(12) United States Patent
Knecht et al.

(10) Patent No.: US 11,390,026 B2
(45) Date of Patent: Jul. 19, 2022

(54) ADDITIVE MANUFACTURING APPARATUS AND SYSTEM

(71) Applicant: PAXIS LLC, Crystal Lake, IL (US)

(72) Inventors: Frederick Knecht, Woodstock, IL (US); Michael G. Littrell, Crystal Lake, IL (US)

(73) Assignee: PAXIS LLC, Crystal Lake, IL (US)

( * ) Notice: Subject to any disclaimer, the term of this patent is extended or adjusted under 35 U.S.C. 154(b) by 542 days.

(21) Appl. No.: 16/376,800

(22) Filed: Apr. 5, 2019

(65) Prior Publication Data

US 2019/0308371 A1 Oct. 10, 2019

Related U.S. Application Data

(60) Provisional application No. 62/654,076, filed on Apr. 6, 2018.

(51) Int. Cl.
| | |
|---|---|
| *B29C 64/218* | (2017.01) |
| *B29C 64/277* | (2017.01) |
| *B29C 64/129* | (2017.01) |
| *B29C 64/236* | (2017.01) |
| *B33Y 30/00* | (2015.01) |
| *B29C 64/241* | (2017.01) |

(Continued)

(52) U.S. Cl.
CPC .......... *B29C 64/218* (2017.08); *B29C 64/129* (2017.08); *B29C 64/236* (2017.08); *B29C 64/277* (2017.08); *B29C 64/379* (2017.08); *B29C 64/393* (2017.08); *B29C 64/241* (2017.08); *B33Y 10/00* (2014.12); *B33Y 30/00* (2014.12); *B33Y 40/00* (2014.12); *B33Y 50/02* (2014.12)

(58) Field of Classification Search
CPC ... B29C 64/129; B29C 64/124; B29C 64/218; B29C 64/277
See application file for complete search history.

(56) References Cited

U.S. PATENT DOCUMENTS

| | | |
|---|---|---|
| 4,865,029 A | 9/1989 | Pankratov et al. |
| 4,915,402 A | 4/1990 | Brinker |

(Continued)

FOREIGN PATENT DOCUMENTS

| | | |
|---|---|---|
| CN | 101489766 A | 7/2009 |
| CN | 101554778 A | 10/2009 |

(Continued)

OTHER PUBLICATIONS

May 19, 2021—(RU) Office Action—App 2020136323/05 (Eng Trans).

(Continued)

*Primary Examiner* — Niki Bakhtiari
*Assistant Examiner* — Nicholas J Chidiac
(74) *Attorney, Agent, or Firm* — Banner & Witcoff, Ltd.

(57) ABSTRACT

An apparatus for producing a three-dimensional object using a resin or other flowable material in a layer-by-layer technique uses a roller or other applicator to carry a layer of the flowable material to an application site, an exposure device to emit electromagnetic waves to apply the layer to the object to build the object, and optionally further including an initial exposure with emitted electromagnetic waves to at least partially solidify the layer of the flowable material prior to the roller carrying the layer to the application site.

27 Claims, 103 Drawing Sheets

(51) Int. Cl.
*B29C 64/393* (2017.01)
*B29C 64/379* (2017.01)
*B33Y 10/00* (2015.01)
*B33Y 50/02* (2015.01)
*B33Y 40/00* (2020.01)

(56) References Cited

U.S. PATENT DOCUMENTS

| | | |
|---|---|---|
| 5,263,130 A | 11/1993 | Pomerantz et al. |
| 5,902,537 A | 5/1999 | Almquist et al. |
| 7,195,472 B2 | 3/2007 | John |
| 7,229,201 B2 | 6/2007 | Krupa et al. |
| 7,357,629 B2 | 4/2008 | Weiskopf et al. |
| 7,438,846 B2 | 10/2008 | John |
| 7,467,837 B2 | 12/2008 | Silverbrook |
| 7,806,493 B2 | 10/2010 | Gazeau et al. |
| 8,252,223 B2 | 8/2012 | Medina et al. |
| 8,317,508 B2 | 11/2012 | Bokodi et al. |
| 8,696,971 B2 | 4/2014 | Boot et al. |
| 8,961,167 B2 | 2/2015 | Swanson et al. |
| 9,011,136 B1 | 4/2015 | Uzan et al. |
| 9,254,535 B2 | 2/2016 | Buller et al. |
| 9,481,133 B2 | 11/2016 | Carbone et al. |
| 10,022,911 B2 | 7/2018 | Yasukochi |
| 10,343,390 B2 | 7/2019 | Knecht et al. |
| 10,618,270 B2 | 4/2020 | Knecht et al. |
| 10,703,085 B2 | 7/2020 | Yasukochi |
| 2005/0280185 A1 | 12/2005 | Russell et al. |
| 2008/0109102 A1 | 5/2008 | Sutcliffe |
| 2008/0169589 A1 | 7/2008 | Sperry et al. |
| 2009/0309267 A1 | 12/2009 | Boot et al. |
| 2010/0177151 A1 | 7/2010 | Thompson et al. |
| 2012/0045617 A1* | 2/2012 | Yasukochi ............ B29C 64/268 428/156 |
| 2012/0313294 A1 | 12/2012 | Vermeer et al. |
| 2014/0070463 A1 | 3/2014 | Boot et al. |
| 2014/0268077 A1* | 9/2014 | Melde ................. G03F 7/70141 355/67 |
| 2014/0271328 A1 | 9/2014 | Burris et al. |
| 2015/0016556 A1 | 1/2015 | Chen et al. |
| 2015/0084240 A1 | 3/2015 | Shuck et al. |
| 2015/0110910 A1 | 4/2015 | Hartmann et al. |
| 2015/0165556 A1 | 6/2015 | Jones et al. |
| 2015/0273762 A1 | 10/2015 | Okamoto |
| 2015/0360419 A1 | 12/2015 | Willis et al. |
| 2015/0375458 A1 | 12/2015 | Chen et al. |
| 2016/0158962 A1 | 6/2016 | Balistreri et al. |
| 2016/0236422 A1 | 8/2016 | Sakura |
| 2016/0311023 A1 | 10/2016 | Schirtzinger et al. |
| 2016/0311163 A1* | 10/2016 | Yasukochi ............. B33Y 10/00 |
| 2016/0311166 A1 | 10/2016 | Campbell |
| 2017/0015059 A1 | 1/2017 | Lewicki |
| 2017/0136688 A1 | 5/2017 | Knecht et al. |
| 2017/0136701 A1 | 5/2017 | Knecht et al. |
| 2017/0192377 A1* | 7/2017 | Batchelder ......... G03G 15/1625 |
| 2017/0239885 A1 | 8/2017 | Knecht et al. |
| 2017/0239932 A1 | 8/2017 | Knecht et al. |
| 2017/0348902 A1 | 12/2017 | Ohara et al. |
| 2018/0141126 A1 | 5/2018 | Buller et al. |
| 2018/0253080 A1 | 9/2018 | Meess et al. |
| 2019/0022937 A1* | 1/2019 | Stelter .................. B29C 64/218 |
| 2019/0126347 A1 | 5/2019 | Roman et al. |
| 2020/0298440 A1* | 9/2020 | Aoto ........................ B41J 2/442 |
| 2021/0187829 A1* | 6/2021 | Ji .......................... G03G 15/224 |

FOREIGN PATENT DOCUMENTS

| | | |
|---|---|---|
| CN | 102049858 A | 5/2011 |
| CN | 103921444 A | 7/2014 |
| EP | 3085516 A1 | 10/2016 |
| EP | 3374163 A1 | 9/2018 |
| JP | S61118273 A | 6/1986 |
| JP | H05237942 A | 9/1993 |
| JP | H0768647 A | 3/1995 |
| JP | 2000211031 A | 8/2000 |
| JP | 2004122501 A | 4/2004 |
| JP | 2009543717 A | 12/2009 |
| JP | 2011098484 A | 5/2011 |
| JP | 2015120261 A | 7/2015 |
| KR | 20100080298 A | 7/2010 |
| RU | 2569516 C2 | 11/2015 |
| RU | 2610505 C2 | 2/2017 |
| RU | 2640551 C1 | 1/2018 |
| RU | 2642654 C1 | 1/2018 |
| WO | 2012143786 A1 | 10/2012 |
| WO | 2014006399 A1 | 1/2014 |
| WO | 2014013312 A1 | 1/2014 |
| WO | 2015093032 A1 | 6/2015 |
| WO | 2015116639 A1 | 8/2015 |
| WO | 2015177598 A1 | 11/2015 |
| WO | 2016030405 A1 | 3/2016 |
| WO | 2016124432 A1 | 8/2016 |
| WO | 2017083734 A1 | 5/2017 |
| WO | 2018208799 A1 | 11/2018 |

OTHER PUBLICATIONS

May 19, 2021—(RU) Search Report—App 2020136323 (Eng Trans).
Aug. 5, 2019—(WO) International Search Report & Written Opinion—App PCT/US19/26026.
Mar. 19, 2019—(AU) Office Action—App 2016353326.
Apr. 2, 2019—(CA) Office Action—App 3,005,229.
Jul. 10, 2019—(EESR) Supplementary European Search Report & Opinion—App EP16865142.
Aug. 5, 2020—(CN) Office Action—App 2016800757907 (trans).
Sep. 22, 2020—(IN) Office Action—App 201817019642.
Sep. 24, 2020—(EP) Examination Report—App 16865142.0.
Mar. 24, 2017—(WO) International Search Report & Written Opinion—App PCT/US16/61649.
Sep. 12, 2018—(WO) International Search Report and Written Opinion—App PCT/US18/31630.
Jun. 10, 2021 (SG) Examination Report—App 11202009858U (Eng).
Jul. 28, 2021—(AU) Examination Report No. 1—App 2019247458 (Eng Trans).
Nov. 19, 2021—(CA) Examination Report—App 3,096,390.
Aug. 11, 2021—(IL) Office Action—App No. 259305.
Dec. 7, 2021—(JP) Office Action—App 2020-554499.
Nov. 12, 2019—(CN) OA—App 2019110701451180—Eng Tran.
Nov. 26, 2019—(JP) Office Action—App 2014-174966—Eng Tran.
Jan. 1, 2020—(KR) OA—App 10-2018-7016314—Eng Tran.
Feb. 10, 2020—(EP) Office Action—App 16865142.0-1017.
Jan. 24, 2020—(CA) Office Action—App 3,005,229.
Mar. 26, 2021—(EP) Examination Report—App 16865142.0-1017.
Dec. 2, 20210—(CN) First Office Action—App 201980037625.6.
Jan. 4, 2022—(EP) Supplementary European Search Report and Search Opinion—App. No. 19781708.3.
Jan. 3, 2022—(MX) First Office Action—App MX/a/2018/005954.
Apr. 26, 2022—(JP) Decision of Refusal—App 2020-554499 (w/Eng trans).
May 16, 2022—(CN) Second Office Action—App 201980037625.6.
May 4, 2022—(NZ) Examination Report—App 769669.

* cited by examiner

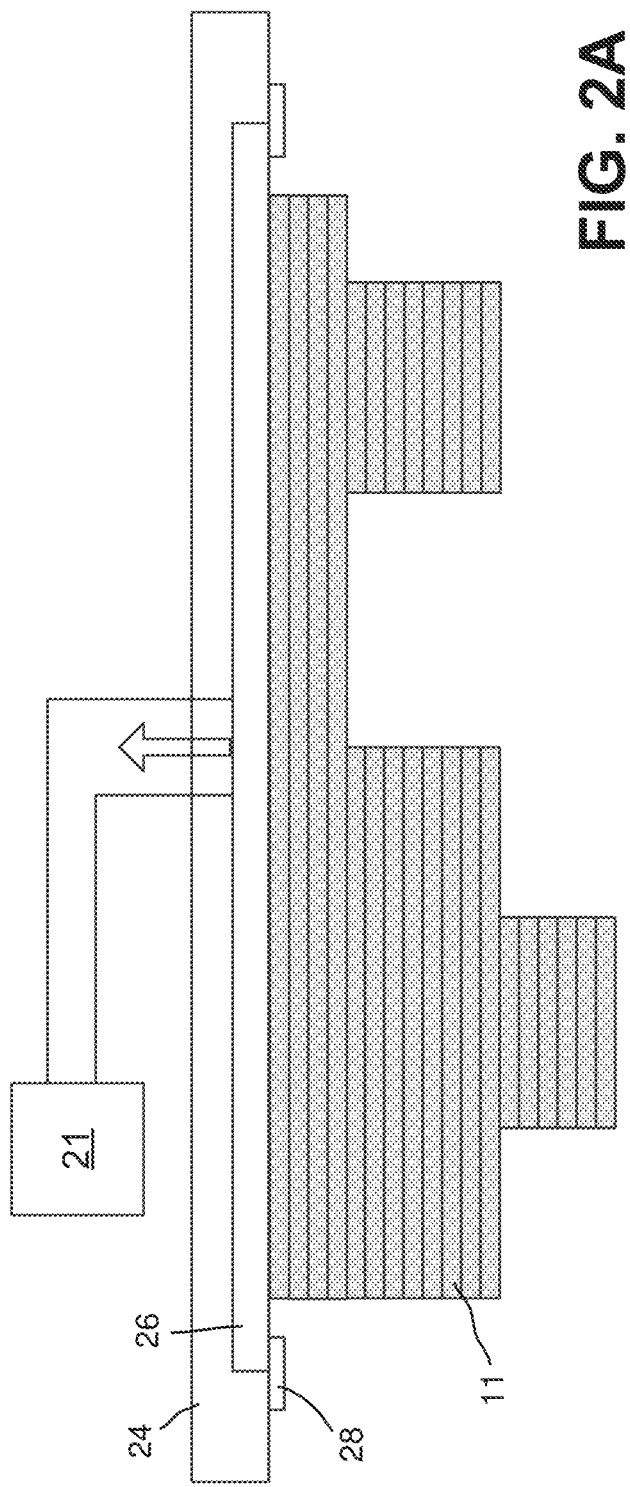

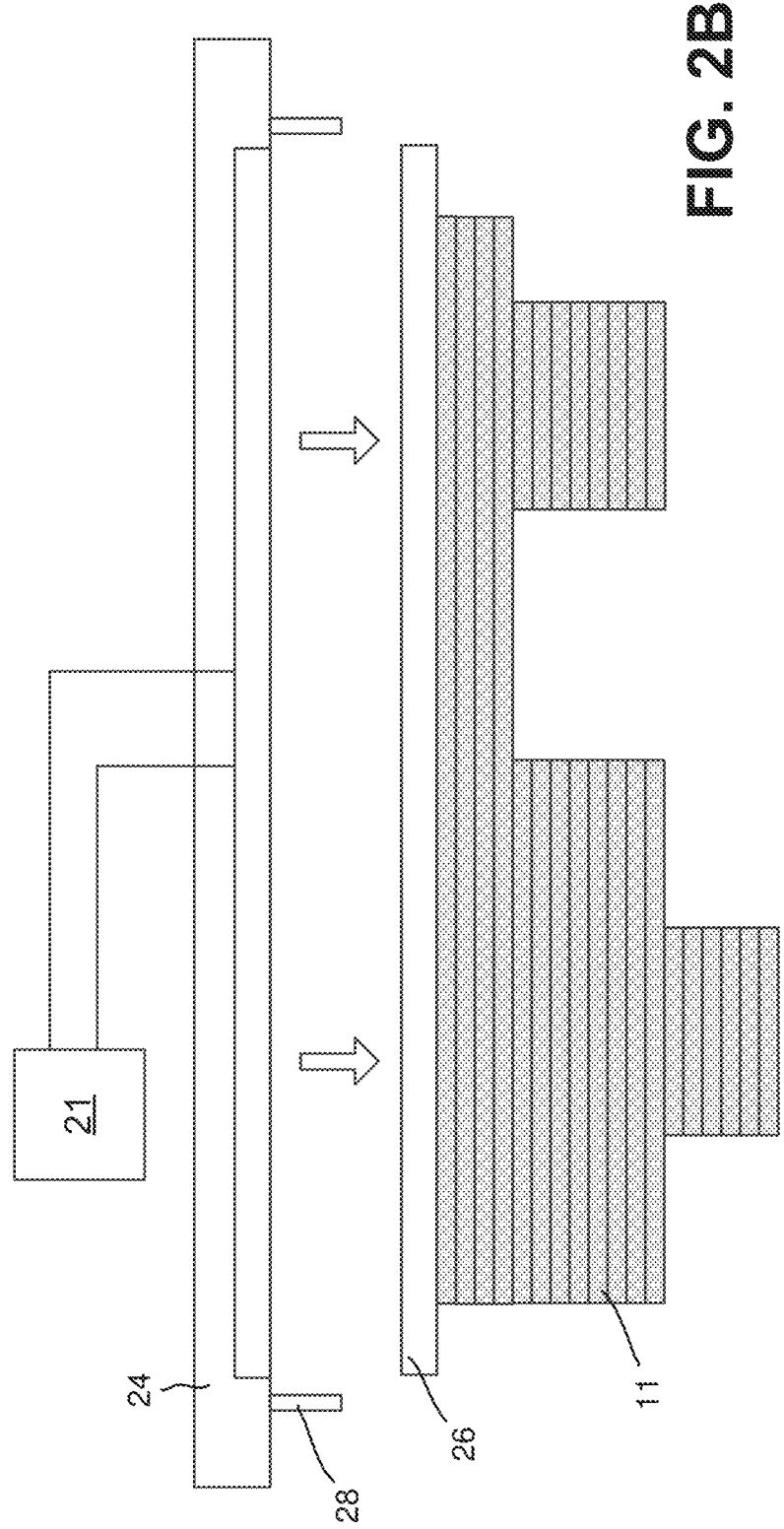

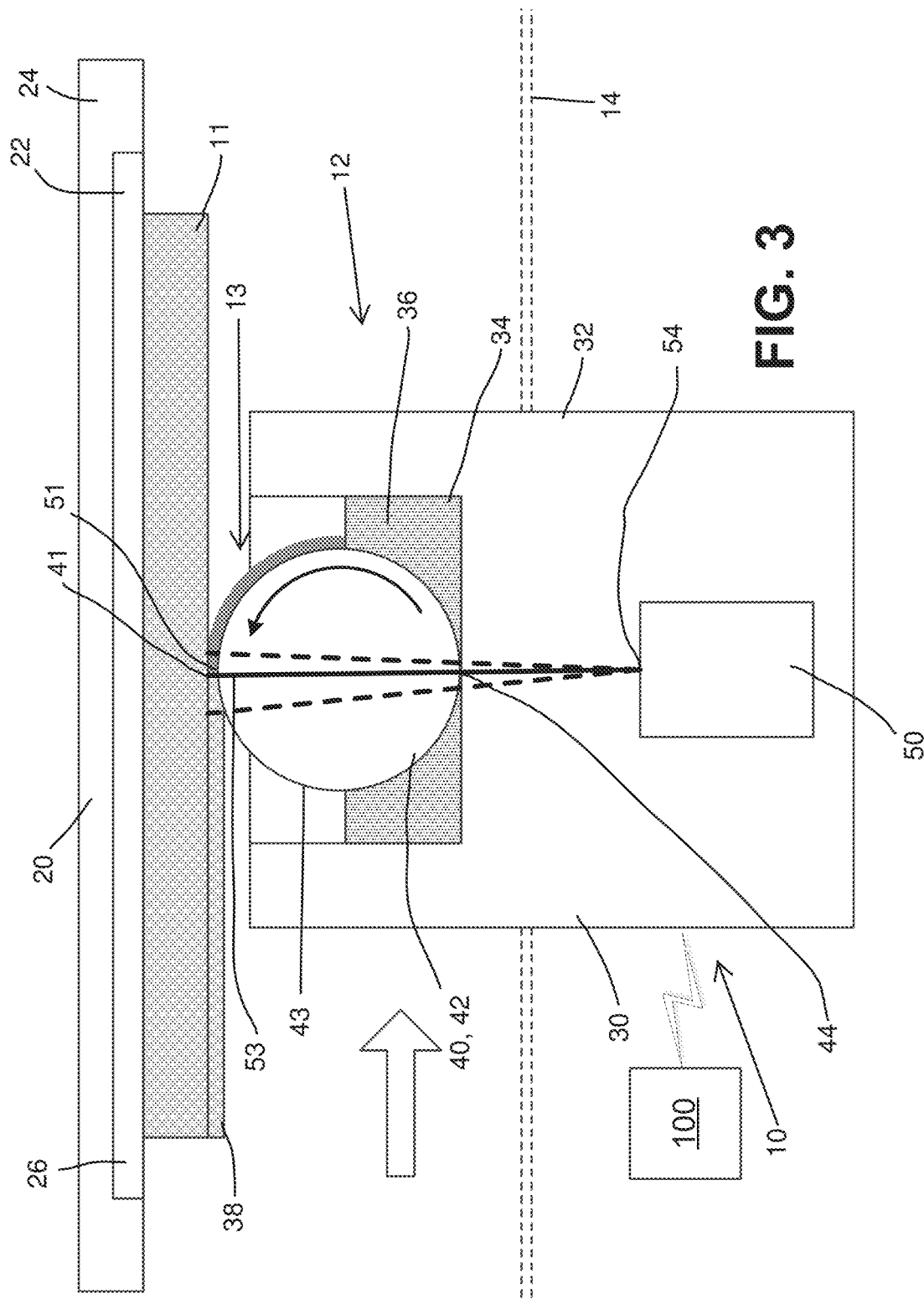

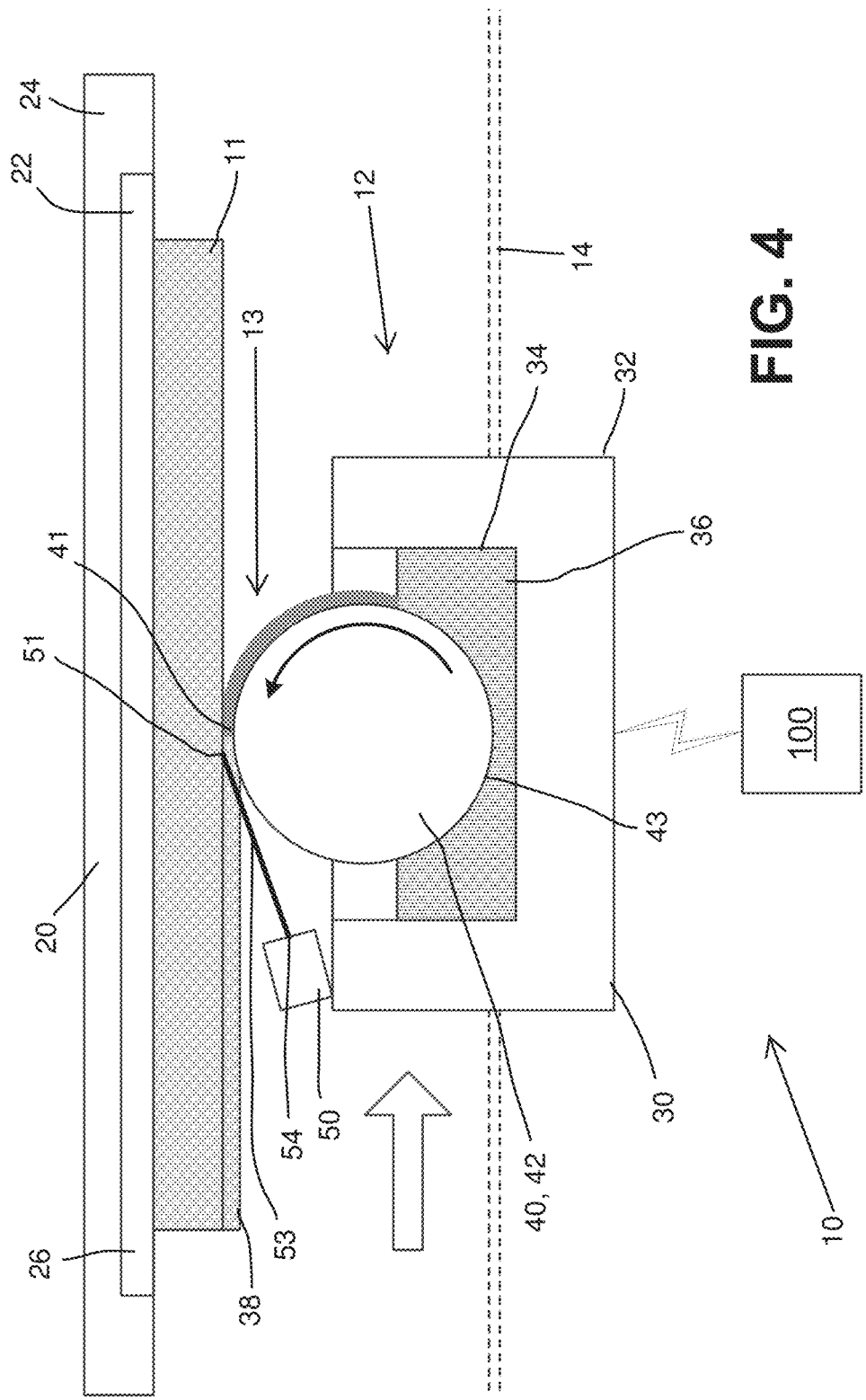

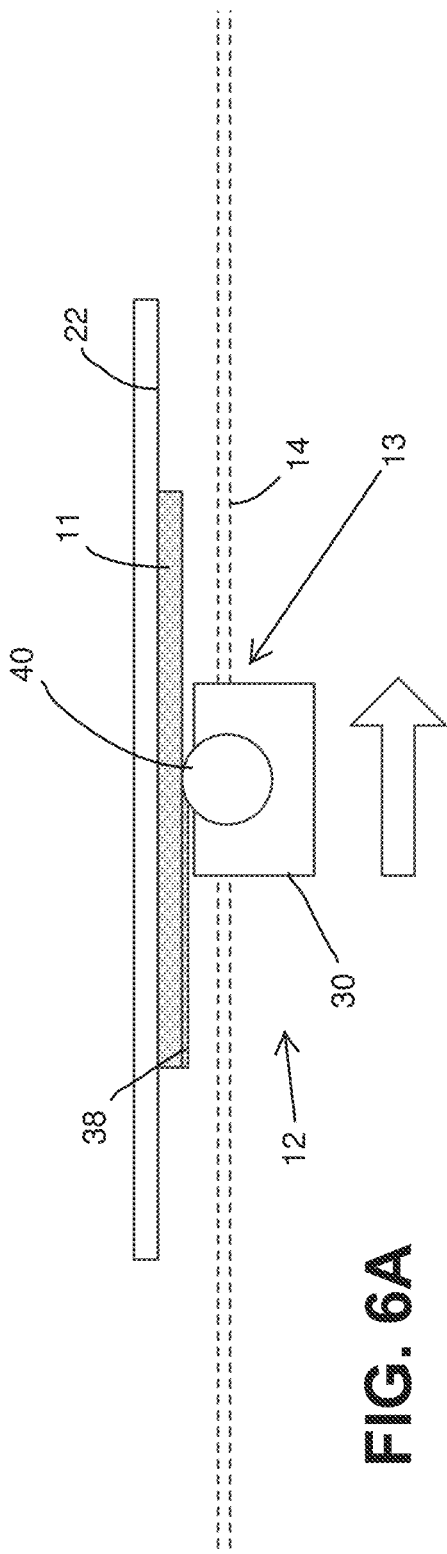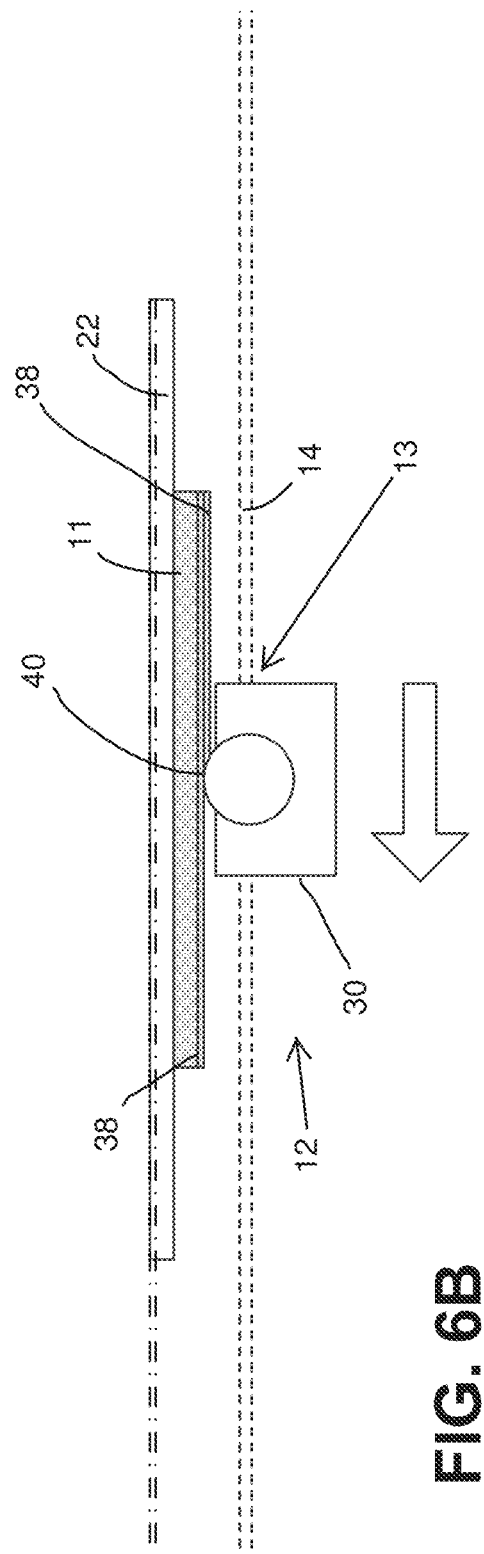

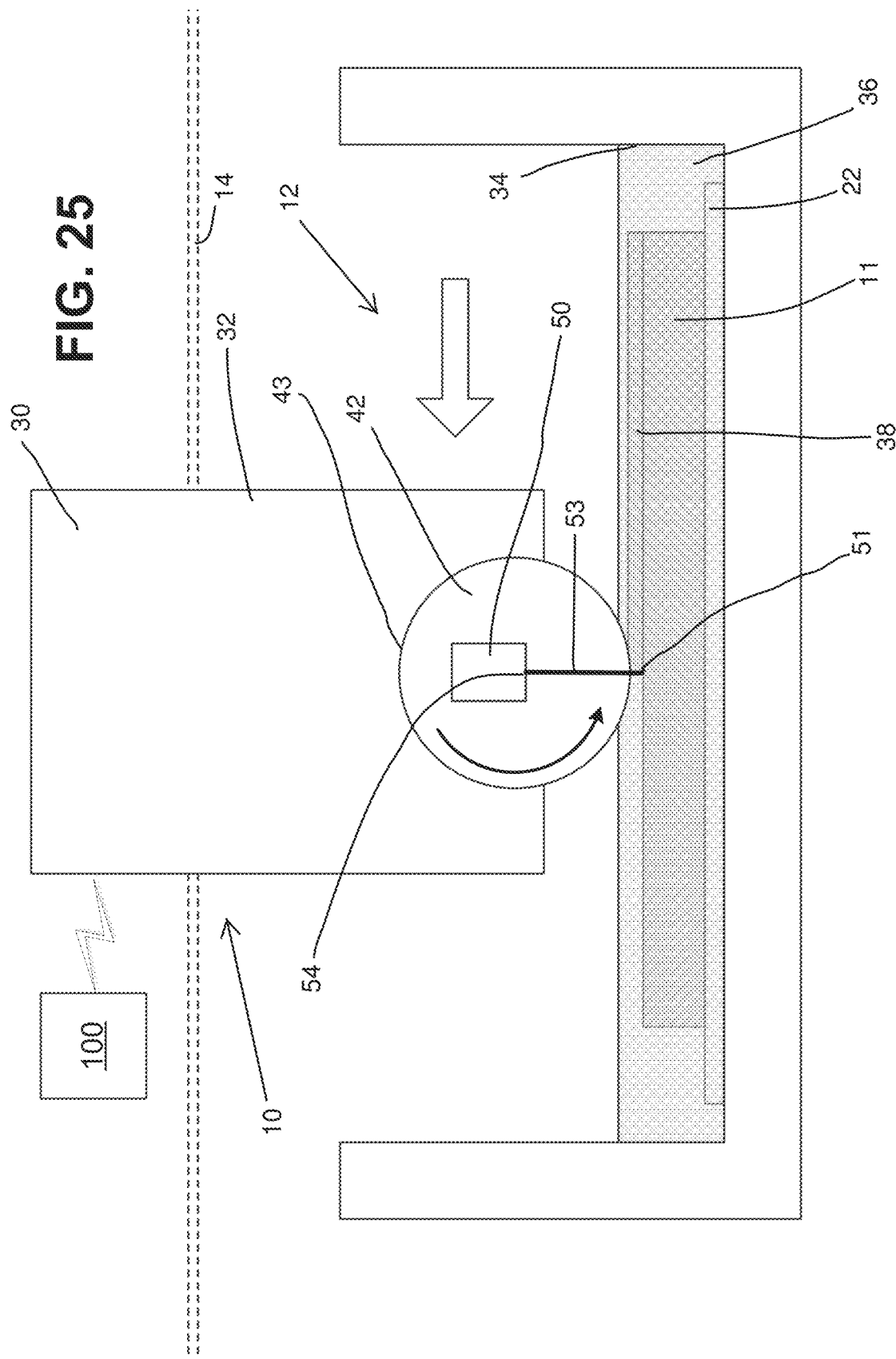

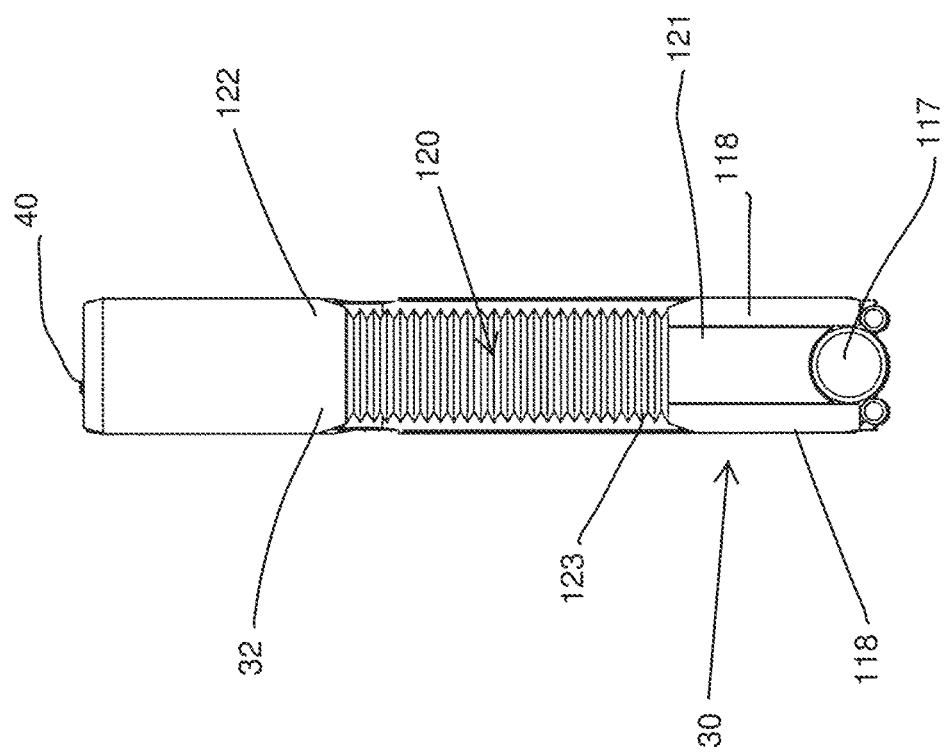

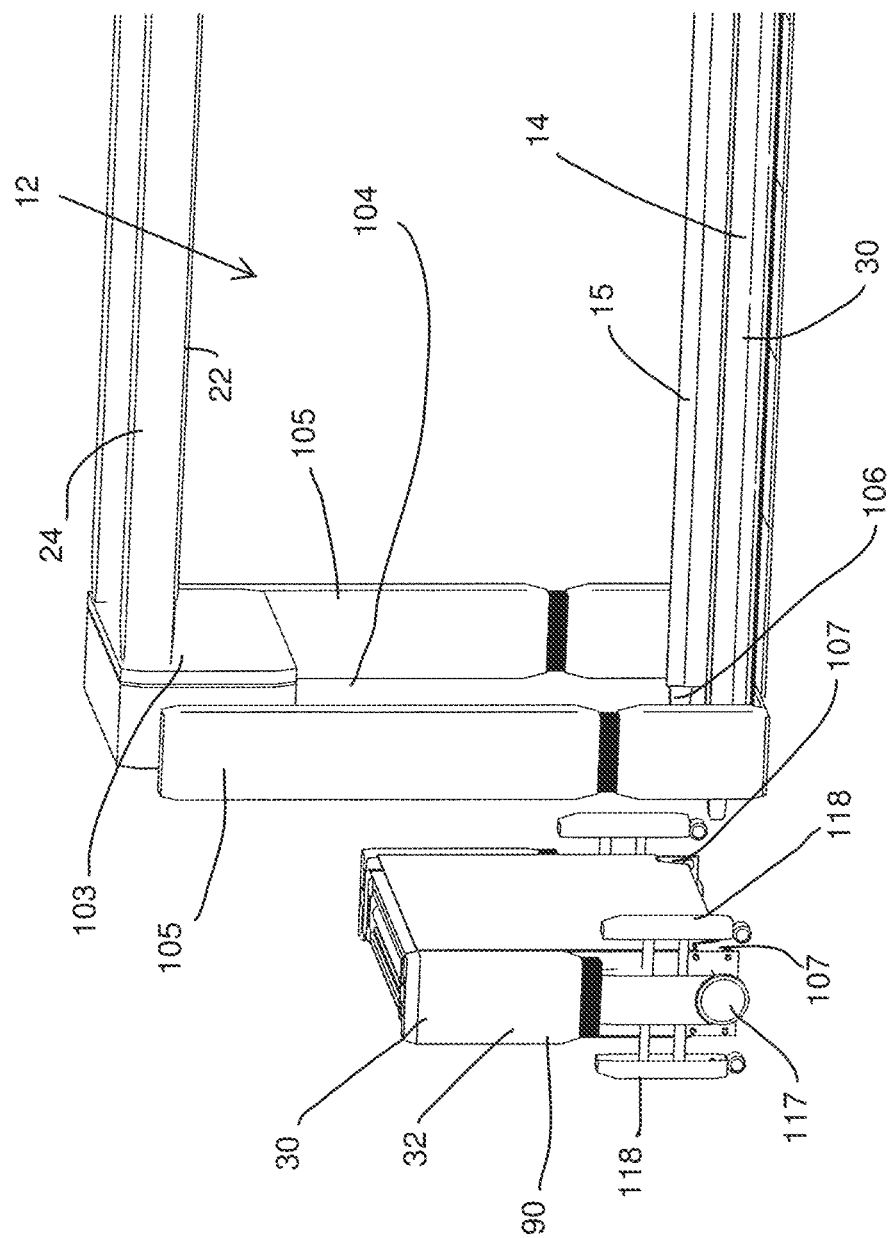

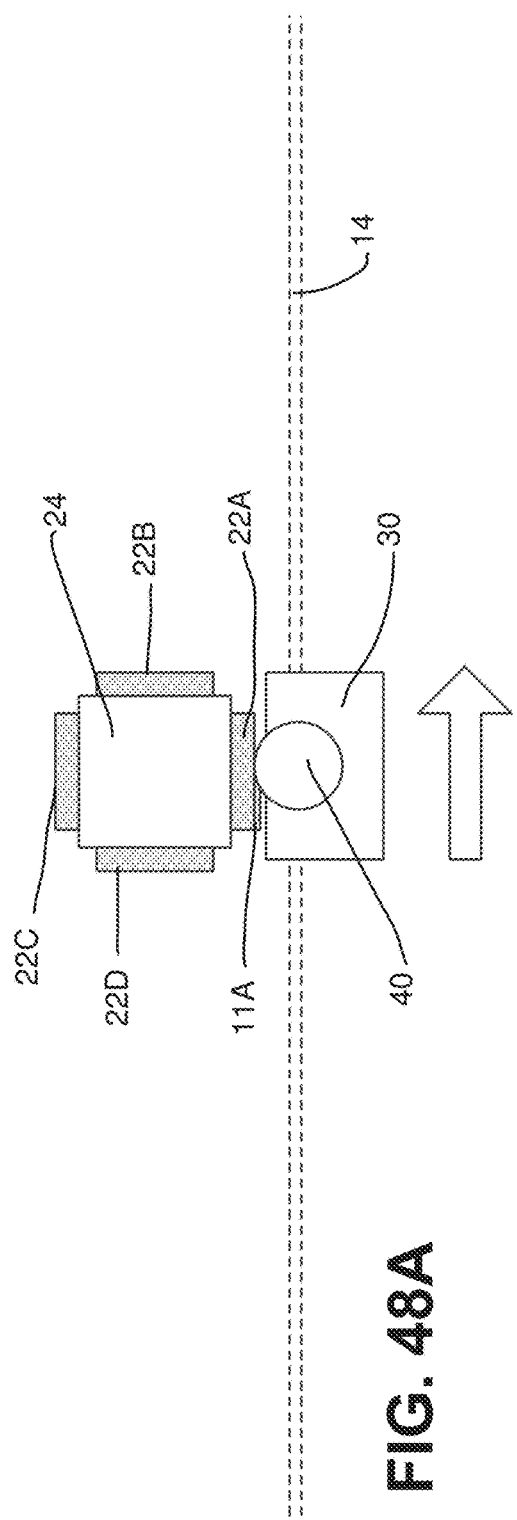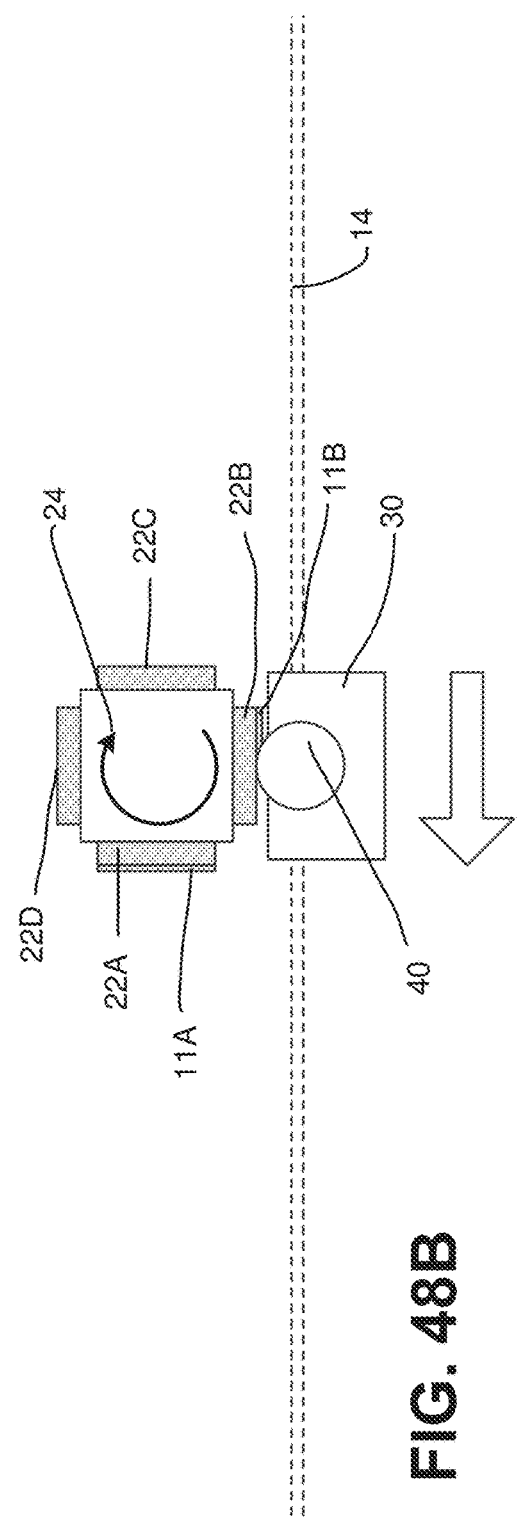

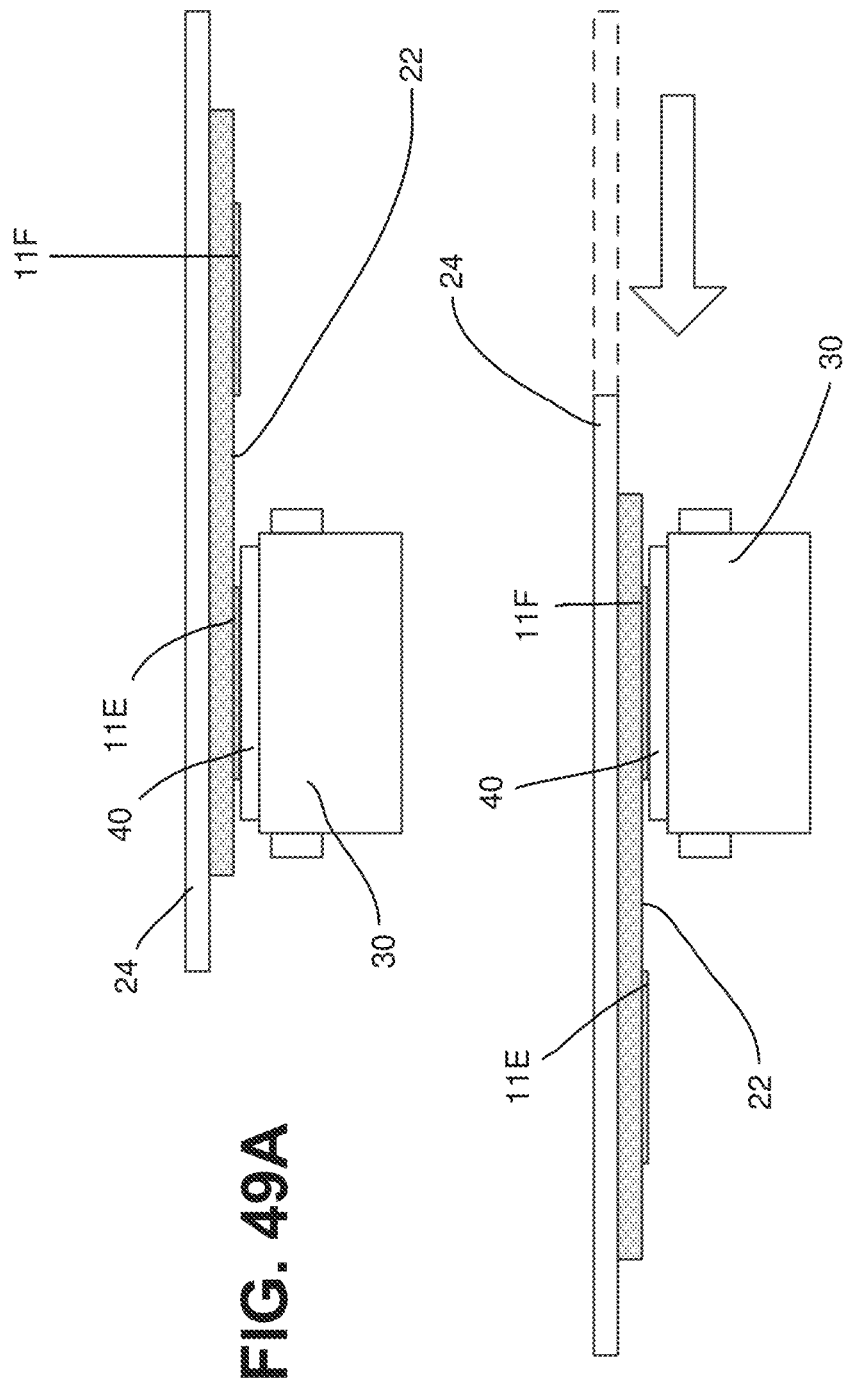

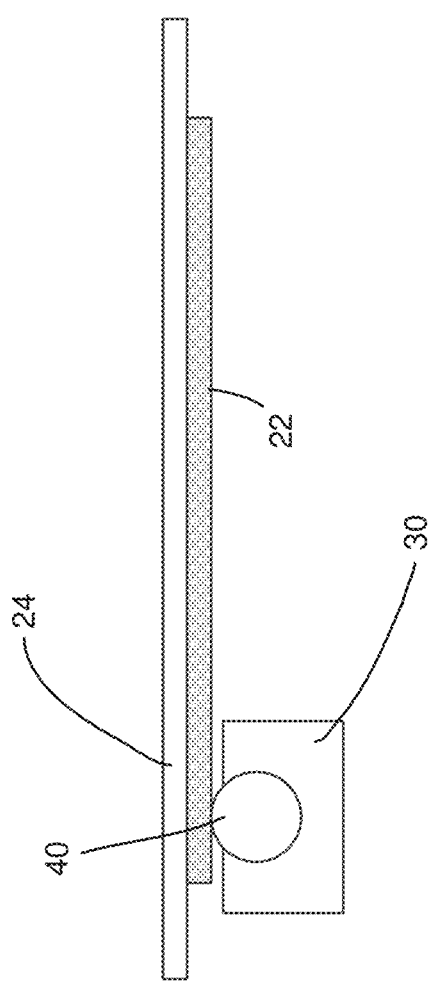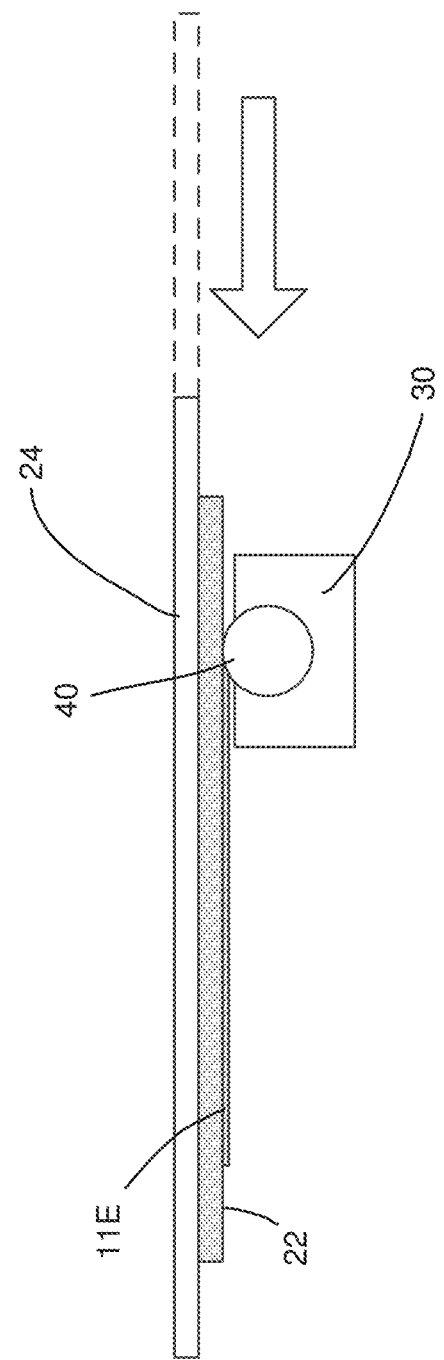
FIG. 49C
FIG. 49D

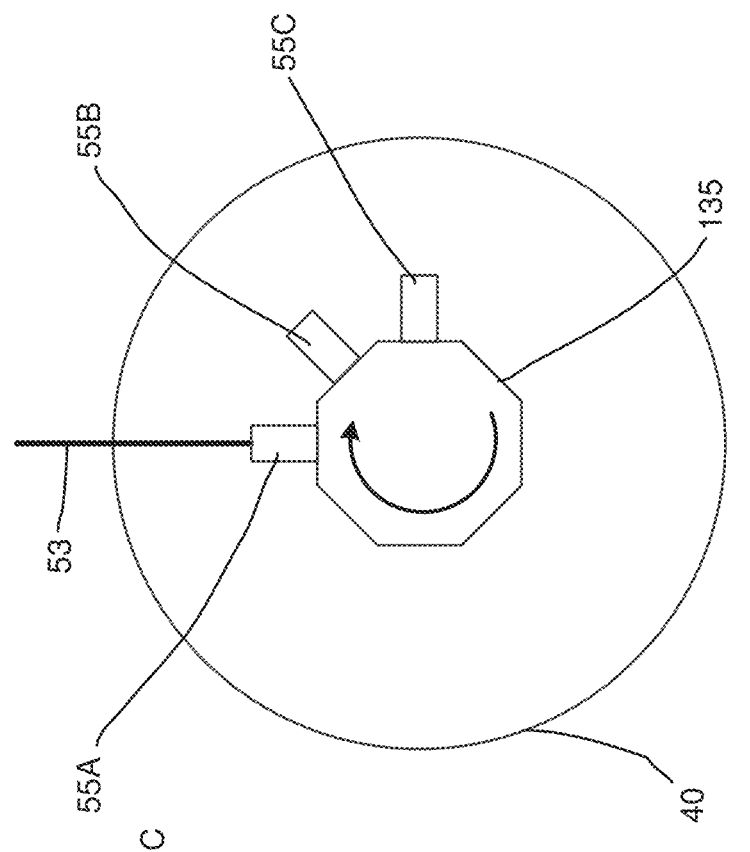
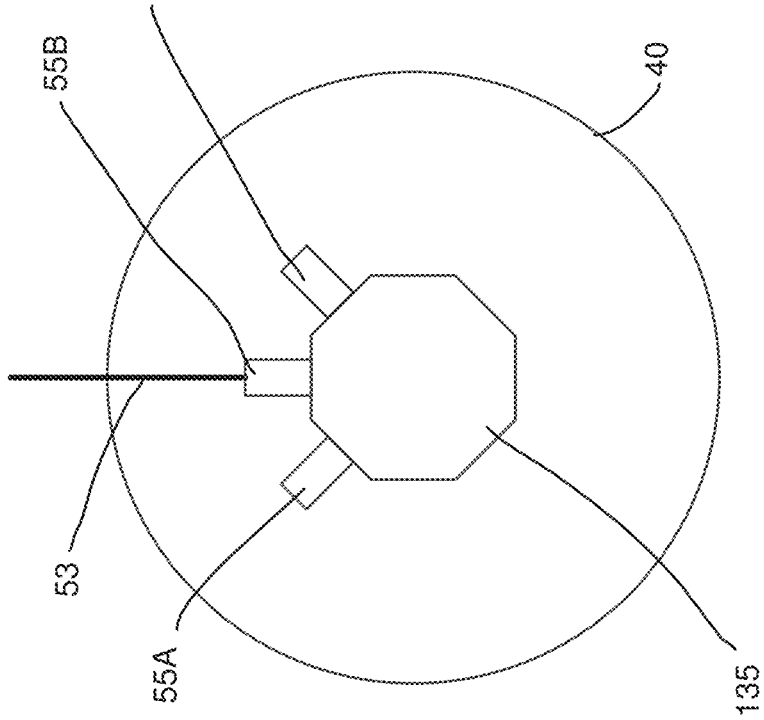

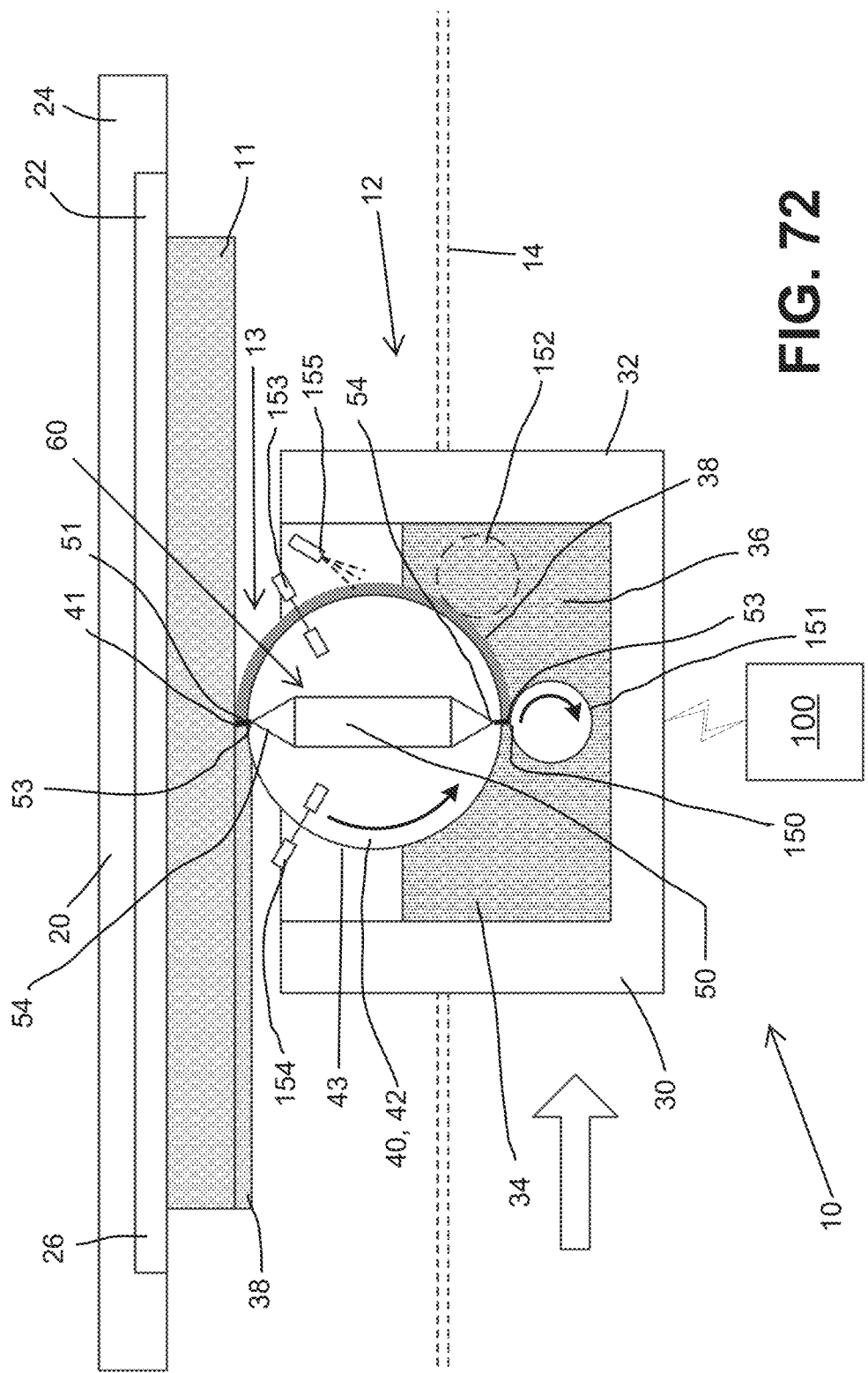

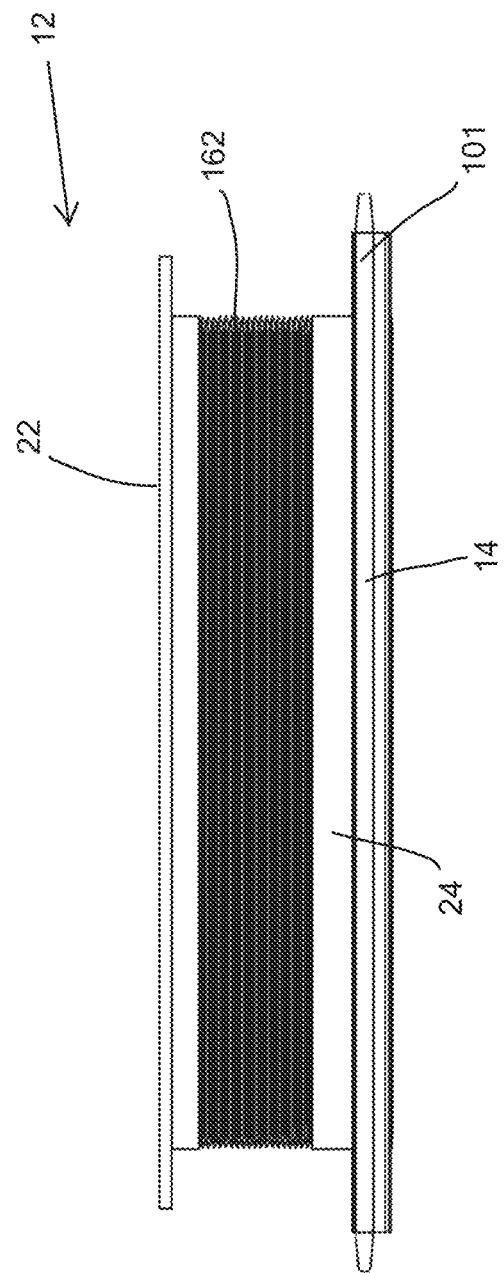
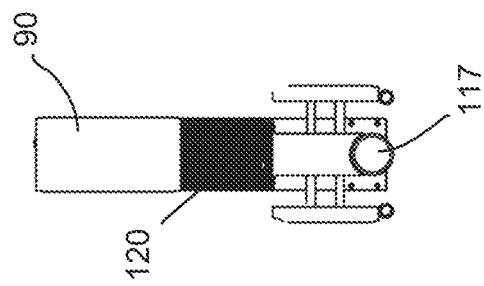
FIG. 77

ADDITIVE MANUFACTURING APPARATUS AND SYSTEM

CROSS REFERENCE TO RELATED APPLICATION

This application is a non-provisional of, and claims priority to, U.S. Provisional Application No. 62/654,076, filed Apr. 6, 2018, which prior application is incorporated by reference herein in its entirety.

TECHNICAL FIELD

The present disclosure generally relates to an apparatus and system for producing a three-dimensional object in an additive manufacturing technique and method for operating the apparatus and system, and more specifically, to an apparatus, system, and method that uses a roller in contact with a flowable resin or other precursor material in building each layer of the object.

BACKGROUND

Current techniques for additive manufacturing of three-dimensional objects (e.g., stereolithography, 3-D printing, etc.) can produce excellent quality products with high fidelity, but such techniques have significant limitations. Typically, such techniques work in one of three ways: (a) continually polymerizing layers at or near the surface of liquid resin contained in a stationary vat, (b) continually polymerizing layers of resin at or near the bottom of a stationary vat of resin, or (c) continually polymerizing layers of resin that has been jetted downward by one or more single-nozzle or multi-nozzle print heads. Such techniques are generally limited to small sizes, with maximum sizes for various machines being only a few feet in width or length or even smaller. This limits the size of objects that can be produced. Jet-based processes have significant size limitations and waste a great deal of resin material during production.

Vat-based techniques require that the object is partially or fully submerged during manufacturing, thus requiring the vat of resin to be maintained at a significant volume. This can be costly, as such resins are typically very expensive, and maintenance of resin vats in a collection of machines can be extremely costly. The size of the vat also limits the size of the object that can be produced, as noted above. Additionally, submersion of the object during production often results in cavities within the object being filled with uncured liquid resin, which must be drained, often requiring drilling a drainage hole and subsequent repair. Further, the vat generally only contains a single resin, so manufacture of multi-material parts is not possible. Vat-based techniques have production speed limitations as well, due to wait times for new resin to flow over or under the areas to be polymerized.

The present disclosure seeks to overcome certain of these limitations and other drawbacks of existing apparatuses, systems, and methods, and to provide new features not heretofore available.

BRIEF SUMMARY

General aspects of the present disclosure relate to deposition mechanisms configured for producing a three-dimensional object on a build platform using a resin or other flowable material in a layer-by-layer technique, which uses a roller or other applicator to carry a layer of the flowable material to an application site, an exposure device to emit electromagnetic waves to apply the layer to the object to build the object, and optionally further including an initial exposure with emitted electromagnetic waves to at least partially solidify the layer of the flowable material prior to the roller carrying the layer to the application site. General aspects of the disclosure also relate to systems, apparatuses, and methods using such deposition mechanisms.

Aspects of the disclosure relate to a deposition mechanism configured for producing a three-dimensional object on a build platform using a resin in a layer-by-layer technique, with a build area defined adjacent to the build platform, including a carriage configured for movement through the build area, a supply of the resin in flowable form mounted on the carriage, a roller in communication with the supply of the resin and rotatably mounted on the carriage, and an exposure device mounted on the carriage and configured for emitting electromagnetic waves. The exposure device is configured for emitting the electromagnetic waves to a first exposure site located adjacent to the roller within the supply of the resin, to at least partially solidify a layer of the resin, and wherein the roller is configured for rotating to carry the layer of the resin to an application site within the build area for application to produce the three-dimensional object as the carriage passes through the build area. The exposure device is further configured for emitting the electromagnetic waves to a second exposure site within the build area to apply the layer to produce the three-dimensional object. In one configuration, the first exposure site and the second exposure site may be located at approximately 180° from each other relative to the roller. In various configurations, the build area may be located below the build platform, such that the roller is configured to pass below the build platform to build the object below the build platform, or the build area may be located above the build platform, such that the roller is configured to pass above the build platform to build the object above the build platform.

According to one aspect, the mechanism further includes a controller configured for controlling movement of the carriage and the roller and for controlling activation of the exposure device to produce the three-dimensional object.

According to another aspect, the mechanism further includes a first plurality of optical fibers having first exit ends arranged in a first array and first entrance ends configured for receiving the electromagnetic waves from the exposure device, and a second plurality of optical fibers having second exit ends arranged in a second array and second entrance ends configured for receiving the electromagnetic waves from the exposure device. The first plurality of optical fibers are configured such that the electromagnetic waves emitted by the exposure device travel through the first plurality of optical fibers and exit the exit ends of the first array directed toward the first exposure site, and the second plurality of optical fibers are configured such that the electromagnetic waves emitted by the exposure device travel through the second plurality of optical fibers and exit the exit ends of the second array directed toward the second exposure site. In one configuration, the exposure device includes a plurality of LEDs, and each of the first plurality of optical fibers and each of the second plurality of optical fibers is associated with one of the plurality of LEDs. In another configuration, the exposure device includes a DLP projector, and each of the first plurality of optical fibers and each of the second plurality of optical fibers are configured for receiving the electromagnetic waves from the DLP projector.

According to a further aspect, the roller is permeable to the electromagnetic waves, and the exposure device is configured such that the electromagnetic waves pass through the roller in traveling to the first exposure site and the second exposure site.

According to yet another aspect, the deposition mechanism further includes a resin removal mechanism positioned between the first exposure site and the second exposure site and configured for removing excess unsolidified resin from the layer between the first and second exposure sites.

According to a still further aspect, the deposition mechanism includes a first lens array positioned between the exposure device and the first exposure site and a second lens array positioned between the exposure device and the second exposure site, where the first and second lens arrays are configured to focus the electromagnetic waves directed toward the first exposure site and the second exposure site.

According to an additional aspect, the deposition mechanism further includes a thickness limiter positioned at the first exposure site, such that the first exposure site is located between the roller and the thickness limiter, and a space between the roller and the thickness limiter defines a thickness of the layer. In one configuration, the thickness limiter includes a secondary roller rotatably mounted at least partially within the supply of the resin.

According to a further aspect, the carriage is configured to be mounted on a track for movement through the build area. The carriage may further be configured for autonomous movement separate from the track.

Additional aspects of the disclosure relate to a deposition mechanism configured for producing a three-dimensional object on a build platform using a resin in a layer-by-layer technique, with a build area defined adjacent to the build platform, including a carriage configured for movement through the build area, a supply of the resin in flowable form mounted on the carriage, a primary roller in communication with the supply of the resin and rotatably mounted on the carriage, a secondary roller rotatably mounted at least partially within the supply of the resin, such that a space is defined between the primary roller and the secondary roller, and an exposure device mounted on the carriage and configured for emitting electromagnetic waves. The exposure device is configured for emitting the electromagnetic waves to a first exposure site located within the supply of the resin and within the space between the primary and secondary rollers, to at least partially solidify a layer of the resin, such that the space between the primary and secondary rollers defines a thickness of the layer, and the primary roller is configured for rotating to carry the layer of the resin to an application site within the build area for application to produce the three-dimensional object as the carriage passes through the build area. The exposure device is further configured for emitting the electromagnetic waves to a second exposure site within the build area to apply the layer to produce the three-dimensional object. In one configuration, the first exposure site and the second exposure site may be located at approximately 180° from each other relative to the roller. In various configurations, the build area may be located below the build platform, such that the primary roller is configured to pass below the build platform to build the object below the build platform, or the build area may be located above the build platform, such that the primary roller is configured to pass above the build platform to build the object above the build platform.

According to one aspect, the mechanism further includes a controller configured for controlling movement of the carriage and the primary and secondary rollers and for controlling activation of the exposure device to produce the three-dimensional object.

According to another aspect, the mechanism further includes a first plurality of optical fibers having first exit ends arranged in a first array and first entrance ends configured for receiving the electromagnetic waves from the exposure device, and a second plurality of optical fibers having second exit ends arranged in a second array and second entrance ends configured for receiving the electromagnetic waves from the exposure device. The first plurality of optical fibers are configured such that the electromagnetic waves emitted by the exposure device travel through the first plurality of optical fibers and exit the exit ends of the first array directed toward the first exposure site, and the second plurality of optical fibers are configured such that the electromagnetic waves emitted by the exposure device travel through the second plurality of optical fibers and exit the exit ends of the second array directed toward the second exposure site. In one configuration, the exposure device comprises a plurality of LEDs, wherein each of the first plurality of optical fibers and each of the second plurality of optical fibers is associated with one of the plurality of LEDs. In another configuration, the exposure device comprises a DLP projector, wherein each of the first plurality of optical fibers and each of the second plurality of optical fibers are configured for receiving the electromagnetic waves from the DLP projector. In some configurations, the exit ends of the first array and the exit ends of the second array are positioned within the primary roller.

According to a further aspect, the primary roller is permeable to the electromagnetic waves, and the exposure device is configured such that the electromagnetic waves pass through the primary roller in traveling to the first exposure site and the second exposure site.

According to a still further aspect, the mechanism further includes a resin removal mechanism positioned between the first exposure site and the second exposure site and configured for removing excess unsolidified resin from the layer between the first and second exposure sites. In one configuration, the resin removal mechanism includes a cleaning roller positioned between the first exposure site and the second exposure site and configured for rotating in contact with a surface of the layer to remove the excess unsolidified resin from the layer between the first and second exposure sites. The resin removal mechanism may include first and second cleaning rollers positioned between the first exposure site and the second exposure site on opposite sides of the second exposure site, where the first and second cleaning rollers are configured such that the first cleaning roller is configured for rotating in contact with a surface of the layer to remove the excess unsolidified resin from the layer between the first and second exposure sites when the deposition mechanism is moving in a first direction and the second cleaning roller is configured for rotating in contact with the surface of the layer to remove the excess unsolidified resin from the layer between the first and second exposure sites when the deposition mechanism is moving in a second direction opposite the first direction. In this configuration, the first and second cleaning rollers are configured such that the first cleaning roller is configured for contacting the primary roller to function as a first transfer verification sensor when the deposition mechanism is moving in the second direction and the second cleaning roller is configured for contacting the primary roller to function as a second transfer verification sensor when the deposition mechanism is moving in the first direction.

According to yet another aspect, the deposition mechanism further includes a first lens array positioned between the exposure device and the first exposure site and a second lens array positioned between the exposure device and the second exposure site, where the first and second lens arrays are configured to focus the electromagnetic waves directed toward the first exposure site and the second exposure site.

According to an additional aspect, the carriage is configured to be mounted on a track for movement through the build area. In one configuration, the carriage is further configured for autonomous movement separate from the track.

Further aspects of the disclosure relate to an assembly for supplying a flowable material, that includes a supply vat configured to contain the flowable material, the supply vat having first and second inner support walls located at opposite ends of the supply vat, a roller positioned at least partially within the supply vat and configured to be in contact with the flowable material, and a first outer support wall positioned outward of the first inner support wall and located outside the supply vat, such that a first space is defined between the first inner support wall and the first outer support wall. The first inner support wall has a first opening therethrough extending between the supply vat and the first space, and the roller extends through the first opening and is positioned at least partially within the first space. A first seal is engaged with the roller around an entire periphery of the roller and positioned adjacent the first opening to resist most leakage of the flowable material through the first opening, while permitting some slow and/or controlled leakage of portions of the flowable material through the first opening. The assembly also includes a drainage system configured to remove portions of the flowable material that pass through the first opening from the first space. Aspects of the disclosure also relate to a deposition mechanism that includes the assembly for supplying the flowable material, as well as a carriage configured for movement through a build area to build a three-dimensional object and an exposure device configured for emitting electromagnetic waves to an exposure site within the build area to apply a layer of material carried by the roller to produce the object.

According to one aspect, the drainage system is further configured to return the portions of the flowable material to the supply vat.

According to another aspect, the assembly also includes a second outer support wall positioned outward of the second inner support wall and located outside the supply vat, such that a second space is defined between the second inner support wall and the second outer support wall. The second inner support wall has a second opening therethrough extending between the supply vat and the second space, and the roller extends through the second opening and is positioned at least partially within the second space. A second seal is engaged with the roller around an entire periphery of the roller and positioned adjacent the second opening to resist most leakage of the flowable material through the second opening. The drainage system is further configured to remove additional portions of the flowable material that pass through the second opening from the second space.

According to a further aspect, the supply vat has a bottom wall that extends between the first and second inner support walls and further extends between the first inner support wall and the first outer support wall across the first space, and the drainage system includes a drain hole in the bottom wall within the first space.

According to yet another aspect, the drainage system further includes a drain hole within the first space and a reservoir in communication with the drain hole, and the drainage system is configured such that the portions of the flowable material are removed by flowing through the drain hole and into the reservoir. In one configuration, the drainage system further includes a pumping mechanism configured for pumping the flowable material from the reservoir into the supply vat. In this configuration, a bottom wall of the supply vat may have an opening in communication with the pumping mechanism, such that the pumping mechanism is configured to pump the flowable material into the supply vat through the opening, and the bottom wall of the supply vat may be sloped downward toward the opening.

According to a still further aspect, a first bearing is connected to the first outer support wall and engaging the roller to rotatably support the roller.

Other aspects of the disclosure relate to an autonomous unit that includes a deposition mechanism and/or an assembly for supplying a flowable material as described herein, where the autonomous unit is moveable to build one or more objects using the deposition mechanism.

Other aspects of the disclosure relate to an apparatus that includes a deposition mechanism as described herein and a support assembly having the build platform with the build area defined adjacent to the build platform for building one or more objects on the build platform.

Still further aspects of the disclosure relate to a method of building a three-dimensional object using a deposition mechanism, an apparatus, and/or an autonomous unit as described above. In one configuration, the method includes selectively activating the exposure device to emit the electromagnetic waves to a first exposure site located adjacent to the roller within the supply of the resin, to at least partially solidify a layer of the resin, rotating the roller to carry the layer of the resin to an application site within the build area for application to produce the three-dimensional object as the carriage passes through the build area, and selectively activating the exposure device to emit the electromagnetic waves to a second exposure site within the build area to apply the layer to produce the three-dimensional object. In another configuration, the method includes selectively activating the exposure device to emit the electromagnetic waves to a first exposure site located within the supply of the resin and within the space between the primary and secondary rollers, to at least partially solidify a layer of the resin, such that the space between the primary and secondary rollers defines a thickness of the layer, rotating the primary roller to carry the layer of the resin to an application site within the build area for application to produce the three-dimensional object as the carriage passes through the build area, and selectively activating the exposure device to emit the electromagnetic waves to a second exposure site within the build area to apply the layer to produce the three-dimensional object.

According to one aspect, the method may further include controlling movement of the carriage and the roller or rollers, and controlling activation of the exposure device to produce the three-dimensional object, using a controller. In one configuration, the carriage is mounted on a track and moves along the track through the build area, and the carriage is configured for movement separate from the track, and the method further includes controlling movement of the deposition mechanism separate from the track, using the controller. In another configuration, the method includes controlling, using the controller, at least one additional deposition mechanism that is moveable independently of the deposition mechanism to produce the three-dimensional object.

Other features and advantages of the disclosure will be apparent from the following description taken in conjunction with the attached drawings.

BRIEF DESCRIPTION OF THE DRAWINGS

To understand the present invention, it will now be described by way of example, with reference to the accompanying drawings in which:

FIGS. 2A and 2B are side schematic views of a support assembly of the system and apparatus of FIG. 1, with a three-dimensional object produced on the support assembly;

FIG. 3 is a side schematic view of another embodiment of a system and apparatus for producing a three-dimensional object in operation, according to aspects of the disclosure;

FIG. 4 is a side schematic view of another embodiment of a system and apparatus for producing a three-dimensional object in operation according to aspects of the disclosure;

FIGS. 6A and 6B are side schematic views of the system and apparatus of FIG. 1 in operation, according to aspects of the present disclosure;

FIG. 25 is a side schematic view of another embodiment of a system and apparatus for producing a three-dimensional object in operation, according to aspects of the disclosure;

FIG. 39 is a side view of the deposition mechanism of FIG. 38, showing vertical adjustment of the deposition mechanism to a new vertical application location;

FIG. 40 is a partial perspective view of the deposition mechanism of FIG. 31, showing movement of the deposition mechanism separately of the support assembly;

FIGS. 48A and 48B are side schematic views of another embodiment of an apparatus for producing a three-dimensional object in operation, according to aspects of the disclosure;

FIGS. 49A and 49B are rear schematic views of another embodiment of an apparatus for producing a three-dimensional object in operation, according to aspects of the disclosure;

FIGS. 49C and 49D are side schematic views of another embodiment of an apparatus for producing a three-dimensional object in operation, according to aspects of the disclosure;

FIGS. 61A and 61B are side schematic views of another embodiment of an exposure device and an applicator for use in connection with an apparatus for producing a three-dimensional object in operation, according to aspects of the disclosure;

FIG. 72 is a side schematic view of another embodiment of a system and apparatus for producing a three-dimensional object in operation, according to aspects of the disclosure;

FIG. 77 is a side view of the apparatus of FIG. 76;

DETAILED DESCRIPTION

Figure 1:
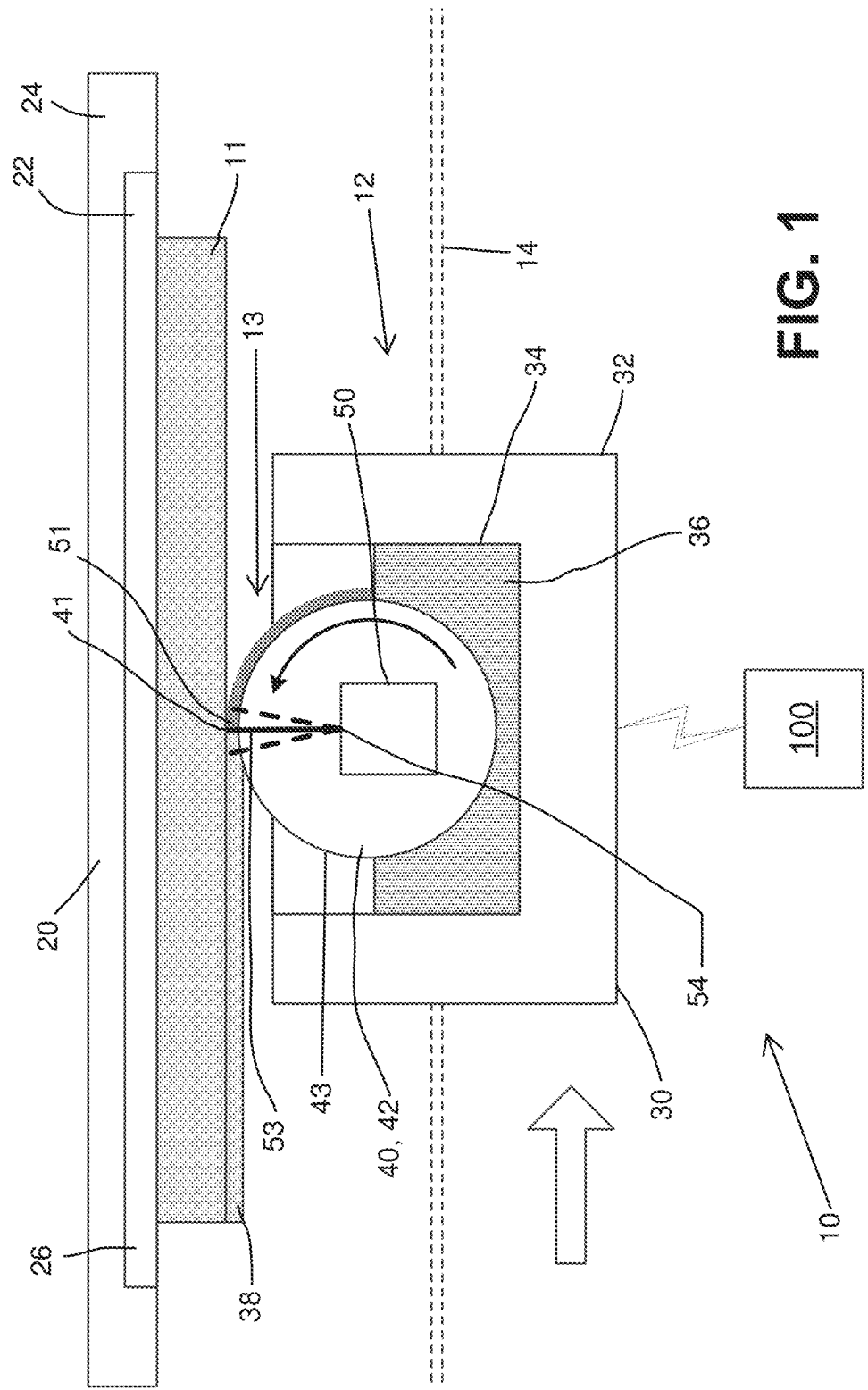
FIG. 1 is a side schematic view of one embodiment of a system and apparatus for producing a three-dimensional object in operation, according to aspects of the disclosure.

While this invention is capable of embodiment in many different forms, there are shown in the drawings, and will herein be described in detail, certain embodiments of the invention with the understanding that the present disclosure is to be considered as an example of the principles of the invention and is not intended to limit the broad aspects of the invention to the embodiments illustrated and described.

In general, the disclosure relates to systems, apparatuses, and methods for producing three-dimensional objects in a layer-by-layer technique, such as additive manufacturing, 3-D printing, stereolithography, or other rapid prototyping techniques. Referring first to FIG. 1, there is schematically shown an example embodiment of a system 10 that includes a manufacturing apparatus 12 and a computer controller 100 in communication with one or more components of the apparatus 12 and configured for controlling operation of the apparatus 12 and/or the components thereof to manufacture an object 11. The apparatus 12 includes a support assembly 20 for supporting the object 11 within a build area 13 during manufacturing, a track 14 extending through the build area 13, and a material deposition mechanism 30 mounted on the track 14 and configured for producing the object 11 within the build area 13 through layer-by-layer application of a material. The material applied by the deposition mechanism 30 may be any flowable material (e.g., liquids, powders or other particulate solids, and combinations thereof) that are capable of being solidified to manufacture the object 11, such as by polymerization, phase change, sintering, and other techniques or combinations of such techniques. In one example, the material may be or include a resin that can be polymerized by exposure to electromagnetic waves such as light (visible, IR, or UV). When using a resin-based material for manufacturing, the deposition mechanism 30 may be referred to as a "resin deposition mechanism". FIGS. 3-4 and 25 illustrate additional schematic embodiments of the system 10 and apparatus 12, and FIGS. 8-13, and 15-19 illustrate structural embodiments of the apparatus 12. FIGS. 2A-B, 5A-7, 14, and 20-29 illustrate schematic embodiments of components and/or methods and configurations for operation of the system 10 and apparatus 12. Consistent reference numbers are used throughout this description to refer to structurally or functionally similar or identical components throughout the drawing figures, and it is understood that features and aspects of some embodiments that have already been described in sufficient detail may not be specifically re-described with respect to each embodiment for the sake of brevity.

Production of objects 11 through additive manufacturing often involves the production of support structure, which is formed during manufacturing and supports the object 11 during manufacturing, to be removed later. Such support structure can be formed of the same or a different material from the desired final portions of the object 11. Removal of such support structures can be accomplished using mechanical means (e.g., separation, breakage, machining), solvent-based means (e.g., use of a water-soluble polymer that can be washed away), or other means. Any support structure manufactured along with an object 11 as described herein will be considered to be part of the "object" as defined herein.

The support assembly 20 generally includes at least a build platform 22 that is configured to support the object 11 within the build area 13 during manufacturing. The build area 13 is defined in the area adjacent to the build platform 22, which is immediately below the build platform 22 in the embodiment of FIG. 1. The support assembly 20 in FIG. 1 includes a support platform 24 that is movable in the vertical (z) direction and supports a removable insert 26 that defines the build platform 22. The insert 26 may be removably connected to the support assembly 20 by mechanical connectors, such as clamps 28 as shown in FIGS. 2A and 2B or other mechanical structures, or various other removable connection mechanisms such as vacuum suction, magnetic attraction, releasable adhesive, and combinations of such mechanisms in certain embodiments. In one embodiment, as shown in FIGS. 2A and 2B, the insert 26 is removably connected to the support assembly 20 primarily by application of vacuum suction by a vacuum apparatus 21, with clamps 28 used as a backup or redundant connection structure in case of malfunction, power outage, etc. As shown in FIG. 2A, when the object 11 is to be supported by the support assembly 20, such as during manufacturing, the vacuum apparatus 21 applies suction to the insert 26 and the clamps 28 are closed to retain the insert 26 in connection with the support platform 24. As shown in FIG. 2B, when the object 11 is to be removed, the vacuum suction is ceased and the clamps 28 are released in order to permit removal of the insert 26 and the object 11 from the support assembly 20. The insert 26 may be flexible, in order to ease release of the object 11 from the insert 26 after removal. Further, it is understood that other removable configurations for the build platform 22 may exist, and may or may not use a definable support platform 24. For example, in the embodiments of FIGS. 8-11 and 15-19, the entire support platform 24 is removable to permit removal of the build platform 22 from the support assembly 20. It is also understood that the object 11 may be removed from the build platform 22 without removal of the build platform 22, and that the build platform 22 may include no removable structure in other embodiments.

In one embodiment, the support assembly 20 and the track 14 may be partially or completely modular. The support assembly 20 and track 14 in the embodiment of FIGS. 8-11 are configured in this manner. This permits ease of build-out and modification of the entire apparatus 12 as desired. This also permits assembling or disassembling the apparatus 12 to move it into or out of a room, even if the apparatus 12 is significantly larger than the door to the room, which can be an issue with current stereolithography machines.

Figure 15:
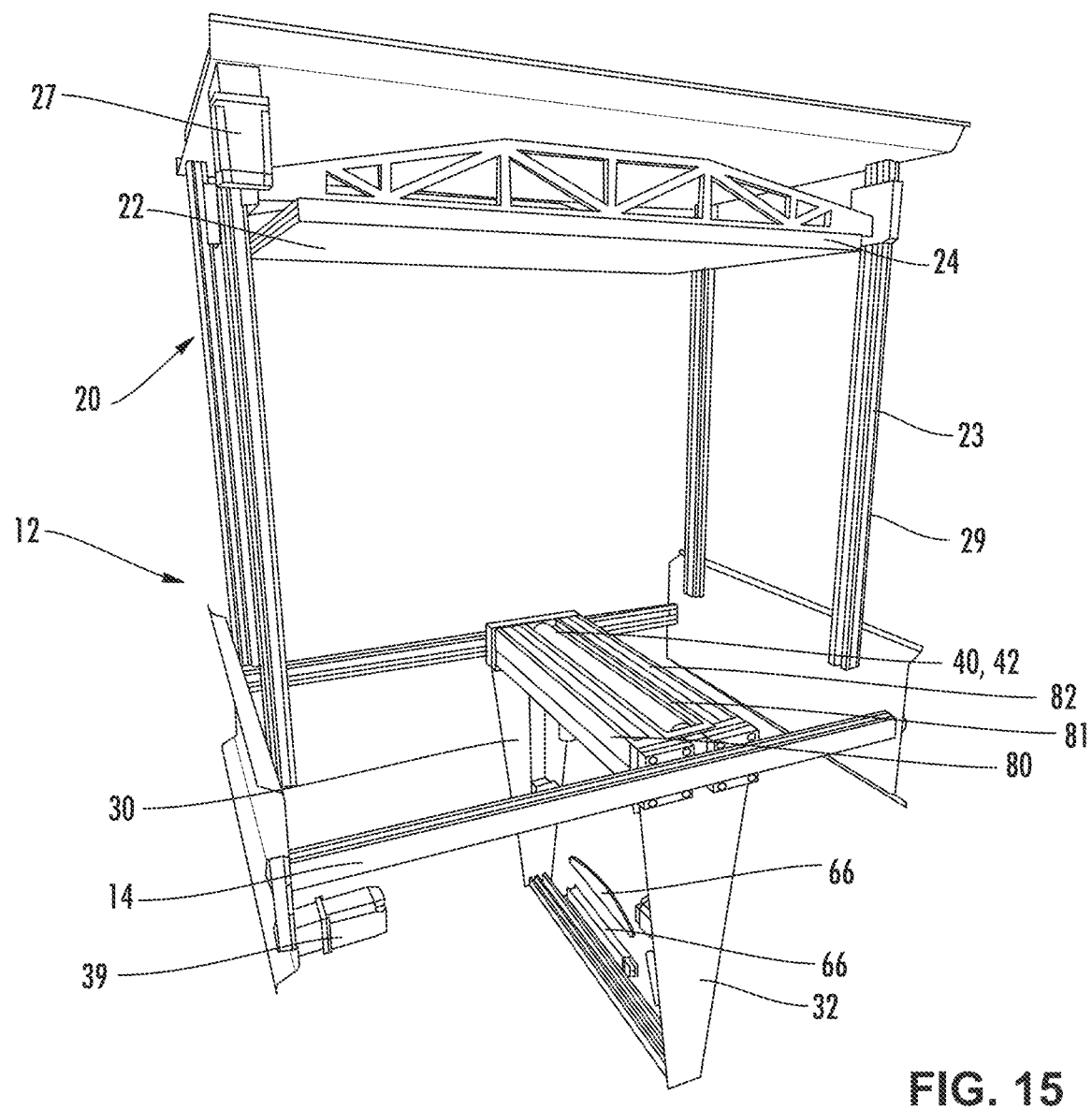
FIG. 15 is a perspective view of another embodiment of an apparatus for producing a three-dimensional object in operation, according to aspects of the disclosure.

The support assemblies 20 in the embodiments of FIGS. 8-11 and 15-19 include vertical positioning mechanisms 23 that are configured to change the height of the build platform 22 during manufacturing, as described elsewhere herein. In the embodiment shown in FIG. 8, the vertical positioning mechanism 23 includes multiple jack screws 25 positioned at opposite sides of the support assembly 20 and a support frame 27 that engages the jack screws 25 and connects to and supports the support platform 24. Vertical movement of the support platform 24 (and thereby, the build platform 22) is accomplished by rotation of the jack screws 25, and it is understood that the threading of the jack screws 25 may be angled to permit fine incremental changes in the vertical position of the build platform 22. The rotation of the jack screws 25 may be driven by a motor assembly (not shown) and controlled by the controller 100. In the embodiment of FIG. 15, the vertical positioning mechanism 23 includes four vertical drive mechanisms 29 located at four corners of the support assembly 20, with a support frame 27 that engages the vertical drive mechanisms 29 and connects to and supports the support platform 24. The vertical drive mechanisms 29 in FIG. 15 may be jack screws as described herein, or may use a different mechanical structure, such as chains, cables, belts, gears, sprockets, wheels, etc. The vertical drive mechanisms 29 may be driven by a motor assembly (not shown) and controlled by the controller 100.

FIG. 1 schematically illustrates an embodiment of the deposition mechanism 30, which generally includes a carriage 32 engaged with the track 14 and configured for movement along the track 14 and through the build area 13, a supply 34 of a flowable material 36 mounted on or otherwise operably connected to the carriage 32, an applicator 40 in communication with the supply 34 of the flowable material 36 and configured to apply the flowable material 36 to an application site 41 within the build area 13, and an exposure device 50 configured for emitting electromagnetic waves to solidify the applied material 36 to form the object 11. The application site 41 is generally defined as the area where the material 36 contacts the deposition surface, i.e., the build platform 22 or the surface of the object 11. Various embodiments of the deposition mechanism 30 are described herein, both schematically and with regard to specific structural embodiments. FIGS. 3 and 4 schematically illustrate embodiments of the deposition mechanism 30 that share many features in common with the embodiment of FIG. 1, and certain aspects of the embodiments of FIGS. 3 and 4 may be described only with respect to their differences from the embodiment of FIG. 1, for the sake of brevity. FIGS. 8-13 and 15-18 illustrate additional embodiments of the manufacturing apparatus 12 and the deposition mechanism 30 that include structures that may be more detailed than the schematic depictions and may have similar or different functionality.

The carriage 32 is configured to move along the track 14 to move the deposition mechanism 30 through the build area 13 during manufacturing. The track 14 is generally configured for guiding the carriage 32 of the deposition mechanism 30 through the build area 13 for creation of the object 11. The apparatus 12 may include a base frame 19 for supporting the track 14 and other components of the apparatus 12, as shown in FIGS. 8-11 and 15-19. The track 14 and the carriage 32 may have complementary engaging structure to permit movement of the carriage 32 along the track 14. For example, in the embodiments shown in FIGS. 8-11 and 15-19, the track 14 includes two parallel beams 15, and the carriage 32 and the track 14 have complementary gear surfaces 33 that allow the carriage 32 to roll along the beams 15 by rotation of the gear surfaces 33 on the carriage 32. The carriage 32 is powered for rotation of the gear surfaces 33 in the embodiments of FIGS. 8-11 and 15-19, and may otherwise be powered for movement in various embodiments, such as by wheels or other gear arrangements, etc. In other embodiments, the power for movement may be supplied by external mechanisms which may or may not be incorporated into the track 14, such as chains, cables, belts, sprockets, pistons, etc. An example of a drive motor 39 is shown in FIG. 15. The speed of the carriage 32 may be adjusted depending on the properties of the material 36, as materials 36 with different viscosities and/or solidification rates may benefit from faster or slower drive speeds. The carriage 32 may be configured to support other components of the deposition mechanism 30, such that the other components move with the carriage 32. For example, in the embodiments of FIGS. 1, 3, and 4, the carriage 32 supports at least the applicator 40, the exposure device 50, and the material supply 34. It is understood that these embodiments are depicted schematically and the carriage 32 may support additional components as well, including the controller 100 and/or other components not pictured. The carriage 32 may be configured for modular connection of components as well, as described elsewhere herein. The controller 100 may be configured to control the operation, speed, elevation, and other aspects of the carriage 32 and the manufacturing process. In one embodiment, numerous parameters may be determined prior to the commencement of the manufacturing process and/or prior to a single pass and executed by the controller 100. Such parameters may be manually determined, automatically determined, or a combination of the same. For example, before a pass is made the layer thickness, the build direction, the build speed, the roller direction and speed, the material-to-roller communication level (determined based on the viscosity of the material 36), and the power output of the exposure device 50 may be determined, and the deposition mechanism 30 may be located to a predetermined starting (registration) position.

In the embodiments of FIGS. 1, 3-4, 8-13, and 15-19, the applicator 40 includes or is in the form of a roller 42 that is in communication or contact with the material supply 34. In these embodiments, the roller 42 is cylindrical and has a cylindrical outer surface 43 in contact with the supply 34. In the embodiments of FIGS. 1 and 3, the roller 42 is hollow or otherwise has an inner chamber, but may alternately be a solid cylinder, e.g., in the embodiments of FIGS. 3-4. The roller 42 rotates so that material 36 is picked up on the outer surface 43 of the roller 42 and is carried to the application site 41 for manufacturing of the object 11. The roller 42 may be powered for rotation by any of various mechanisms, such as gears, sprockets, wheels, belts, etc. In one embodiment, the roller 42 is configured to rotate in conjunction with the movement of the carriage 32, i.e., such that the top of the roller 42 is moving in the opposite direction to and at approximately the same speed as the movement of the carriage 32. This is schematically shown in FIGS. 1 and 3-4 and avoids drag and/or shear on the surface of the object 11 and the applied material 36. In another embodiment, the roller 42 may be configured to rotate at a different speed, i.e., faster or slower than the translational movement speed across the deposition surface. It is contemplated that rotating the roller 42 faster than the translational movement speed can improve curing of the material 36 at the deposition surface, by increasing exposure time of the material 36 at the deposition surface relative to the material 36 on the surface 43 of the roller 42. The roller 42 may further be made from a material that is permeable to the electromagnetic waves that are emitted by the exposure device 50, such that the waves can pass through the roller 42 relatively unchanged. The application site 41 is generally defined between the outer surface 43 of the roller 42 and the deposition surface, i.e., the build platform 22 or the surface of the object 11. The spacing between the outer surface 43 of the roller 42 and the deposition surface may define the thickness of the material 36 that is deposited, and the ultimate thickness of the solidified material layer 38. It is understood that the material of the roller 42 may be customized to the specific wavelength of the electromagnetic waves to ensure sufficient permeability. The applicator 40 may have a different configuration in another embodiment, and may carry the material 36 to the application site 41 using a different mechanism. The applicator 40 may further have a different orientation relative to the build platform 22, such as shown in FIG. 25.

The use of the roller 42 in certain embodiments described herein creates a moving retention area at the apex of the roller 42, and the fixed distance between the apex of the roller 42 and the build surface (i.e., the build platform or the last-deposited layer 38) determines the thickness of the layer being produced. Additionally, because the roller 42 is in communication with the supply 34 of the material 36, any non-solidified material 36 is returned to the supply 34, reducing or eliminating waste.

When the applicator 40 is configured as a roller 42, the surface of the build platform 22 and/or the surface of the roller 42 may be selected or modified for desired adhesion properties. It is beneficial for the surface of the build platform 22 and/or the surface of any applied layer 38 of the object 11 to have greater adhesion to the solidified material 36 than the surface of the roller 42. If this does not occur, material may adhere to the roller 42 and solidify there, causing flaws in the manufactured object 11. In one embodiment, the roller 42 may be made from a low-adhesion material or treated with a coating to reduce adhesion. Likewise, the surface of the build platform 22 may be made from a high-adhesion material or treated with a coating to increase adhesion. In one embodiment, the roller 42 has a lower adhesion property with respect to the solidified material 36 than the adhesion property of the bonding surface for the material 36 (i.e., the build platform 22 or the last-deposited layer 38). The adhesive properties of the flowable material 36 may be different for different materials.

In the embodiments of FIGS. 1, 3-4, 8-13, and 15-19, the supply 34 is configured as a vat of the flowable material 36 that is in contact with the roller 42, such that rotation of the roller 42 carries the material 36 to the application site 41. In this configuration, the flowable material 36 should have sufficient viscosity that the roller 42 is able to carry a continuous layer of the uncured flowable material 36 to the application site 41. The desired viscosity of the flowable material 36 may depend on the desired build speed or rotation speed of the roller 42, or on the level of the roller 42 relative to the level of the material 36 in the supply 34. A slower rotation speed and/or a lower vat material 36 level may require higher viscosity material 36. It is understood that the power of the exposure device 50 may require a slower or faster speed, as more powerful waves 53 can solidify materials (e.g., polymerizing resins) more quickly. In another embodiment, the supply 34 may be more complex, such as by including injectors or nozzles to force the material 36 onto the roller 42. In the embodiment of FIGS. 15-19, the supply 34 includes fluid connectors 35 that may permit removable connection of a container of additional material 36 for refill or maintenance of the level of the material 36 in the vat. Additionally, the supply 34 of the flowable material 36 may be configured differently if the configuration of the applicator 40 is changed, and the supply 34 may be configured to be compatible with the design of the applicator 40, or vice-versa.

Figure 27:
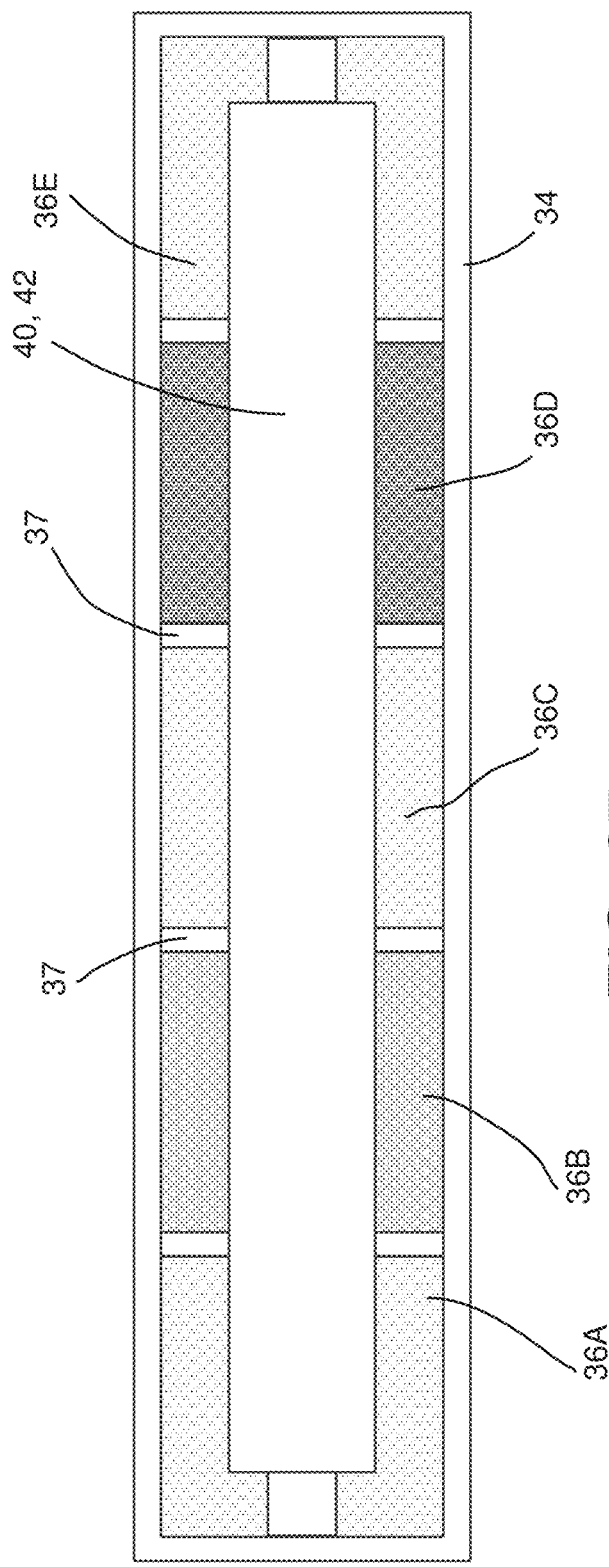
FIG. 27 is a top schematic view of another embodiment of an applicator and a supply of flowable material according to aspects of the disclosure.

In one embodiment, shown in FIG. 27, the supply 34 may be configured to hold multiple flowable materials 36A-E to permit the deposition mechanism 30 to build multiple objects 11 out of different materials 36A-E or a single object 11 out of different materials 36A-E simultaneously. As shown in FIG. 27, the supply 34 may be configured as a vat that has partitions 37 to separate the different materials 36A-E. The partitions 37 may be adjustable to alter the ratios and boundaries of the different materials 36A-E as desired. It is understood that descriptions of using "different materials" as used herein may also enable usage of the same material with different colorings.

The exposure device 50 is generally configured for emitting electromagnetic waves 53 to solidify the applied material 36 to form the object 11. The wavelength and intensity of the electromagnetic waves may be selected based on the material 36 to be solidified and the speed or mechanism of solidification. For example, when a light-curable resin is used as the material 36, the exposure device 50 may be configured to emit light (visible, IR, UV, etc.) that is an appropriate wavelength for curing/polymerizing the resin to form a solid material layer 38. As another example, if a sintering process is used to solidify the flowable material 36, the waves 53 emitted by the exposure device 50 may have sufficient power to sinter the material 36 to form a solid material layer 38. The exposure device 50 may also include various components and structures to direct the emitted waves toward an exposure site 51 within the build area 13, where the material 36 is exposed to the waves at the exposure site 51. The waves may be directed so that the exposure site 51 is located approximately at the application site 41 in one embodiment, or so that the exposure site 51 is offset from the application site 41 (ahead or behind the application site 41 in the direction of travel) in another embodiment. FIGS. 1 and 3 illustrate (with solid lines) the waves 53 being directed to an exposure site 51 approximately at the application site 41, and further illustrate (with broken lines) the waves 53 alternately being directed to an exposure site 51 offset behind or ahead of the application site 41. FIG. 4 illustrates the waves 53 being directed to an exposure site 51 offset behind the application site 41.

Figure 5A:
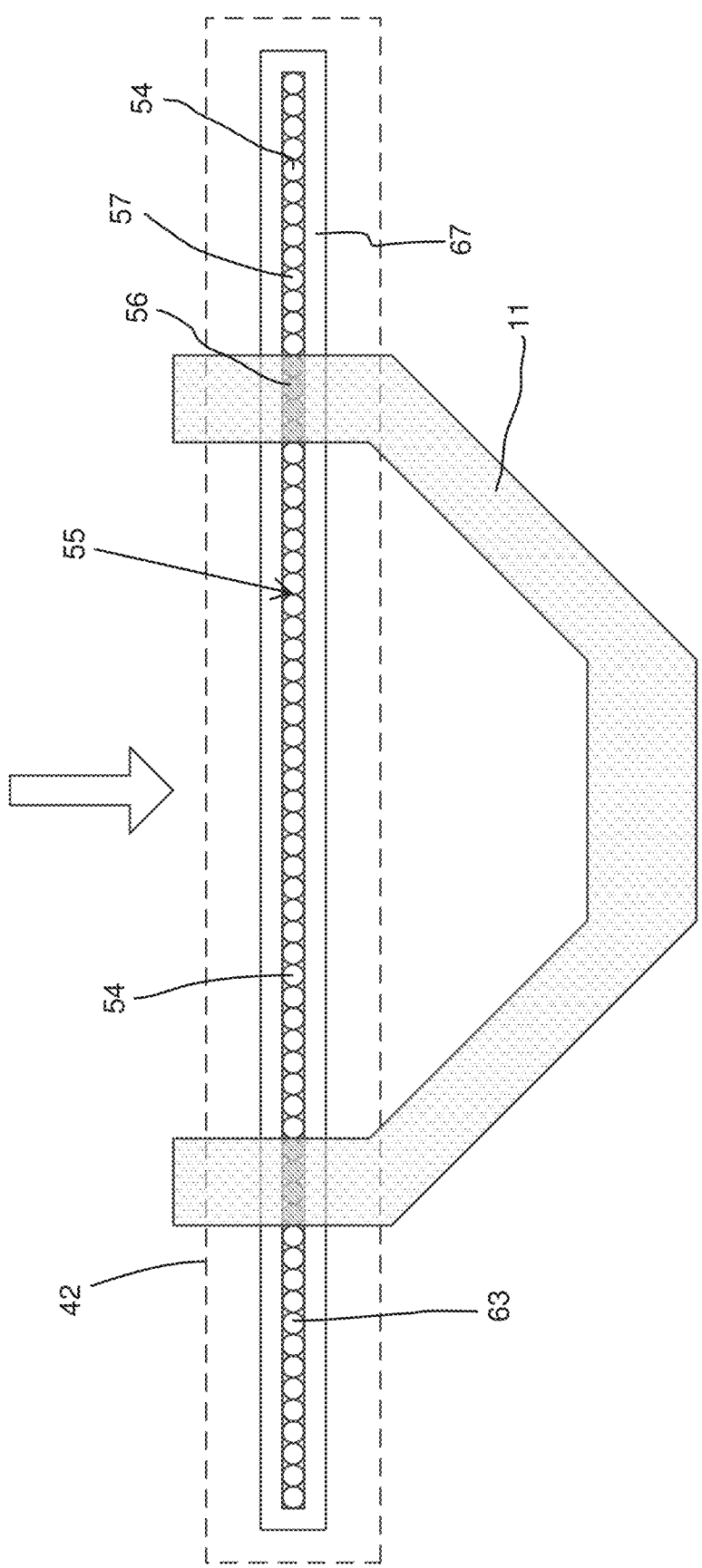
FIGS. 5A and 5B are top schematic views of the system and apparatus of FIG. 1 in operation, according to aspects of the present disclosure.
Figure 5B:
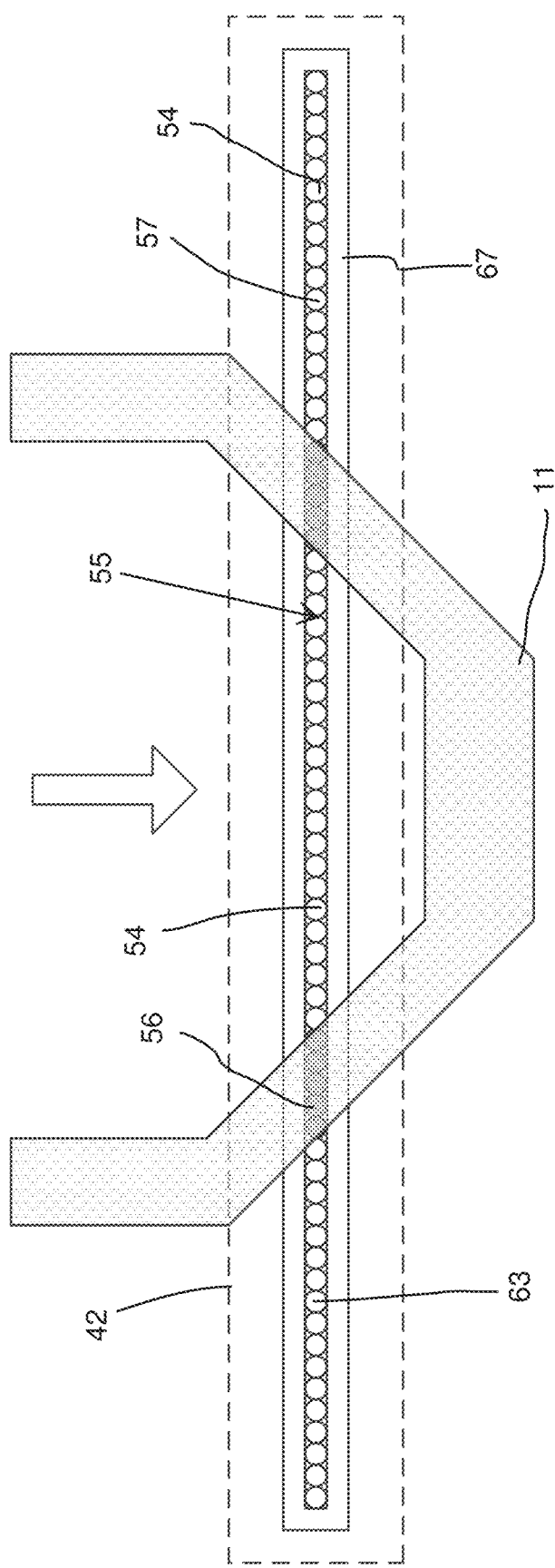

In general, the exposure device 50 is configured such that waves generated by the exposure device exit through outlets 54 and are directed toward specific areas of the exposure site 51 to permit selective solidification of the material 36 at the selected areas of the exposure site 51 as the deposition mechanism 30 passes. In one embodiment, the exposure device 50 is part of an exposure assembly 60 that includes components designed to direct and/or focus the waves 53 toward the exposure site 51. The outlets 54 may be arranged in an array 55, and specific outlets 54 along the array 55 may be selectively activated to selectively solidify portions of the material 36, as shown in FIGS. 5A and 5B. FIGS. 5A and 5B illustrate the active outlets 56 as being darkened, and the inactive outlets 57 as being light. As seen in FIGS. 5A and 5B, the active outlets 56 and inactive outlets 57 are changed when the roller 42 reaches a point where the shape or contour of the object 11 changes. The selective activation and deactivation of the outlets 54 may be controlled by the controller 100, as described herein. The array 55 in FIGS. 5A and 5B is illustrated as a single horizontal row of outlets 54. In other embodiments, the array 55 may be arranged differently, such as in multiple, offset horizontal rows. The use of multiple rows in the array 55 can permit closer lateral spacing between the outlets 54 than the use of a single row. The array 55 in FIG. 14 may similarly be configured and arranged according to any of these embodiments.

Figure 16:
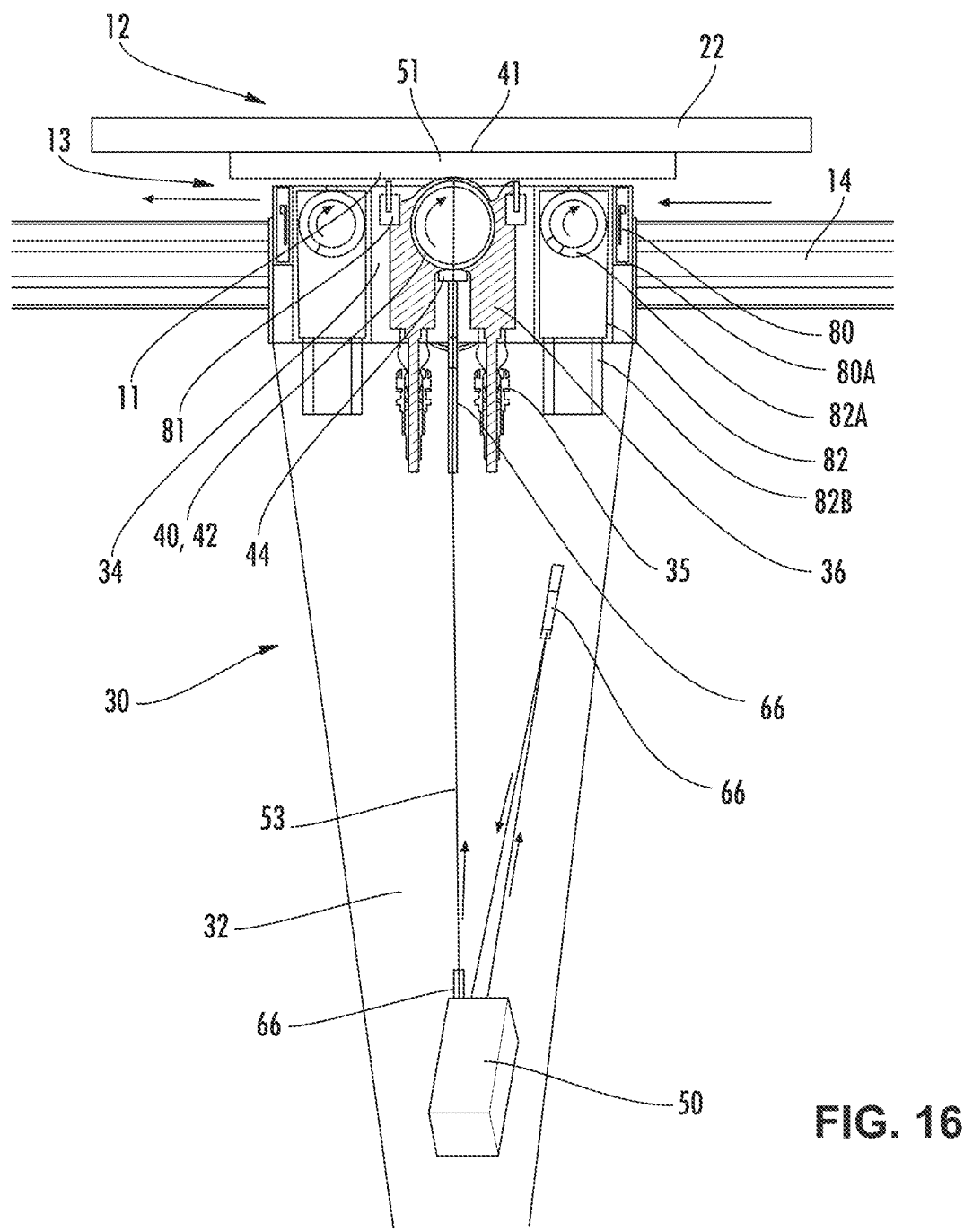
FIG. 16 is a side view of a deposition mechanism of the apparatus of FIG. 15.
Figure 17:
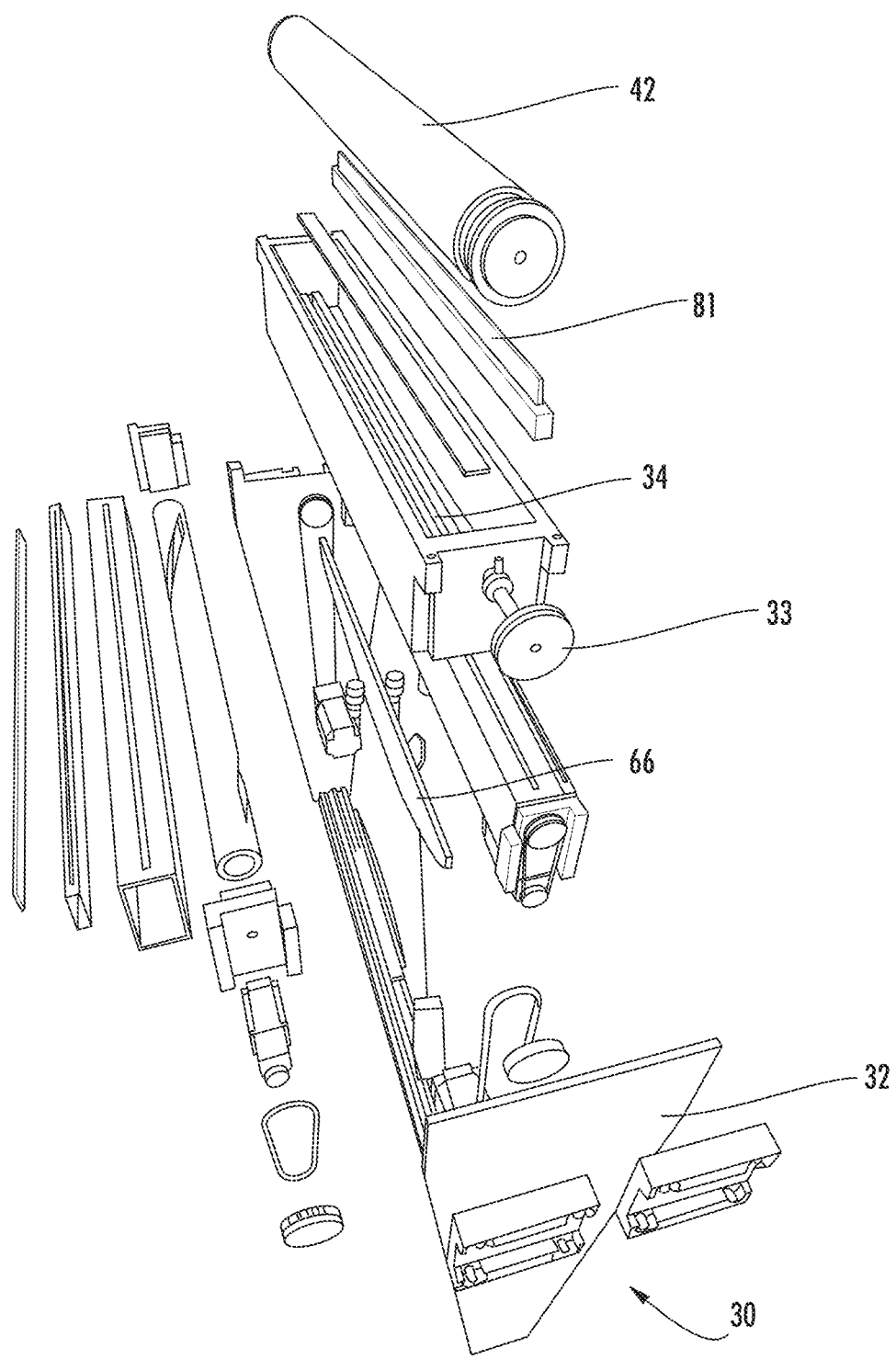
FIG. 17 is an exploded view of the deposition mechanism of FIG. 16.
Figure 18:
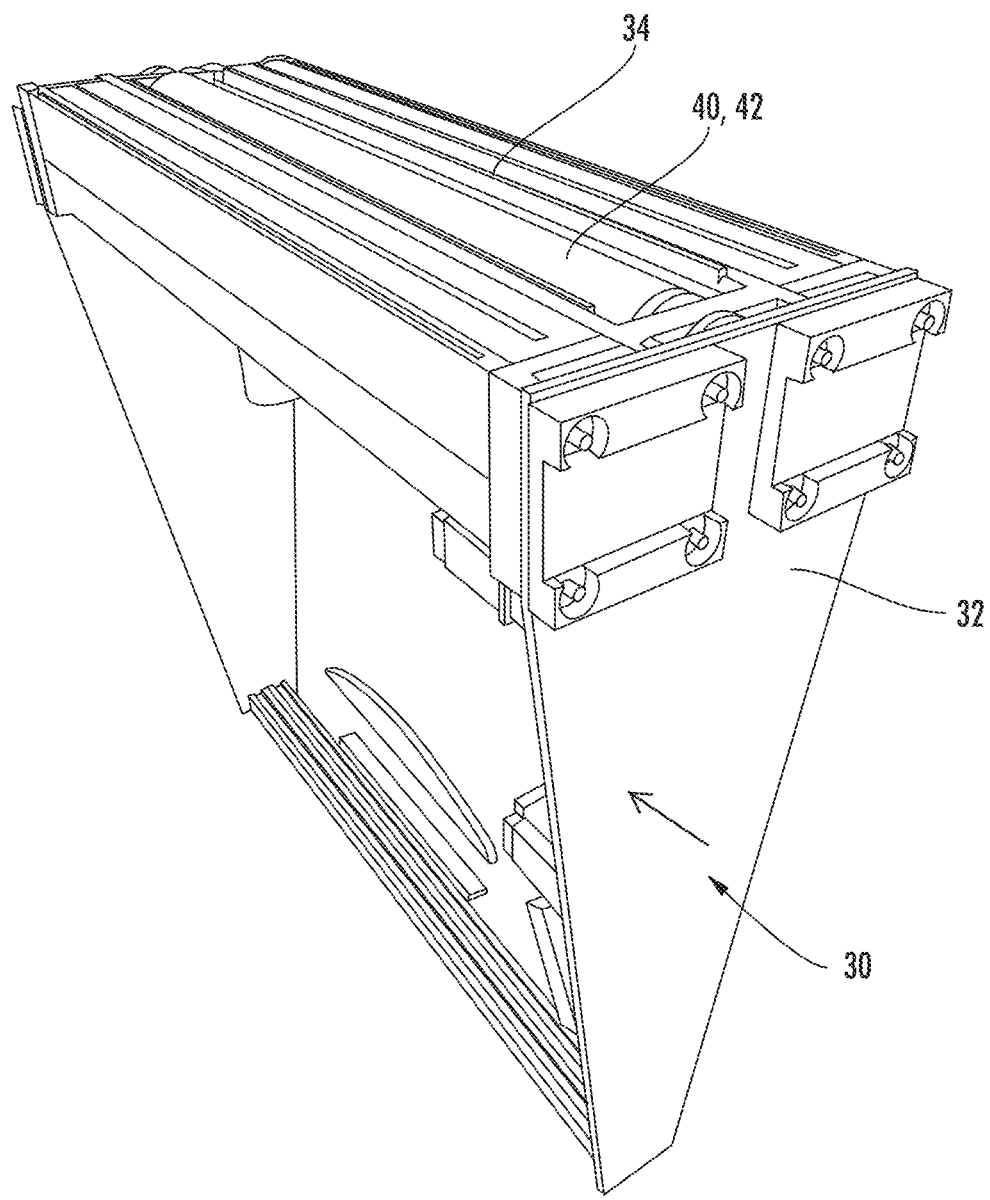
FIG. 18 is a perspective view of the deposition mechanism of FIG. 16.

As described above, the waves 53 may penetrate the roller 42 on their path to the exposure site 51. In the embodiment of FIG. 1, the outlets 54 are located inside the roller 42 and the emitted waves 53 penetrate the surface of the roller 42 once on their paths to the exposure site 51. In the embodiment of FIG. 1, the exposure device 50 itself may be located within the roller 42, or the exposure device 50 may be located outside the roller 42, with the outlets 54 positioned within the roller, as in the embodiment of FIGS. 8-13. In the embodiment of FIG. 3, the outlets 54 are located below the roller 42 and the emitted waves 53 penetrate entirely through the roller 42 in their paths to the exposure site 51. The embodiment of FIGS. 15-18 is similarly configured. In this configuration, the deposition mechanism 30 may include a window 44 configured to permit the waves 53 to pass through the wall of the supply vat 34, as shown in FIGS. 16-17. Additional structures such as squeegees, gaskets, or other sealing structures may be used to resist resin ingress between the roller 42 and the window 44. In the embodiment of FIG. 4, the outlets 54 are positioned and directed to an exposure site 51 located immediately behind the application site 41, and the waves 53 do not need to pass through the roller 42 in this embodiment. It is understood that the waves 53 in the embodiment of FIG. 4 may be directed to pass through a portion of the roller 42 if so desired.

Figure 12:
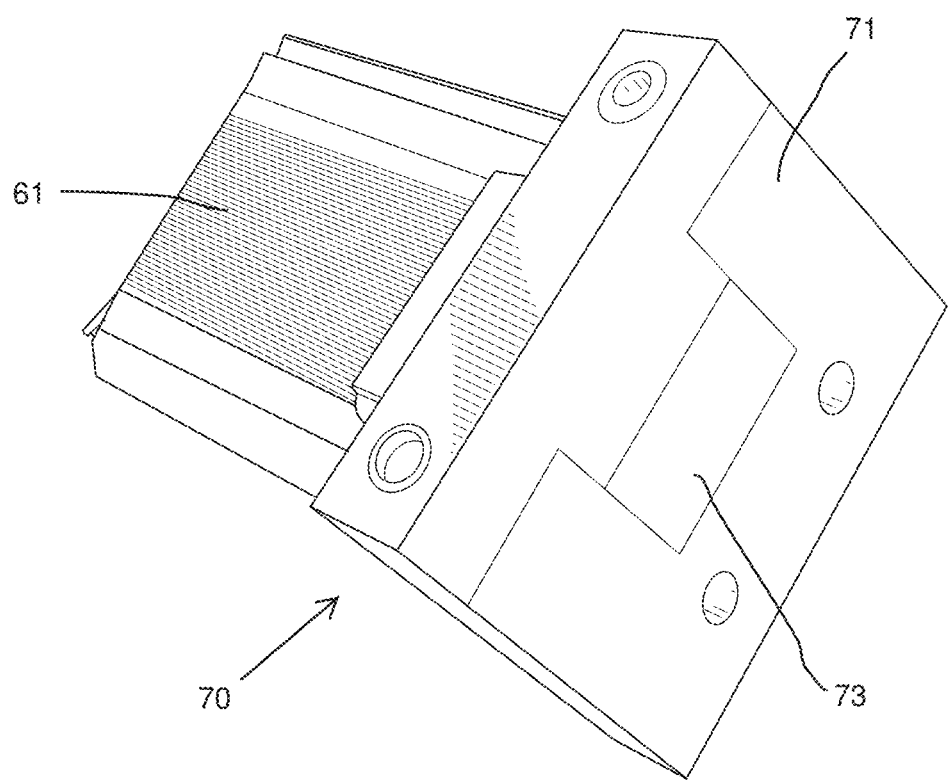
FIG. 12 is a perspective view of one embodiment of a collector for use with the deposition mechanism of FIG. 8, according to aspects of the disclosure.
Figure 13:
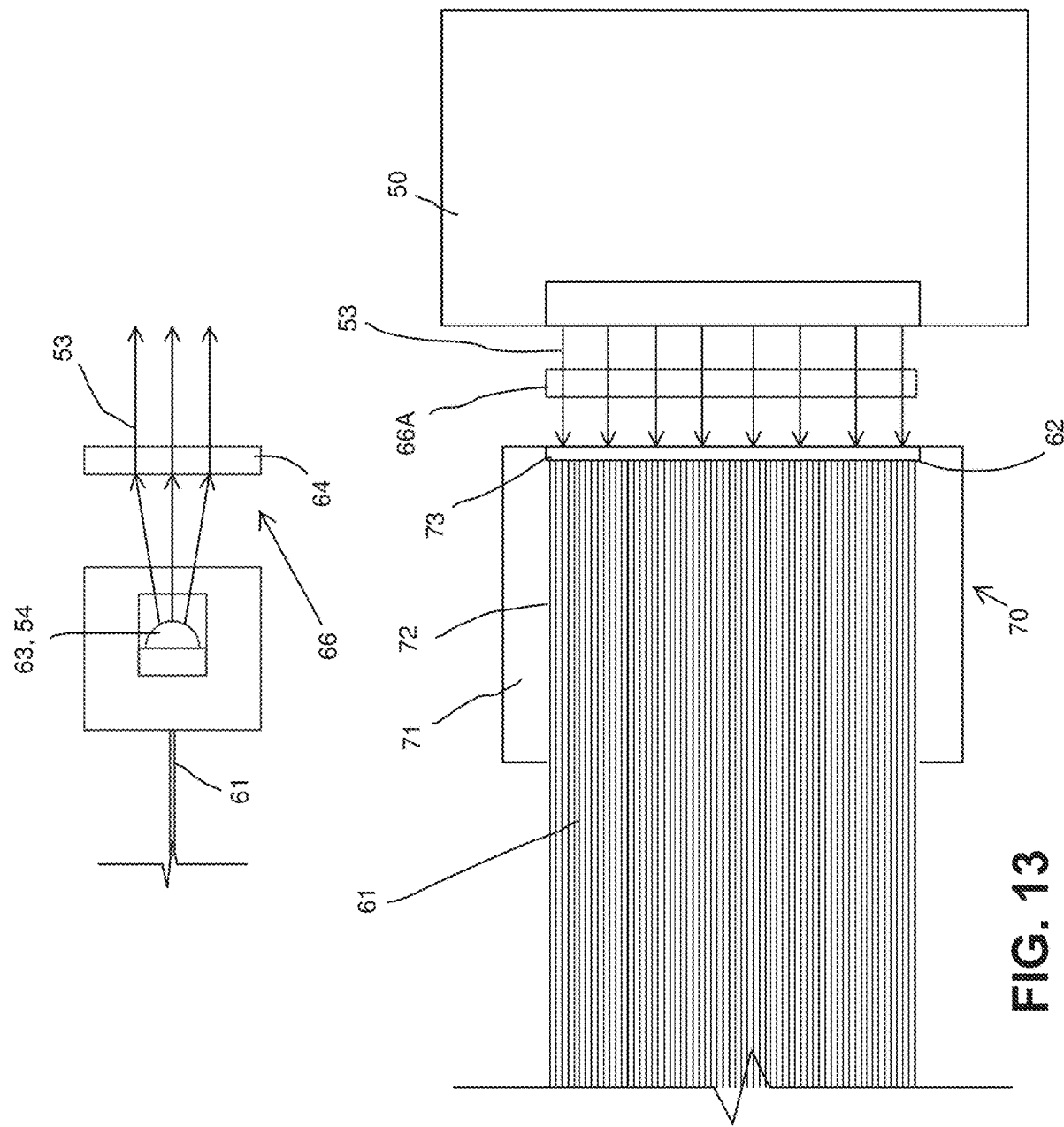
FIG. 13 is a schematic view of the collector of FIG. 12 shown in operation with one embodiment of an exposure device according to aspects of the disclosure.

In one embodiment, the exposure device 50 is a projector, such as a Digital Light Processing (DLP) projector, as the source of the waves 53, and the exposure assembly 60 may also use optical fibers 61 to direct the waves 53 to the exposure site 51, as shown in FIGS. 8-13. In this embodiment, the projector 50 is configured such that the light emitted by the projector 50 enters the entrance ends 62 of the optical fibers 61, travels down the optical fibers 61, and exits through the exit ends 63 of the optical fibers 61, directed at the exposure site 51. The outlets 54 in this embodiment are formed by the exit ends 63 of the optical fibers 61, and may be located inside the roller 42 and arranged as an array 55 inside the roller, as shown in FIGS. 1, 5A-B, and 8-12. In such an embodiment, the optical fibers 61 may extend into the roller 42 from one or both ends of the cylinder, and appropriate sealing and bracing components may be used around the optical fibers 61 in this case. For example, in the embodiment of FIGS. 8-12, the exit ends 63 of the optical fibers 61 may be gathered and held in place by a casing or similar structure 67 (see FIGS. 5A-5B). The exposure assembly 60 may further use a focusing mechanism 66 to focus the light waves 53 after they exit the exit ends 63 of the optical fibers 61, as illustrated in FIG. 13. In one embodiment, the focusing mechanism 66 includes a micro-lens array 64 between the exit ends 63 of the optical fibers 61 and the object 11, such as a Selfoc Lens Array (SLA) lens, that focuses the waves 53 and avoids diffraction on the path to the exposure site 51. FIGS. 8-12 illustrate a micro-lens array 64 being held in place within the roller 42 by braces 65. In other embodiments, various other lenses, mirrors, and other focusing equipment may be used. It is understood that such a focusing mechanism 66 may be used in other embodiments described herein, such as the embodiments of FIGS. 3, 4, 15-18, and 25. It is also understood that the use of the optical fibers 61 permit the wave source of the exposure device 50 to be positioned remotely from the applicator 40, e.g., elsewhere on the deposition mechanism 30 or even away from the deposition mechanism 30 in some embodiments. In this configuration heat produced by the exposure device is not transmitted to the applicator or the material 36, which can avoid undesired solidification, change of properties of the material 36, or thermal distortion of the applicator 40. This configuration also permits an exposure device 50 to use a much larger and/or more powerful wave source (e.g., high power LED's or a high-power DLP projector) without regard for physical limitations, e.g., fitting inside the roller 42.

The exposure assembly 60 in the embodiment of FIGS. 8-13 uses a collector 70 engaged with the entrance ends 62 of the optical fibers 61 to fix the entrance ends 62 in position with respect to the exposure device 50, such that the waves 53 enter the entrance ends 62 of the optical fibers 61 at the collector 70. One embodiment of the collector 70 is illustrated in FIG. 12 and schematically in FIG. 13. The collector 70 includes a frame 71 that engages the entrance ends 62 of the optical fibers 61 and holds the entrance ends 62 within a chamber or passage 72, with a window 73 (which may be configured as a lens in one embodiment) positioned at the end of the passage 72. Waves 53 exiting the exposure device 50 pass through the window 73 to enter the entrance ends 62 of the optical fibers 61. A lens 66A may be positioned between the exposure device 50 and the window 73 to focus the waves 53 at this stage. The frame 71 is held firmly in place relative to the exposure device 50, so that the entrance ends 62 of the optical fibers 61 do not move relative to the exposure device 50. This fixed relative positioning permits the exposure device 50 to selectively activate and deactivate the outlets 54 by use of pixel mapping. In other words, the entrance end 62 of each optical fiber 61 is mapped to one or more specified pixels of the exposure device 50, such that activating the specified pixel(s) causes waves 53 emitted by the specified pixel(s) to travel down the optical fiber 61, thereby activating the outlet 54 associated with that optical fiber 61. The pixel mapping also incorporates mapping of the specific area of the exposure site 51 toward which the outlet 54 of each optical fiber 61 is directed. In one embodiment, where a DLP projector is used as the exposure device 50, each optical fiber 61 is mapped to a plurality of pixels (potentially hundreds or more) of the DLP projector. In such a configuration, loss or inactivation of multiple pixels can occur without affecting the ability of the optical fiber 61 to maintain sufficient functionality and power for operation. The use of the collector 70 and optical fibers 61 as described herein achieves the conversion of a two-dimensional projection into a roughly one-dimensional (linear) exposure. This mapping may be stored in computer memory and executed by a computer processor, such as by the controller 100.

Figure 14:
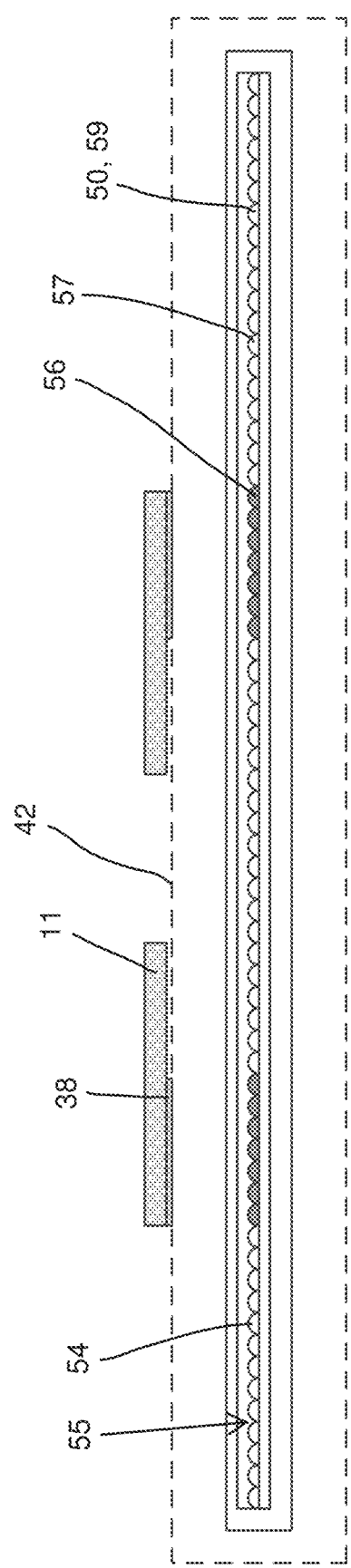
FIG. 14 is a side schematic view of another embodiment of an exposure device according to aspects of the disclosure.
Figure 66:
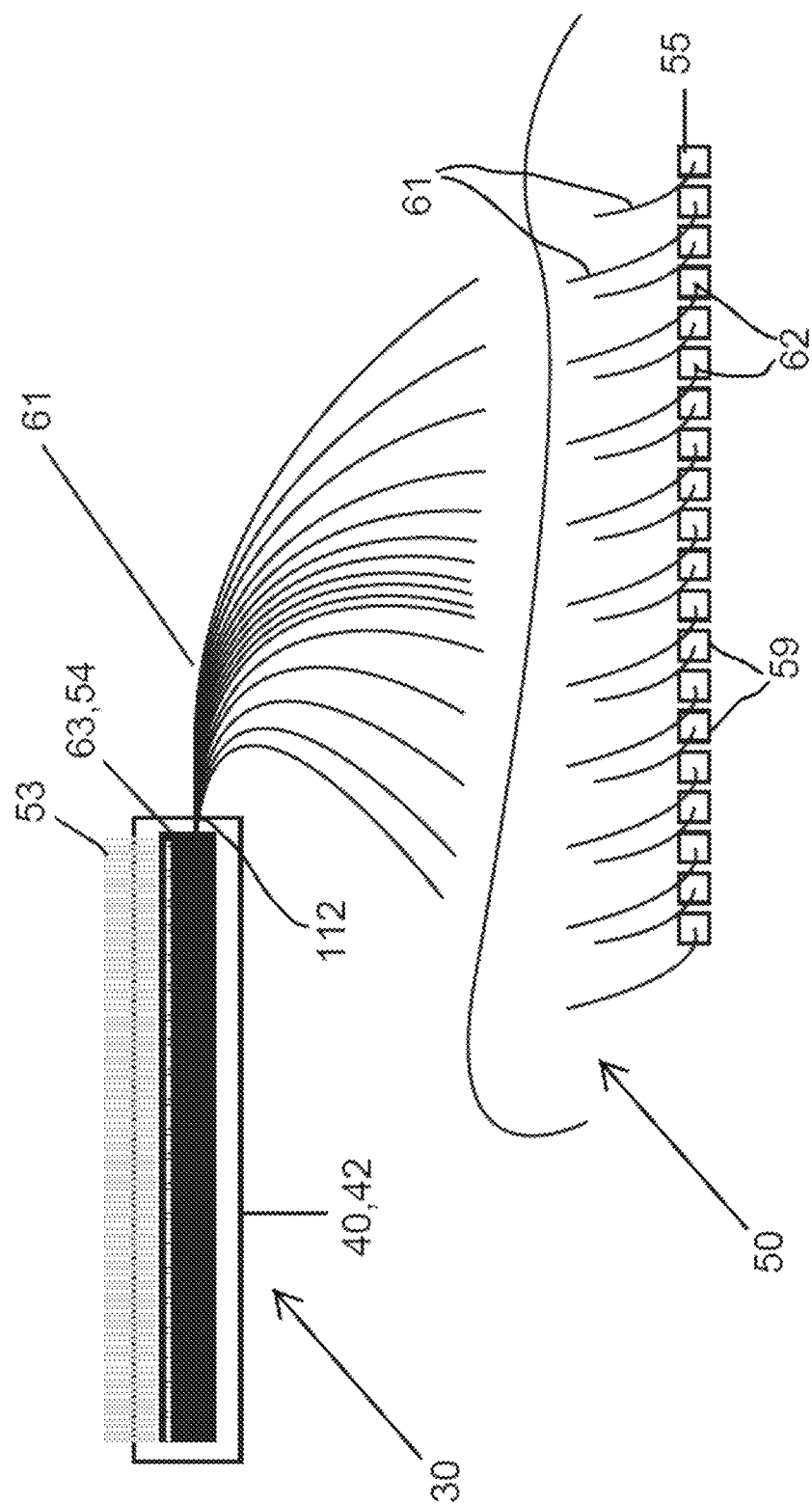
FIG. 66 is a partially-magnified schematic view of another embodiment of an exposure device and a deposition mechanism according to aspects of the disclosure, with the exposure device shown magnified and a break line illustrating separation between the magnified and non-magnified portions.
Figure 67:
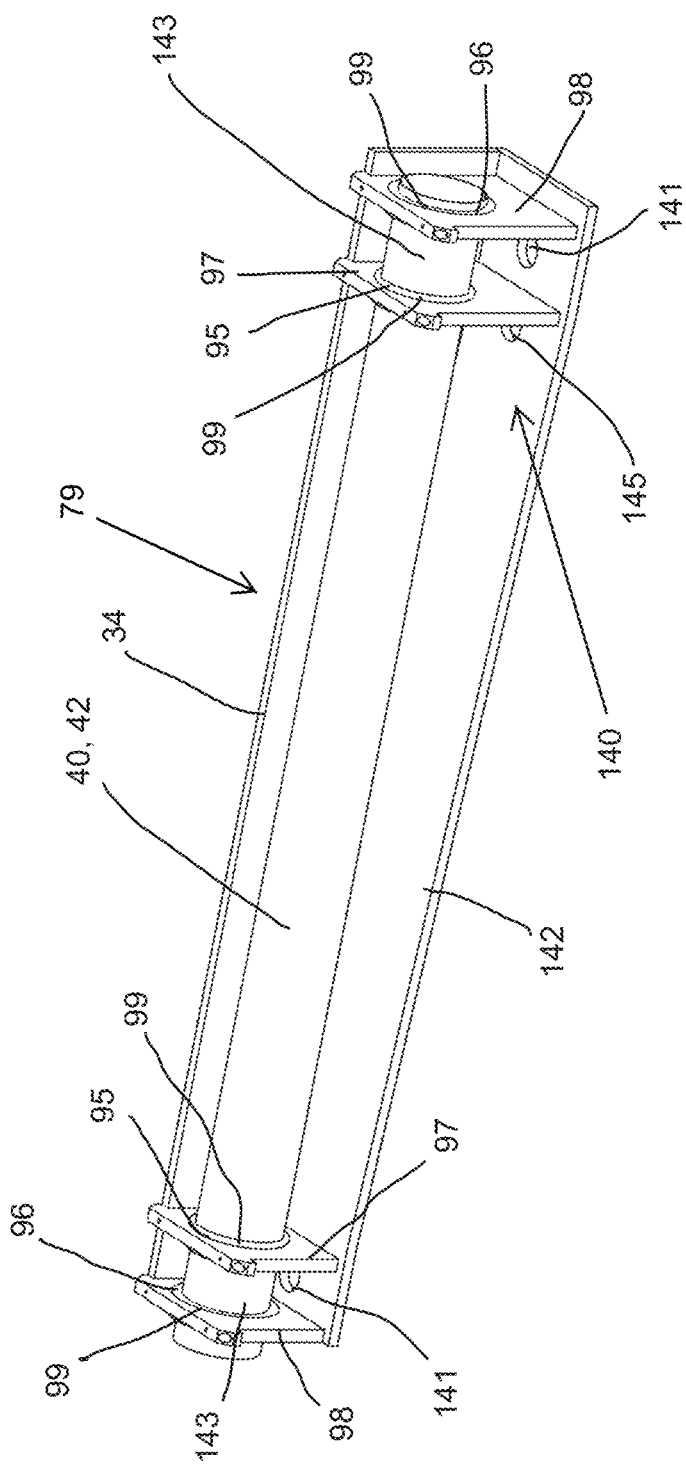
FIG. 67 is a partially cut-away perspective view of one embodiment of a roller and a vat for supply of flowable material according to aspects of the disclosure.
Figure 68:
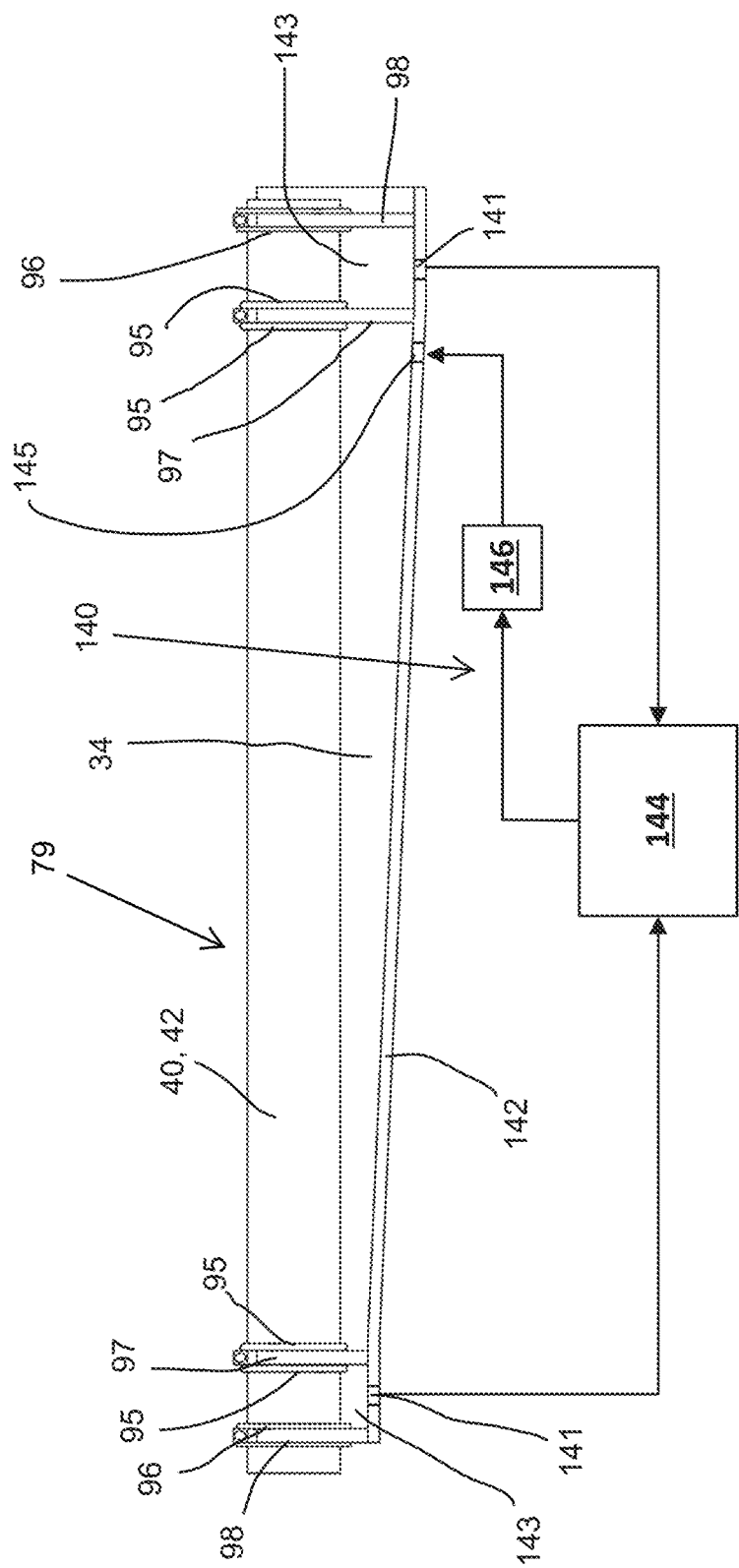
FIG. 68 is a partially cut-away side view of the roller and the vat of FIG. 67.
Figure 69:
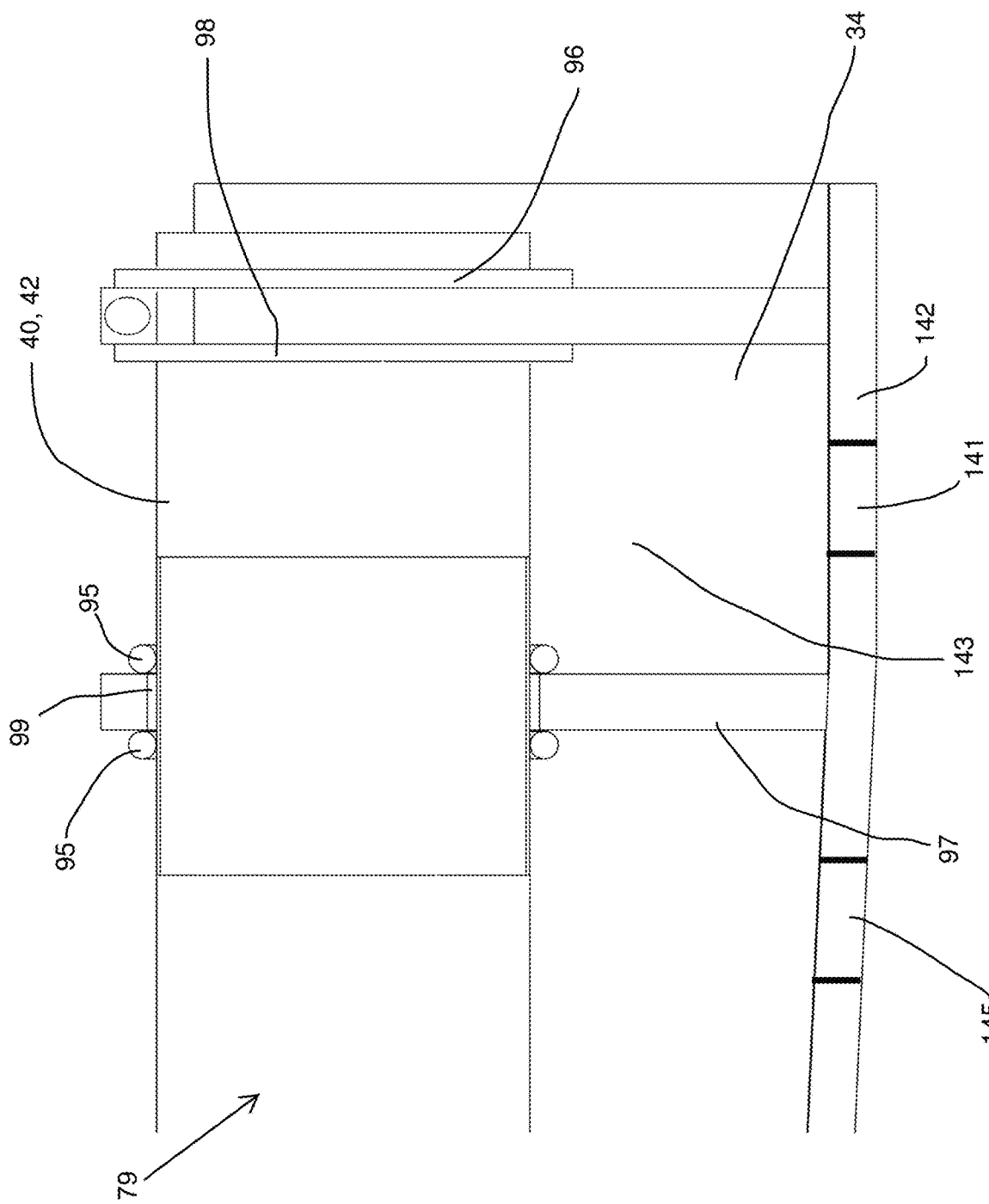
FIG. 69 is a magnified cross-sectional view of a portion of the roller and the vat of FIG. 67.
Figure 70:
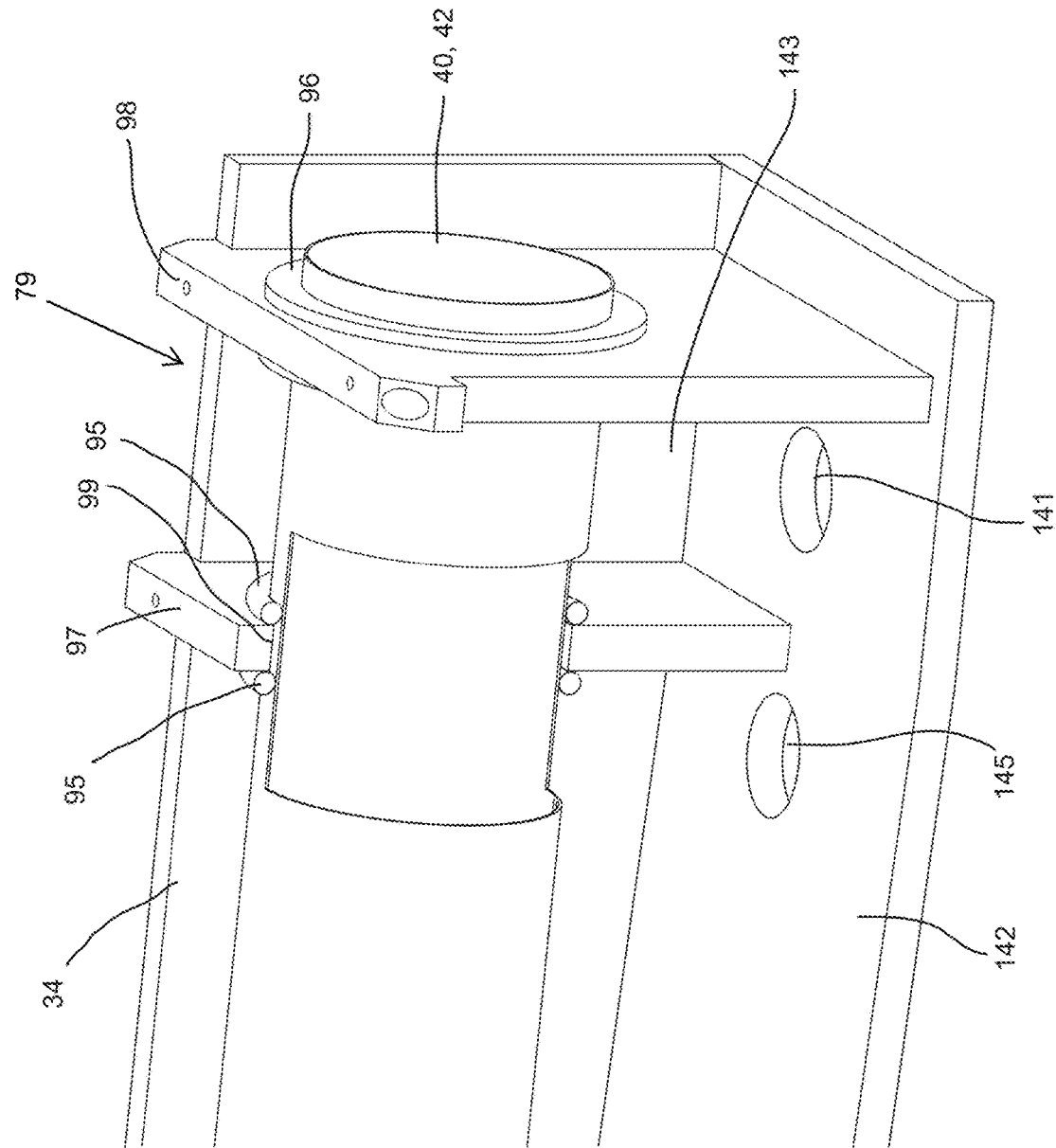
FIG. 70 is a magnified partial cross-sectional perspective view of a portion of the roller and the vat of FIG. 67.

In another embodiment, the exposure device 50 is in the form of an array 55 of LEDs 59 that function as the sources of the waves 53, as shown in FIG. 14. The LEDs 59 may be designed to emit waves 53 of the proper wavelength and intensity for solidifying the material 36. The array 55 of LEDs 59 can be positioned within the roller 42 as shown in FIG. 14, or outside the roller 42 as described herein, and may use a focusing mechanism 66 as also described herein. In either case, a micro-lens array 64 at the outlets 54 as described above may assist in focusing the waves 53. Each of the LEDs 59 in this embodiment constitutes a separate outlet 54 that is directed at a specific area of the exposure site 51, and the LEDs 59 can be selectively activated and deactivated to expose that specific area of the exposure site 51 to the waves 53. The activated LEDs 59 constitute active outlets 56 and are shown as being darkened in FIG. 14, and the inactive LEDs 59 constitute inactive outlets 57 that are shown as being light. As seen in FIG. 14, the material 36 aligned with the active outlets 56 is being solidified to form a layer 38. The LEDs 59 may be mapped to the specific areas of the exposure site 51 toward which they are directed, and this mapping may be stored in computer memory and executed by a computer processor, such as by the controller 100. If the LEDs 59 are positioned outside the roller 42, a plurality of optical fibers 61 may be used in conjunction with the LEDs 59, forming the outlets 54. FIG. 66 schematically illustrates one embodiment of this configuration, with an array 55 of LEDs 59 positioned separately from the applicator 40, where the optical fibers 61 have their entrance ends 62 fixed in position relative to the LEDs 59 so that waves 53 from the LEDs 59 enter the optical fibers 61 and are emitted at the exit ends 63, forming outlets 56 as described above. The outlets 56 may be configured in the same manner as shown and described herein with respect to the embodiment of FIGS. 1-13 and other embodiments, including the use of a focusing mechanism 66 and mechanisms for adjusting the direction of the waves 53 forward or rearward in the direction of travel of the deposition mechanism 30, which are not shown in FIG. 66. The entrance ends 62 of the optical fibers 61 may be fixed in position relative to the LEDs 59 using various fixing and bundling structures as appropriate for the size and arrangement of the LED array 55, and it is understood that the LED array 55 may not be linearly arranged in some configurations. In one embodiment, no lens or other focusing structure may be necessary between the LEDs 59 and the entrance ends 62 of the optical fibers 61. Each LED 59 may be mapped to an individual optical fiber 61 in the embodiment shown in FIG. 66, although in other embodiments, multiple optical fibers 61 may be mapped to each LED 59. This configuration permits the use of an array of LEDs that is larger than can be incorporated inside the applicator 40. In further embodiments, a different type of exposure device 50 may be used, and the deposition mechanism 60 may include components configured to direct the waves 53 from the exposure device to the proper areas of the exposure site 51. For example, in the embodiment of FIGS. 15-19, the exposure device 50 is in the form of a laser, and a focusing mechanism 66 including lenses and/or mirrors is used to focus the beam. The focusing mechanism 66 in FIGS. 16-17 includes one or more lenses 66A and one or more mirrors 66B. In still further embodiments, the exposure device 50 may be in the form of an LCD source or a high-speed positionable mechanical shutter system.

During operation of the apparatus 12, the spacing between the applicator 40 and the deposition surface must be changed for each new layer 38 of the object 11 that is deposited. The applicator 40 in the embodiments of FIGS. 1, 3-4, 8-11, and 15-19 is oriented so that the roller 42 is positioned vertically below the deposition surface and forms the layer 38 vertically above the roller 42. In this embodiment, relative vertical translation (i.e., parallel to the layer-by-layer build direction) occurs between the applicator 40 and the deposition surface during manufacturing of successive layers 38. This vertical translation is illustrated, e.g., in FIGS. 6A and 6B, which illustrate the deposition mechanism 30 making a first pass (FIG. 6A) from left to right to deposit a first layer 38 and a second pass (FIG. 6B) from right to left to deposit a second layer 38, where the vertical translation between the first and second passes is shown in phantom lines. This relative change in positioning can be accomplished using one or more different methods and mechanisms or combinations thereof. In the embodiments of FIGS. 8-11 and 15-19, this vertical translation can be accomplished by changing the elevation of the build platform 22, using a vertical positioning mechanism 23 as described herein. In another embodiment, this vertical translation can instead be accomplished by changing the elevation of the track 14, which may be accomplished using similar vertical positioning mechanisms 23 as described herein. In a further embodiment, the deposition mechanism 30 may include a mechanism for changing the vertical position of the applicator 40 relative to the build platform 22, such as by raising or lowering the applicator 40 and/or the entire chassis 32. For example, in the embodiment of FIGS. 20A-B, the deposition mechanisms 30 each are capable of vertical translation relative to the track 14 through a limited range of motion by raising or lowering the carriage 32 relative to the track 14. The vertical translation may be accomplished by switching the carriage 32 between pre-set vertical positions, such as by vertically moving the drive structure that engages the track 14 with respect to the roller 42. The primary vertical translation of the build platform 22 relative to the applicator 40 in this embodiment is accomplished by movement of the build platform 22 as described herein, and the vertical positioning range of the deposition mechanism 30 permits multiple deposition mechanisms 30 to make passes through the build area 13 without adjusting the position of the build platform 22, which is more time-consuming. The operation of these embodiments are described in further detail herein.

Figure 7:
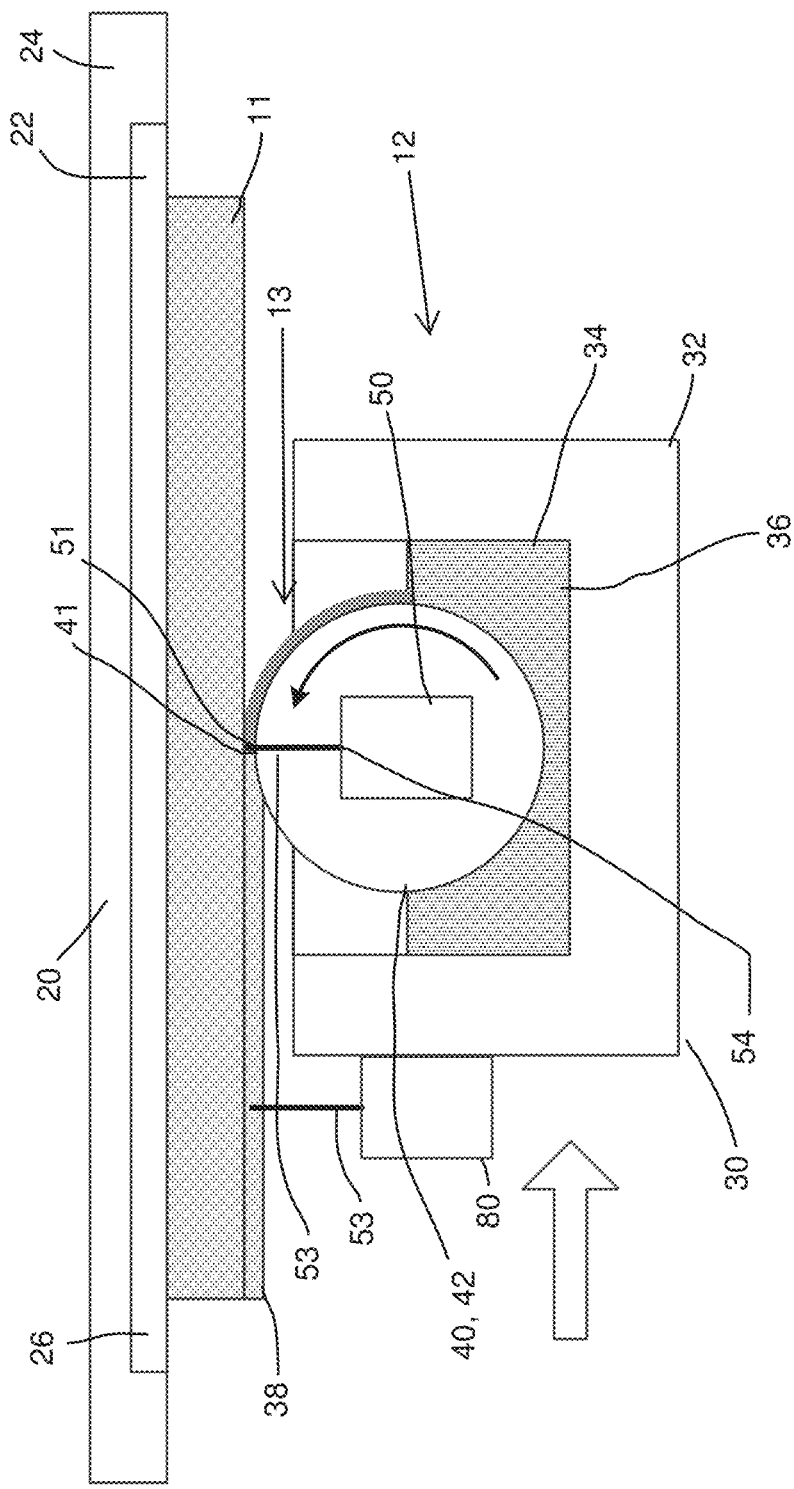
FIG. 7 is a side schematic view of the apparatus of FIG. 1, further including a secondary exposure device.
Figure 8:
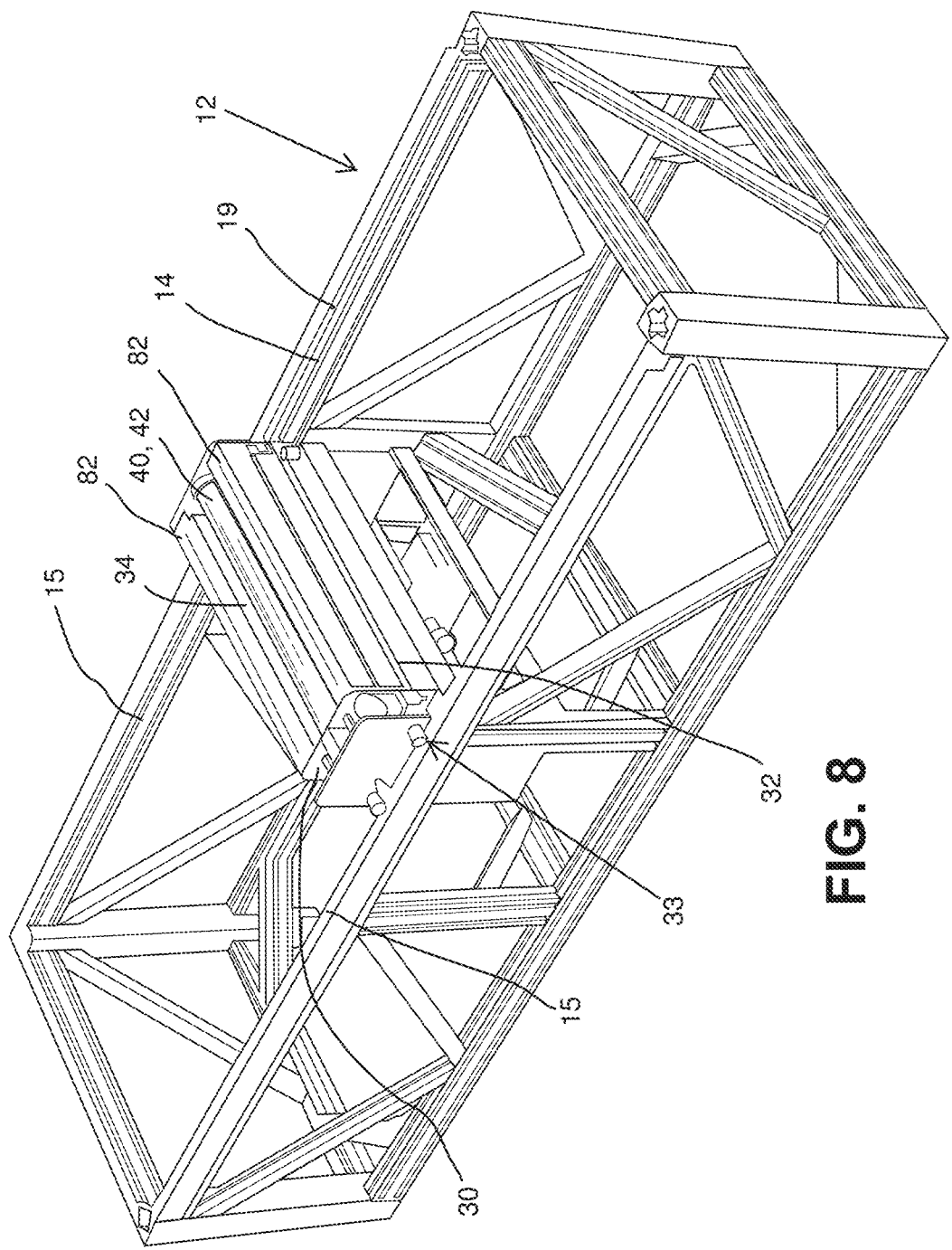
FIG. 8 is a top perspective view of another embodiment of an apparatus for producing a three-dimensional object, according to aspects of the disclosure.
Figure 9:
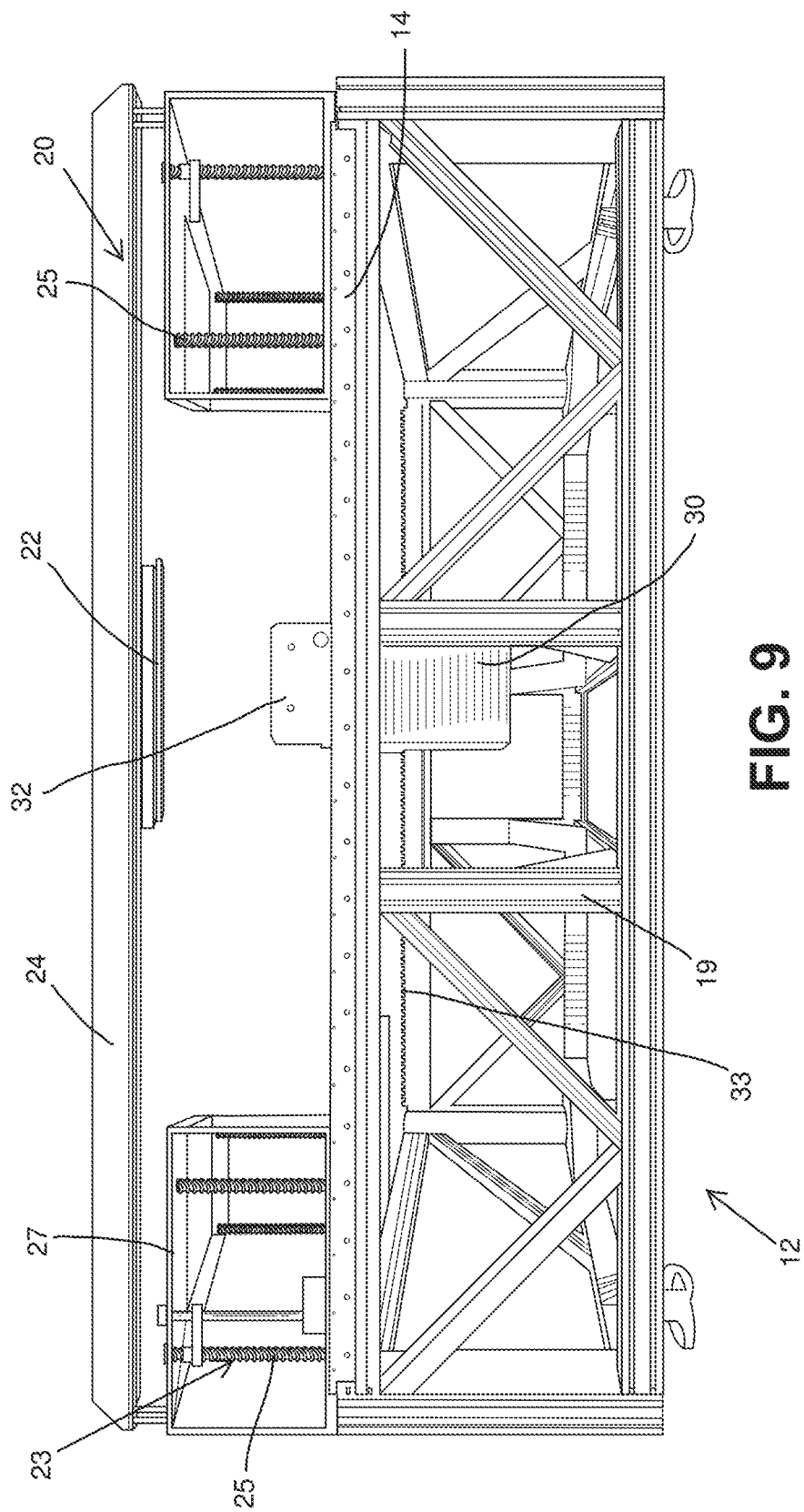
FIG. 9 is a side view of the apparatus as shown in FIG. 8.
Figure 10:
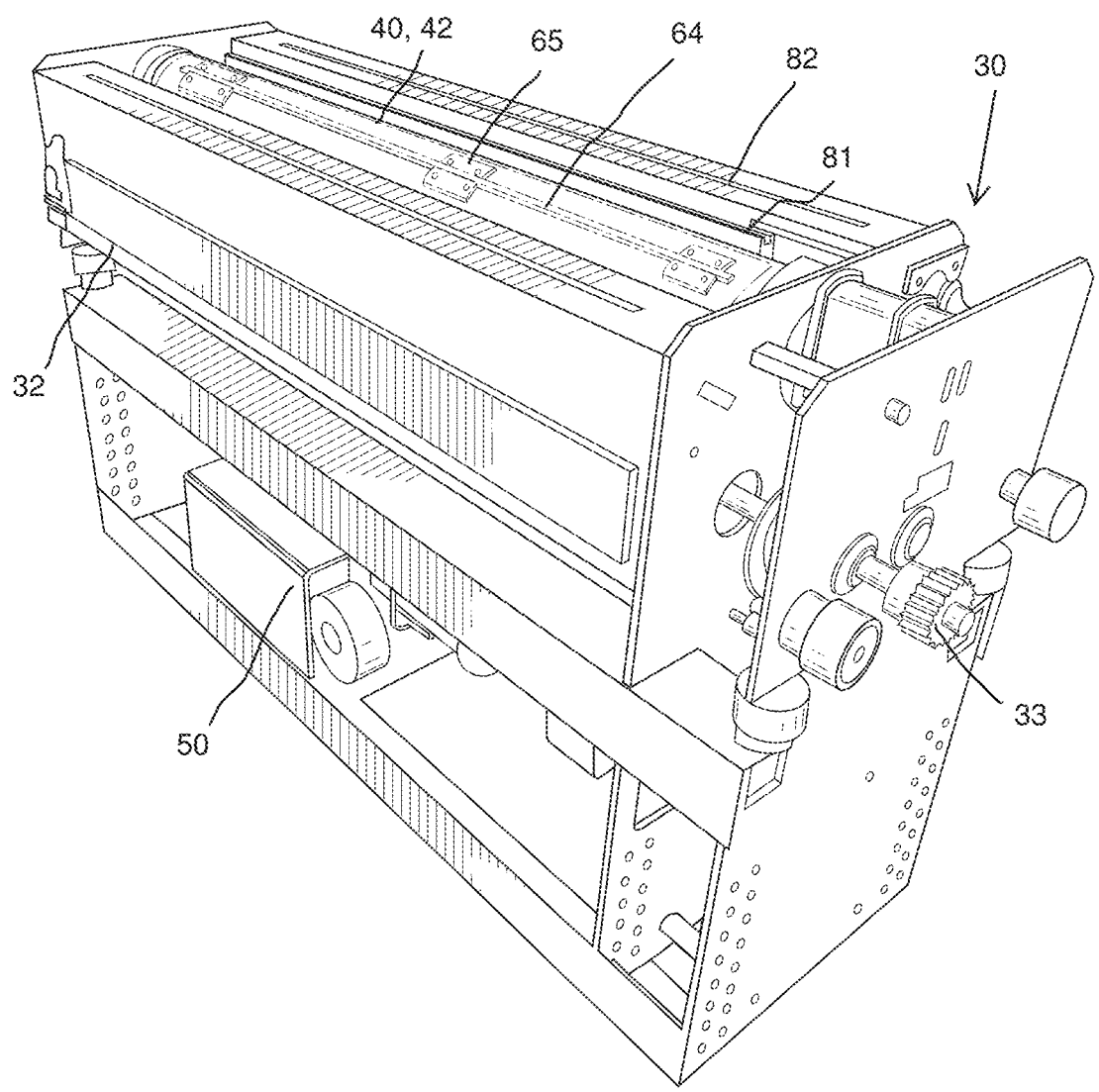
FIG. 10 is a top perspective view of a deposition mechanism of the apparatus as shown FIG. 8.
Figure 11:
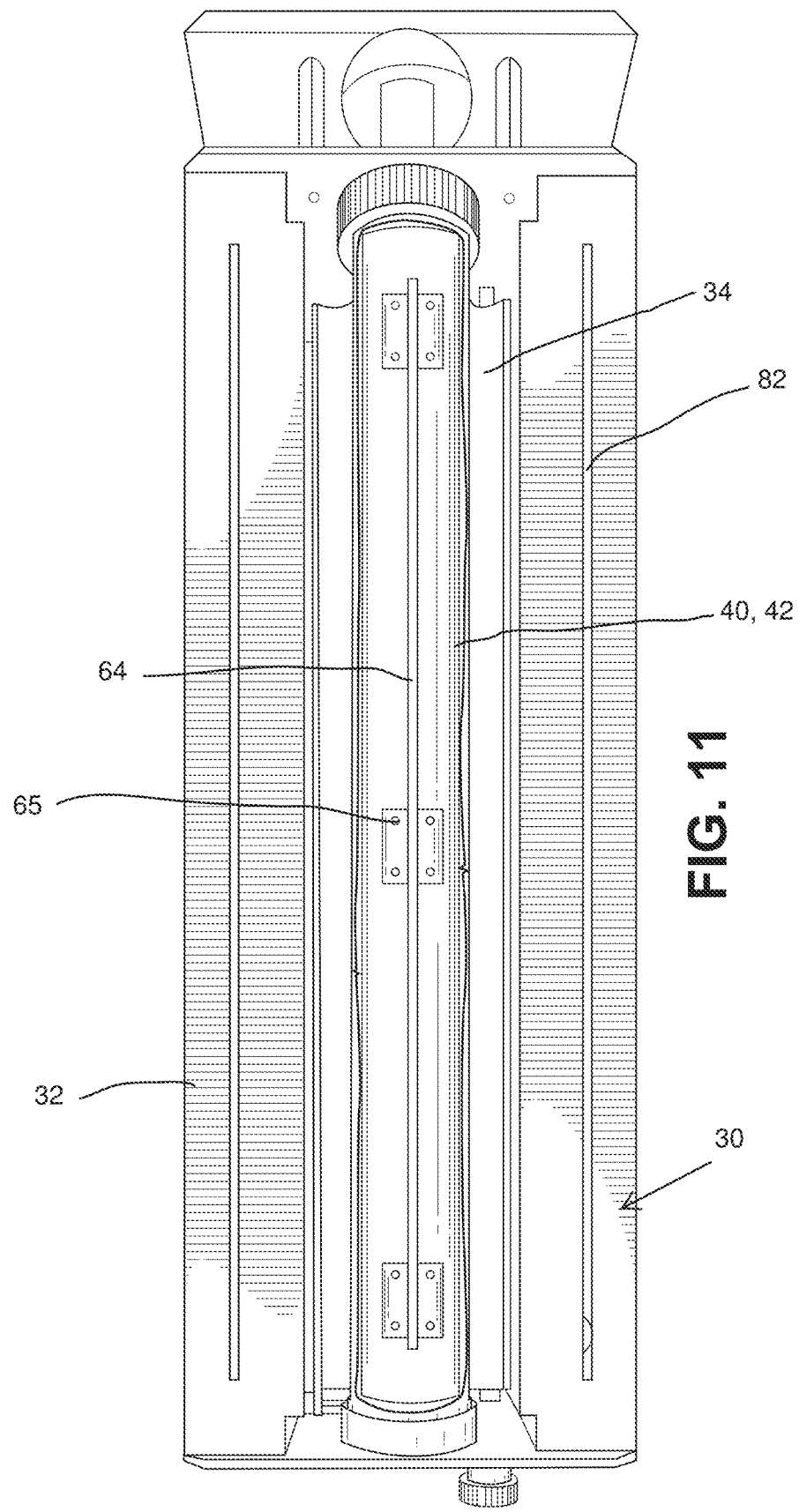
FIG. 11 is a top view of the deposition mechanism of the apparatus as shown in FIG. 10.

The deposition mechanism 30 may include further additional components to provide additional functionality in producing a high-quality object 11. It is understood that any of the example embodiments herein may include any combination of these additional components, even if not specifically illustrated herein. For example, the deposition mechanism 30 may include one or more secondary exposure devices 80, configured to trail the applicator 40 in the direction of movement, as shown in FIG. 7. The secondary exposure device 80 emits additional electromagnetic waves 53 to further solidify the material, which waves 53 may have the same or different wavelength and intensity as the waves 53 from the exposure device 50. In one embodiment, the secondary exposure device 80 does not need to be precisely focused, as it is acceptable for the entire surface of the object 11 to be irradiated. In this configuration, the waves 53 from the exposure device 50 may be configured to only solidify the material 36 enough to form a stable layer 38 (known as a "green state"), and the secondary exposure device 80 then further solidifies the layer 38 to the desired final degree of solidification. This presents a significant efficiency advantage over existing processes, where objects 11 are typically produced in the green state and require a subsequent separate irradiation step for full curing. In one embodiment, the power levels of the exposure device 50 and the secondary exposure device 80 may be set so that each exposure device 50, 80 partially solidifies the material 36 and the combined exposure is sufficient to completely solidify the material 36. This setting avoids overexposure of the material 36, which could cause aesthetic and/or mechanical damage. The embodiment of FIGS. 15-19 includes two secondary exposure devices 80, to permit secondary exposure of the layer 38 while the carriage 32 is traveling in two opposite directions without making a 180° turn. The leading secondary exposure device 80 may be deactivated for each pass of the carriage 32, with the trailing secondary exposure device 80 being active, or both secondary exposure devices 80 may be active. Components 80A of the secondary exposure device 80 are illustrated in FIG. 16. The controller 100 may control activation of the secondary exposure device(s) 80.

As another example, the deposition mechanism 30 may include one or more material removal and/or relocation mechanisms configured to remove or relocate excess and/or unsolidified material, such as one or more squeegees 81 or one or more contactless vacuum squeegees 82. For example, the embodiment in FIGS. 15-19 includes two squeegees 81 positioned on alternate sides of the roller 42, which wipe the surface of the layer 38 to remove excess and/or unsolidified material 36 after the solidification process. In one embodiment, the squeegees 81 may be configured to be raised and lowered, so that only the trailing squeegee 81 engages the surface of the object 11, which operation may be controlled by the controller 100. As another example, the embodiment in FIGS. 15-19 also includes two vacuum squeegees 82 positioned on alternate sides of the roller 42, which remove or relocate excess and/or unsolidified material 36 after the solidification process through application of vacuum airflow through blowing or suction. Components 82A-B of the vacuum squeegees 82 are shown in FIG. 16. In one embodiment, the vacuum squeegees 82 may be configured to be activated and deactivated, so that only the trailing vacuum squeegees 82 affects the surface of the object 11, which operation may be controlled by the controller 100. In one embodiment, the vacuum squeegees 82 can relocate remaining flowable material 36 located on vertical surfaces of the object 11 to adjacent horizontal surfaces of the applied layer 38, where the material 36 can either be removed and reclaimed into the supply 34 by the mechanical squeegees 81 or solidified to become part of the applied layer 38, e.g., by a secondary exposure device 80. Moving any remaining material 36 to the surface of the object 11 to be solidified has the added benefits of creating additional edge volume and an irregular surface at the edges of the layer, which can aid in retention and bonding of the next applied layer 38. In one embodiment, the vacuum squeegees 82 may not be activated until one or more foundation layers of the object 11 are completed. The vacuum squeegees 82 may alternately be configured to completely remove excess and/or unsolidified material in another embodiment. The embodiment in FIGS. 8-11 includes squeegees 81 and vacuum squeegees 82 configured similarly to those in the embodiment of FIGS. 15-19.

Figure 65:
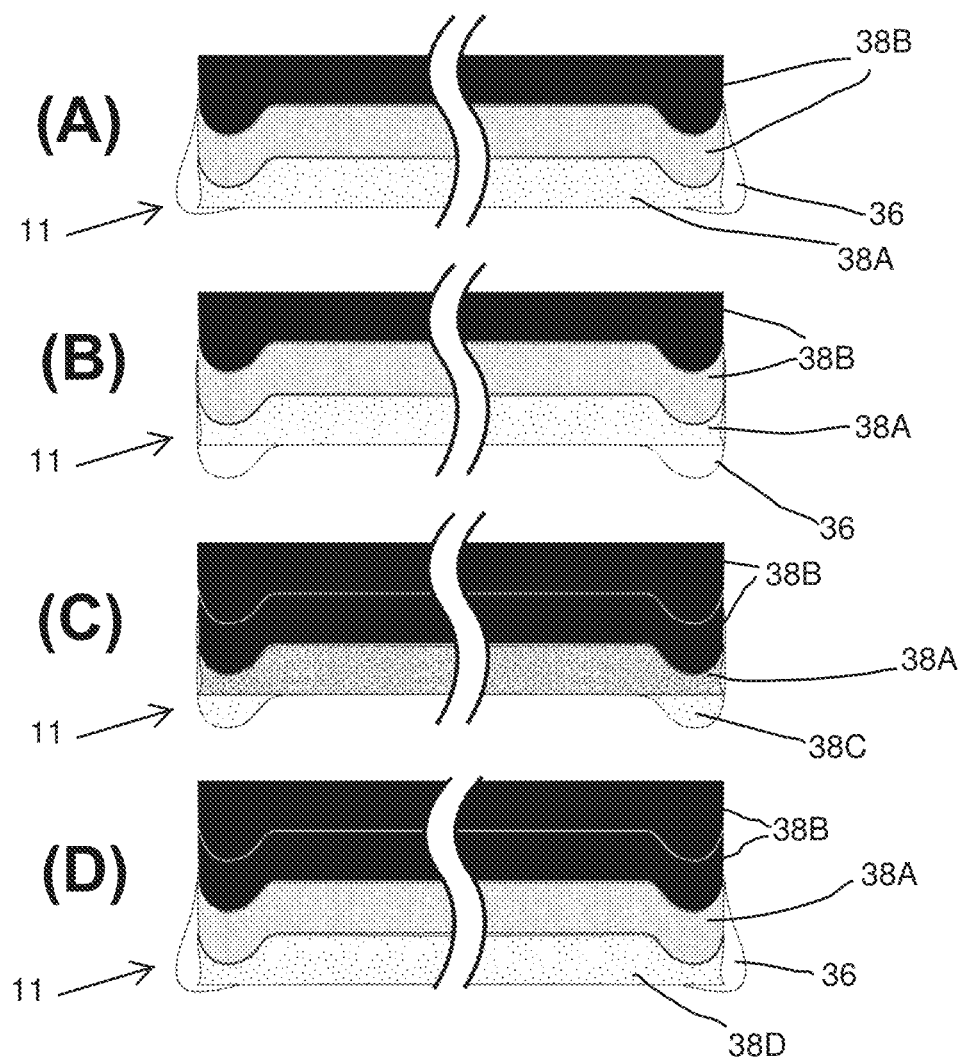
FIG. 65 is a schematic view illustrating a process for relocating and solidifying additional material according to aspects of the disclosure.

FIG. 65 illustrates relocation and subsequent solidification of unsolidified flowable material 36 using the vacuum squeegee 82 as described herein that can occur according to one embodiment. In FIG. 65, Step A depicts the unsolidified material 36 remaining around the edges of the last solidified layer 38A that was solidified by the exposure device 50, which is stacked onto previous layers 38B that were previously solidified. The shading in the layers 38A-B in FIG. 65 illustrate different degrees of solidification/curing of the material 36. Step B in FIG. 65 depicts the relocation of the unsolidified material 36 by the vacuum squeegee 82 as described herein. The unsolidified material 36 has been relocated from the vertical surfaces 93 of the layer 38A to the horizontal surface 94 of the layer 38A, and remains near the edges of the horizontal surface 94. Step C in FIG. 65 depicts the solidification of the material 36 by a secondary exposure device 80 as described herein, to form solidified material 38C. The solidified material 38C in this configuration forms uneven portions near the edges of the previous layer 38A. Step D in FIG. 65 depicts the object 11 after application and solidification of the following layer 38D, for which binding to the previous layer 38A is enhanced by the edge portions of the solidified material 38C. Additional unsolidified material 36 is illustrated in Step D, and it is understood that the process may then return to Step B in a cycle until the build is completed.

Figure 19:
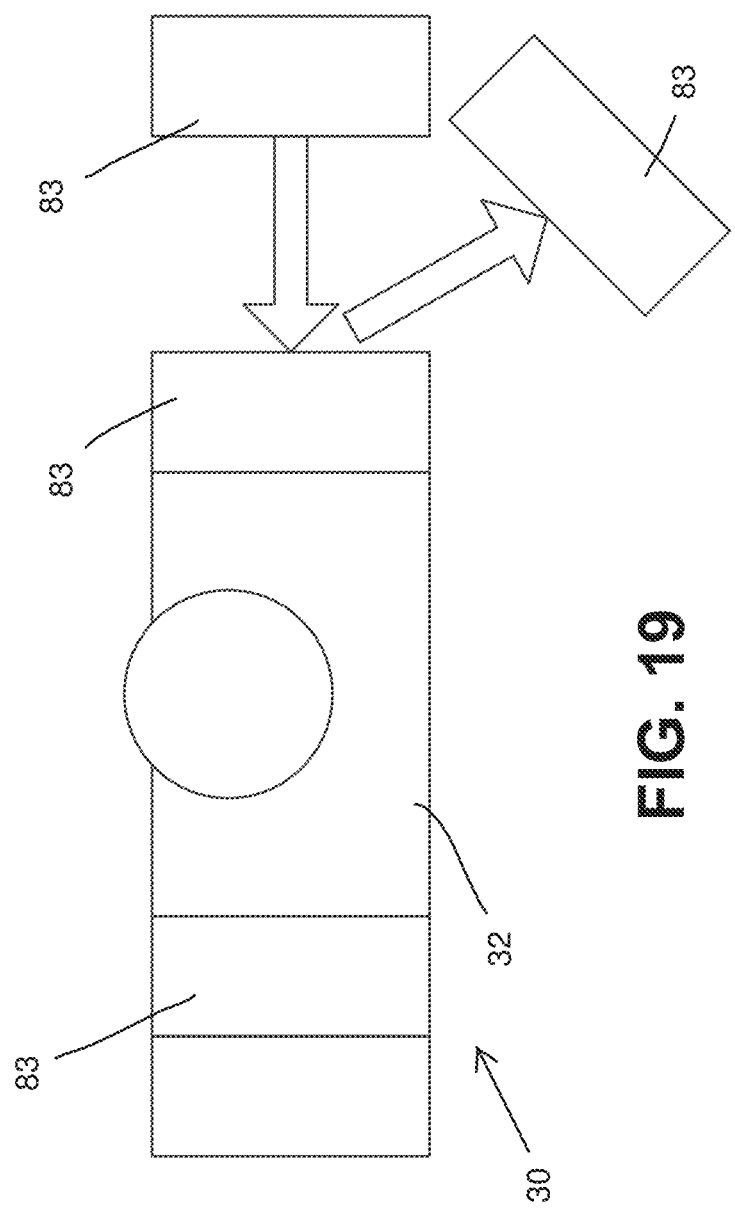
FIG. 19 is a side schematic view of another embodiment of a deposition mechanism configured for modular connection of modular connection of components, according to aspects of the disclosure.

Further additional components may be included in other embodiments. In one embodiment, one or more additional components 83 may be modularly connectable to the carriage 32 and to each other to provide the desired functionality, as shown in FIG. 19. Removable connections such as fasteners, clamps, interlocking structures (e.g., tabs/slots), or other structures may be used to effect these modular connections. As illustrated in FIG. 19, each of the additional components 83 is connectable to the carriage 32 and connectable to the outer side of each other additional component 83 in order to provide a fully modular and customizable structure. Such additional components 83 may include one or more secondary exposure devices 80, squeegees 81, or vacuum squeegees 82 as described herein. Such additional components 83 may also include other functional components, such as a solvent or liquid washing apparatus, mechanical wipers/cleaners, a color applicator, or an apparatus for additional material deposition. A color applicator used in this configuration can allow coloring to be applied on a layer-by-layer basis, giving the final object 11 a coloring that penetrates internally through the thickness of the object 11, instead of simply a surface coating. An apparatus for additional material deposition may include an apparatus for deposition of conductive materials or traces within the body of the object 11, providing conductivity and/or circuit functionality to the object 11.

Figure 20A:
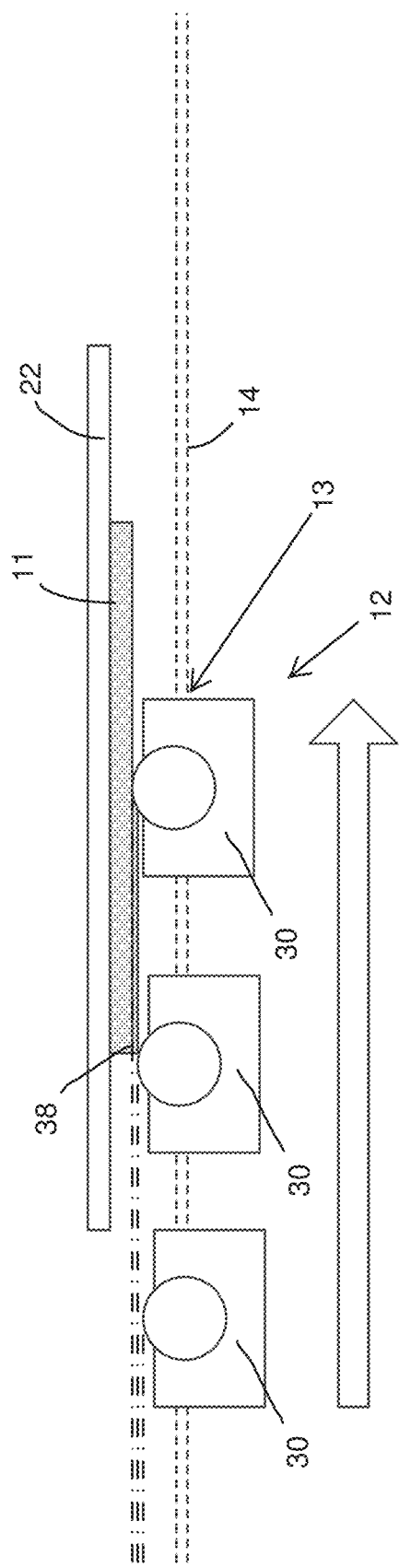
FIGS. 20A and 20B are side schematic views of another embodiment of an apparatus for producing a three-dimensional object in operation, according to aspects of the disclosure.
Figure 20B:
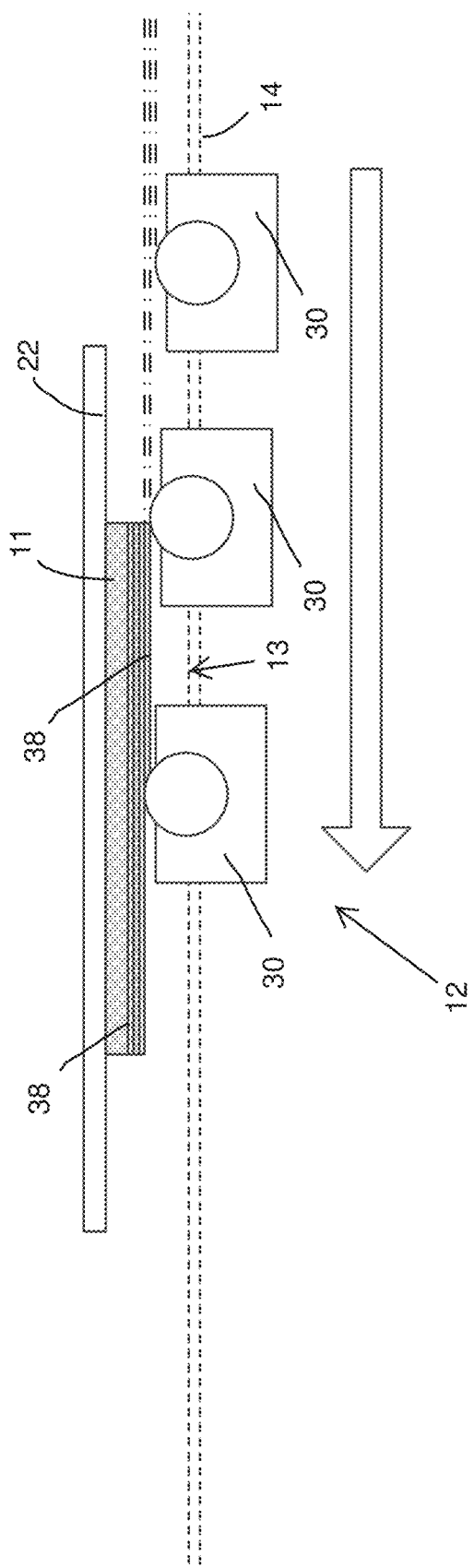
Figure 21:
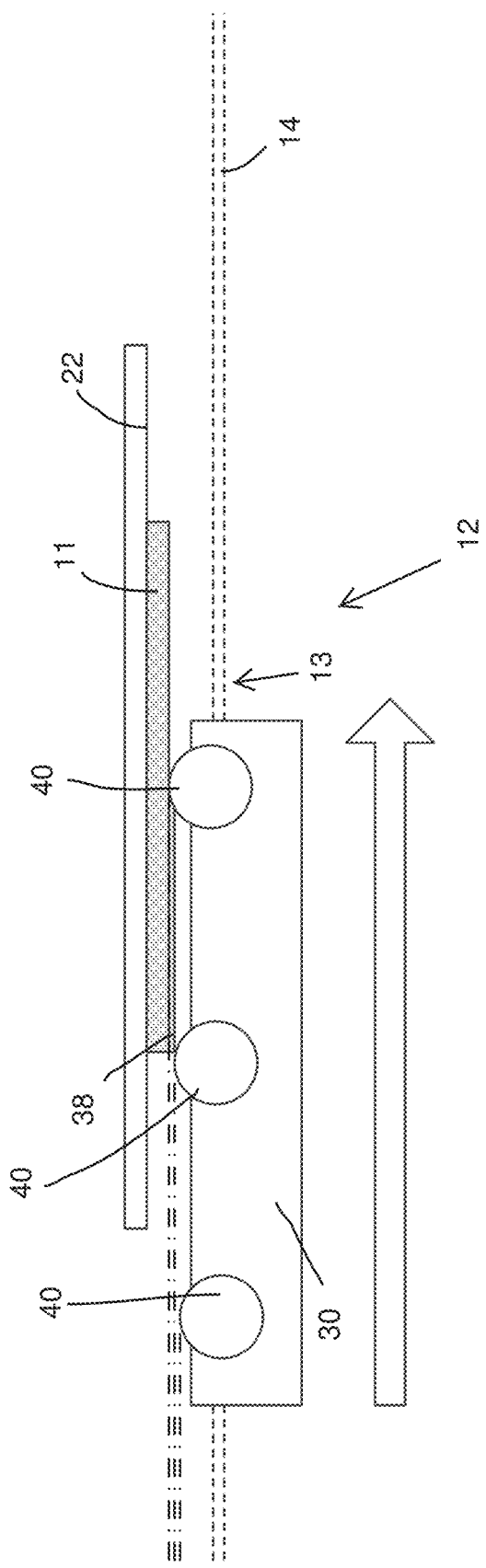
FIG. 21 is a side schematic view of another embodiment of an apparatus for producing a three-dimensional object in operation, according to aspects of the disclosure.
Figure 22:
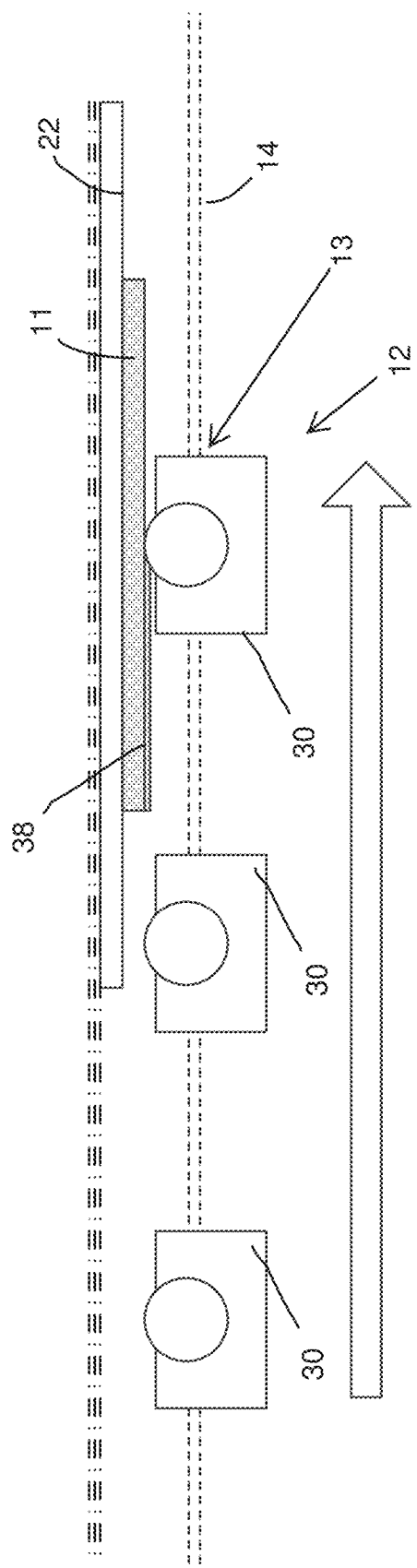
FIG. 22 is a side schematic view of another embodiment of an apparatus for producing a three-dimensional object in operation, according to aspects of the disclosure.
Figure 23:
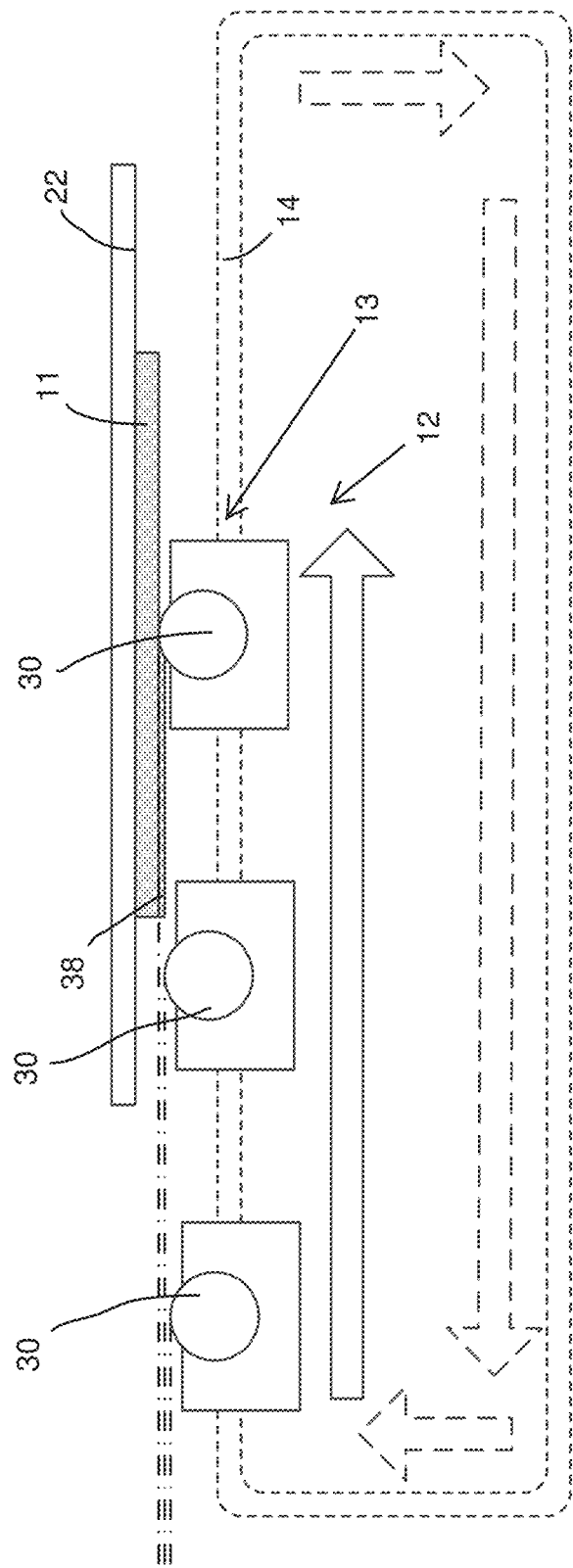
FIG. 23 is a side schematic view of another embodiment of an apparatus for producing a three-dimensional object in operation, according to aspects of the disclosure.

The apparatus 12 may be configured to use multiple deposition mechanisms 30 and/or multiple applicators 40 to pass through the build area 13 in sequence, such as illustrated in FIGS. 20-23. The multiple deposition mechanisms 30 in FIGS. 20-23 are illustrated as being connected to the same track 14, but multiple tracks 14 may be used in another embodiment. In one embodiment, as illustrated in FIGS. 20A-B, multiple deposition mechanisms 30 may be configured to pass through the build area 13 sequentially, with each deposition mechanism 30 having the applicator 40 at different vertical positions. The different applicator 40 positions are indicated by phantom lines in FIGS. 20A-B, and each successive deposition mechanism 30 is spaced lower than the preceding deposition mechanism 30. This configuration may be accomplished using vertical positioning structures described elsewhere herein. It is understood that the difference in vertical positioning among the multiple deposition mechanisms 30 may be substantially the same as the desired thickness of each applied layer 38. As shown in FIG. 20A, multiple deposition mechanisms 30 passing through the build area 13 each deposit a layer 38, one on top of the next, in a single pass that does not require re-positioning of the support assembly 20. This configuration results in multiplicative efficiency and time savings, as each pass in FIG. 20A deposits 3× as many layers as a single pass with a single deposition mechanism 30. Further, the multiple deposition mechanisms 30 may be configured to adjust their heights in the reverse order to enable a pass in the opposite direction to deposit three additional layers 38, after repositioning of the build platform 22, as shown in FIG. 20B. In another embodiment, the support assembly 20 may be configured for rapidly adjusting the positioning of the build platform 22 between each deposition mechanism 30 passing, to enable multiple passes, as shown in FIG. 22. In a further embodiment, the track 14 may be arranged in a loop or carousel configuration to enable passes by one or more deposition mechanisms 30 at the same relative build platform 22 height, without reversing the direction of the deposition mechanism(s) 30. This can remove the necessity for re-adjusting the relative heights of the deposition mechanisms 30 relative to each other, and only adjustment of the build platform 22 relative to the track 14 is necessary. This can also remove the need for duplicative components such as secondary exposure devices 80, squeegees 81, vacuum squeegees 82, etc., to permit opposite directional passes. The loop of the track 14 may be horizontal, vertical, or a more complex configuration. When multiple deposition mechanisms 30 are used, all deposition mechanisms 30 may use the same material 36, or different deposition mechanism 30 may be configured to apply different materials 36. Due to differences in properties of different materials 36, the deposition mechanism 30 may need to pass at different speeds. A self-propelled carriage 32 as described herein permits this operation. Still further, the track 14 may include a complex structure (not shown) with rest areas for unused deposition mechanisms and track-switching mechanisms, to permit switching between deposition mechanisms 30 as desired.

In another embodiment, multiple deposition mechanisms 30 may be configured as illustrated in FIGS. 20A-B to pass through the build area 13 sequentially, with the deposition mechanisms 30 having the applicators 40 at the same vertical positions. This can be used to build different portions of the same layer of an object 11, and in particular, the deposition mechanisms 30 can be configured to deposit different materials 36 in the layer. For example, different deposition mechanisms 30 can produce portions with different colors, or one deposition mechanisms 30 may produce the body of the object 11 while another produces the support structure to be later removed.

In another embodiment, shown in FIG. 21, a single deposition mechanism 30 may include multiple applicators 40 positioned at different heights to define separate application sites 41, with sufficient outlets 54 for the waves 53 emitted by one or more exposure devices 50 to define a separate exposure site 51 for each applicator 40. The multiple applicators 40 may be configured with a single supply 34 of the flowable material 36 or multiple supplies 34 of one or more flowable materials 36, and it is understood that other components may be duplicated if desired. The rollers 42 in FIG. 21 may be vertically adjustable relative to each other in one embodiment.

Figure 24A:
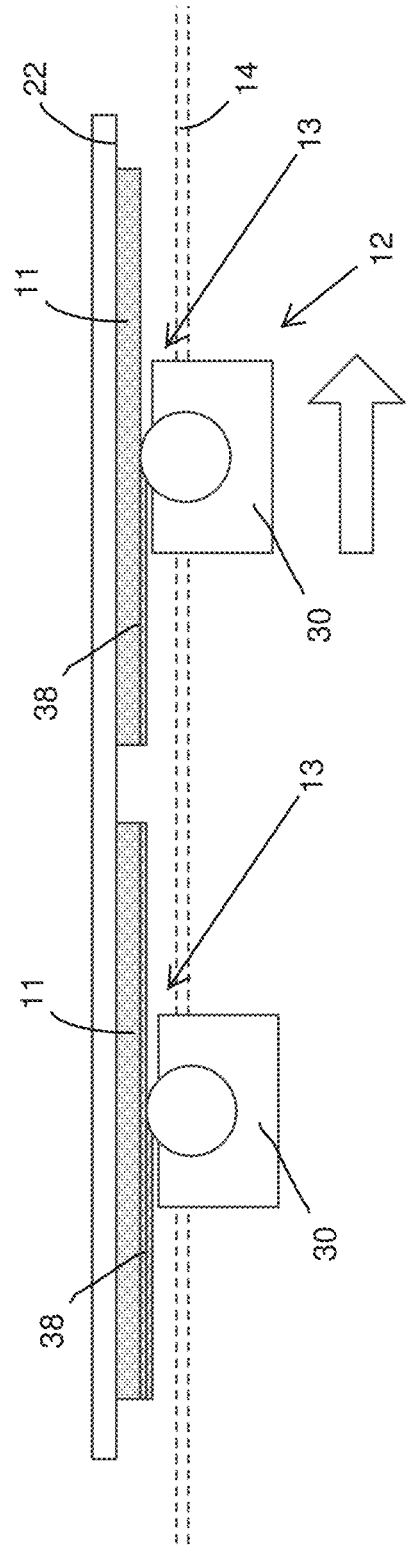
FIG. 24A is a side schematic view of another embodiment of an apparatus for producing a three-dimensional object in operation, according to aspects of the disclosure.
Figure 24B:
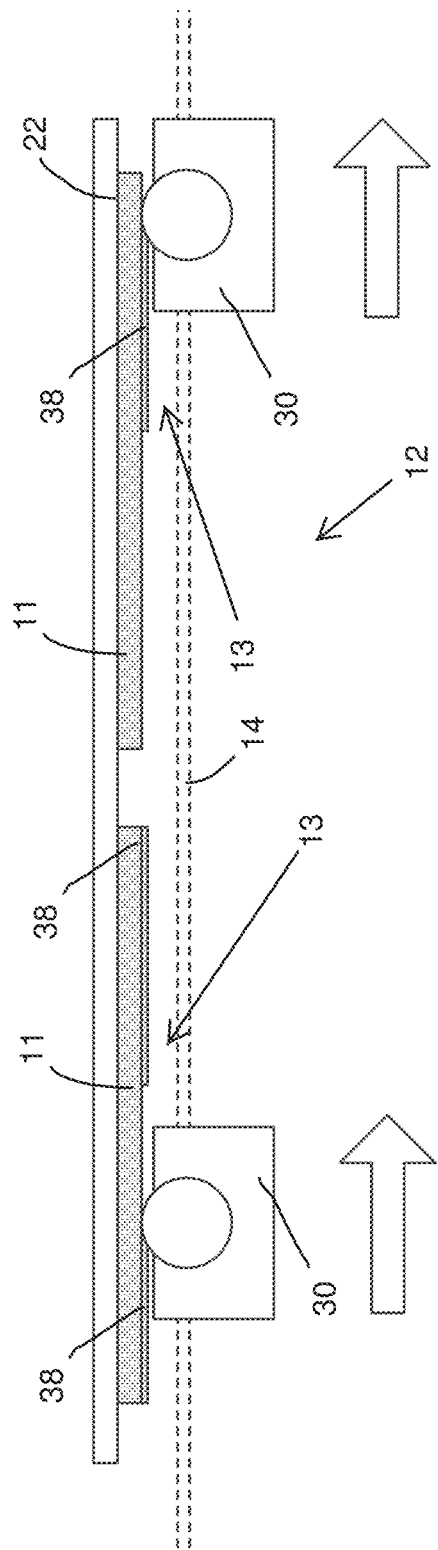
FIG. 24B is a side schematic view of another embodiment of an apparatus for producing a three-dimensional object in operation, according to aspects of the disclosure.

In other embodiments, shown in FIGS. 24A-B, a single or multiple deposition mechanisms 30 may be configured to build multiple objects 11 in a single pass, such as by using multiple build platforms 22 or multiple objects 11 built on the same build platform 22, with each separate object 11 having a separate build area 13 through which the track 14 passes. As shown in FIG. 24A, multiple deposition mechanisms 30 may apply multiple consecutive layers 38 to multiple objects 11 in a single pass. As shown in FIG. 24B, multiple deposition mechanisms 30 may apply different portions of the same layer 38 to each of multiple objects 11 in a single pass. This configuration may be particularly useful for a part where multiple materials need to be deposited in the same layer, such as for a multi-material object 11 or an object 11 that includes support structure being manufactured along with the object 11 that will be later removed. It is understood that the height(s) of the build platform(s) 22 relative to the applicator(s) 40 may be adjusted between passes as described herein. Additionally, the use of multiple deposition mechanisms 30 and/or multiple applicators 40 as shown in FIGS. 20-23 with an embodiment as shown in FIG. 24 may enable dually multiplicative efficiency and time savings. Further, the use of multiple deposition mechanisms 30 and/or multiple applicators 40 as shown in FIGS. 20-23 in combination with an embodiment as shown in FIG. 24A or 24B may enable different parts of multiple identical objects 11 to be simultaneously manufactured in a single pass of each deposition mechanism 30. For example, a first deposition mechanism 30 may be loaded with a first material 36 for manufacturing a first part of an object 11, and a second deposition mechanism 30 may be loaded with a second material 36 for manufacturing a second part of the object 11, and each of these deposition mechanisms 30 can be configured make a single pass depositing a layer 38 (or partial layer) of the desired material 36 in the same location on a plurality of identical objects 11 sequentially as shown in FIG. 24A-B. It is understood that different deposition mechanisms 30 may also include different exposure devices 50 if different materials 36 are used.

Figure 28:
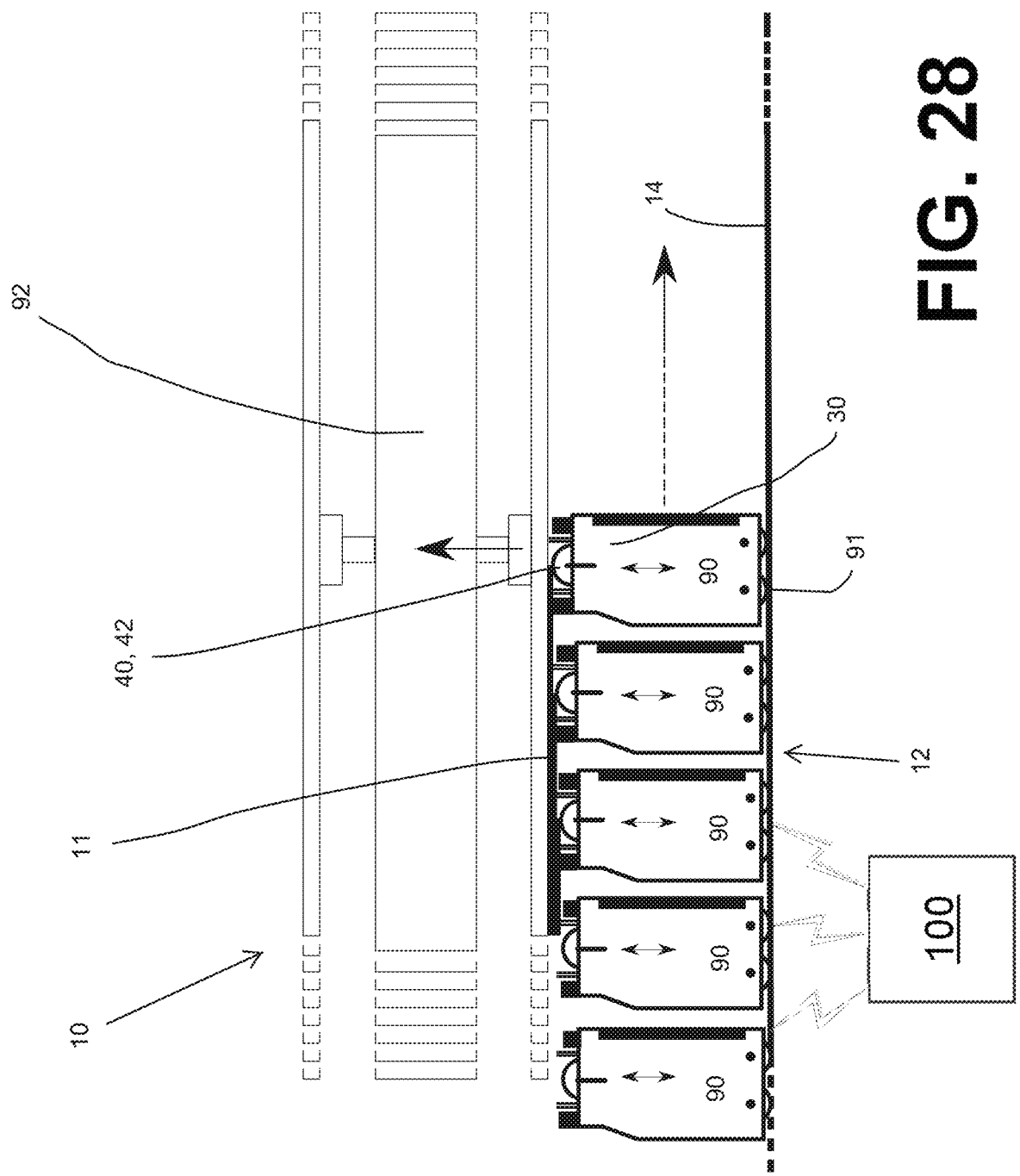
FIG. 28 is a side schematic view of another embodiment of a system and apparatus for producing a three-dimensional object in operation, according to aspects of the disclosure.

FIG. 28 illustrates an additional embodiment of a system 10 for manufacturing one or more objects 11 utilizing an apparatus 12 and deposition mechanisms 30 according to embodiments described herein. In particular, the embodiment of FIG. 28 may be configured for producing a number of objects 11 in sequence, similar to the embodiment of FIG. 24. Each deposition mechanism 30 in the embodiment of FIG. 28 may be configured as an autonomous unit 90 with an individual sub-controller, where all of the sub-controllers for all of the units 90 are integrated with the controller 100, such that the controller 100 controls the sub-controllers and thereby controls all of the units 90. Each unit 90 may further include one or more positioning systems, including a local positioning system and/or a global positioning system (GPS). Each unit 90 may further include a deposition mechanism 30 and a drive mechanism 91 configured for moving the unit 90 around during manufacturing. As shown in FIG. 28, the units 90 are all connected to a carousel 92 that moves the units 90 around to a plurality of stations. The stations may each be configured for a specialized purpose. For example, some stations may be manufacturing stations where the unit 90 makes a pass through one or more build areas 13 for manufacturing one or more objects 11 on one or more build platforms 22. Such stations may also include robotic components, such as robotic arms that hold a build platform 22 in the proper location for building by the units 90. Other stations may be maintenance stations, such as stations configured for refilling the supply 34 the unit 90. The carousel 92 may have one or more tracks 14 as described herein for guiding movement of the units 90 during building. The drive mechanism 91 may be multifunctional, such that the units 90 are autonomously powered and capable of engaging and disengaging from the track 14 and moving separately from the track 14 when not in the building process, such as for visiting refilling or maintenance stations. In the configuration illustrated in FIG. 28, each unit 90 may be loaded with a different material 36 for manufacturing different parts of a single object 11 or different objects, as described above with respect to FIG. 24. This configuration therefore provides the ability for rapid manufacturing of a series of objects 11, either identical objects 11 or different objects 11.

Figure 29:
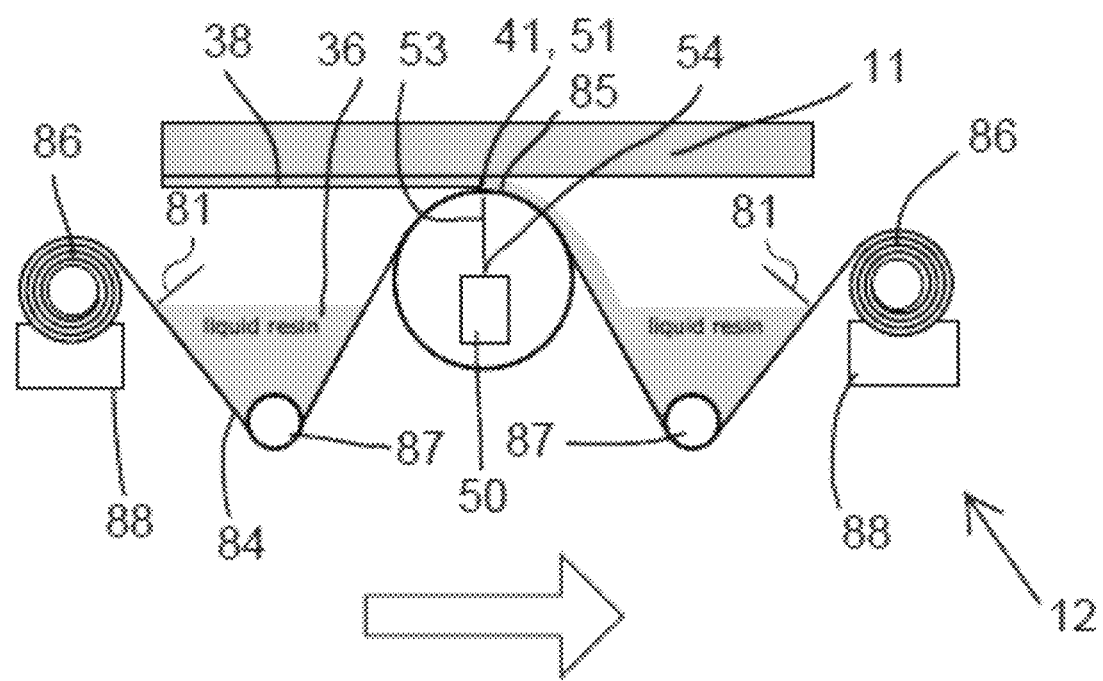
FIG. 29 is a side schematic view of another embodiment of an apparatus for producing a three-dimensional object in operation, according to aspects of the disclosure.
Figure 30:
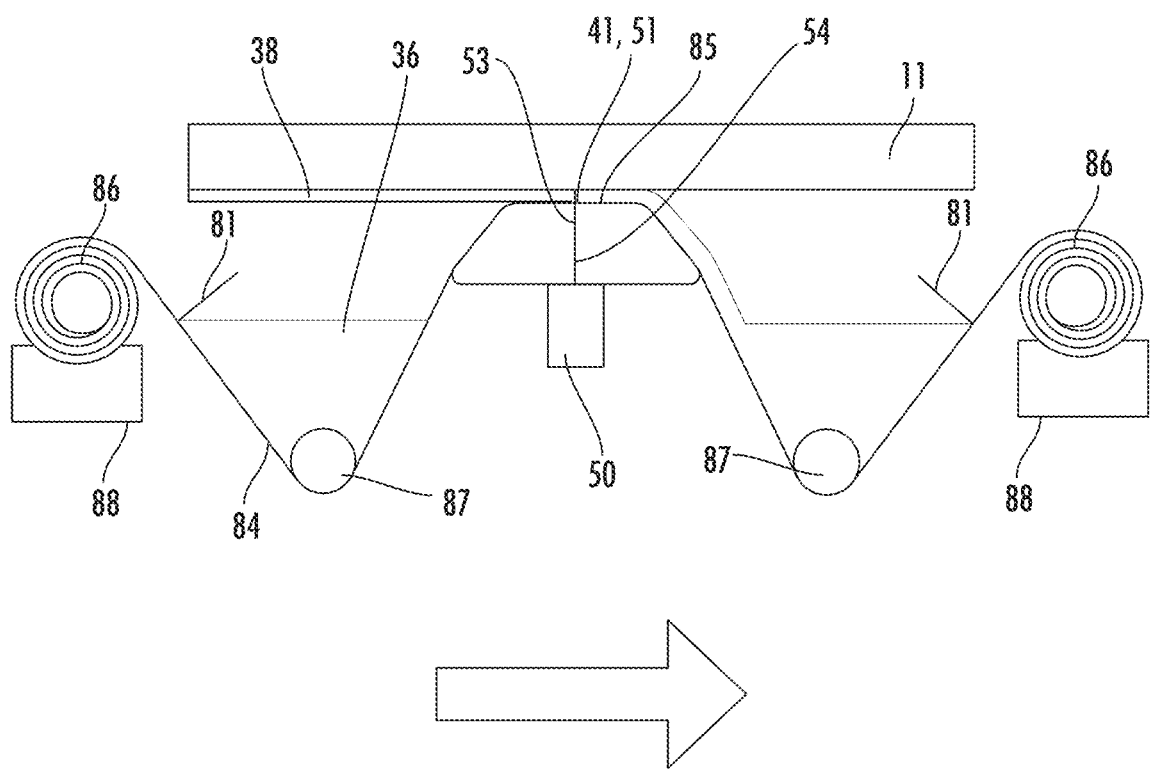
FIG. 30 is a side schematic view of another embodiment of an apparatus for producing a three-dimensional object in operation, according to aspects of the disclosure.
Figure 31:
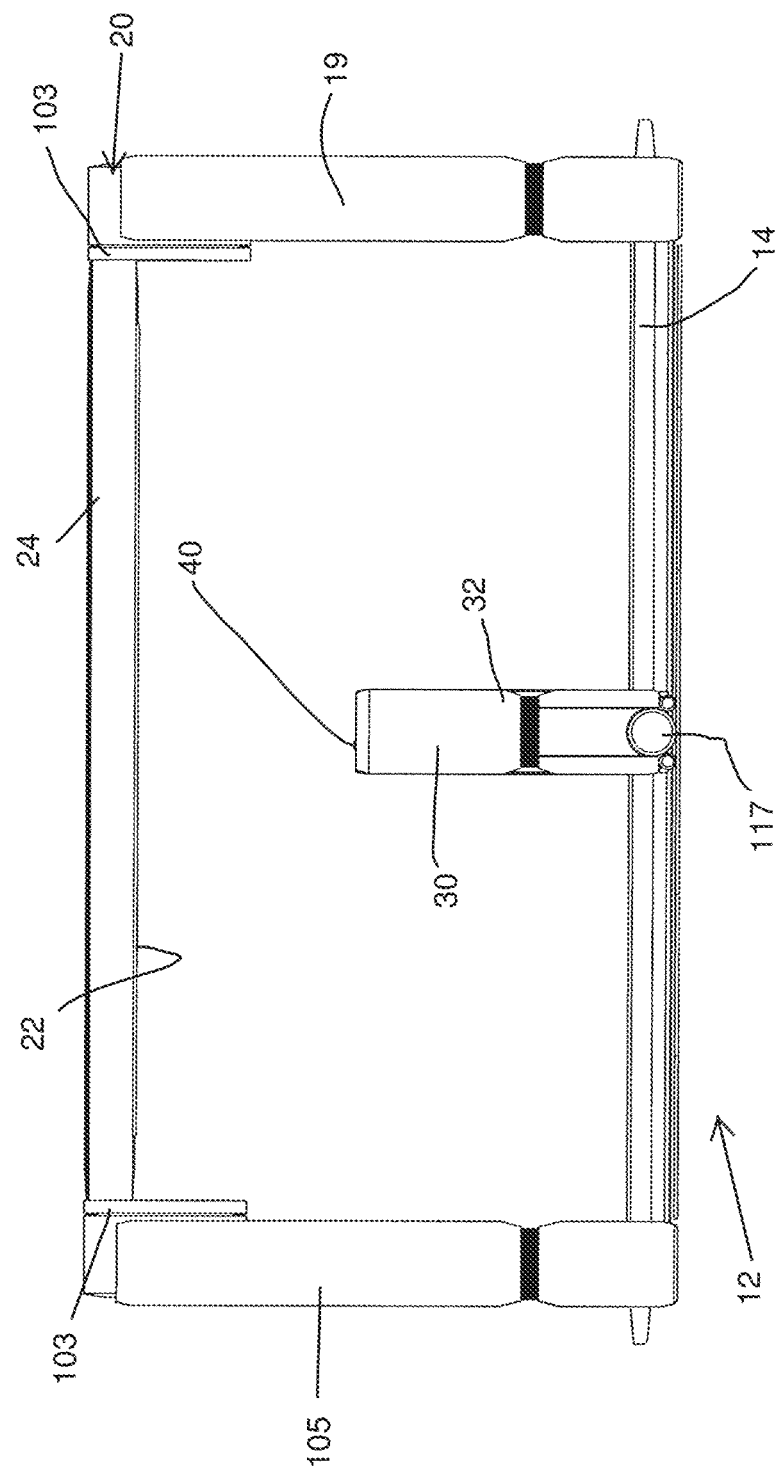
FIG. 31 is a side view of another embodiment of an apparatus for producing a three-dimensional object in operation, according to aspects of the disclosure.
Figure 32:
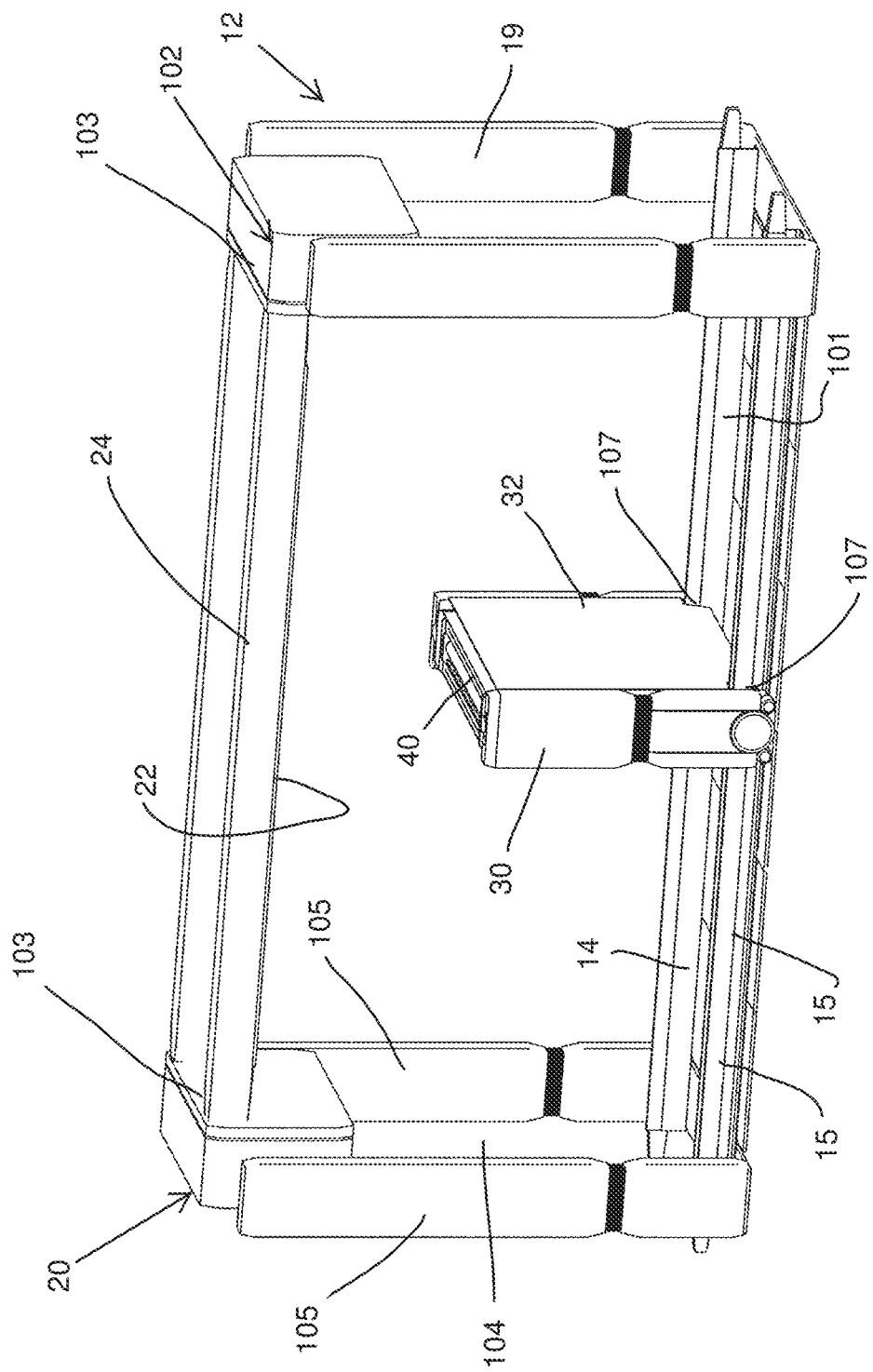
FIG. 32 is a perspective view of the apparatus of FIG. 31.
Figure 33:
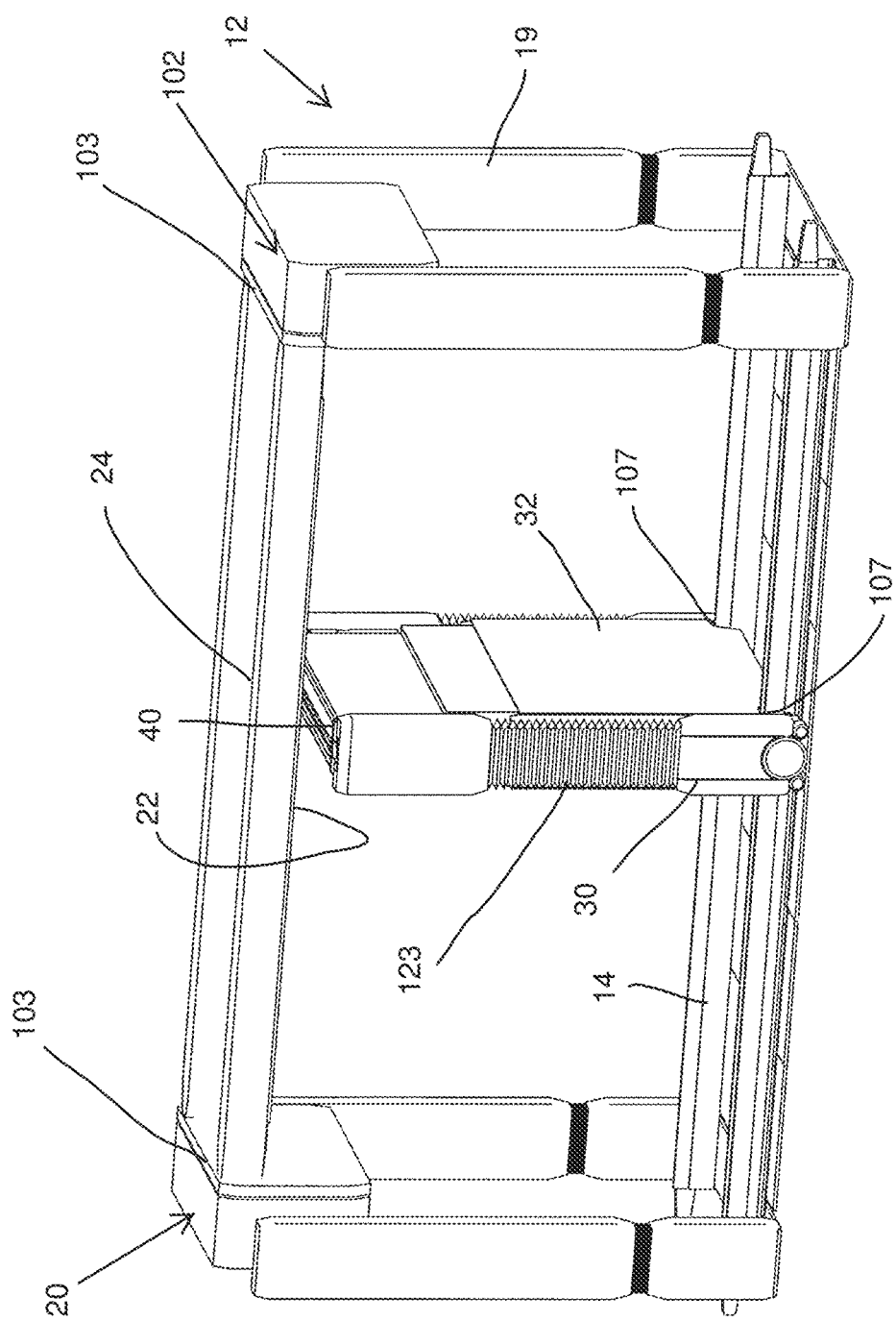
FIG. 33 is a perspective view of the apparatus of FIG. 31, showing vertical adjustment of a deposition mechanism of the apparatus to a new vertical application location.

FIG. 29 illustrates an additional embodiment of a system 10 for manufacturing one or more objects 11 utilizing an apparatus 12 and a deposition mechanism 30 with an applicator 40 that is different from the roller 42 described herein. In the embodiment of FIG. 29, the applicator 40 includes a moveable film 84 that is in communication with the supply 34 of the flowable material 36 and carries the flowable material 36 to the application site 41 by lateral movement to form a layer 38 of the object 11. The deposition mechanism 30 in FIG. 29 has a static surface 85 that defines the location of the application site 41 and the thickness of the applied layer 38 as described above, and the film 84 carries the material 36 to the application site 41 by moving over the static surface 85. The static surface 85 is formed by a cylinder in FIG. 29, but may be formed by a ridge or other structure in other embodiments. For example, FIG. 30 illustrates an embodiment of a system 10 as shown in FIG. 29 with a flattened static surface 85 that is formed by a trapezoidal structure. An oval, obround, or other structure with an elongated or flattened surface may be used in other embodiments. The deposition mechanism in FIG. 29 also has two rolls 86 on opposite sides of the application site 41, which serve as take-up or supply stations, depending on the direction of movement. For example, in FIG. 29, the deposition mechanism is moving from left to right as indicated, and the film 84 is moving from right to left, with the left hand roll 86 serving as a take-up station and the right-hand roll 86 serving as the supply station. This will be reversed when moving from right to left. Other components are also included such as guide rollers 87 or other guides for the film 84, squeegees 81 or other material removal devices to remove the flowable material 36 from the film 84 before reaching a take-up roller 86, and a cleaning station 88 for cleaning the film 84 stored on the rolls 86. While the carriage 32 is not shown in FIG. 29, it is understood that all of these components may be mounted on a carriage 32 as described herein. As shown in FIG. 29, the exposure device 50, or at least the outlets 54 thereof, may be located beneath the static surface 85 and within the cylinder that defines the static surface 85, although any configuration and positioning of the exposure device 50 and the outlets 54 thereof described herein can be used in connection with this embodiment. In the illustrated configuration, the waves 53 from the exposure device 50 pass through both the static surface 85 and the film 84 on the path to the exposure site 51. In an additional embodiment, the static surface 85 may have a gap that permits the waves 53 to pass to the exposure site 51 without passing through the static surface 85. In a further embodiment, the static surface 85 may have an array 55 of outlets 54 mounted within such a gap, which may place the outlets 54 in such close proximity to the exposure site 51 that no lenses or other focusing equipment may be necessary.

FIG. 25 illustrates an alternate embodiment of the system 10 and apparatus 12 that uses a traditional vat supply 34 of the flowable material 36, with the deposition mechanism 30 positioned above the build platform 22. The deposition mechanism 30 in this embodiment generally includes a carriage 32 that is configured for movement along a track 14, with a roller 42 and an exposure device 50 that emits waves 53 that pass through the roller 42 on their path to the exposure site 51. In this embodiment, the roller 42 does not act as an applicator as in the embodiments of FIGS. 1 and 3-4, but does define the thickness of the applied layer 38 of the material 36, similarly to the such previous embodiments. As such, the roller 42 in this embodiment acts as a layer-defining mechanism, and differently configured structures may be used for this purpose in other embodiments, such as a block shape that slides along or through the material 36. The build platform 22 in FIG. 25 and associated structures may be configured to have a removable structure as described elsewhere herein. Additionally, the deposition mechanism 30 and/or the build platform 22 may have adjustment mechanisms (not shown) for relative vertical positional adjustment of the build platform 22 and the roller surface 42. The adjustment mechanism may include structures described herein and/or structures used in existing vat-based rapid prototyping technologies, such as moving the build platform 22 gradually deeper into the vat supply 34. This embodiment enables the object 11 to be manufactured below the surface of the flowable material 36 if so desired, with a controllable layer 38 thickness. However, this embodiment does not provide some of the advantages of the other embodiments described herein, such as eliminating the requirement to maintain a large vat supply 34 of the flowable material 36. It is understood that the embodiment of FIG. 25 may include additional structure, components, and features described herein. For example, the system 10 illustrated in FIG. 25 also includes a controller 100 configured for controlling and/or monitoring components of the apparatus 12 as described herein. As another example, the exposure device 50, or at least the outlets 54 thereof, are illustrated in FIG. 25 as being located inside the roller 42, but the exposure device 50 may be configured similar to that in FIG. 3 to project completely through the roller 42 in another embodiment.

FIGS. 31-46 illustrate another embodiment of a system 10 that includes a manufacturing apparatus 12 that may be connected to a computer controller 100 in communication with one or more components of the apparatus 12 and configured for controlling operation of the apparatus 12 and/or the components thereof to manufacture an object 11. The apparatus 12 of FIGS. 31-46 includes a support assembly 20 for supporting the object 11 within a build area 13 during manufacturing, a track 14 extending through the build area 13, and a material deposition mechanism 30 mounted on the track 14 and configured for producing the object 11 within the build area 13 through layer-by-layer application of a material. Many components of the system 10 and apparatus 12 of FIGS. 31-46 are similar in structure and operation to other components described herein with respect to other embodiments, and such components may not be described again in detail with respect to the embodiment of FIGS. 31-46. It is understood that similar reference numbers may be used to indicate such similar components. The deposition mechanisms 30 in FIGS. 31-46 are configured for operation as autonomous units 90 as described herein, and each autonomous unit 90 may have onboard a processor 2604, a memory 2612, and/or other computer components necessary for executing computer-executable instructions to automate the autonomous unit 90 and/or communicate with the computer controller 100.

The support assembly 20 in FIGS. 31-46 includes a base frame 19 for supporting some or all of the track 14, the build platform 22, and other components of the apparatus 12. In the embodiment of FIGS. 31-46, the track 14 is not supported by the base frame 19 and is fixed separately to the floor, but the track 14 may be connected to and supported by the base frame 19 in another embodiment. The track 14 includes two parallel beams or rails 15 and at least one bus bar 101 configured for supplying power to the deposition mechanism 30. The bus bar(s) 101 may be part of one or both of the rails 15 in one embodiment. Additionally, the substantial entirety of one or both rails 15 may act as the bus bar(s) 101 in one embodiment. One or more bus bars 101 may be provided separate from the rails 15 in another embodiment. The track 14 may not contain any bus bar 101 in another embodiment, and the deposition mechanism 30 (i.e., the autonomous unit 90) may be self-powered for movement and operation, such as by an internal battery. It is understood that the track 14, the build platform 22, the support assembly 20, and other components may be constructed in any desired size, including lengths and widths that are significantly larger than those illustrated in FIGS. 31-42.

Figure 42:
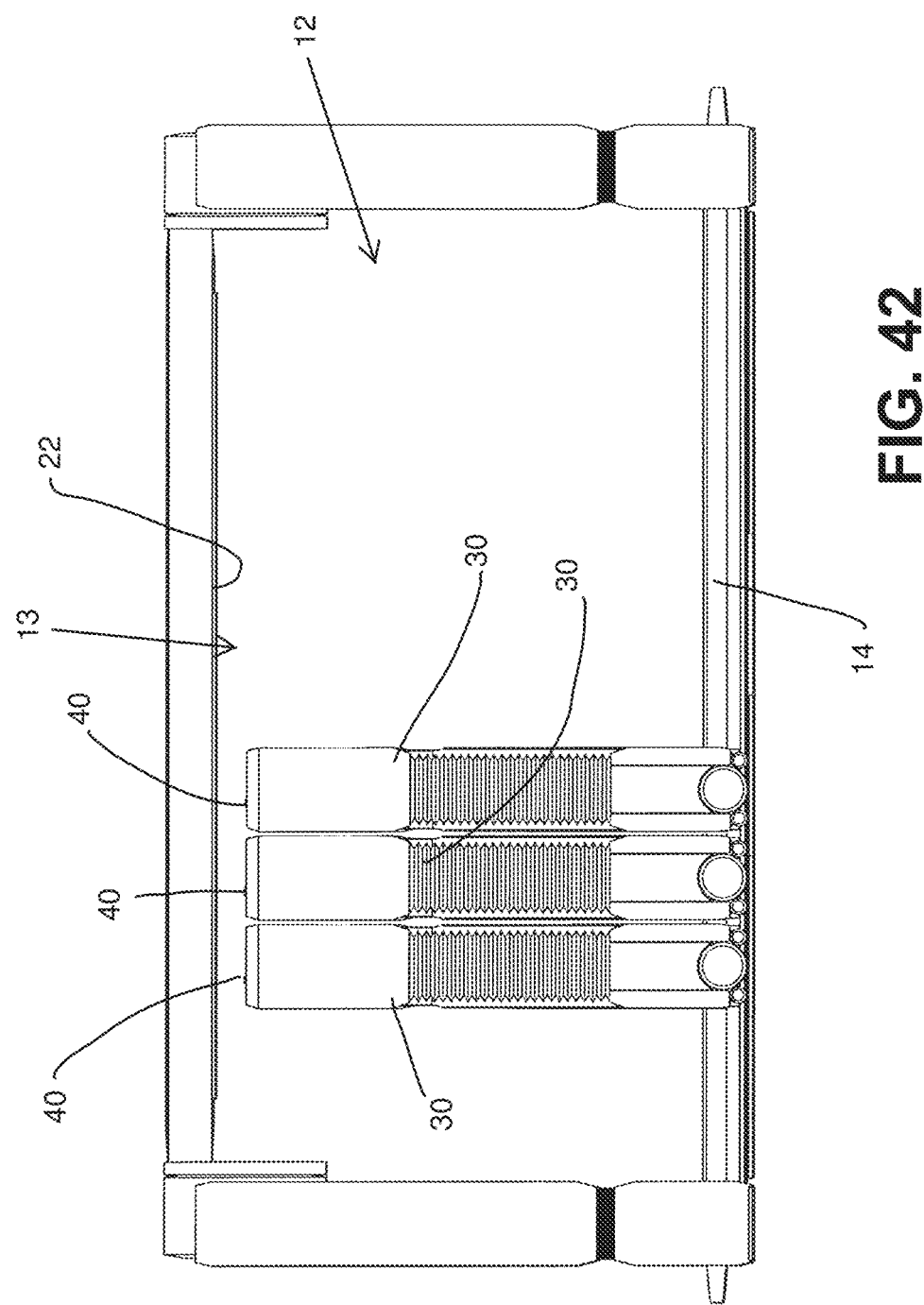
FIG. 42 is a side view of the apparatus of FIG. 31 with multiple deposition mechanisms operating simultaneously.
Figure 43:
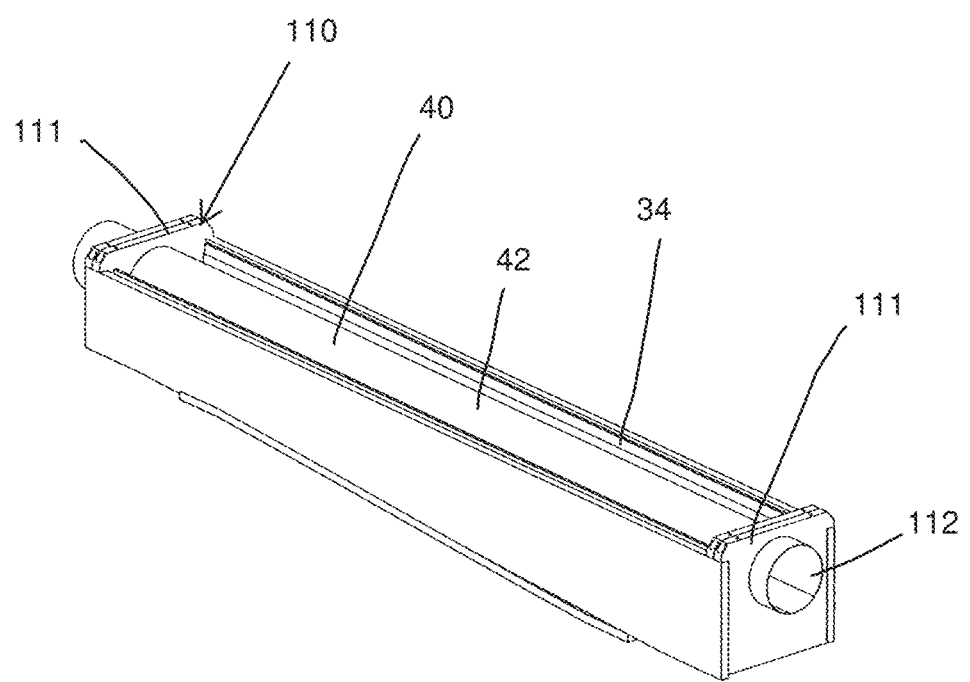
FIG. 43 is a perspective view of a portion of a removable resin application module of the deposition mechanism of FIG. 38.
Figure 44:
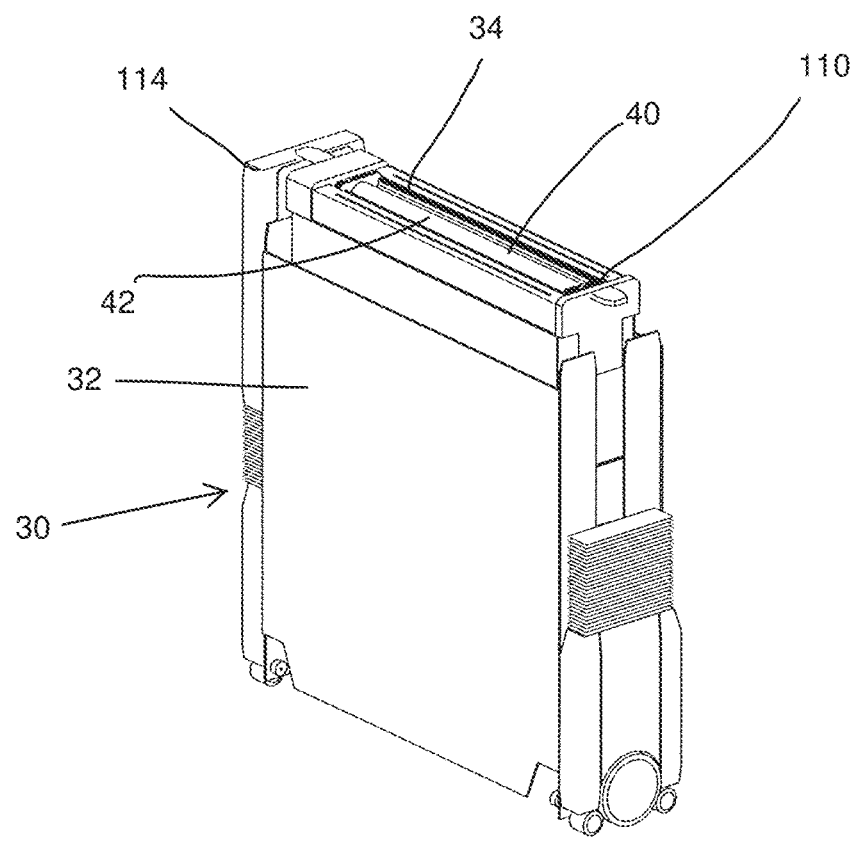
FIG. 44 is a perspective view illustrating removal of a resin application module from the resin deposition mechanism of FIG. 38.
Figure 45:
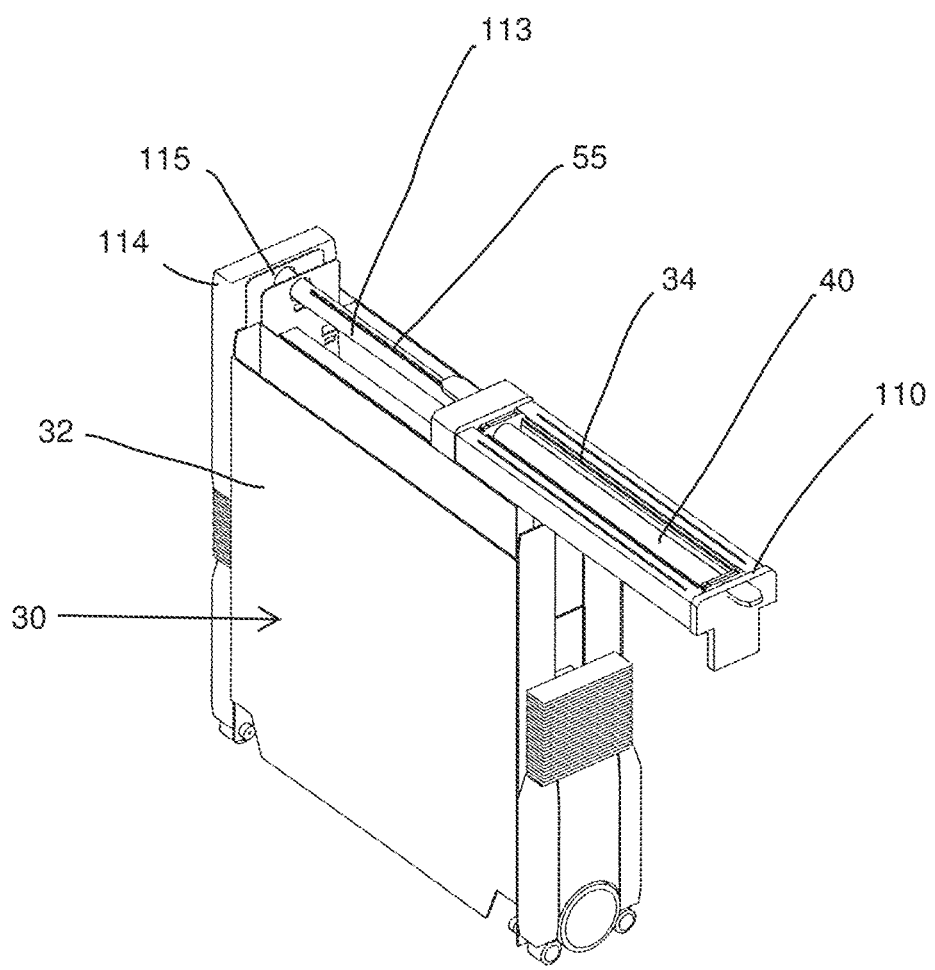
FIG. 45 is a perspective view illustrating removal of the resin application module of FIG. 44 from the resin deposition mechanism of FIG. 38.
Figure 46:
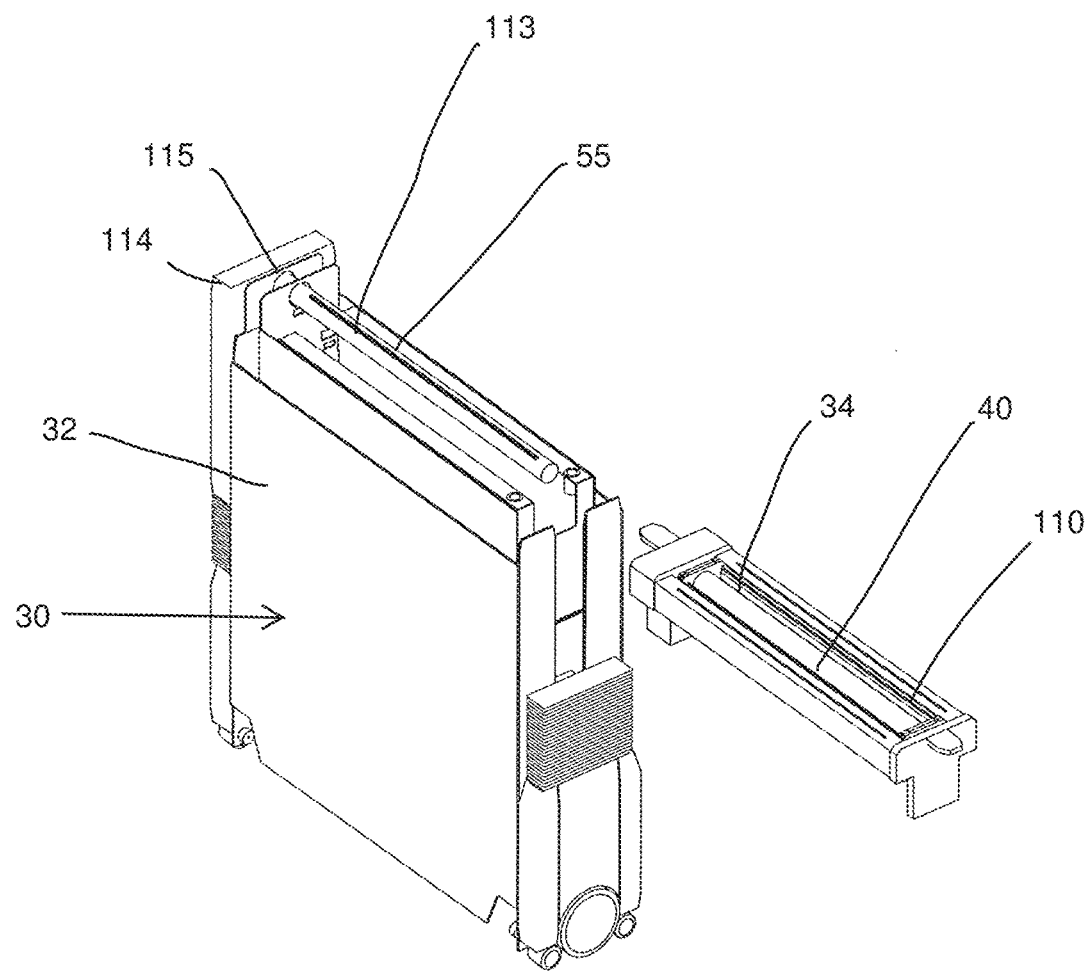
FIG. 46 is a perspective view illustrating interchanging of a second resin application module for the resin deposition mechanism of FIG. 38.
Figure 47:
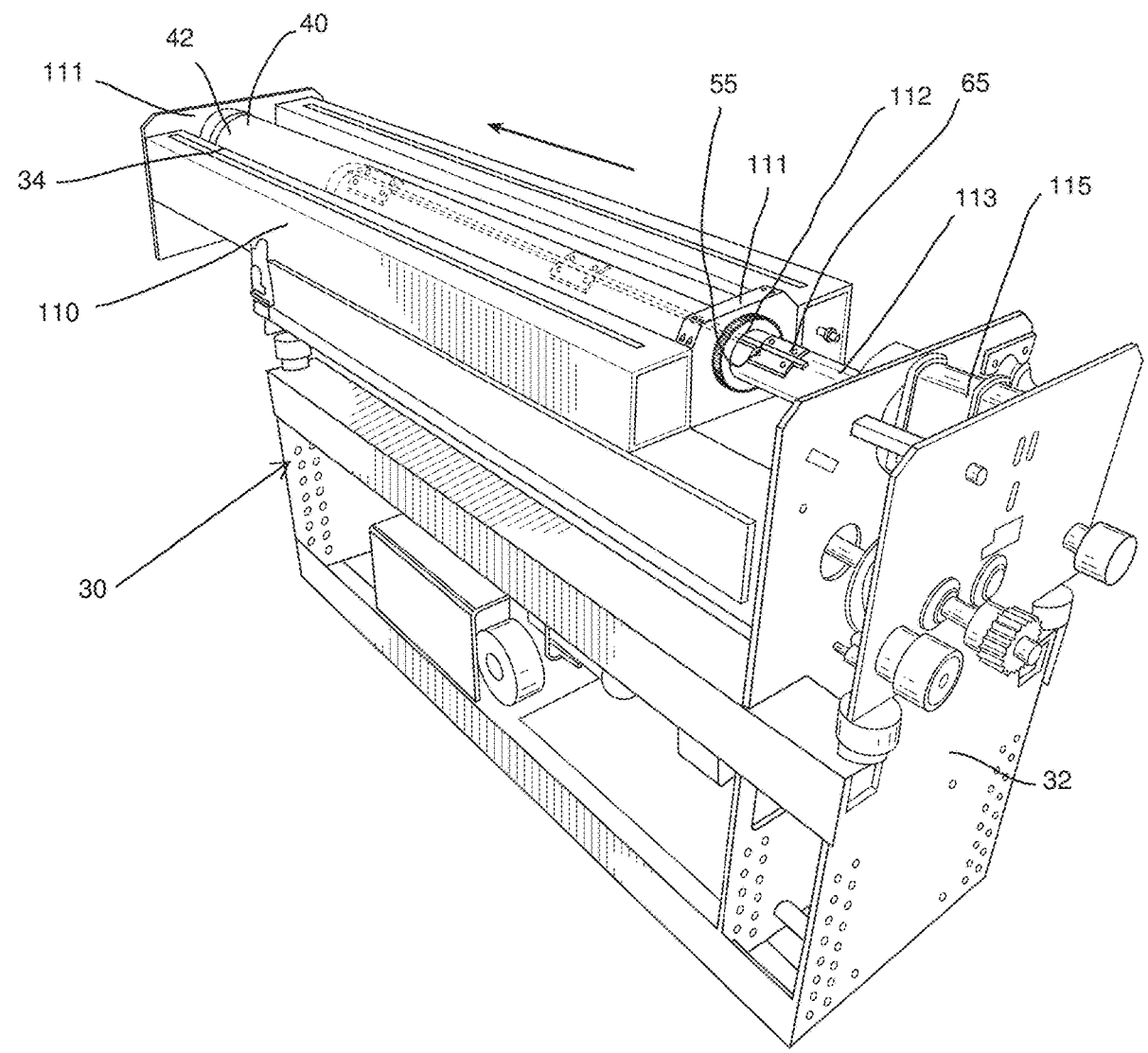
FIG. 47 is a perspective view of the deposition mechanism of FIG. 10 illustrating removal of a resin application module from the deposition mechanism.

The deposition mechanism 30 in the embodiment of FIGS. 31-46 includes a carriage 32 engaged with the track 14 and configured for movement along the track 14 and through the build area 13, a supply 34 of a flowable material 36 mounted on or otherwise operably connected to the carriage 32, an applicator 40 in communication with the supply 34 of the flowable material 36 and configured to apply the flowable material 36 to an application site 41 within the build area 13, and an exposure device 50 configured for emitting electromagnetic waves to solidify the applied material 36 to form the object 11. The supply 34 of the flowable material 36, the applicator 40, and the exposure assembly 60 in the embodiment of FIGS. 31-46 are similar or identical in function and structure to the same components in the embodiment of FIGS. 8-13 and need not be re-described herein in detail. The supply 34 of the flowable material 36 and the applicator 40 in the embodiment of FIGS. 31-46 are connected so as to form an integrated application module 110, also referred to as a resin application module 110, which is removable from the carriage 32 and replaceable with a second application module 110. FIGS. 44-46 illustrate an example of such an application module 110 and the process of removing and replacing the application module 110. FIG. 43 illustrates a portion of the application module 110, including the roller 42 and the structures defining the supply 34. As seen in FIGS. 43-46, the supply 34 is provided in the form of a vat or reservoir with the roller 42 at least partially disposed within the reservoir to be in communication with the flowable resin 36, and the supply 34 can be removed without draining the resin 36 if so desired. The applicator 40 in this embodiment is in the form of an elongated roller 42, and one or both of the ends of the roller 42 is connected to the side walls 111 of the vat 34. The optical fibers 61 pass through an opening 112 extending through one of the side walls 111 and the end of the roller 42 to pass into the interior of the roller 42 to form the array 55 of outlets 54 within the roller 42. The braces 65 and associated supporting structure 113 holding the fibers 61, the micro-lens array 64 and other components of the exposure device 50 remain in place when the application module 110 is removed. It is understood that a side panel 114 of the carriage 32 is removed in this embodiment in order for the application module 110 to be removed, as shown in FIG. 44. The removable side panel 114 in the embodiment of FIGS. 31-46 is on the opposite side of the carriage as the drive assembly 115 that drives rotation of the roller 42. In one embodiment, either or both side panels 114 of the deposition mechanism 30 may include a resin tank connected to the supply 34 to replace used material 36 and/or keep the level of the material 36 constant. The deposition mechanism in FIGS. 8-13 may also include a removable application module 110 as described herein, such as shown in FIG. 47.

After the application module 110 is removed as shown in FIGS. 44-45, the same or a different application module 110 may be replaced in the same manner, as shown in FIG. 46. In one embodiment, a first application module 110 can be removed and replaced with a second application module 110 that has a different characteristic. For example, the second application module 110 may have a differently configured applicator 40 or may have a different flowable material 36, enabling switching of flowable materials 36 without draining, cleaning, and refilling the supply 34. As another example, the application module 110 may be removed for repair or refill and replaced with a backup application module 110 to avoid downtime. In other embodiments, either the supply 34 or the applicator 40 may be independently removable and replaceable using a similar configuration. Other removable configurations may be used in other embodiments.

Figure 34:
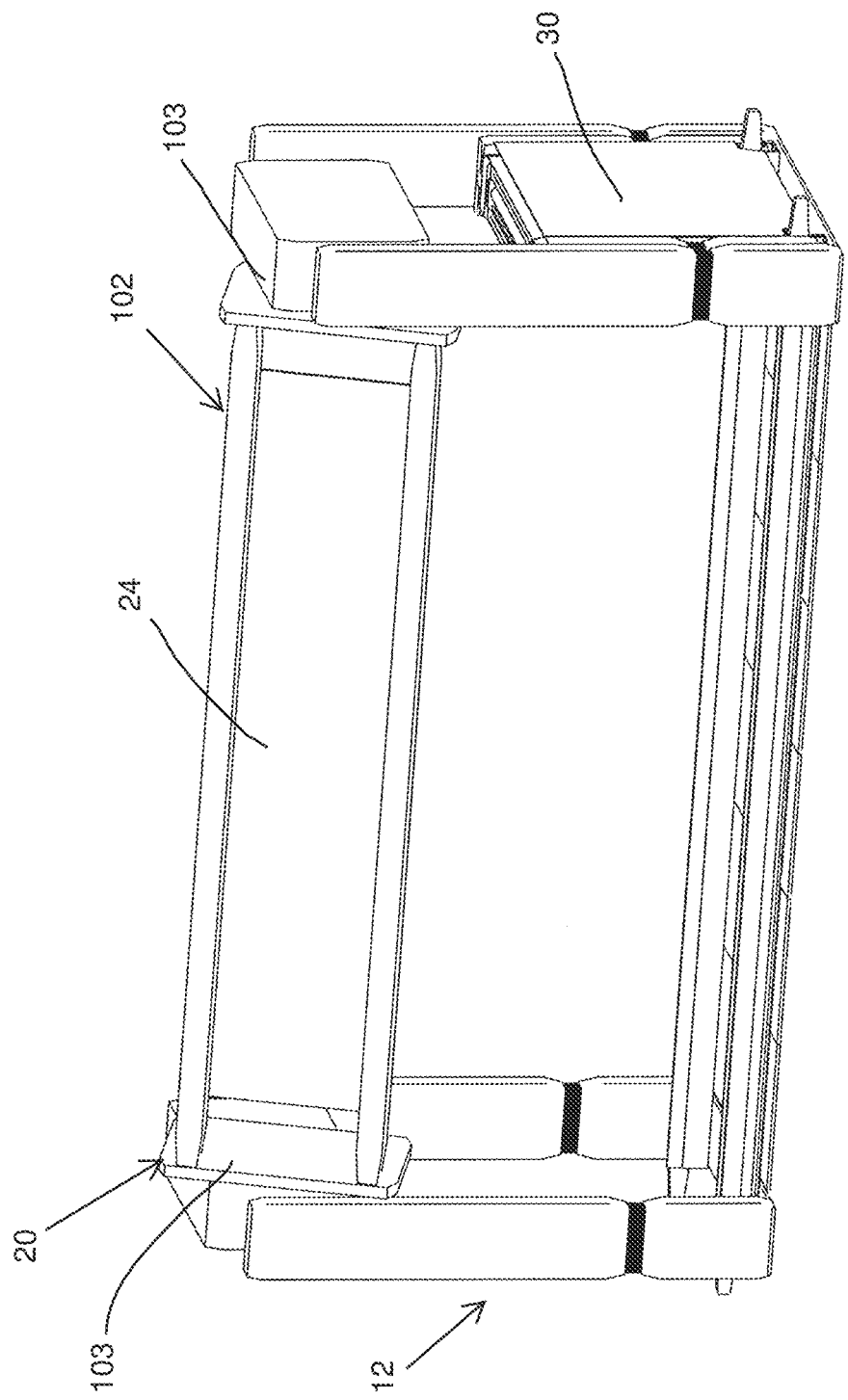
FIG. 34 is a perspective view of a support assembly of the apparatus of FIG. 31, showing movement of a build platform from a build position to a tending position.
Figure 35:
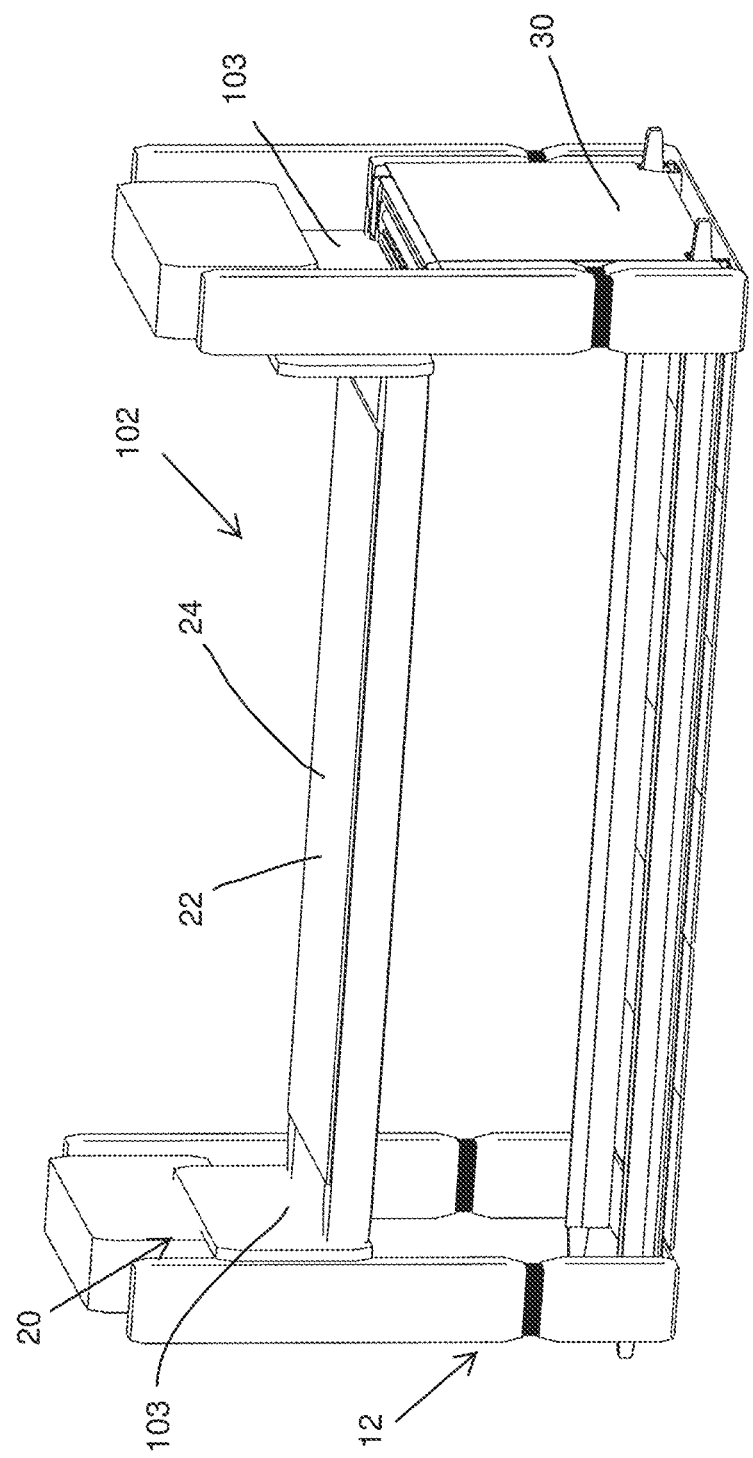
FIG. 35 is a perspective view of a support assembly of the apparatus of FIG. 31, showing the build platform in the tending position.
Figure 36:
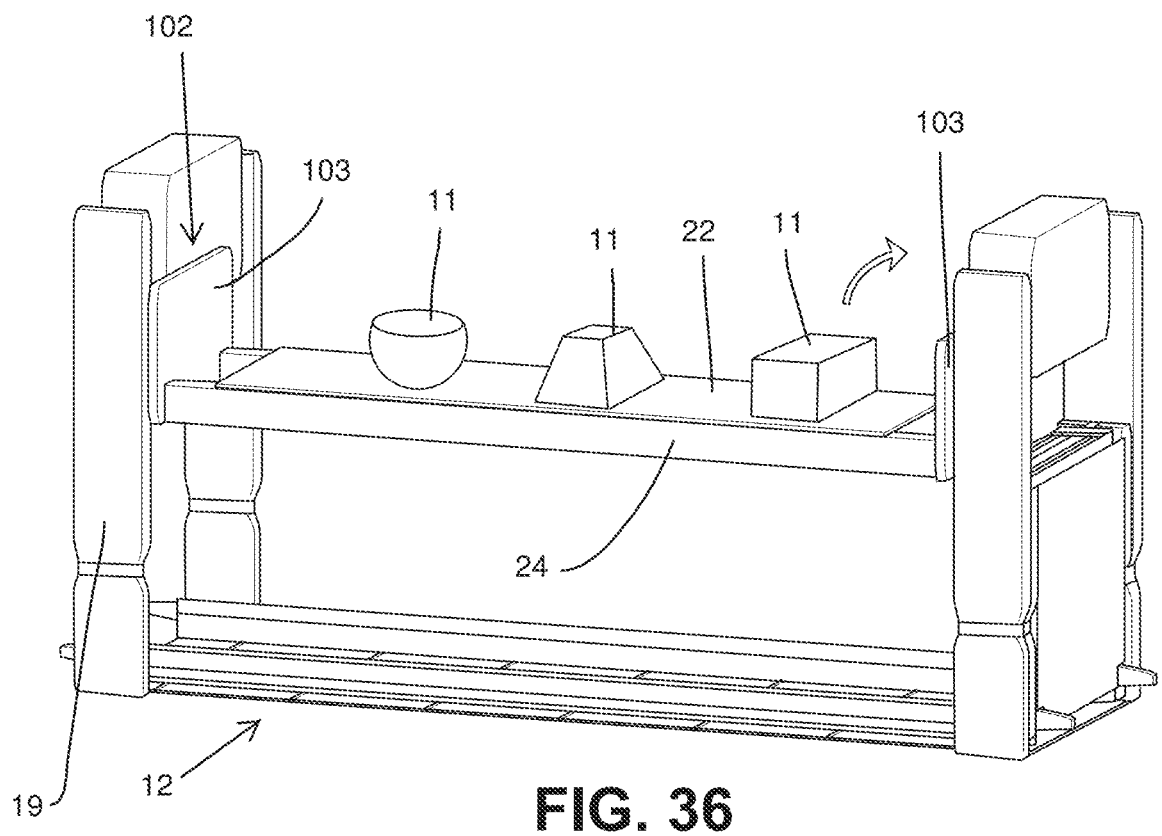
FIG. 36 is a perspective view of the apparatus of FIG. 31 illustrating performance of a tending operation when the build platform is in the tending position.

The support assembly 20 further includes a mechanism 102 for moving the build platform 22 between a build position and a tending position, where the build platform 22 faces toward the track 14 for production of an object 11 in the build position, and the build platform 22 faces away from the track 14 in the tending position, to permit a tending operation to be performed on the object 11. Examples of tending operations include modifying the object 11, such as by material removal, including removal of support structure (e.g., by cutting, machining, etc.), painting, cleaning, or removing the object 11 from the build platform 22, such as if production of the object 11 is completed, or inserting or attaching functional or non-functional components previously manufactured by the same or different process (also referred to as secondary objects), such as RFID chips, magnets, added weights or structural supports, printed circuit boards, liquid tanks, etc. Such a secondary object may be connected in a configuration such that it is not exposed to the waves 53 during continuing production of the object 11 when the build platform 22 is returned to the build position. For example, the secondary object may be inserted within an internal cavity of the partially-built object 11 and/or provided with a protective casing. In one embodiment, the secondary object(s) may be other objects 11 manufactured simultaneously on the same or other build platforms 22 as described herein. In the embodiment of FIGS. 31-46, the mechanism 102 moves the build platform 22 between the build position and the tending position by rotation. FIGS. 31-33 and 37 illustrate the build platform 22 in the build position, FIG. 34 illustrates the build platform 22 being moved from the build position to the tending position, and FIGS. 35 and 36 illustrate the build platform 22 in the tending position in this embodiment.

The mechanism 102 for moving the build platform 22 in the embodiment of FIGS. 31-46 includes a support platform 24 that defines and/or supports the build platform 22 as described herein, with one or more rotating bases 103 connected to the support platform 24 and configured for rotating to move the support platform 24. As shown in FIGS. 31-37, the mechanism 102 includes two rotating bases 103 at opposed ends of the support platform 24 that are configured for rotating in unison about an axis, and the support platform 24 is fixed with respect to the rotating bases 103. The rotating bases 103 are mounted on the base frame 19 and configured to rotate with respect to the base frame 19. The support platform 24 in this embodiment is offset from the axis and parallel to the axis such that the support platform 24 and the build platform 22 orbit the axis when the rotating bases 103 rotate. This orbital action results in the build platform 22 both facing in a different direction and changing in height when moving between the build position and the tending position. The build platform 22 in this embodiment is higher in the build position, in order to permit more build space in the vertical direction, and is lower in the tending position, in order to facilitate manual manipulation of any object(s) 11 on the build platform. In another embodiment, the support platform 24 may be rotationally aligned with the axis of the rotating base(s) 103, such that the support platform 24 rotates rather than orbits in moving between the build position and the tending position. In another embodiment, the support platform 24 may have a different arrangement, such as a cantilever arrangement where only a single rotating base 103 is provided at one end of the support platform 24, or an arrangement where the rotating base(s) 103 are not located at the ends of the support platform 24. In a further embodiment, a different type of movement mechanism 102 may be used.

Figure 62:
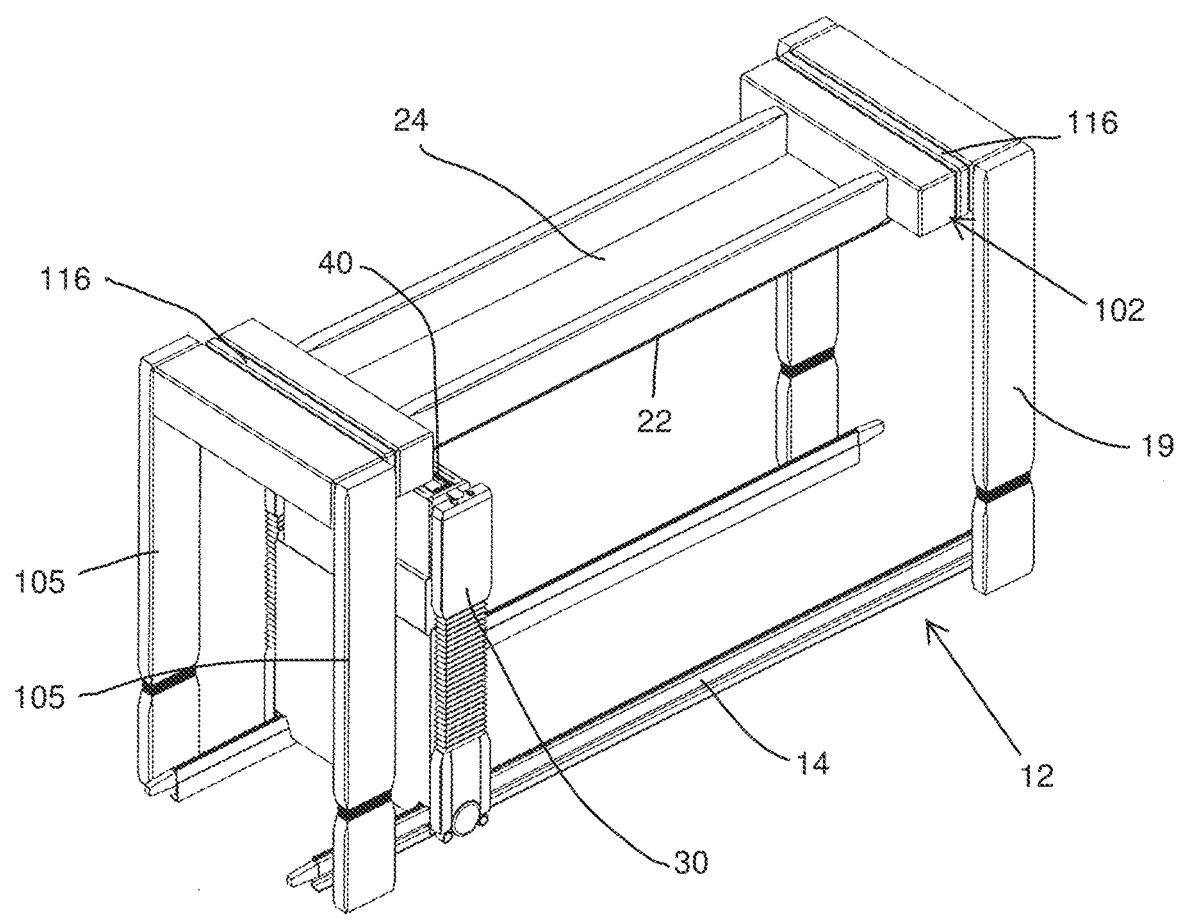
FIG. 62 is a perspective view illustrating another embodiment of an apparatus for producing a three-dimensional object in operation, according to aspects of the disclosure, shown with a build platform in a build position.
Figure 63:
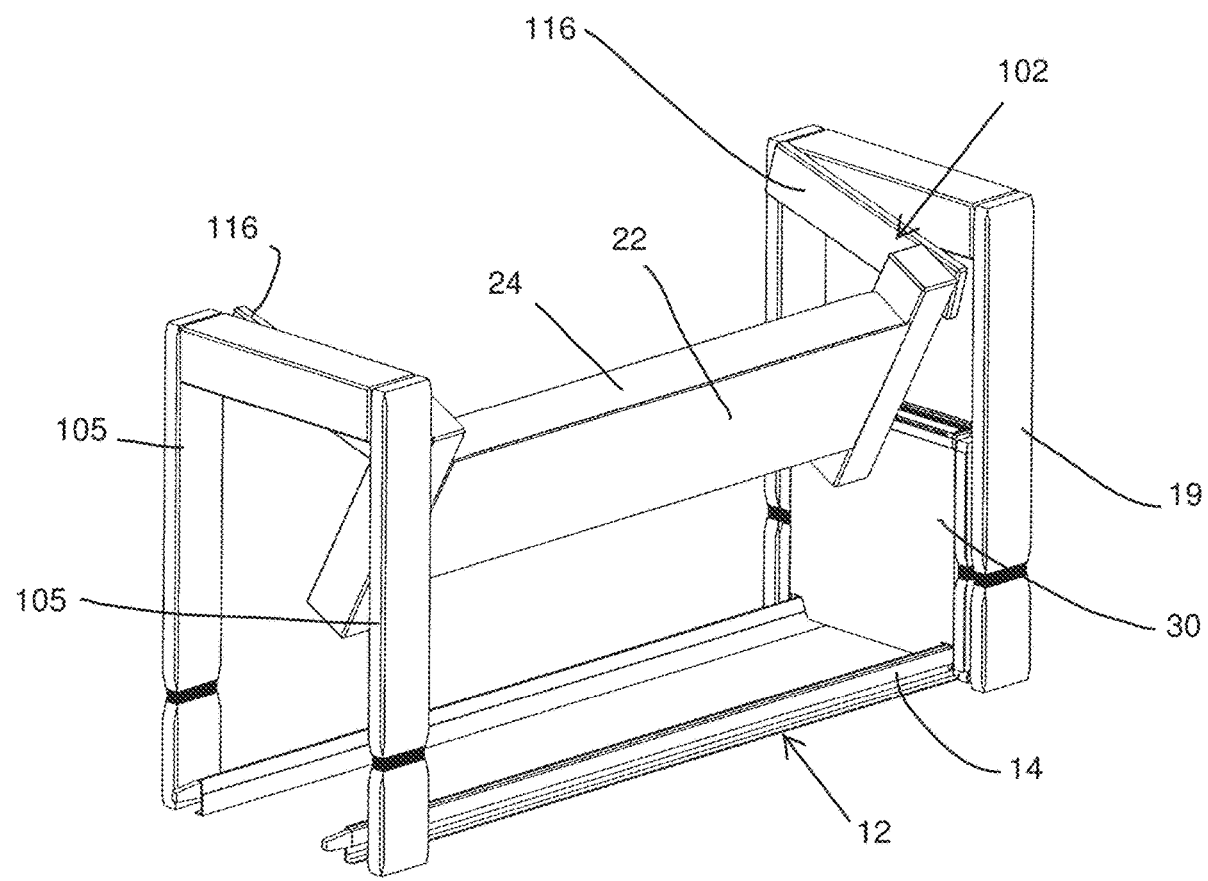
FIG. 63 is a perspective view illustrating the apparatus of FIG. 62 showing movement of the build platform from the build position to a tending position.
Figure 64:
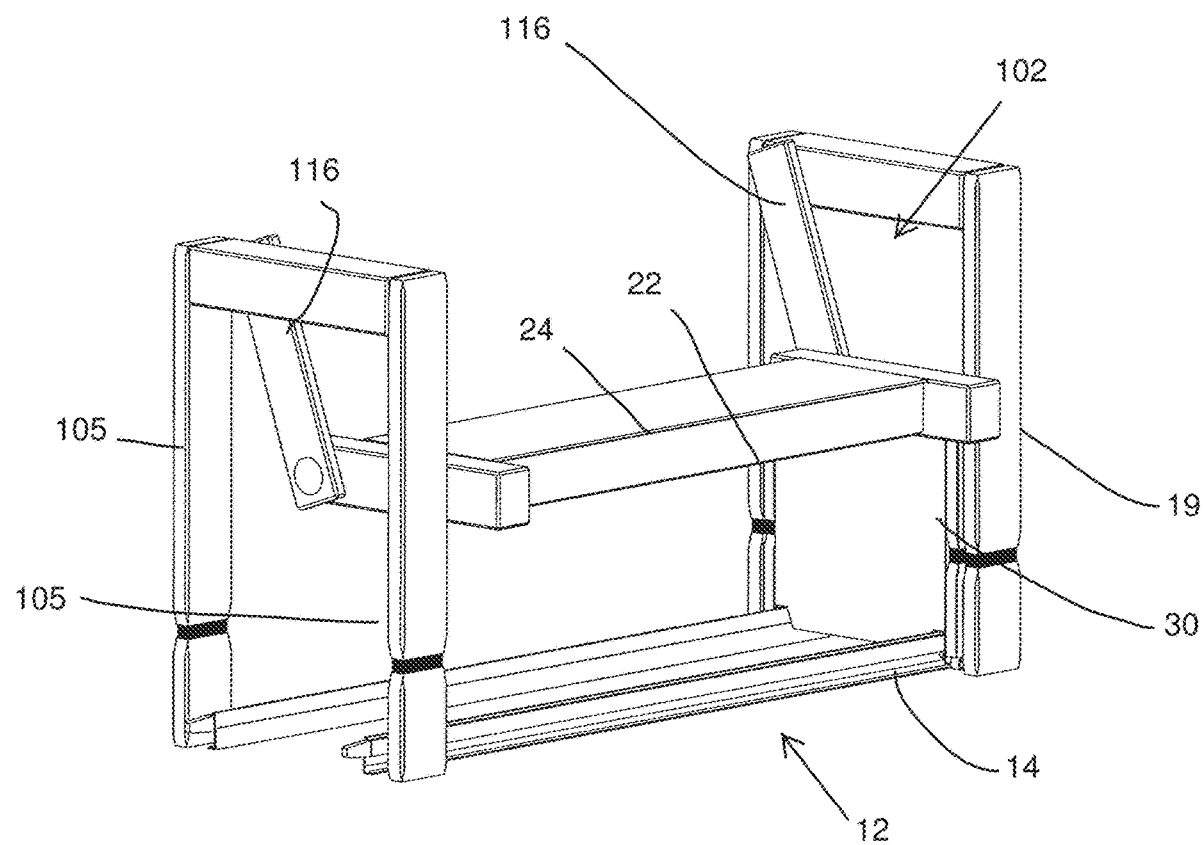
FIG. 64 is a perspective view illustrating the apparatus of FIG. 62 showing the build platform in the tending position.

FIGS. 62-64 illustrate another embodiment of a mechanism 102 for moving the build platform 22 between the build position and the tending position. FIG. 62 illustrates the build platform 22 in the build position, FIG. 63 illustrates the build platform 22 being moved from the build position to the tending position, and FIG. 64 illustrates the build platform 22 in the tending position in this embodiment. In the embodiment of FIGS. 62-64, the mechanism includes one or more pivoting bases (or pivoting arms) 116 connected to the support platform 24 and configured for pivoting to move the support platform 24 upward and downward. As shown in FIGS. 62-64, the mechanism 102 includes two pivoting bases 116 at opposed ends of the support platform 24 that are configured for pivoting in unison about a common axis, and the support platform 24 is configured for pivoting with respect to the pivoting bases 116. The pivoting bases 116 are pivotably mounted on the base frame 19 and configured to pivot with respect to the base frame 19. As shown in FIGS. 63 and 64, in moving from the build position to the tending position, the pivoting bases 116 pivot downward to lower the level of the build platform 22 for ease of access, and the support platform 24 pivots with respect to the pivoting bases 116 to cause the build platform 22 to face upward and/or away from the track 14. Similarly, in moving from the tending position to the build position, the pivoting bases 116 pivot upward to raise the level of the build platform 22, and the support platform 24 pivots with respect to the pivoting bases 116 to cause the build platform 22 to face downward and/or toward the track 14 for use in production. In another embodiment, the support platform 24 may rotate about a central axis on the pivoting bases 116, rather than pivoting, with respect to the pivoting bases 116. The configuration in FIGS. 62-64 permits greater ability to adjust the height of the build platform 22 in the tending position, and also provides more clearance room for an autonomous unit 90 to engage with the track 14 (such as without lowering the applicator 40 as described herein).

Figure 37:
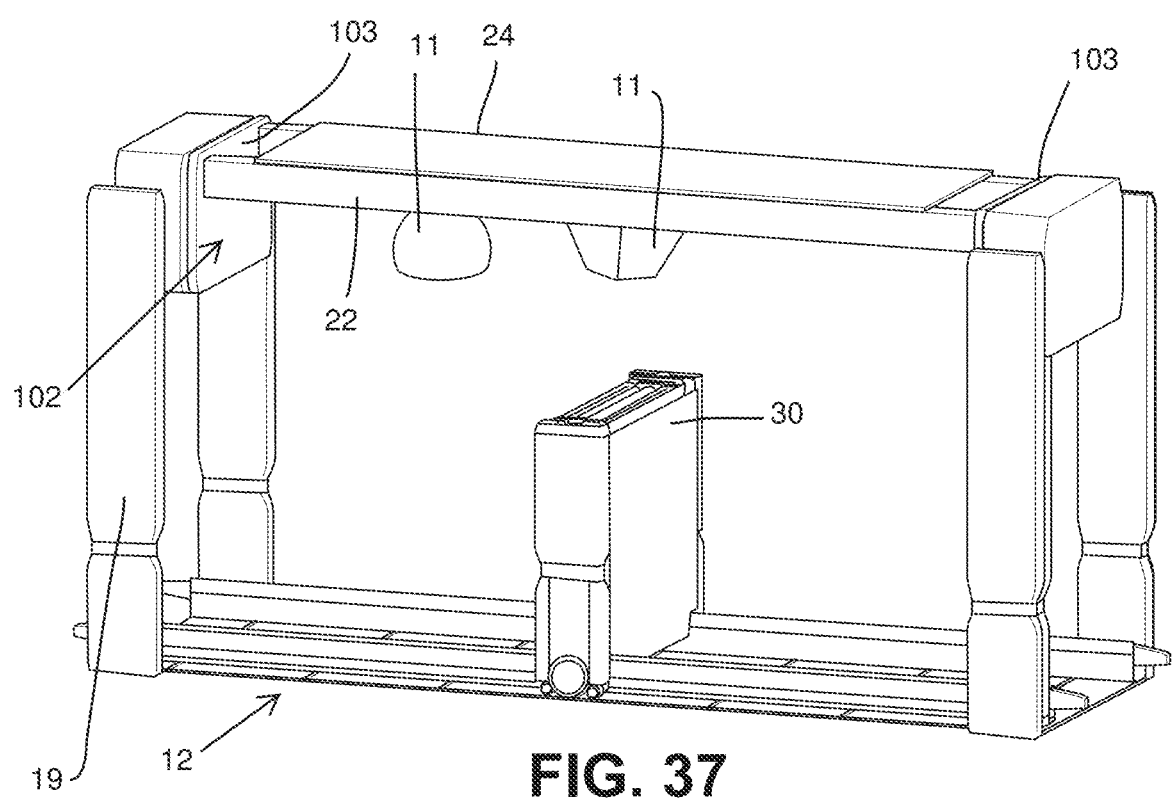
FIG. 37 is a perspective view of the apparatus of FIG. 31 illustrating further production of objects when the build platform is in the build position, after performance of the tending operation in FIG. 36.
Figure 38:
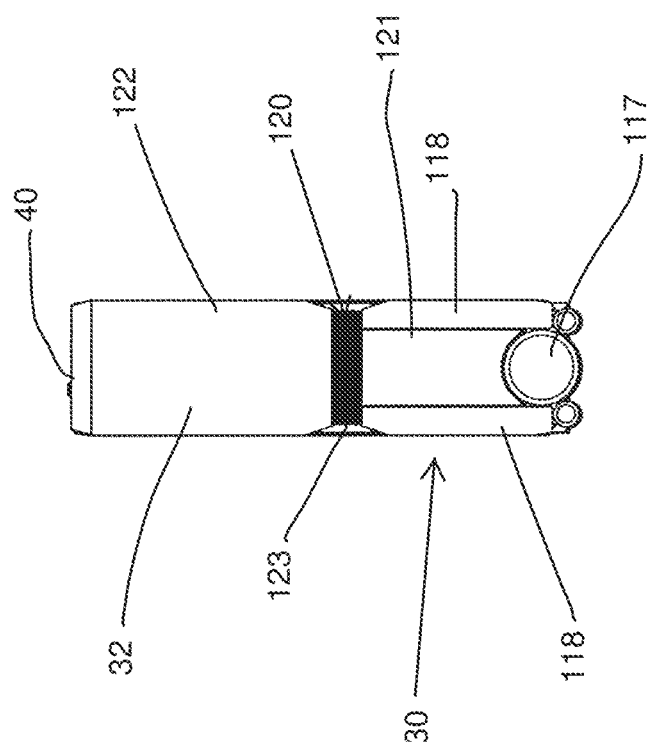
FIG. 38 is a side view of the deposition mechanism of the apparatus of FIG. 31.

FIGS. 34-37 and 62-64 illustrate the build platform 22 and the support platform 24 being rotated 180° between the build position and the tending position, such that the build platform 22 faces downward in the build position and upward in the tending position. In other embodiments, the build platform 22 and the support platform 24 may be oriented differently in the tending position, such as rotating 90° or 135° from the build position. For example, the mechanism 102 for moving the build platform 22 in one embodiment may be configured to provide multiple tending positions at different orientations, such as a first tending position that faces downward (i.e., 180° rotation from the build position 22 as shown in FIGS. 37 and 62), a second tending position that faces laterally outward (i.e., a 90° rotation from the build position 22 as shown in FIGS. 37 and 62), and/or a third tending position at a different angular orientation (e.g., 135° rotation from the build position 22 as shown in FIGS. 37 and 62). In a further embodiment, the mechanism 102 for moving the build platform 22 may be configured to provide the tending position at any desired orientation selectable by the user, and the mechanism 102 may be manually controlled. Any combination of tending positions may be provided by the structures described herein and other embodiments of mechanisms 102 for moving the build platform 22 between the build position and the tending position.

In one embodiment, as shown in FIGS. 36 and 37, the system 10 and apparatus 12 may be used to produce multiple objects 11 simultaneously, including multiple objects that are different from each other and have different build times, build requirements, and/or build heights. As described herein, the apparatus 12 and the deposition mechanism 30 according to various embodiments is capable of producing multiple objects 11 simultaneously, including multiple objects 11 on the same build platform 22 or multiple objects 11 on different build platforms 22 supported by the same support assembly 20. In the apparatus 12 of FIGS. 31-46, the multiple objects 11 can be built with the build platform 22 in the build position, as shown in FIG. 37. When a tending operation is necessary on one or more of the objects 11, the build platform 22 can be moved to the tending position, as shown in FIG. 36, and the tending operation may be performed. FIG. 36 illustrates a tending operation in the form of removal of one of the objects 11 for which building is complete, and it is understood that additional tending operations may be performed on any of the objects 11, including the objects 11 not removed at this stage. When the tending operation is complete, the build platform 22 can be returned to the build position, as shown in FIG. 37, which illustrates the apparatus 12 continuing to build the two remaining incomplete objects 11. This permits different objects to be simultaneously manufactured.

Figure 41A:
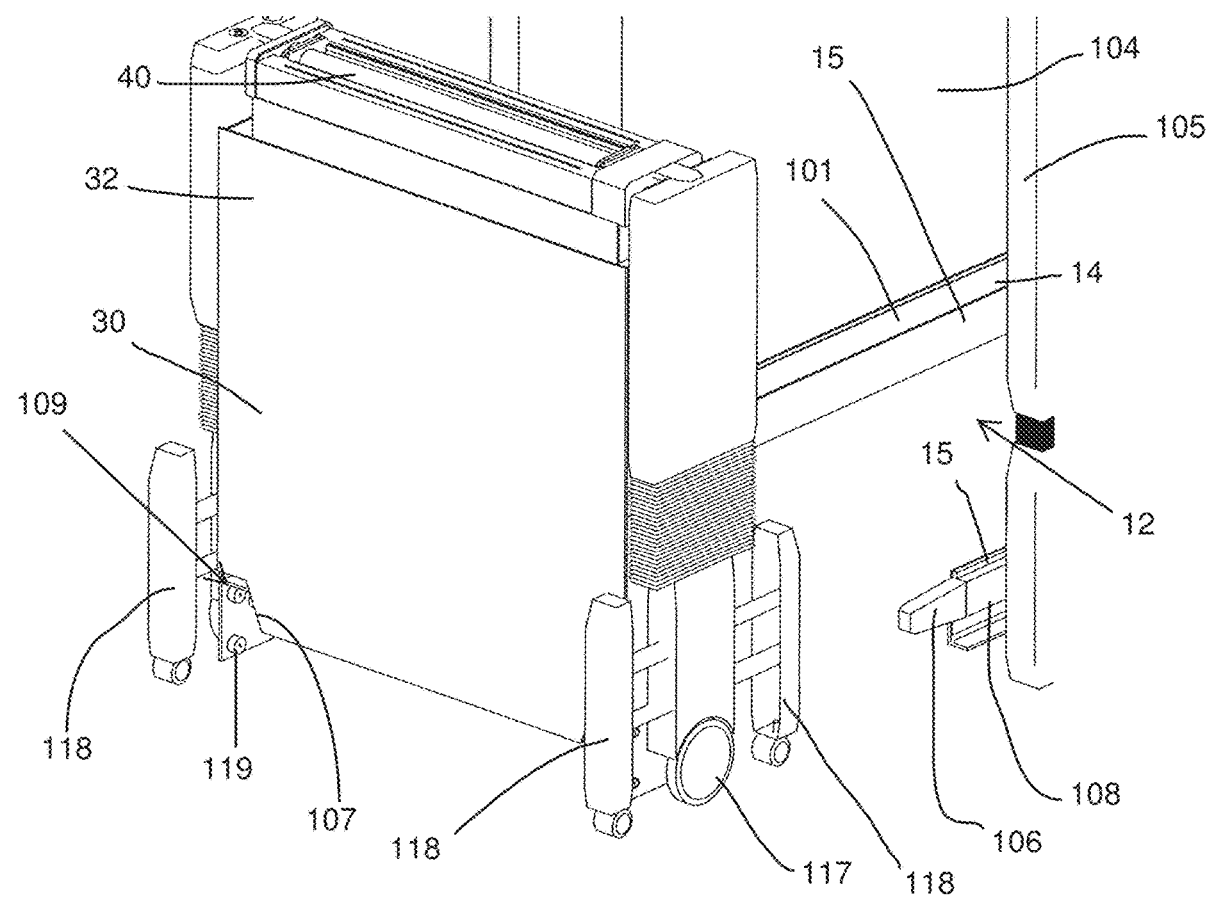
FIG. 41A is a partial perspective view of the deposition mechanism of FIG. 40 preparing to engage with a track of the support assembly.
Figure 41B:
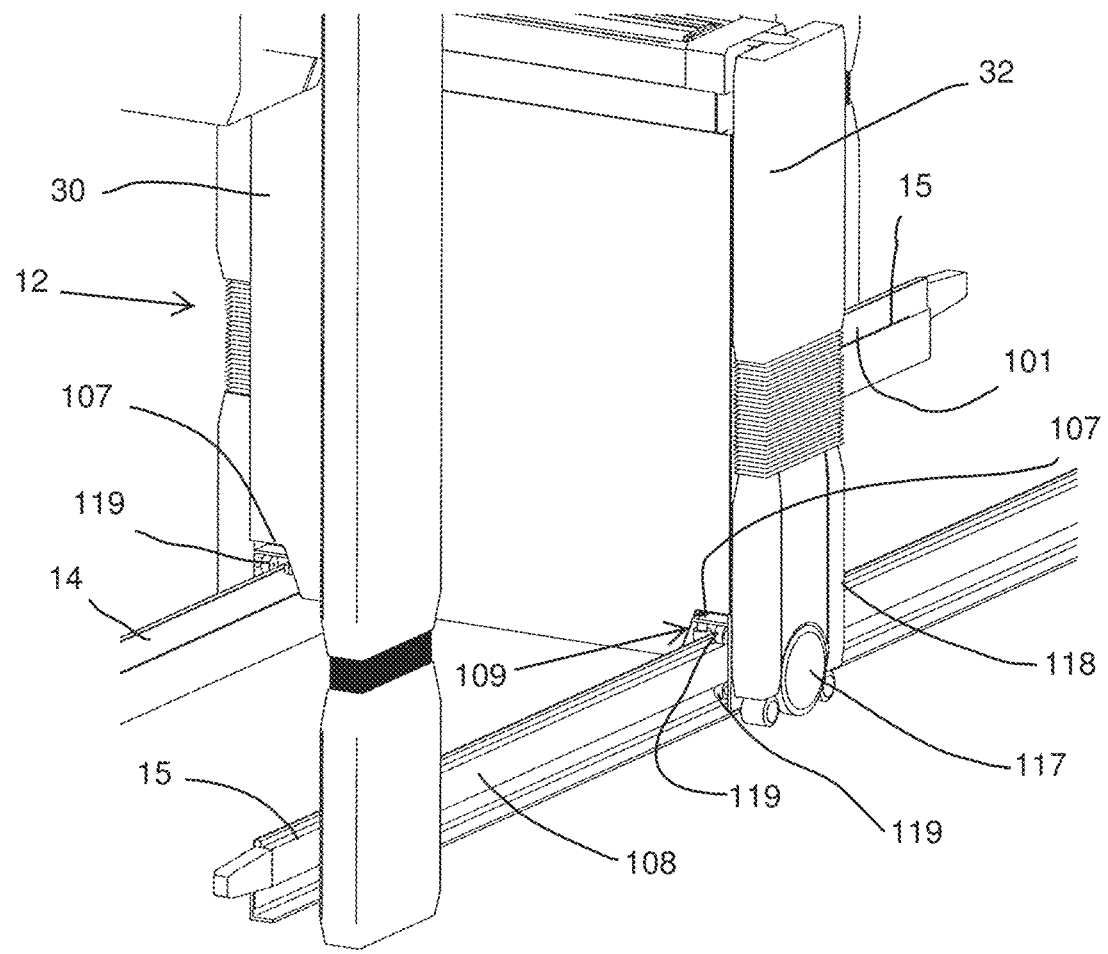
FIG. 41B is a partial perspective view of the deposition mechanism of FIG. 41 after engaging with the track of the support assembly.

The track 14 in the embodiment of FIGS. 31-46 is configured to be "open" to allow a deposition mechanism 30 (such as the autonomous unit 90) to engage and disengage with the track 14 as desired. The track 14 may be considered to have an open end at one or both ends, where the deposition mechanism 30 can be engaged and disengaged with the track 14. As shown in FIGS. 41A-42, the base frame 19 provides an opening 104 defined between two vertical columns 105 at one or both ends of the track 14 to permit the deposition mechanism 30 to engage with the track through the base frame 19. The opening 104 is also present between the rails 15 of the track 14. The rails 15 of the track 14 shown in FIGS. 31-46 extend outwardly beyond the opening 104 and/or beyond the adjacent portion of the base frame 19 and have ends 106 that are tapered on one or more surfaces to ease engagement of the carriage 32 with the track 14. The carriage 32 has a track engagement mechanism 109 that is configured to engage the track 14 to permit movement of the deposition mechanism 30 along the track 14. The track engagement mechanism 109 in the embodiment of FIGS. 31-46 includes slots 107 that are configured to receive the ends 106 during engagement and to further receive a portion of the respective rail 15 when the carriage 32 is engaged with the track 14. The rails 15 in the embodiment of FIGS. 31-46 each have a flange or other outwardly extending portion 108 that is received in the slot 107, and the track engagement mechanism 109 has wheels, rollers, sliders, gears, sprockets or other engagement structures positioned within the slots 107 and engaging the rails 15 on multiple surfaces, including the bottom and/or inner sides of the outwardly extending portion 108. As shown in FIGS. 41A-B, the track engagement mechanism 109 in the embodiment of FIGS. 31-46 includes rollers 119 that engage the top and inner surfaces of the rails 15 and the undersides of the outwardly extending portions 108 to stabilize the carriage 32 with respect to the track 14. The locomotion of the carriage 32 along the track 14 is provided by the track engagement mechanism 109, which includes a locomotion mechanism that engages the track 14, such as wheels, gears, sprockets, etc. In one embodiment, the deposition mechanism 30 includes a circular gear that engages a linear gear on the or each rail 15 to drive motion of the carriage 32 along the track 14. In other embodiments, the locomotion of the carriage 32 along the track 14 may be provided by powered wheels 117 or by linear induction motors, among other mechanisms. The track engagement mechanism 109 in one embodiment further may have one or more electrical contacts (not shown) for engaging and drawing power from the bus bar(s) 101. The deposition mechanism 30 may be powered by other mechanisms, including an internal power source, a temporary umbilical power connection, and/or a contactless inductive power supply. Other track engagement mechanisms 109 may be used in other embodiments, including different locomotion mechanisms, and it is understood that the track 14 and the track engagement mechanism 109 may be designed in a complementary manner.

The deposition mechanism 30 in FIGS. 31-46 is configured to be an autonomous unit 90 that may be moveable independently of the track 14 in some circumstances, as described herein with respect to FIG. 28. FIGS. 40-41B illustrate movement of the deposition mechanism 30 independently of the track 14 and engagement of the deposition mechanism 30 with the track 14. As illustrated in FIG. 42, multiple deposition mechanisms 30 can be used on the track 14 simultaneously. Such multiple deposition mechanisms 30 may be configured for making multiple passes in opposite directions or for making a single pass. For example, a deposition mechanism 30 may engage with one end of the track 14, make a single pass of the build area 13, and then exit the track 14 at the opposite end to either move along to a different task (e.g., another apparatus) or to re-engage the track 14 again at the first end. It is contemplated that a continuous train of deposition mechanisms 30 could sequentially pass the build area 13, with each deposition mechanism 30 making a single pass and returning to re-engage the track 14 in order to make another pass. In a further embodiment, the apparatus 12 may use a mix of deposition mechanisms including autonomous units 90 that can be disengaged from the track 14 and non-autonomous and/or permanent deposition mechanisms 30 that cannot be readily disconnected from the track 14.

As described above, the deposition mechanism 30 may be moveable separately and independently from the track 14 in the embodiment of FIGS. 31-46, where the deposition mechanism 30 is provided as an autonomous unit 90. In this embodiment, the deposition mechanism 30 uses a ground engagement mechanism for support and locomotion independently of the track 14. The ground engagement mechanism in the embodiment of FIGS. 31-46 uses the wheels 117 for locomotion independently from the track 14, e.g., on the surface on which the apparatus 12 sits. The ground engagement mechanism in FIGS. 31-46 also includes stabilizers 118 on the front and rear sides of the wheels 117 to stabilize the deposition mechanism 30 and resist tipping during movement by the wheels 117 apart from the track 14. In this embodiment, the stabilizers 118 are retractable when not needed, i.e., the stabilizers 118 are moveable between an extended position, shown in FIGS. 33 and 39, for use in movement apart from the track 14 and a retracted position, shown in FIGS. 31, 32, and 38, when the deposition mechanism 30 is engaged with the track 14. The stabilizers 118 may include additional wheels, casters, sliders, or other structures to enable ground engagement while in motion. In other embodiments, the deposition mechanism 30 may include different ground engagement mechanism(s), including tracks, moveable legs, or other such structures.

The deposition mechanism 30 in the embodiment of FIGS. 31-46 has a vertical adjustment mechanism 120 that is configured for adjusting the position of the applicator 40 and/or other components of the deposition mechanism 30 in the vertical direction, i.e., parallel to the build direction in the embodiment illustrated. This configuration differs from the configurations illustrated in FIGS. 8-11 and 15-18, where vertical adjustment is performed by adjusting the position of the build platform 22. The deposition mechanism 30 in FIGS. 31-46 has a bottom portion 121 that is engaged with the track 14 and/or the ground and a top portion 122 that is supported by the bottom portion 121 and is moveable in the vertical direction with respect to the bottom portion 121. The top portion 122 includes at least the applicator 40, the supply 34 of flowable material 36, and the outlets 54 in the embodiment of FIGS. 31-46, such that at least these components move in the vertical direction with the top portion 122. The vertical adjustment mechanism 120 moves the top portion 122 with respect to the bottom portion 121. In the embodiment of FIGS. 31-46, the vertical adjustment mechanism 120 includes two lifts 123 on opposite sides of the deposition mechanism 30. These lifts 123 may include telescoping structure and may be powered by a variety of different mechanisms, including hydraulic or pneumatic cylinders, jack screws, sprocket/chain drive, gears, etc. In other embodiments, the build platform 22 of FIGS. 31-46 may additionally or alternately be configured for vertical adjustment as described elsewhere herein. For example, the build platform 22 is not configured for vertical adjustment in the embodiment of FIGS. 31-46, but may be so configured in other embodiments, in addition to or instead of the vertical adjustment of the deposition mechanism 30. In one embodiment, both the build platform 22 and the deposition mechanism 30 may be configured for vertical adjustment, to further increase the potential vertical size of an object 11 to be built. In this configuration, the build platform 22 may be configured for vertical adjustment only when the vertical adjustment range of the deposition mechanism 30 is insufficient for the build requirements, or vice-versa.

The build platform 22 may be configured for movement to permit production of larger and/or more numerous objects than would be enabled by the size of the track 14 in some embodiments. For example, in one embodiment, shown in FIGS. 48A-B, the build platform 22 is provided on a support platform 24 that has multiple build platforms 22 and is moveable to selectively position different build platforms 22 in the build area 13 for production of different objects 11. As shown in FIG. 48A, the support platform 24 is rotatable to position a first build platform 22A within the build area 13 to produce a first object 11A, and can then rotate to place one of three additional build platforms 22B-D in the build area 13 to produce one of three other objects 11B-D. This configuration permits a single deposition mechanism 30 and/or a single track 14 with multiple deposition mechanisms 30 to produce objects 11 or portions of objects sequentially. This provides the advantage of allowing production of one object 11A and then immediately commencing production of a second object 11B, without waiting for the completed object 11A to be removed from the build platform 22A, which can be done at a later time. This also provides the advantage of allowing one or more deposition mechanisms 30 to produce a first portion of multiple objects 11 sequentially, then switching the deposition mechanism(s) 30 to produce a different portion of the objects 11 (e.g., that may be made from a different material), reducing the number of times that the deposition mechanism(s) 30 need to be modified or switched during the course of producing multiple objects.

As another example, the build platform 22 may be positioned on a support platform 24 that is moveable in one or more directions, as shown in FIG. 49A-D. In the embodiment of FIGS. 49A-B, the support platform 22 is moveable laterally (i.e., in the y-direction). In this embodiment, the deposition mechanism(s) 30 may make one or more passes through the build area 13 to produce a first object or portion of an object 11E, then the build platform 22 and/or the support platform 24 may be shifted laterally to permit production of a second object or portion of an object 11F. It is understood that FIGS. 49A-B are viewed along the x-direction, i.e., the direction of movement of the deposition mechanism 30. The lateral movement shown in FIGS. 49A-B can permit operation of the deposition mechanism(s) 30 to build multiple different objects 11 on the same or different build platforms 22, or to build portions of a single object 11 that is wider than the build area. In the embodiment of FIGS. 49C-D, the build platform 22 is moveable horizontally (i.e., in the x-direction). In this embodiment, the deposition mechanism(s) 30 may be stationary, and the build platform 22 and/or the support platform may be shifted horizontally to apply the material 36. In other words, relative movement between the deposition mechanism(s) 30 and the build platform 22 is accomplished via movement of the build platform 22 rather than movement of the deposition mechanism(s). This configuration may be practiced with a moveable deposition mechanism 30 as described herein that is held stationary for production, and may be connected to an "open" track 14 as described herein, or alternately, this configuration may be practiced with a permanently stationary deposition mechanism 30. It is understood that in the embodiments of FIGS. 49A-D, the vertical adjustment may be accomplished via adjustment of the height of the applicator 40, the height of the build platform 22, or a combination. In a further embodiment, the build platform movement of FIGS. 49A-B may be combined with the movement of FIGS. 49C-D, offering further increase in potential size of the build area 13.

Figure 50:
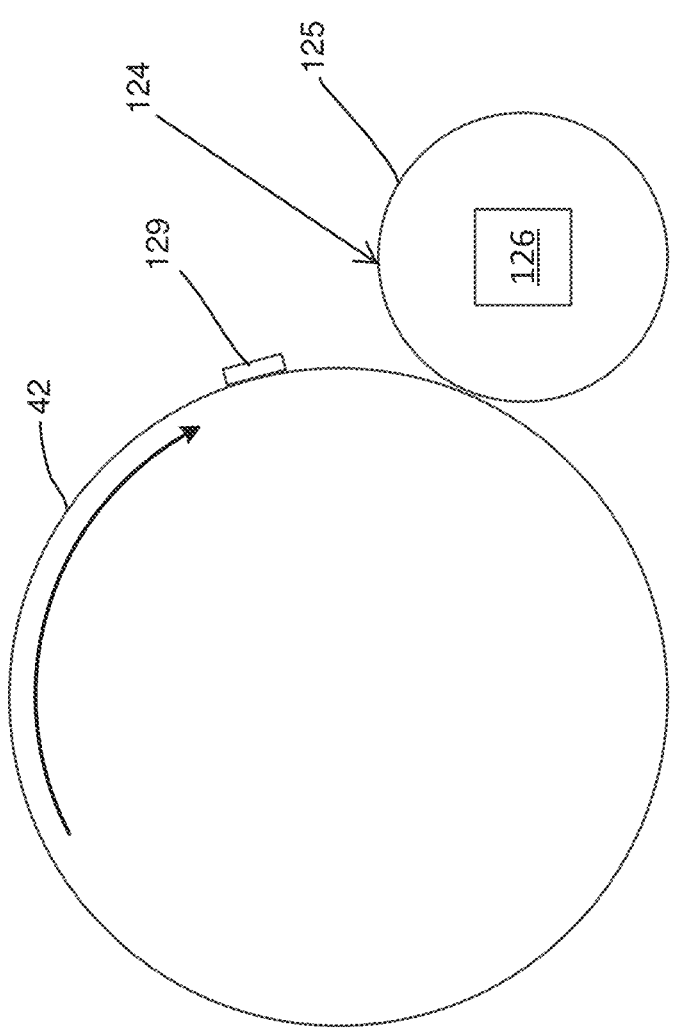
FIG. 50 is a side schematic view of one embodiment of a buildup sensor configured for use in connection with a deposition mechanism for producing a three-dimensional object in operation, according to aspects of the disclosure.

The apparatus 12 may include a material buildup sensor 124 in one embodiment, configured to sense buildup of material (e.g., cured resin) on the applicator 40. For example, as shown in FIG. 50, when a roller 42 is used, material 129 that is cured by the exposure device 50 may inadvertently adhere to the roller 42. This adhered material 129 can cause further buildup and negatively affect the quality of the object 11. In the embodiment of FIG. 50, a contact member 125 may be positioned so that any discontinuity on the surface of the roller 42 (e.g., material 129) will cause displacement of the contact member 125, thus allowing the discontinuity to be sensed by a displacement sensor 126 configured to sense displacement of the contact member 125. The contact member 125 in the embodiment of FIG. 50 is shown as a contact roller, but other contact members may be used in other embodiments, such as sliders, fibers, etc. Other non-contact based buildup sensors 124 may be used in other embodiments, such as optical sensors, conductivity/resistance sensors, or other sensors. A material buildup sensor 124 as described herein may be incorporated into the deposition mechanism 30 in one embodiment, or may be provided separately from the deposition mechanism 30 in another embodiment.

Figure 51:
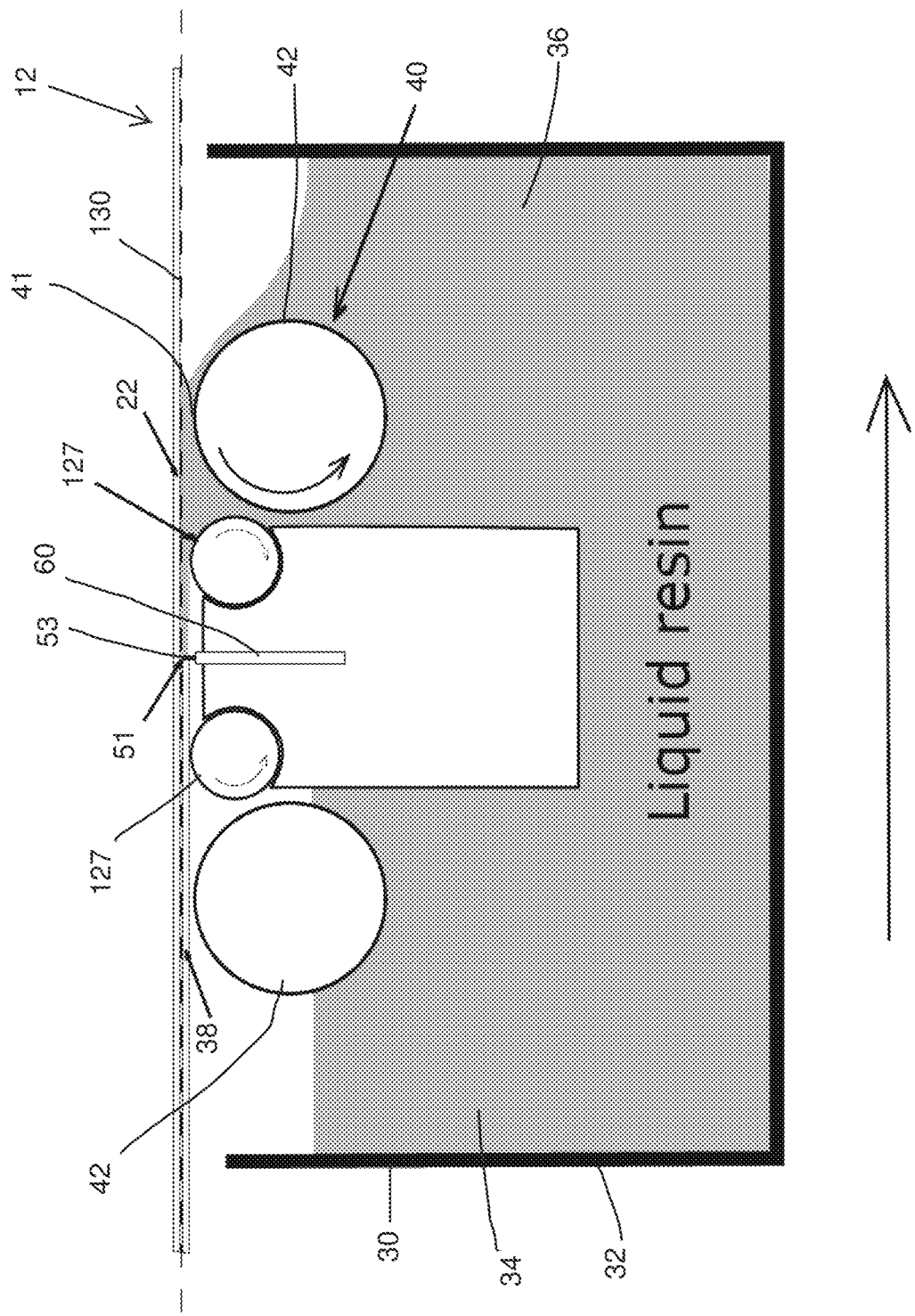
FIG. 51 is a side schematic view of another embodiment of an apparatus for producing a three-dimensional object in operation, according to aspects of the disclosure.
Figure 52:
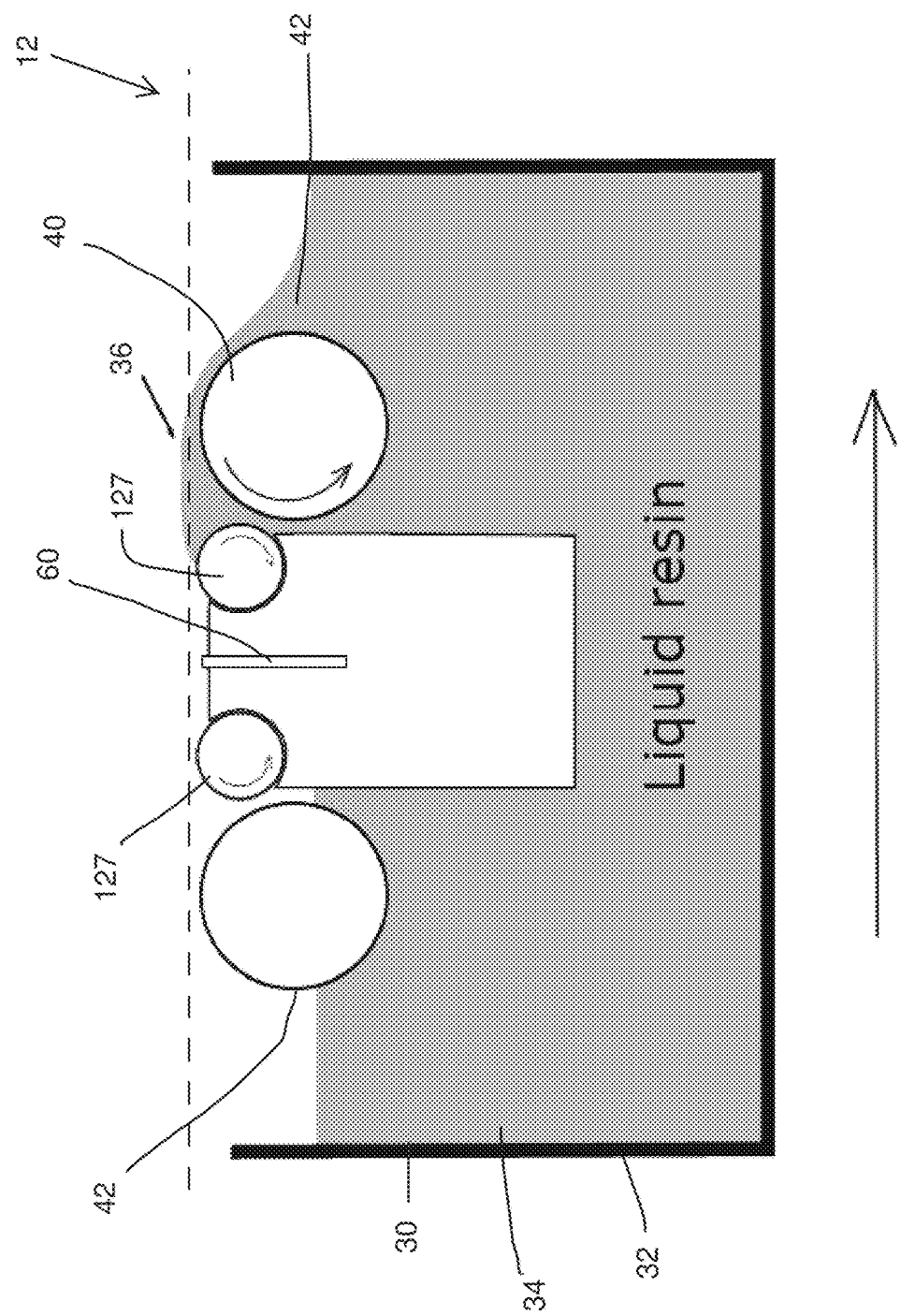
FIG. 52 is a side schematic view illustrating operation of the apparatus of FIG. 51 away from a build platform.
Figure 53:
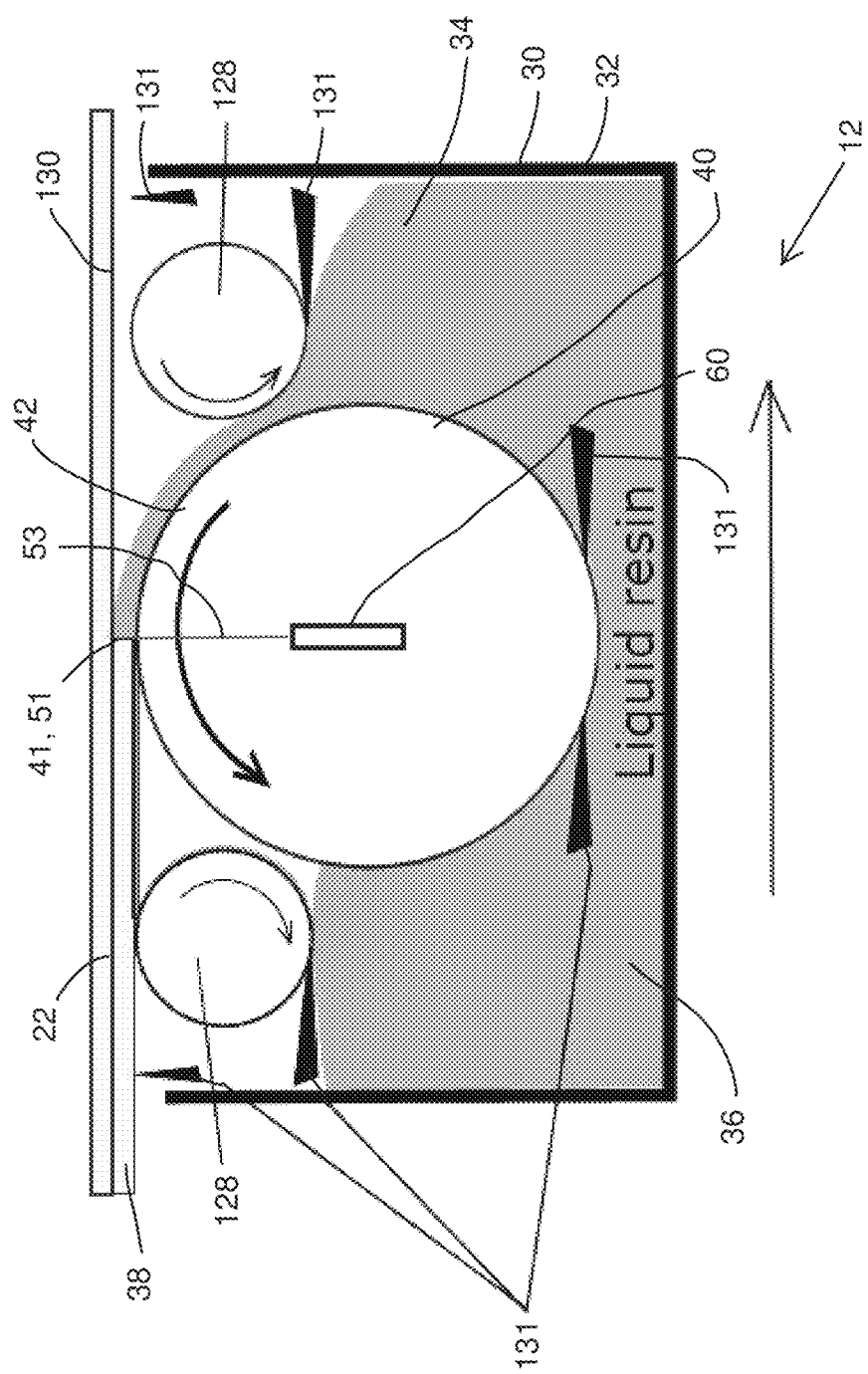
FIG. 53 is a side schematic view of another embodiment of an apparatus for producing a three-dimensional object in operation, according to aspects of the disclosure.

In another embodiment, the deposition mechanism 30 may be configured with a leveling device 127 to provide greater control over the thickness of the material 36 applied by the applicator 40. FIGS. 51-52 illustrate one embodiment of an apparatus with a leveling device 127, and FIG. 53 illustrates another such embodiment. In the embodiment of FIGS. 51-52, the deposition mechanism 30 includes an applicator 40 in the form of a roller 42 that rotates to carry the flowable material 36 from the supply 34 to the build area 13, an exposure device 50 for solidifying the flowable material 36, and a leveling device 127 in the form of a leveling roller 128 located between the roller 42 and the outlet 54 of the exposure device 50. In this embodiment, the roller 42 carries the flowable material 36 to the surface 130 to which the material 36 is to be applied (i.e., the build platform 22 or the surface of the object 11), and the leveling roller 128 rotates in the opposite direction from the roller 42 to move any excess material 36 back into the supply 34. The movement of the carriage 32 causes the exposure device 50 to solidify the material 36 after the material 36 has passed the leveling roller 128, and the spacing between the leveling roller 128 and the surface 130 approximately sets the thickness of the applied layer 38. As shown in FIG. 52, when there is no surface 130 for application of the material 36, the rotation of the leveling roller 128 pushes all of the material 36 back into the supply 34. It is understood that increased adherence between the material 36 and the surface 130 may assist in forming the object 11 using a deposition mechanism 30 as shown in FIGS. 51-52, as an air gap exists between the applied material 36 and the deposition mechanism 30 at the intersection point between the waves 53 and the material 36. In this embodiment, the application site 41 may be spaced from the exposure site 51, and it is understood that the outlet 54 may be aimed in the leading direction as described herein in order to move the exposure site 51 at or nearer to the application site 41. The deposition mechanism 30 further includes a second roller 42 and leveling roller 128 on the opposite side of the carriage 32 (i.e., the left side in FIGS. 51 and 52). The second roller 42 does not spin when trailing the application site 41 to avoid moving excess material 36 toward the surface 130. When the carriage 32 moves in the opposite direction (i.e., right to left in FIGS. 51-52), the second (leading) roller 42 rotates and the trailing roller 42 is still. The deposition mechanism 30 in FIGS. 51-52 can therefore apply the material 36 while traveling in two opposite directions.

FIG. 53 illustrates another embodiment of a deposition mechanism 30 that uses a leveling device 127 in the form of two leveling rollers 128. In this embodiment, the applicator 40 is in the form of a roller 42 that carries the material 36 toward the surface 130, and the leveling roller 128 on the leading side rotates the opposite direction as the roller 42 to remove excess material 36 from the roller 42. The spacing between the roller 42 and the leveling roller 128 approximately sets the thickness of the applied layer 38. The deposition mechanism 30 includes a second leveling roller 128 on the opposite side of the carriage 32 (i.e., the left side in FIG. 53) that performs the leveling function when the carriage 32 is moving in the opposite direction (i.e., right to left in FIG. 53). Additionally, the trailing leveling roller 128 provides the further function of removing unsolidified material (e.g., uncured resin) from the surface of the applied layer 38 after exposure. It is understood that the roller 42 will rotate in the opposite direction when the carriage is moving in the opposite direction. The deposition mechanism 30 in FIGS. 51-52 can therefore apply the material 36 while traveling in two opposite directions. The deposition mechanism 30 further includes a plurality of wipers or squeegees 131 configured for wiping excess material 36 from various surfaces, including the surface of the roller 42, the surfaces of the leveling rollers 128, and the surface of the applied layer 38. The deposition mechanism 30 may also include a vacuum squeegee (not shown) or other vacuum-based material removal device as described herein, trailing the final wiper 131. This vacuum device may further include a recovery tank for storing unused material 36 removed by the vacuum device, and it is understood that any of the vacuum-based material removal devices described herein (including vacuum squeegees 82) may include such a recovery tank.

The exposure device 50 and associated structures for transmission and direction of the electromagnetic waves 53 may be configured for adjustability to provide improved performance and/or versatility to the deposition mechanism 30. Such adjustability may include adjustability in the selection, arrangement, power output, aiming direction, and/or other aspects and properties of the exposure device 50 and associated structures (including the outlets 54). FIGS. 54-61B illustrate various embodiments providing such adjustability, and it is understood that aspects of the embodiments of FIGS. 54-61B may be used in combination with each other and with other embodiments described herein, including other adjustable configurations (and applications thereof) already described herein.

Figure 54:
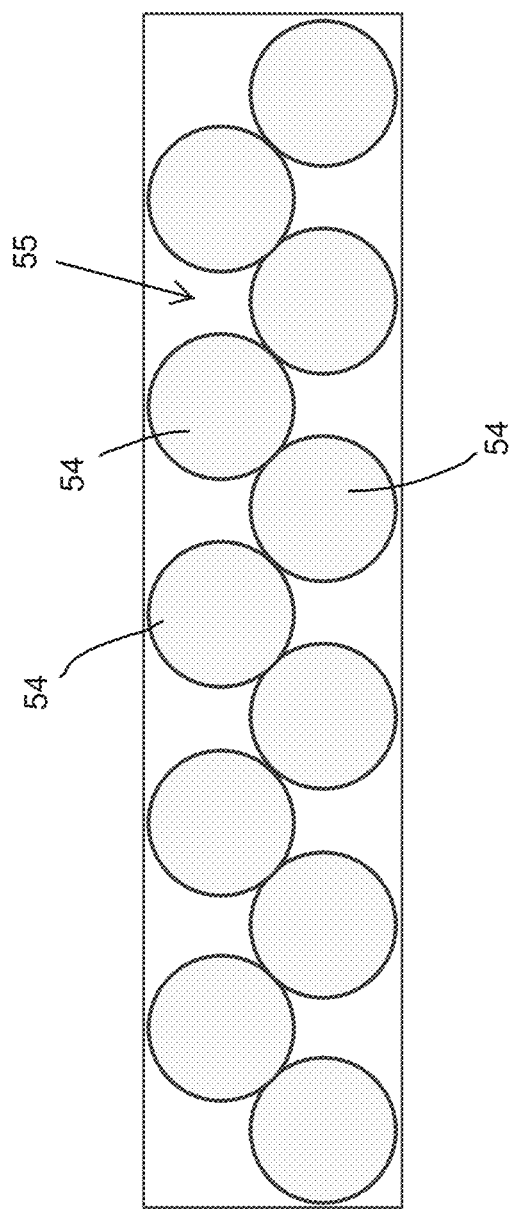
FIG. 54 is a plan schematic view of one embodiment of an exposure device for use in connection with an apparatus for producing a three-dimensional object in operation, according to aspects of the disclosure.

FIG. 54 illustrates one embodiment an arrangement of the array 55 of the outlets 54 of the exposure assembly 60 that can provide improved resolution in part production. The outlets 54 in the embodiment of FIG. 54 are staggered with respect to each other, such that each outlet 54 of the array 55 is overlapped laterally (i.e., in the y-direction) by at least one other outlet 54. As shown in FIG. 54, all outlets 54 other than the outlets 54 on opposite ends of the array 55 are overlapped on both edges by other outlets 54. This arrangement permits the lateral (y-direction) extremities of the exposure area to be more precisely selected, improving the resolution of the exposure assembly 60. The staggering of the outlets 54 also permits a greater number of outlets 54 to be placed into a given lateral width as compared to a single row, thus improving the total power output of the array 55.

Figure 55:
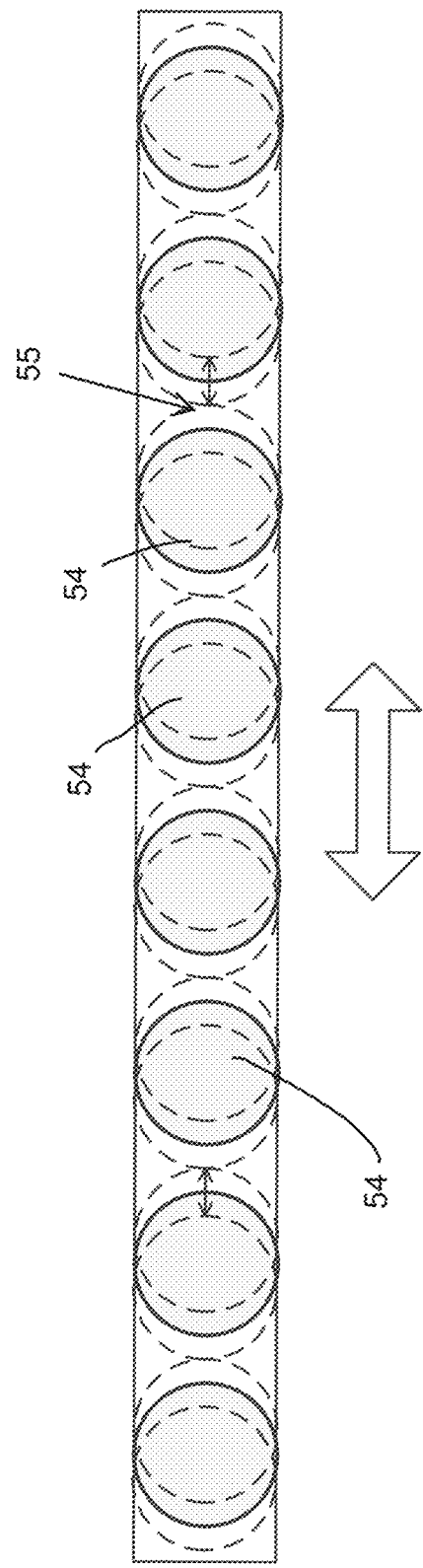
FIG. 55 is a plan schematic view of another embodiment of an exposure device for use in connection with an apparatus for producing a three-dimensional object in operation, according to aspects of the disclosure.

FIG. 55 illustrates an embodiment of an array 55 of the outlets 54 of the exposure assembly 60 that are configured for positional adjustment in the y-direction. In one embodiment, this positional adjustment may be accomplished by mounting the array 55 on a structure that is configured for translational/sliding movement in one embodiment, which sliding movement may be actuated by a piston, jack screw, or other structure configured for one-dimensional movement. In another embodiment, this positional adjustment may be accomplished by mounting the array 55 on a structure that is configured for angular/tilting movement, which may be actuated by a piston, jack screw, or other structure configured to raise and lower one or both lateral ends of the array 55. In a further embodiment, the outlets 54 may be adjustable individually or in discrete groups or clusters. The outlets 54 may further be configured for rapid reciprocation in the y-direction, permitting a single outlet 54 to direct waves 53 at an area that is enlarged in the y-direction. This y-direction adjustment and/or reciprocation permits the lateral (y-direction) extremities of the exposure area to be more precisely selected, improving the resolution of the exposure assembly 60. It is understood that the array 55 may include a larger number of rows and/or different offset arrangements in other embodiments.

Figure 56:
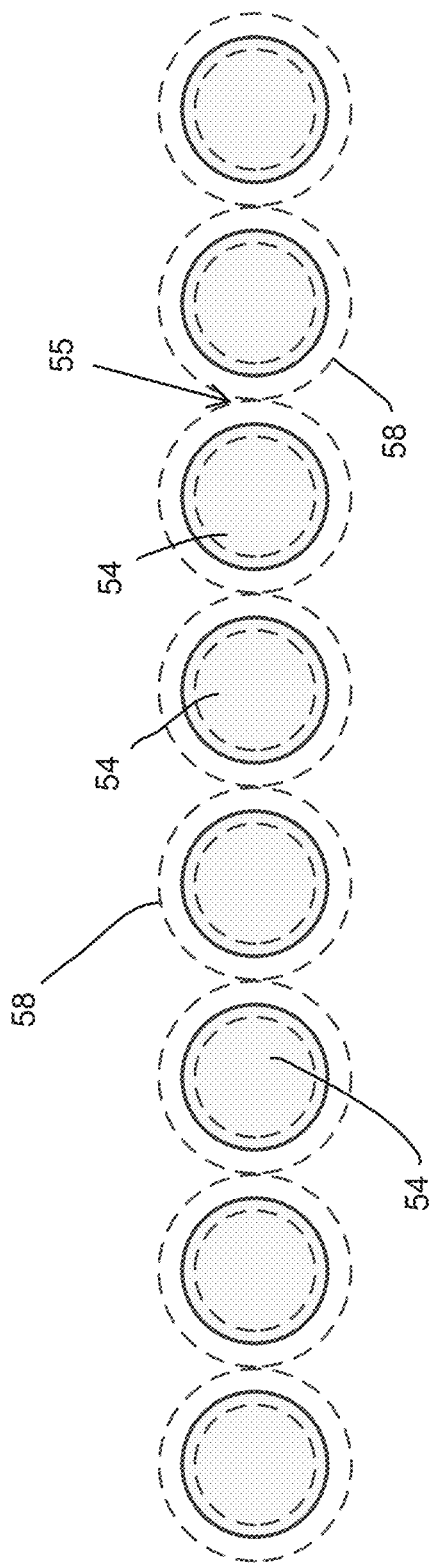
FIG. 56 is a plan schematic view of another embodiment of an exposure device for use in connection with an apparatus for producing a three-dimensional object in operation, according to aspects of the disclosure.

FIG. 56 illustrates an embodiment of an array 55 of the outlets 54 of the exposure assembly 60 that are configured for adjustment in output power. This adjustment in output power may be accomplished by varying the output power of the exposure device 50. In one embodiment, the adjustment in output power may be configured to adjust the size of the exposure area 58 of each outlet 54, thereby permitting the lateral (y-direction) extremities of the exposure area to be more precisely selected, improving the resolution of the exposure assembly 60. As seen in FIG. 56, the size of the exposure area 58 may be increased or decreased (indicated by broken lines) by increasing or decreasing the output power, respectively. In another embodiment, the adjustment in output power may be customized to the properties of the flowable material 36, as some materials 36 may require larger or smaller amounts of power for solidification. It is understood that other factors, such as travel speed of the deposition mechanism 30, may influence the desired output power.

Figure 57:
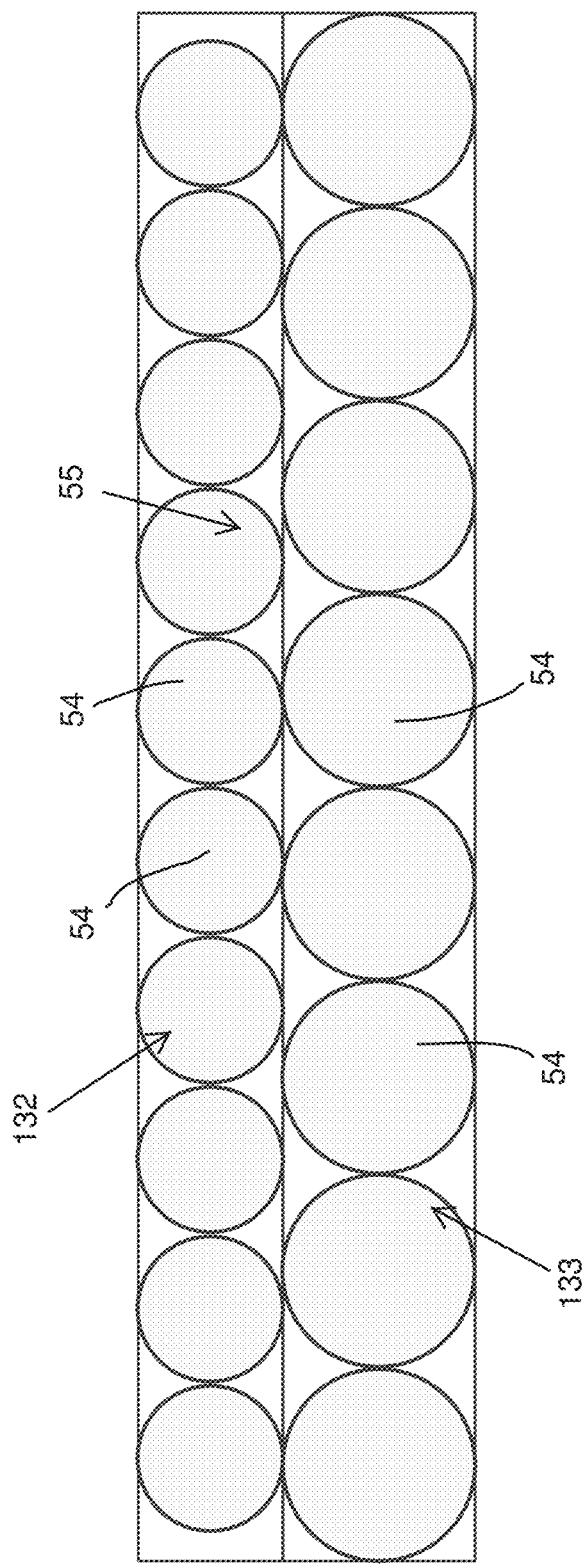
FIG. 57 is a plan schematic view of another embodiment of an exposure device for use in connection with an apparatus for producing a three-dimensional object in operation, according to aspects of the disclosure.

FIG. 57 illustrates an embodiment of an array 55 of the outlets 54 of the exposure assembly 60 that are configured such that a first subset 132 of the array 55 is configured for emitting waves 53 having a first property and a second subset 133 of the array is configured for emitting waves 53 having a second property. In one embodiment, the first and second subsets 132, 133 may be configured for emitting waves having different power output levels, permitting significantly greater versatility in production. For example, the first subset 132 may include smaller outlets 54 (e.g., smaller diameter optical fibers 61) with relatively smaller power output levels that are more tightly packed together, to permit greater y-direction resolution for critical dimensions, and the second subset 132 may include larger outlets 54 (e.g., larger diameter optical fibers 61) with relatively larger power output levels to permit more rapid solidification for filling the body of an object. The different power outputs may be achieved by connecting the outlets 54 of the different subsets 132, 133 to different exposure devices 50, connecting the outlets 54 of the different subsets 132, 133 to a single exposure device 50 that is capable of power variation, or by the entrance ends 62 of the second subset 133 receiving waves 53 emitted by a larger number of pixels (if a DLP projector is used) due to their larger size. A combination of outlets 54 from different subsets 132, 133 (including laterally overlapping outlets 54) may be activated to permit further process variability, such as further increased exposure power and/or a combination of high power for the middle portions of the object 11 and finer resolution at the edges of the object 11. In an alternate embodiment, some of these benefits may be achieved using subsets 132, 133 of smaller and larger diameter optical fibers 61 without having any difference in power output between the two subsets 132, 133. In another embodiment, the outlets 54 of the first and second subsets 132, 133 may be connected to different exposure devices that emit different wavelengths of waves 53 that may cure different types of materials 36 or to cure one material 36 at different rates. It is understood that a larger number of subsets 132, 133 with further different properties may be used in other embodiments, and that the waves 53 emitted by each subset may have multiple properties differing from each other.

FIGS. 61A and 61B illustrates an embodiment of a deposition mechanism 30 that uses multiple outlets 54 or arrays 55A-C of outlets 54 that can be switched selectively. In one embodiment, multiple arrays 55A-C of outlets 54 may be mounted on a mounting structure 135 that is rotatable about an axis (e.g., mounted on a gimbal structure), such that the arrays 55A-C can be selectively aimed toward the exposure site 51. Each array 55A-C may be configured differently. For example, the arrays 55A-C may be configured to emit waves 53 having one or more different properties, e.g., wavelengths, power, or other properties as described herein, or the arrays 55A-C may have outlets 54 that are sized or arranged differently to produce different resolution ability. This configuration increases the versatility of the process, as a single deposition mechanism 30 can operate with different materials 36 that require waves 53 having different properties for solidification and different projects that require different resolution capabilities, similar to the configuration of FIG. 57. It is understood that the subsets 132, 133 in FIG. 57 may be mounted to be moveable to selectively aim each subset 132, 133 toward the exposure site 51 in one embodiment, such as by translational movement and/or by rotational movement as shown in FIGS. 61A-B. In other embodiments, the deposition mechanism 30 may include a different number of arrays 55A-C, and the mounting structure 135 may be moveable in a different manner to select among the arrays 55A-C.

Figure 58:
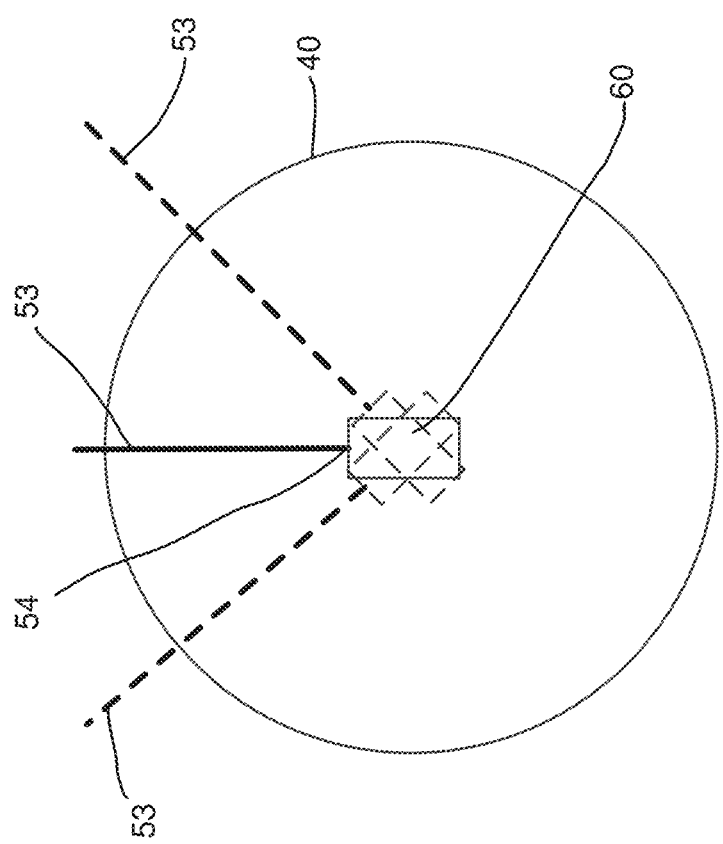
FIG. 58 is a side schematic view of another embodiment of an exposure device and an applicator for use in connection with an apparatus for producing a three-dimensional object in operation, according to aspects of the disclosure.

FIG. 58 illustrates one embodiment of a structure for directing the waves 53 so that the exposure site 51 is located approximately at the application site 41 in one embodiment, or so that the exposure site 51 is offset from the application site 41 (ahead or behind the application site 41 in the direction of travel) in another embodiment, as described herein and illustrated with respect to FIGS. 1, 3, and 4. In this embodiment, the aim of the outlets 54 is adjustable forwardly and rearwardly in the x-direction. As illustrated in FIG. 58, the outlets 54 of the exposure assembly 60 may be configured to be tiltable in one embodiment, such as by mounting the outlets 54 using a structure (e.g., braces 65) that is rotatable or pivotable over a range of movement to advance or retard the exposure site 51. For example, the deposition mechanism 30 may include a mounting structure for the outlets 54 that is mounted on a gimbal to permit single-axis rotation. It is understood that the degree of tilting shown in FIG. 58 may be exaggerated compared to the actual degree of tilting necessary to achieve this purpose in many embodiments. In another embodiment, the exposure device 50 may include multiple arrays of outlets 54 that are directed at different angles, where selective activation of the outlets 54 allows the exposure site 51 to be advanced or retarded. In a further embodiment, the outlets 54 may be aimed differently by translational movement in the x-direction. It is understood that the degree of offset of the exposure site 51 may depend on the properties of the flowable material 36 and the speed of the deposition mechanism 30, among other factors. Offsetting the exposure site 51 may improve bonding of the flowable material 36 to the surface 130 and/or separation of the flowable material 36 from the roller 42. On rollers 42 having greater lengths, contraction of the material 36 as it solidifies can pull on the surface of the roller 42 if the material 36 is not properly separated from the roller 42, causing dimensional distortion (e.g., bowing outward) of the surface of the roller 42. Offsetting the exposure site 51 can therefore be particularly advantageous for such configurations.

Figure 59:
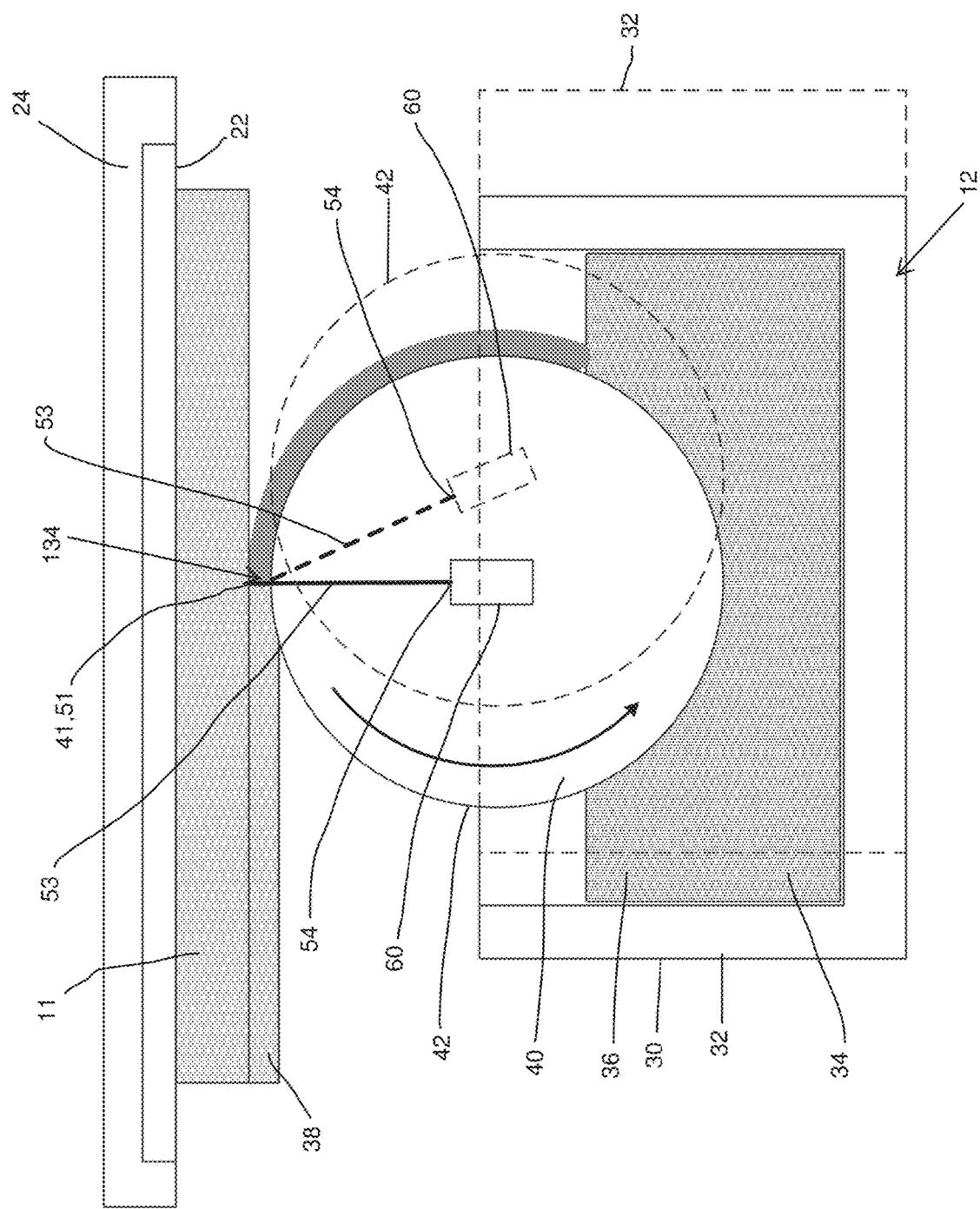
FIG. 59 is a side schematic view illustrating one embodiment of operation of the exposure device and applicator of FIG. 58 in connection with an apparatus for producing a three-dimensional object in operation, according to aspects of the disclosure.
Figure 60:
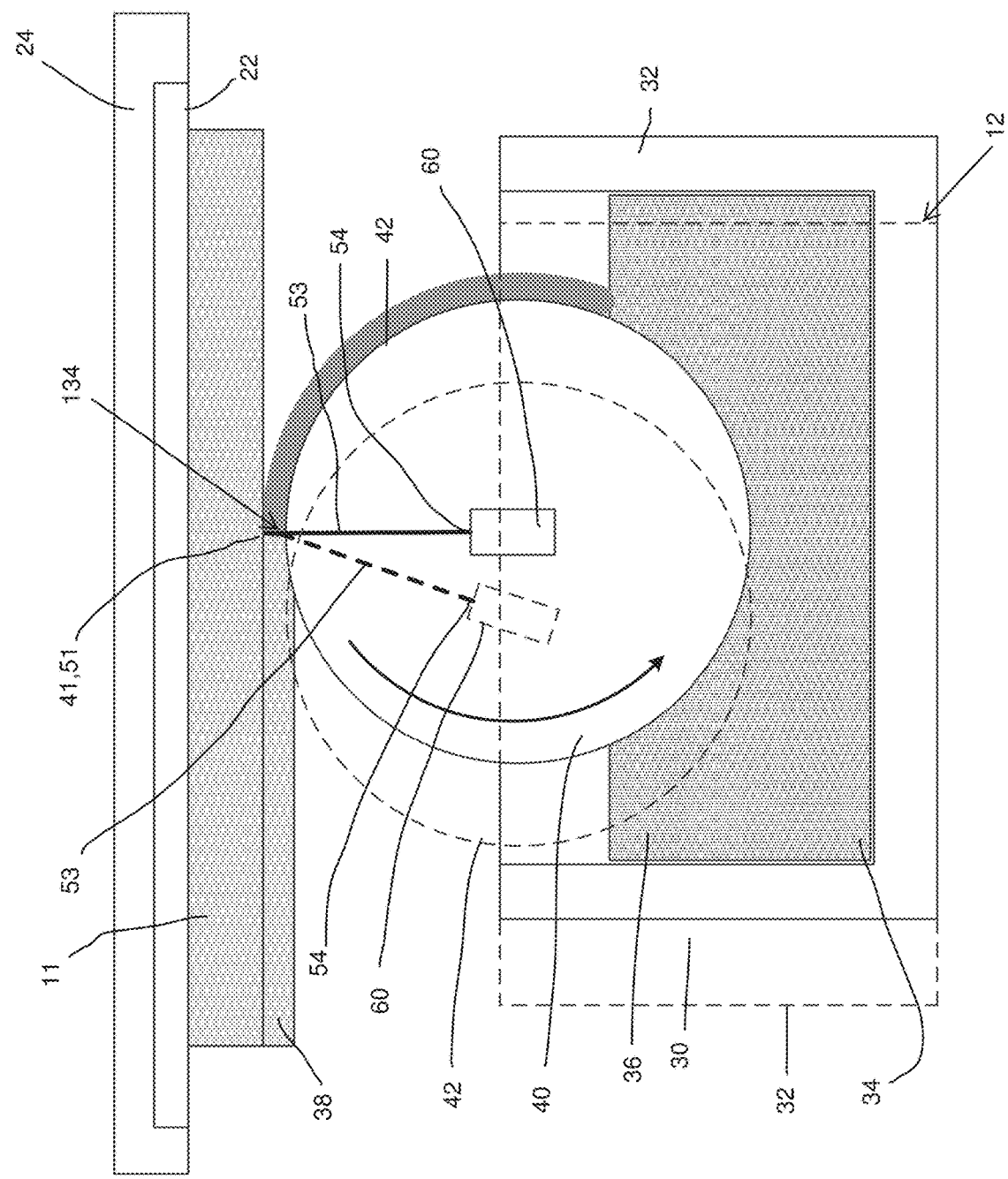
FIG. 60 is a side schematic view illustrating another embodiment of operation of the exposure device and applicator of FIG. 58 in connection with an apparatus for producing a three-dimensional object in operation, according to aspects of the disclosure.

FIGS. 59 and 60 illustrate an embodiment of a deposition mechanism 30 with an exposure assembly 60 capable of directing the waves 53 offset from the application site 41. In the embodiment of FIGS. 59 and 60, the aim of the outlets 54 is adjusted along the direction of travel of the deposition mechanism as the applicator 40 passes the application site 41 to focus the waves 53 on a defined point 134 within the build area 22 as the applicator 40 passes the defined point 134, to increase the exposure time of the defined point 134. As illustrated in FIG. 59, the exposure assembly 60 is configured for continuously adjusting the aim of the outlets 54 rearwardly in the travel direction so that the aim of the outlets 54 tracks the defined point 134 and continue to focus on the defined point 134 after the applicator 40 (i.e., the apex of the roller 42 in this embodiment) passes the defined point 134. As illustrated in FIG. 60, the exposure assembly 60 is configured for continuously adjusting and re-adjusting the aim of the outlets 54 forwardly in the travel direction so that the aim of the outlets 54 tracks the defined point 134 in advance of the applicator 40 and continue to focus on the defined point until the applicator 40 (i.e., the apex of the roller 42 in this embodiment) arrives at the defined point 134. This creates moments of stationary exposure at the defined point 134, and it is understood that the start/stop aim angles may be based on factors such as build speed and the properties of the material 36. It is understood that the embodiments in FIGS. 59 and 60 may be combined so that the aim of the outlets 54 tracks the defined point 134 both in advance of and behind the arrival of the applicator 40 at the defined point 134.

In a further embodiment, an apparatus 12 as described herein may be enclosed within a sealed chamber that may be temperature controlled, pressure-controlled, humidity-controlled, and/or filled with a specific gas (including mixtures of gases). Temperature, pressure, and humidity control may be able to influence build speed and thereby improve efficiency. Additionally, the apparatus 12 has the ability to build hollow, sealed objects 11, and thus, selection of the environmental gas may permit production of a hollow, sealed object 11 filled with a specified gas. For example, such an object 11 filled with an inert gas may be useful, e.g., for aerospace applications.

FIGS. 67-70 illustrate another embodiment of a supply assembly 79 that includes a supply 34 for flowable material 36 in the form of a vat, which is usable in connection with any embodiments described herein. The configuration of FIGS. 67-70 utilizes seals 95 and a drainage system 140 to minimize waste of the material 36 and resist leakage of the material 36 into undesirable locations. As shown in FIGS. 67-70, the supply assembly 79 has inner support walls 97 and outer support walls 98, with the inner support walls 97 being parallel to and located inward of the outer support walls 98. The inner support walls 97 in this configuration define the boundaries of the supply vat 34 of the flowable material 36 for use in production of articles. The inner and outer support walls 97, 98 all have circular openings 99, and the roller 42 extends through the openings 99 in the inner and outer support walls 97, 98 to support the roller 42. It is understood that any components contained inside the roller 42 may also extend through the support walls 97, 98. The inner support walls 97 have seals 95 around the roller 42 on the inner and outer ends of the opening 99, which are in the form of O-ring seals 95 in FIGS. 67-70. The inner support walls 97 may therefore be considered to be sealing walls in the embodiment of FIGS. 67-70. The seals 95 are engaged with the roller 42 and rotate with the roller 42 in one embodiment, and the roller 42 may have grooves to form seats for the seals 95 to resist movement of the seals 95. In other embodiments, the seals 95 may be in the form of a sleeve disposed around the roller 42 or a ridge extending outward from the outer surface of the roller 42, among other configurations. Extremely tight tolerances may be used to minimize leakage in another embodiment. The outer support walls 98 have bearings 96 around the roller 42 on the inner and outer ends of the opening 99, such that the outer support walls 98 and the bearings 96 support the roller 42 for rotation. The seals 95 are configured to create minimal friction with the inner support walls 97 as the seals 95 rotate adjacent the inner and outer surfaces of the inner support walls 97 to avoid solidification of the flowable material 36 due to friction, which may occur in some circumstances. In order to minimize friction, it is understood that some slow, controlled leakage of the flowable material 36 through the seals 95 may occur in one embodiment. The drainage system 140 is configured to remove any material 36 that penetrates the seals 95 and the inner support walls 97 to avoid having the flowable material 36 come into contact with the bearings 96. The leakage of material 36 through the seals 95 may be sufficiently small that the drainage system 140 can remove any leaked material 36 from the spaces 143 before the material 36 contacts the bearings 96. This configuration may be useful for flowable materials having a particulate or filler material dispersed therein as well.

The drainage system 140 includes drain holes 141 positioned in the walls (e.g., the bottom wall 142) of the vat in the spaces 143 that are defined between the inner and outer support walls 97, 98, and may also include a reservoir or drain pan into which the flowable material 36 can flow from the drain holes 141. In one embodiment, shown in FIG. 68, the drain holes 141 are in communication with a reservoir or tank 144 of the flowable material 36 positioned below the bottom wall 142, such as by conduits. The reservoir 144 is shown schematically in FIG. 68 and is configured to supply the flowable material 36 to the supply vat 34, such as by use of a pumping mechanism 146. In one embodiment, the reservoir 144 may be the main supply or holding tank for the flowable material 36 that holds significantly more flowable material 36 than the supply vat 34 to enable extended operation without stopping to refill the supply vat 34. Any material 36 that passes through the inner support wall 97, e.g., through the seals 95, will run into the drain holes 141 and into the reservoir 144, and thereby avoid penetrating or even contacting the bearings 96 on the outer support wall 98. Additionally, the bottom wall 142 in FIGS. 67-70 has an opening 145 adjacent the inner support wall 97 at the lowermost end of the bottom wall 142, which can permit material 36 in the reservoir 144 to be returned to the supply 34 for use. The opening 145 may also be used to drain the supply vat 34, and the bottom wall 142 of the supply vat 34 is sloped downward from the left end to the right end in the orientation shown in FIGS. 67-70 to assist in draining. The reservoir 144 may also be removable for emptying and/or interchanging with a fresh reservoir. The seals 95 are also replaceable in the event that they become damaged or covered with cured material 36.

It is understood that the supply assembly 79 and the supply 34 and associated components shown in FIGS. 67-70 may be incorporated in the same or similar configuration in some of the embodiments disclosed herein (e.g., in FIGS. 1, 3-4, 7-11, 15-18, 43-47, etc.), and that a modified version of the supply assembly 79, the supply 34, and/or components thereof may be incorporated into some other embodiments herein. For example, the seals 95 and the drainage system 140 may be incorporated in some form into any embodiment that includes one or more rollers 42 immersed or partially immersed in a supply 34 of flowable material 36, including the embodiments of FIGS. 71-81 described below.

FIGS. 71-75 illustrate additional embodiments of a manufacturing apparatus 12 that is usable with a system 10 and method as described herein, and which may include any components of the system 10 and method according to any embodiments herein. For example, the apparatus 12 of the embodiments of FIGS. 71-75 may be connected to a computer controller 100 in communication with one or more components of the apparatus 12 and configured for controlling operation of the apparatus 12 and/or the components thereof to manufacture an object 11. The embodiments of FIGS. 71-75 have deposition mechanisms 30 that differ from the embodiments of FIGS. 1-66, including a supply 34 of flowable material 36, an applicator 40, an exposure assembly 60, and other components that are configured differently from other embodiments described herein. The supply 34, the applicator 40, the exposure assembly 60, and other components of the deposition mechanisms 30 illustrated in FIGS. 71-75 may be used in connection with other components and features of other embodiments described herein. The supply 34, the applicator 40, the exposure assembly 60, and other associated structures in the embodiments of FIGS. 71-75 may be incorporated into a deposition mechanism 30 and apparatus 12 as shown in FIG. 8-13, 15-18, or 31-46. For example, the supply 34, the applicator 40, and other associated structures in the embodiments of FIGS. 71-75 may be mounted on a carriage 32 and/or connected to other components of an exposure assembly 60 according to one or more of the embodiments shown and described herein to form a deposition mechanism 30, and that such a deposition mechanism 30 may be used in connection with a track 14 and/or a support assembly 20 according to one or more of the embodiments shown and described herein. It is understood that the apparatuses 12 in FIGS. 71-75 may be provided with any of the components, features, and functionality described herein with respect to other embodiments, including in particular, but without limitation, components, features, and configurations of the exposure assembly 60 and the exposure device 50, the carriage 32, various modular components, etc. Components that have already been described with respect to one or more embodiments herein may not be described again with respect to FIGS. 71-75 for the sake of brevity, and identical reference numbers may be used to reference components previously described.

The deposition mechanisms 30 shown in FIGS. 71-75 may further be configured as part of an autonomous unit 90 according to one or more of the embodiments shown and described herein, and may have onboard a processor 2604, a memory 2612, and/or other computer components necessary for executing computer-executable instructions to automate the autonomous unit 90 and/or communicate with the computer controller 100. The deposition mechanisms 30 in FIGS. 71-74 may be incorporated into an autonomous unit 90 as shown FIGS. 31-47 with some modifications, and FIGS. 76-81 illustrate an example of an autonomous unit 90 and associated system 10 configured to use the deposition mechanism 30 of FIG. 75, as described below.

Figure 71:
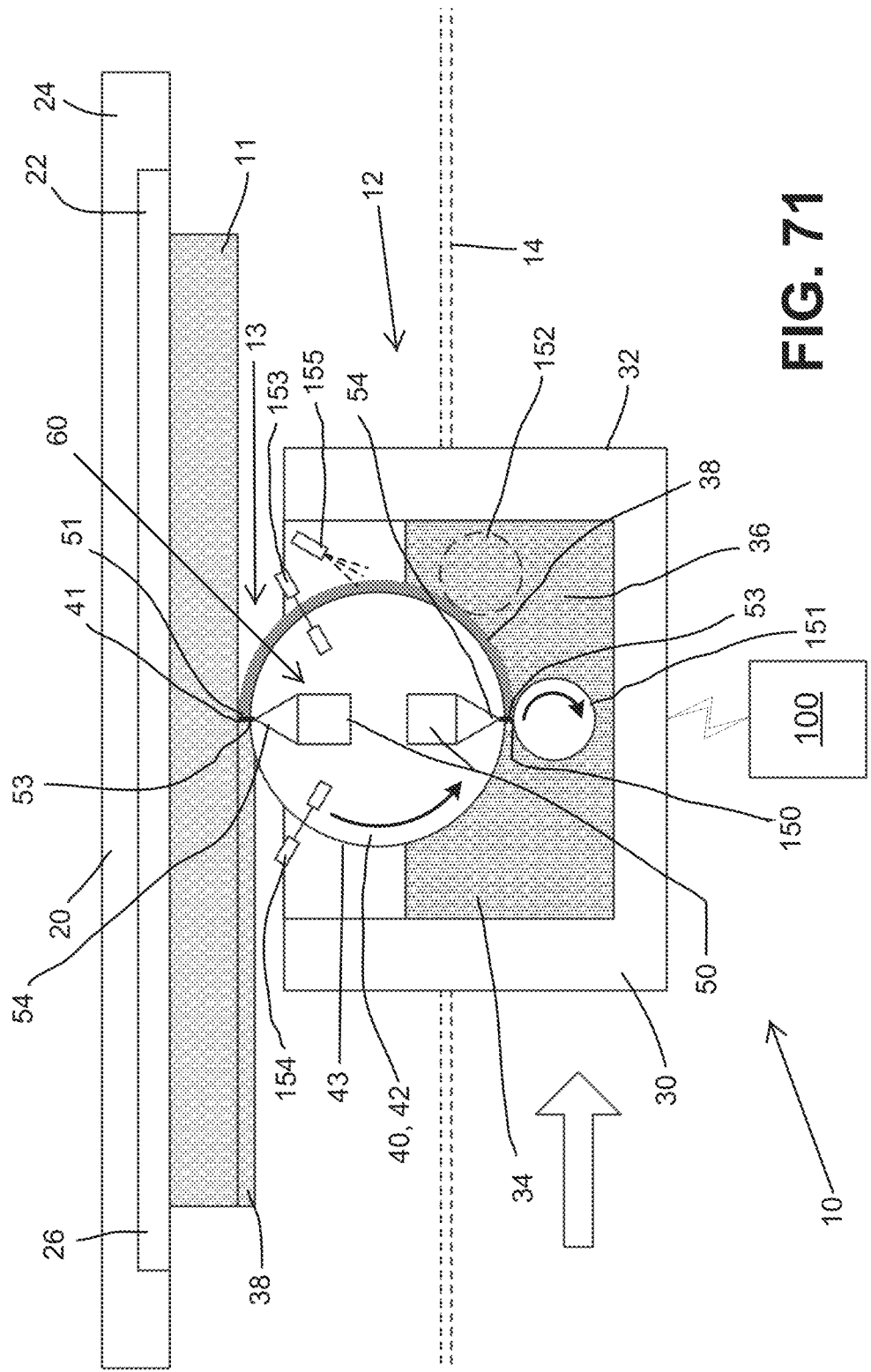
FIG. 71 is a side schematic view of another embodiment of a system and apparatus for producing a three-dimensional object in operation, according to aspects of the disclosure.

The deposition mechanism 30 in FIG. 71 utilizes a first or initial exposure site 150 that at least partially forms the layer 38 prior to the material 36 reaching the application site 41, such that the exposure site 51 located at or near the application site 41 becomes a secondary exposure site 51 to bond the layer 38 to the object 11. The secondary exposure site 51 may be the final exposure in one embodiment. It is understood that additional exposures may be performed after the secondary exposure site 51, such as by the secondary exposure device 80 as shown in FIG. 7, and/or between the initial exposure site 150 and the secondary exposure site 51 in other embodiments. The initial exposure site 150 and the secondary exposure site 51 may be referred to as "first" and "second" exposure sites, with the understanding that "first" and "second" do not imply any order unless explicitly specified otherwise. For example, "first" and "second" do not imply that the "first" action precedes the "second" action, and "first" does not imply that no other actions precede the "first" action, unless explicitly specified otherwise. The terms "initial" and "final" are used to mean that the actions (e.g., exposures) are the first or last in a series. In the embodiments of FIGS. 71-75, the initial exposure site 150 is located within the flowable material 36 (i.e., submerged), and the deposition mechanism may use a thickness limiter in conjunction with the initial exposure site 150, such that the thickness limiter is spaced from the surface of the roller 42, and the initial exposure site 150 is located within this space. The space between the roller 42 and the thickness limiter defines the thickness of the layer 38 in one embodiment. The deposition mechanism 30 in FIG. 71 includes a thickness limiter in the form of a secondary roller 151 spaced from the roller 42, such that the space between the roller 42 and the secondary roller 151 defines the thickness of the layer 38 formed at the initial exposure site 150. The roller 42 may be considered to be a primary roller or a primary build roller, and the secondary roller may be considered to be an intermediate build roller, in this configuration. The apparatus 12 may include a mechanism for adjusting the spacing between the rollers 42, 151 in order to change the thickness of the layer 38, which may be a manual or automated mechanism as described herein. The secondary roller 151 is illustrated in FIG. 71 as being completely submerged, with the initial exposure site 150 being located within the flowable material 36, i.e., below the surface of the flowable material 36. In another embodiment, the secondary roller 151 may be partially submerged such that the initial exposure site 150 is still located below the surface of the flowable material 36. In a further embodiment, the initial exposure site 150 may be located at or above the surface of the flowable material 36. In this configuration, a thickness limiter (e.g., a secondary roller 151 that is partially or completely positioned above the surface of the flowable material 36) may or may not be used.

The secondary roller 151 in one embodiment may be made from a silicone rubber material or polytetrafluoroethylene (PTFE), which generally has weak adhesion to most photocurable resins. Other materials with weak adhesion properties to the solidified layer 38 may be used as well. In one embodiment, the material for the secondary roller 151 may be selected so as not to adhere to the layer 38 upon solidification. The secondary roller 151 may be opaque in the embodiment of FIG. 71, because the waves 53 need not penetrate the surface of the secondary roller 151. In fact, it may be desirable for the waves 53 not to penetrate the secondary roller 151 in order to avoid inadvertent solidification of the material 36. In one embodiment, the secondary roller 151 may have reflective properties (e.g., a mirrored surface) configured to reflect the waves 53 back to the initial exposure site 150, which may permit lower power to be used for the exposure device 50 because the reflected waves 53 will increase the exposure of the flowable material 36. The secondary roller 151 may be configured to rotate such that the surface of the secondary roller 151 is moving in the same general direction and speed as the adjacent surface of the roller 42. The secondary roller 151 may be powered for such rotation in one embodiment or may be freely rotating in another embodiment. One or more additional secondary rollers 152 may be used in other embodiments (shown in broken lines in FIG. 71), and the additional secondary roller(s) 152 may be used to hold the layer 38 in place and/or provide an additional exposure site. The secondary roller 151 and the initial exposure site 150 are shown in FIG. 71 as being positioned at the bottom of the roller 42, opposite the application site 41, but this position may be changed in other embodiments. For example, placing the secondary roller 151 to the side of the roller 42 may reduce the necessary depth of the supply vat 34.

The deposition mechanism 30 in other embodiments may include a different type of thickness limiter, or may include no thickness limiter at all. For example, FIG. 71C illustrates an embodiment of a deposition mechanism 30 with a surface 172 (or a portion thereof) that is submerged in the flowable material 36 and spaced from to the roller 42 to form the thickness limiter. In this configuration, the initial exposure site 150 is located in the space between the surface 172 and the roller 42. The surface 172 may be formed of materials with weak adhesion properties for the flowable material 36, low friction properties, and/or reflective properties as described herein. In one embodiment, the surface 172 may be a static surface, and in another embodiment, the surface 172 may be a moveable surface, such as an endless belt looped around one or more pulleys. The surface 172 is depicted as being flat in FIG. 172, but the surface 172 may be concave, convex, or have another contour in other embodiments. As another example, FIG. 71D illustrates an embodiment of a deposition mechanism 30 with no thickness limiter. In this embodiment, the power of the exposure device 50 is carefully adjusted based on the transparency of the roller 42 and the properties of the flowable material 36 so that the waves 53 penetrate only a set distance into the flowable material 36, thereby forming the layer 38 at the desired thickness. The depth of curing of a photocurable resin, for example, is a function of the power of the electromagnetic waves 53 and the exposure time, and the controller 100 may include algorithms for achieving a desired depth of cure based on these factors. More specifically, the depth of curing of the photocurable resin depends on the function $P*t/A$, where P=power, A=area of exposure, and t=time.

Figure 71A:
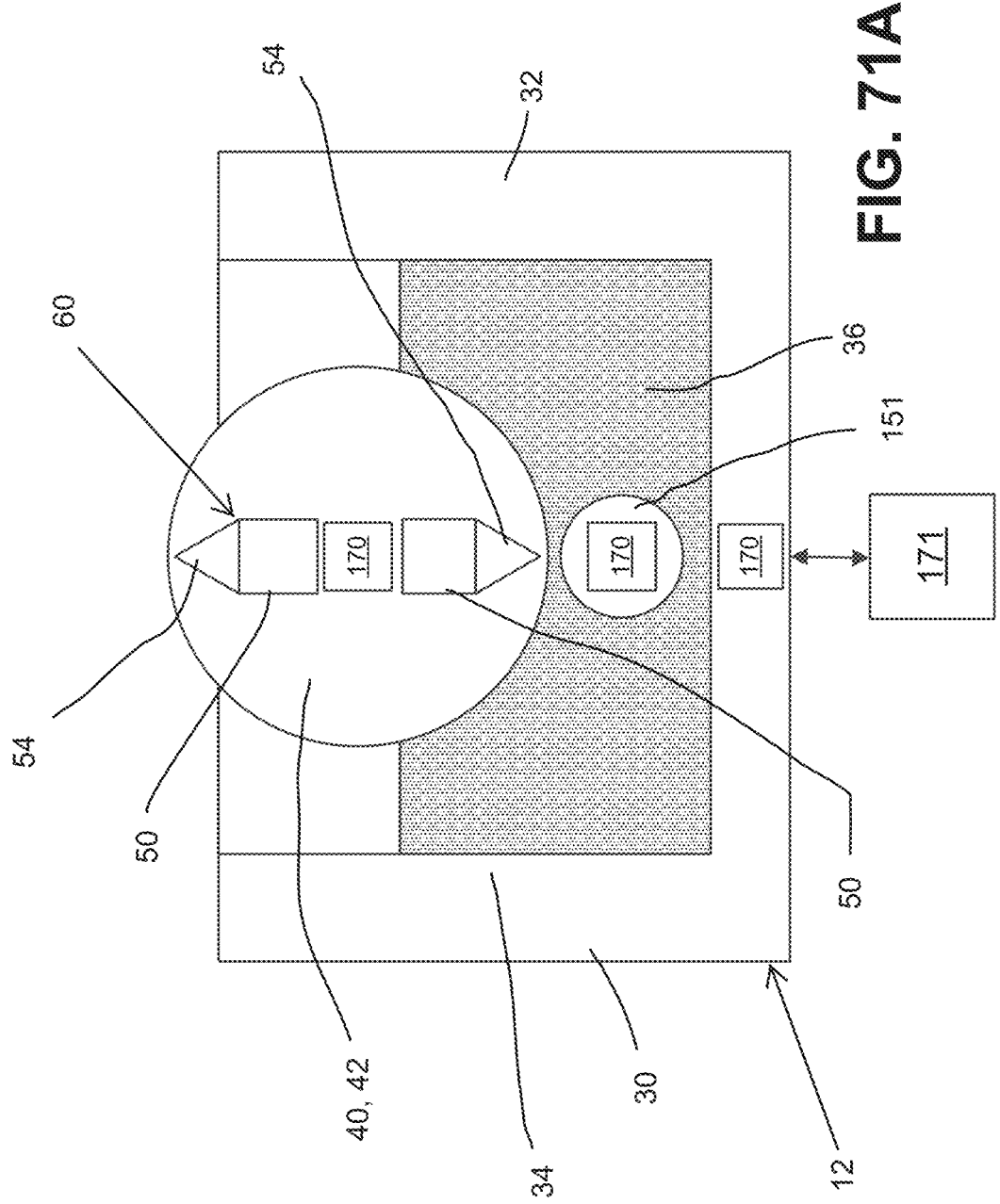
FIG. 71A is a side schematic view of a portion of the system and apparatus of FIG. 71 including temperature regulation elements, according to aspects of the disclosure.
Figure 75:
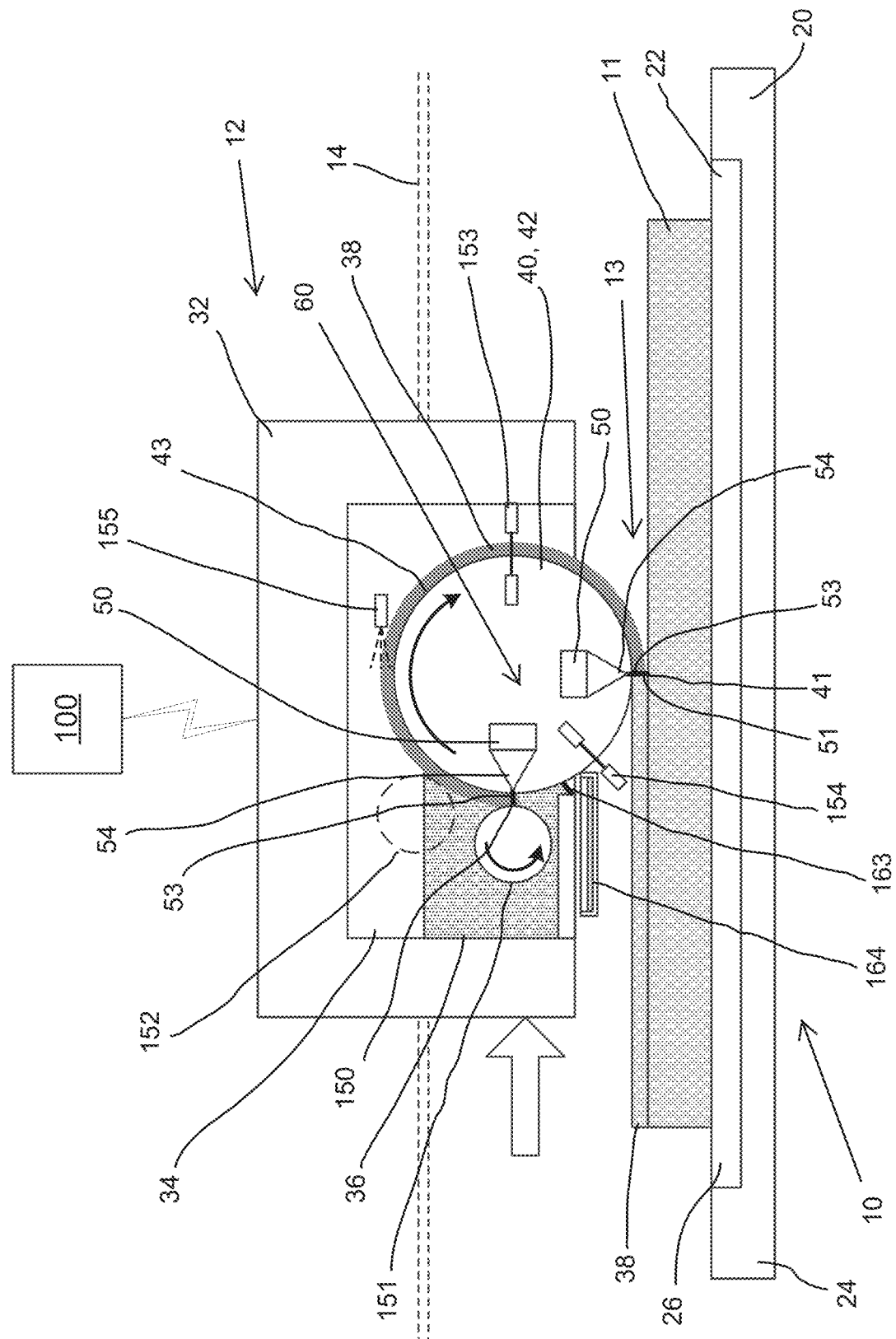
FIG. 75 is a side schematic view of another embodiment of a system and apparatus for producing a three-dimensional object in operation, according to aspects of the disclosure.
Figure 75A:
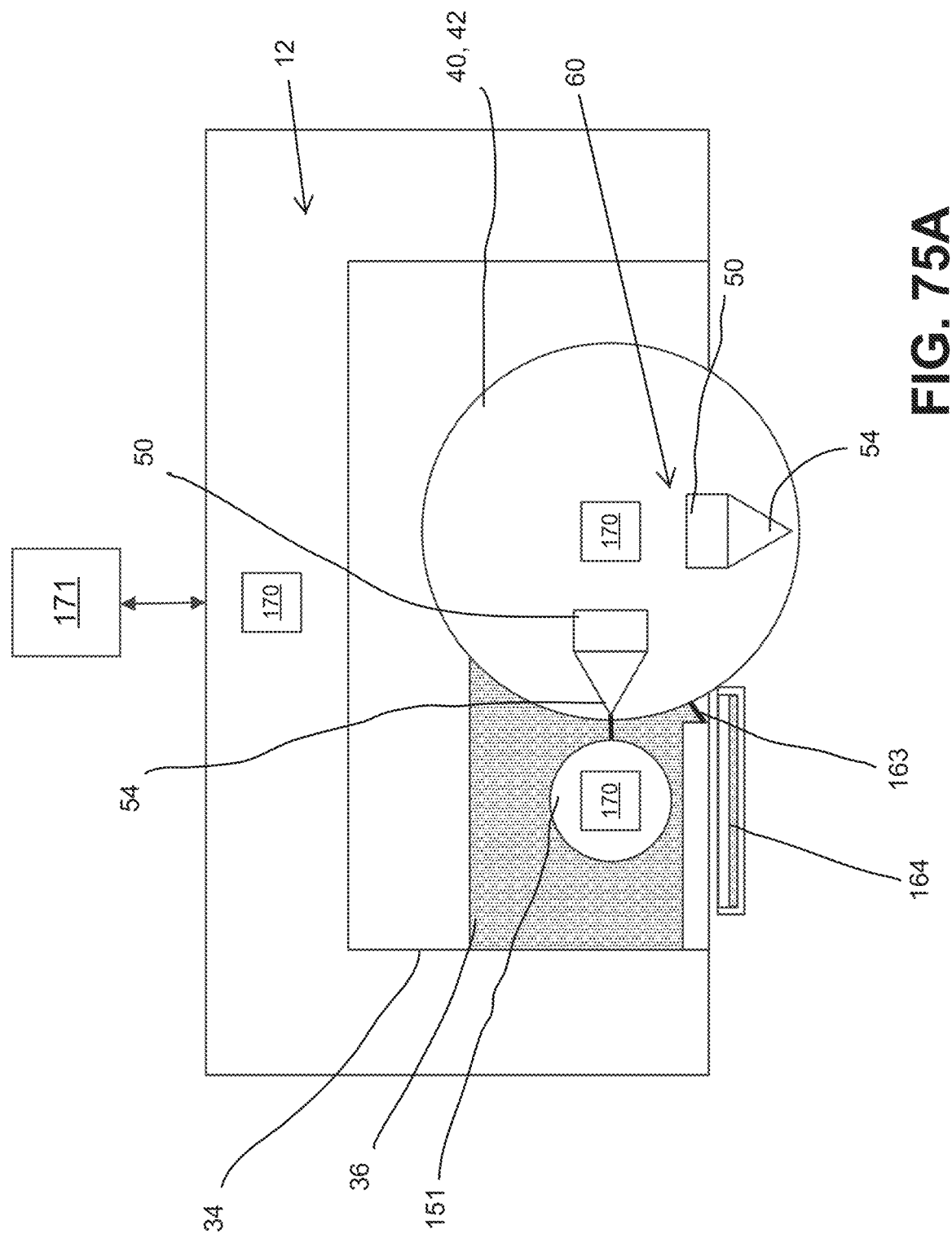
FIG. 75A is a side schematic view of a portion of the system and apparatus of FIG. 75 including temperature regulation elements, according to aspects of the disclosure.
Figure 76:
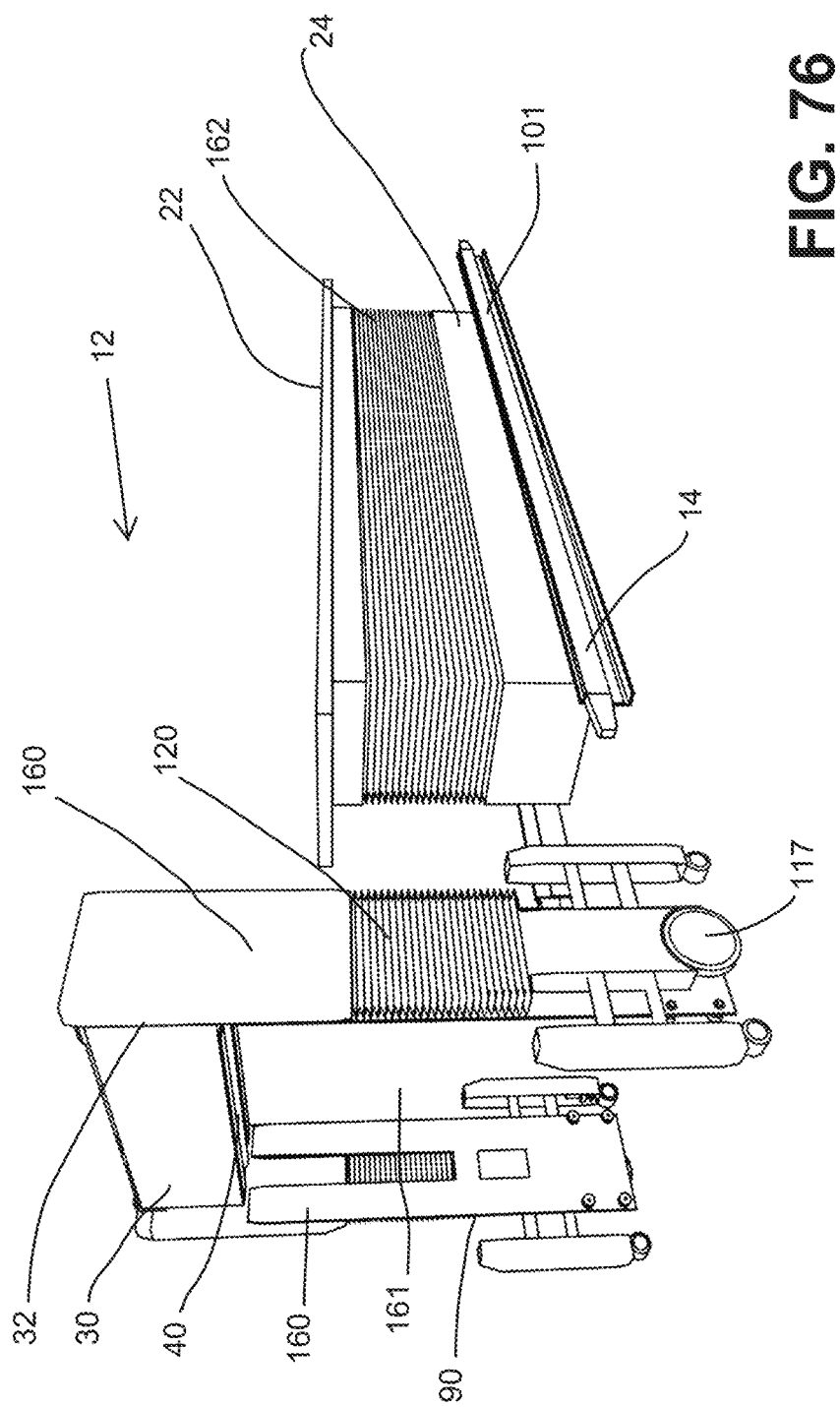
FIG. 76 is a perspective view of another embodiment of an apparatus for producing a three-dimensional object in operation, according to aspects of the disclosure, including a deposition mechanism moving toward a support assembly.

In the embodiments of FIGS. 71A and 75A, the deposition mechanism 30 may include one or more temperature regulation elements 170 configured to control the temperature of the flowable material 36 in the supply vat 34. For example, some resins may function better at temperatures above ambient temperature, and the deposition mechanism 30 may include one or more heating elements to increase the temperature of the flowable material 36 to a more optimal temperature. As another example, solidification of the flowable material 36, such as by curing, may generate heat that will raise the temperature of the flowable material 36 to an undesirable level, particularly when the initial exposure site 150 is submerged beneath the flowable material 36. In this example, the deposition mechanism 30 may include one or more cooling elements to limit the temperature increase of the flowable material 36 and/or to cool the flowable material 36 to a more optimal temperature. The temperature regulation element(s) 170 may be placed in various locations, including within the supply vat 34, within or adjacent to the walls of the supply vat 34, or within the roller 42 and/or the secondary roller 151. An example of such a temperature regulation element 170 is a fluid conduit circulating a heating or cooling fluid which may be supplied from an external source 171 of heating and/or cooling fluid, but other temperature regulation elements 170 may be used in other embodiments. For example, in one embodiment, the roller 42 and/or the secondary roller 151 may have one or more fluid conduits extending substantially the entire length of the rollers 42, 151. The same conduit(s) may be used to selectively circulate heating or cooling fluid as desired. The deposition mechanism 30 in one embodiment may further include separate temperature regulation elements 170 configured for heating and cooling. In one embodiment, the temperature regulation element(s) 170 may initially be used to raise the temperature of the flowable material 36 to a suitable or optimal temperature for production of the article 11, but after heat builds up from extended solidification/curing, the temperature regulation element(s) may be used to reduce the temperature of the flowable material 36 and/or limit temperature increase to maintain a suitable or optimal temperature. The controller 100 may include logic for controlling the temperature of the deposition mechanism 30 and/or portions thereof by controlling one or more of such temperature regulation elements 170 to perform a heating or cooling function.

The exposure assembly 60 in FIG. 71 includes two exposure devices 50 each having its own outlet 54, such that one exposure device 50 emits waves 53 toward the initial exposure site 150 and the other exposure device 50 emits waves 53 toward the secondary exposure site 51 at the application site 41. In one embodiment, the exposure assembly 60 includes two arrays 55 of outlets 54 as described herein, each of which may be provided by an exposure device 50 in the form of an array 55 of LEDs 59 directed toward the exposure site 51, 150 or an array 55 of optical fibers 61 connected to an exposure device 50 in the form of a DLP projector or an array of LEDs 59. The exposure assembly 60 may further include focusing mechanisms 66 to focus the waves 53 between the outlets 54 and the exposure site 51, 150, as also described herein. For example, the focusing mechanisms 66 may include a micro-lens array 64 or other lens array as described herein. The exposure devices 50 may be configured to selectively solidify portions of the flowable material 36 as described herein in order to produce each layer 38, such as by selective activation of specific outlets 54 and other techniques. In one embodiment, the exposure device 50 for the initial exposure site 150 may be configured to selectively activate outlets 54 to solidify the same portions of the layer 38 as the exposure device 50 for the secondary exposure site 51. In a further embodiment (not shown), some or all of the outlet(s) 54 for the initial exposure site 150 may be located inside the secondary roller 151, such that the secondary roller 151 has a structure similar to the roller 42 shown and described herein, e.g., as shown in FIGS. 8-11, 15-18, and 43-47. It is understood that the exposure assembly 60 may be configured to advance or retard the exposure sites 51, 150 as desired, as described herein. Additionally, in one embodiment, the focusing mechanism 66 for the initial exposure site 150 may have a focal length configured such that the waves 53 are focused at the surface of the roller 42, and the focusing mechanism 66 for the secondary exposure site 51 may have a focal length configured such that the waves 53 are focused at the outer surface of the layer 38 and/or the surface of the object 11 to which the layer 38 is being applied/bonded.

Figure 73:
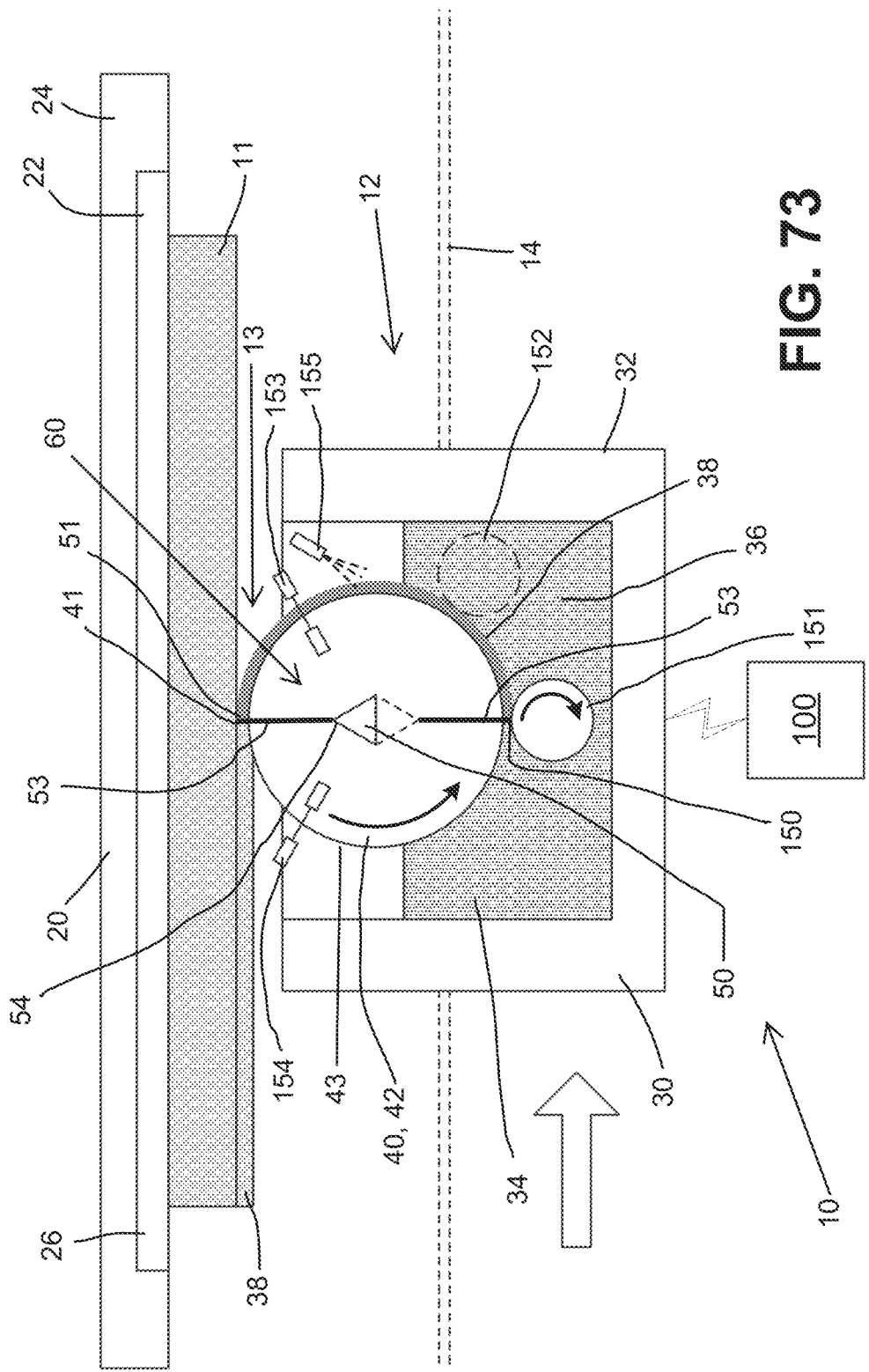
FIG. 73 is a side schematic view of another embodiment of a system and apparatus for producing a three-dimensional object in operation, according to aspects of the disclosure.
Figure 74:
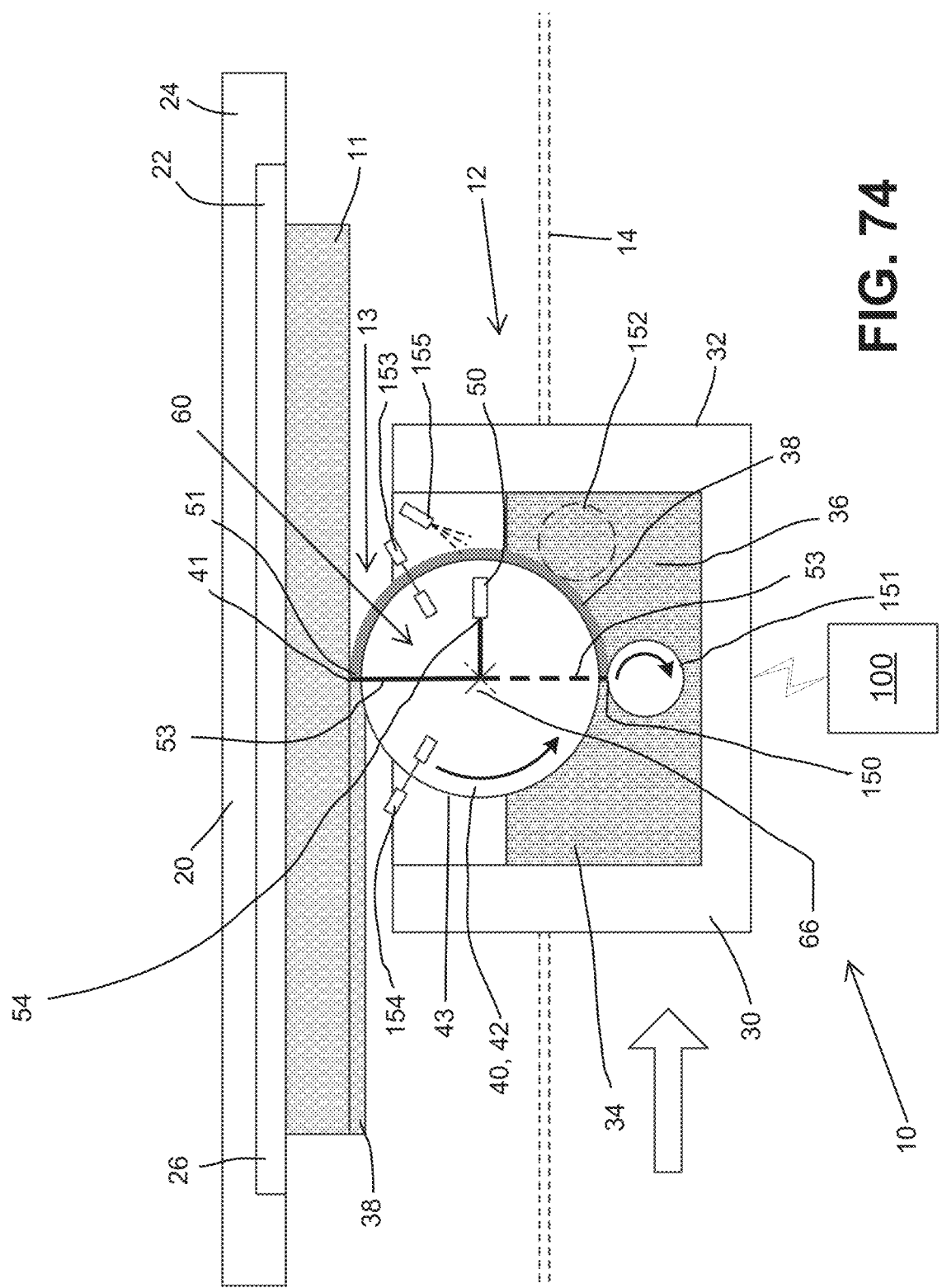
FIG. 74 is a side schematic view of another embodiment of a system and apparatus for producing a three-dimensional object in operation, according to aspects of the disclosure.

In other embodiments, the apparatus 12 and deposition mechanism 30 of FIG. 71 may be provided in a similar or identical configuration with an exposure assembly 60 having a different configuration. FIGS. 72-74 illustrate such similar or identical apparatuses 12 and deposition mechanisms 30 with different exposure assemblies 60, and it is understood that the embodiments of FIGS. 72-74 may include any of the components and features described herein with respect to FIG. 71. As with other embodiments described herein, the exposure device(s) 50 are schematically depicted as being located inside the roller 42 in FIGS. 71-74, but in many configurations, the exposure device(s) are located outside the roller 42 with the outlet(s) 54 located inside the roller 42. In the embodiment of FIG. 72, the exposure assembly 60 includes a single exposure device 50 that has two outlets 54 or arrays 55 of outlets 54 directed toward the two exposure sites 51, 150. For example, the exposure assembly 60 may include a single exposure device 50 in the form of an array of LEDs 59 or a DLP projector, with optical fibers 61 arranged and directed to form two arrays 55 of outlets 54 within the roller 42. In the embodiment of FIG. 73, the exposure assembly 60 includes a single exposure device 50 with a single outlet 54 or single array 55 of outlets 54, where the outlets 54 are moveable to direct the waves 53 at a desired exposure site 51, 150. For example, the outlets 54 (e.g., exit ends 63 of optical fibers 61 or LEDs 59) may be mounted on a gimbal or other rotatable structure and may use alternating strobing to achieve this functionality. In the embodiment of FIG. 74, the exposure assembly 60 includes a single exposure device 50 with a single outlet 54 or single array 55 of outlets 54, with a focusing mechanism 66 configured to direct the waves 53 at either of the exposure sites 51, 150 as desired. For example, the focusing mechanism 66 may include one or more moveable mirrors configured to reflect and/or direct the waves 53 toward the desired exposure site 51, 150, which may be moveable by mounting on a gimbal or other rotatable structure and may use alternating strobing to achieve this functionality. It is understood that other configurations of exposure assemblies 60 may be used in connection with the embodiments of FIGS. 71-74, including any configuration described herein with respect to another embodiment.

The deposition mechanism 30 in FIG. 71 operates by at least partially or completely solidifying the layer 38 at the initial exposure site 150, beneath the surface of the flowable material 36, at the desired thickness. The layer 38 is then carried upward to the application site 41 by the roller 42, and is then applied/bonded to the object 11 and (if necessary) further solidified at the secondary exposure site 51. It is understood that the apparatus 12 may further include one or more additional secondary exposure devices 80, such as in FIG. 7, for further solidification of the layer 38. In one embodiment, the deposition mechanism 30 may be configured to encourage proper adhesion of the layer 38 at the proper time. For example, the secondary roller 151 may have an outer surface that has a lower adhesion property to the material forming the layer 38 than the outer surface 43 of the roller 42, to encourage the layer 38 to adhere to the roller 42 to be carried to the application site 41 rather than adhering to the secondary roller 151. Likewise, the outer surface 43 of the roller 42 may have a lower adhesion property to the material forming the layer 38 than the surface of the object 11 to encourage the layer 38 to adhere to the object 11 and/or the build platform 22, rather than adhering to the roller 42. The apparatus 12 in FIG. 71 also includes a removal device 155 for removal of excess uncured flowable material 36, which is in the form of an air wiper in FIG. 71 but may additionally or alternately include a squeegee or other mechanical removal device in other embodiments. The removal device 155 is configured to remove most, but not all, of the flowable material 36 from the layer 38, leaving a small amount of unsolidified material 36 on the layer 38 for bonding of the layer 38 to the object 11. The characteristics of the removal device 155, e.g., the angle and power of an air wiper, may be configured in order to ensure proper removal of the flowable material 36 without damaging or detaching the layer 38 from the surface(s) to which it is adhered. The removal device 155 may further be configured to direct removed material 36 back into the supply 34 to decrease waste. It is understood that additional removal devices 155 may be used, including at locations to remove flowable material 36 after the layer 38 is adhered to the object 11.

The apparatus 12 in the embodiment of FIG. 71 includes sensors to confirm proper operation of the deposition mechanism 30, such as build verification sensors 153 and transfer verification sensors 154. The build verification sensor 153 is positioned to scan the surface of the roller 42 between the initial exposure site 150 and the secondary exposure site 51 to confirm that the layer 38 was created and is adhered to the roller 42. The transfer verification sensor 154 is positioned to scan the surface of the roller 42 after passing the secondary exposure site 51 to confirm that the layer 38 separated from the roller 42 and adhered to the object 11. Both the build and transfer verification sensors 153, 154 may be an array of photosensors or other sensor(s) capable of detecting presence of the layer 38. If either of the sensors 153, 154 detects that the relevant actions were not completed properly, e.g., the build verification sensor 153 does not sense the layer 38 or the transfer verification sensor 154 does sense the layer 38 present, production can be stopped in order to address the problem and avoid a manufacturing defect that may not be discovered until much later. The use of the verification sensors 153, 154 helps to ensure reliable and accurate production of the object 11.

Figure 71B:
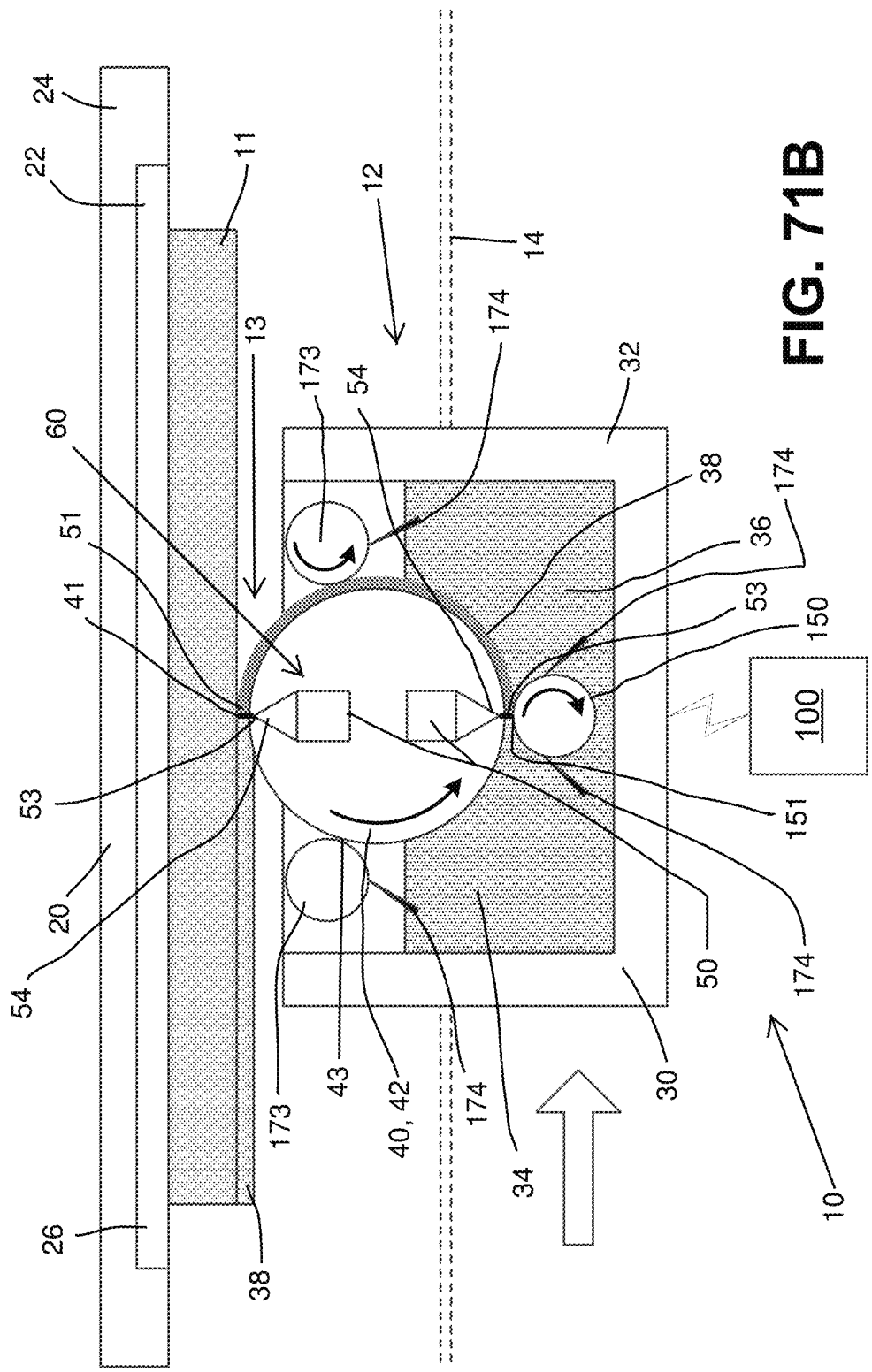
FIG. 71B is a side schematic view of another embodiment of a system and apparatus for producing a three-dimensional object in operation, according to aspects of the disclosure.
Figure 71C:
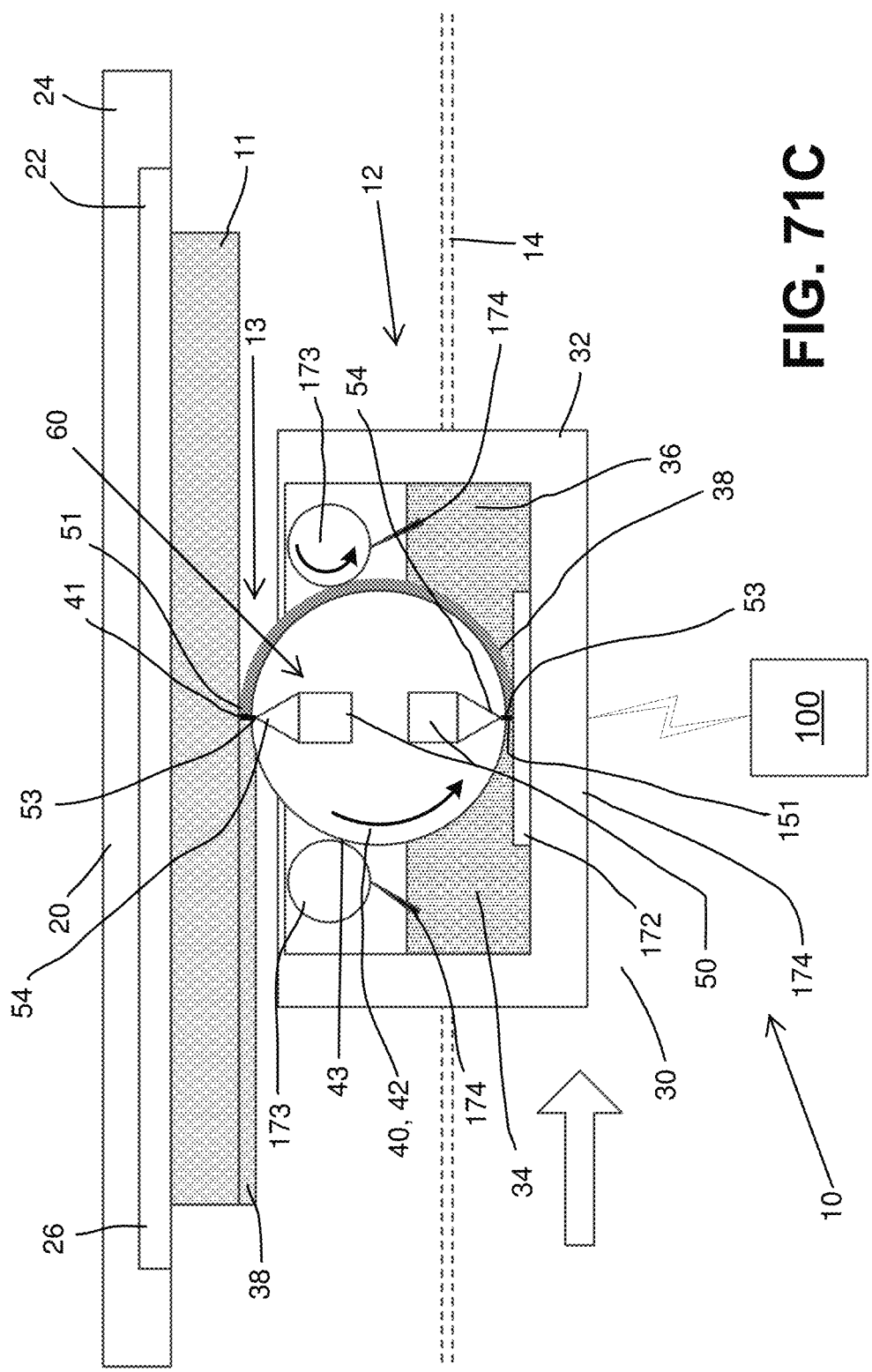
FIG. 71C is a side schematic view of another embodiment of a system and apparatus for producing a three-dimensional object in operation, according to aspects of the disclosure.
Figure 71D:
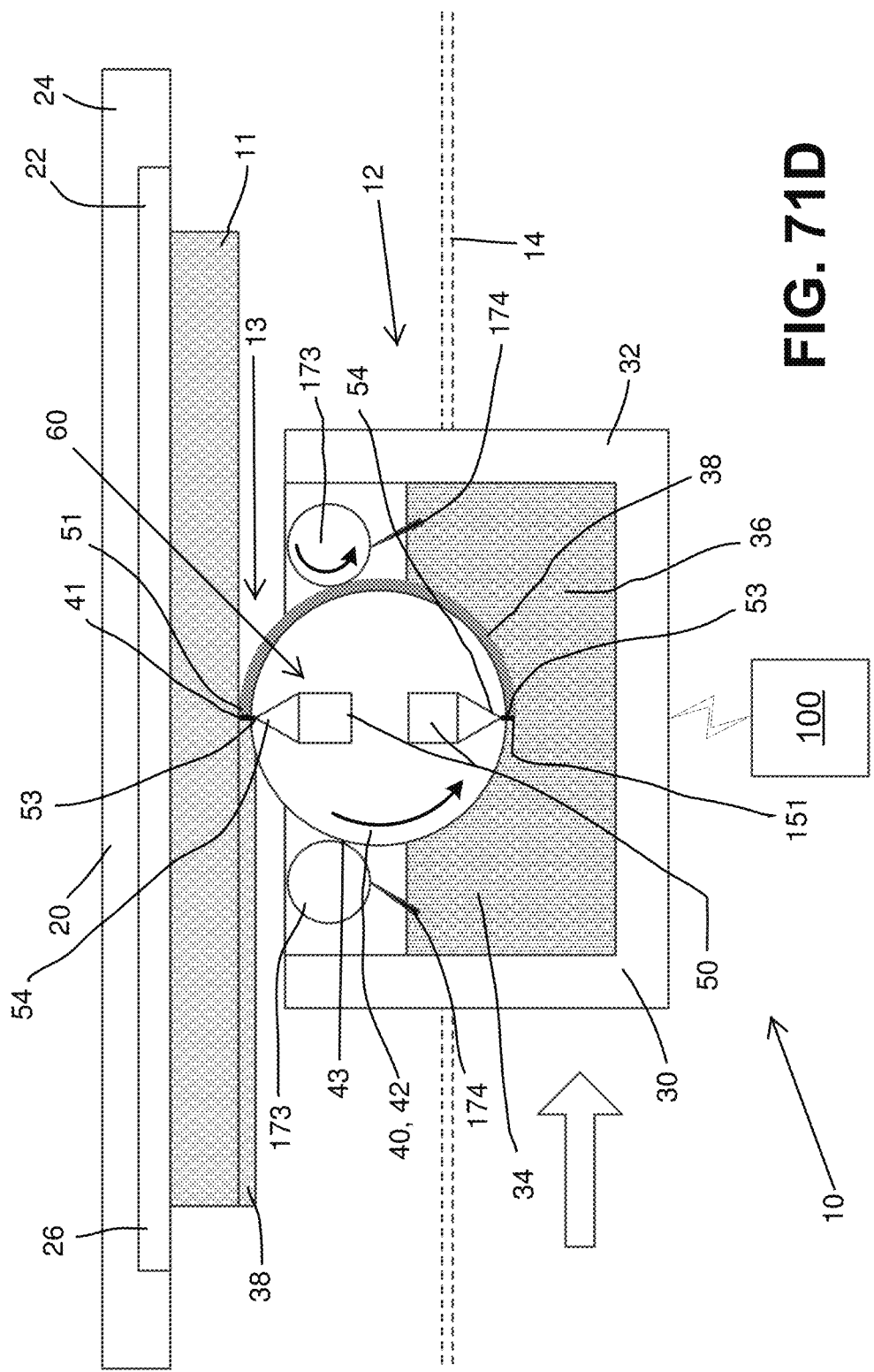
FIG. 71D is a side schematic view of another embodiment of a system and apparatus for producing a three-dimensional object in operation, according to aspects of the disclosure.

FIG. 71B illustrates another embodiment of a deposition mechanism 30 having a removal device 155 that includes one or more cleaning rollers 173 configured to contact the surface of the layer 38 opposite the roller 42 and clean excess flowable material 36 from the layer 38. In FIG. 71B, the removal device 155 includes two cleaning rollers 173 positioned on opposite sides of the application site 41 and the exposure site 51, such that one of the cleaning rollers 173 (the right hand roller 173 in FIG. 71B) contacts the layer 38 to clean the excess flowable material when the deposition mechanism 30 is moving in one direction (to the right in FIG. 71B), and the other cleaning roller 173 (the left hand roller 173 in FIG. 71B) performs the same act when the deposition mechanism 30 is moving in the opposite direction (to the left in FIG. 71B). The cleaning rollers 173 may be powered for rotation such that the surface of the cleaning roller 173 contacting the layer 38 is moving in the opposite direction as the layer 38 and the adjacent surface of the roller 42. The removal device 155 may further include wipers 174 configured to clean the flowable material from the surface of the cleaning rollers 173, as also shown in FIG. 71B. Additional wipers 174 may be included to clean other components of the deposition mechanism 30, including the secondary roller 151 as shown in FIG. 71B or the roller 42. Wipers 174 can be are shown in FIGS. 71C-D as well, and it is understood that wipers 174 such as those shown in FIGS. 71B-D and described herein can be used in connection with any of the rollers in any embodiments described herein, including the roller 42, the secondary roller 151, the cleaning rollers 173, the leveling rollers 128, etc. In one embodiment, the cleaning rollers 173 can also function as sensors, e.g., a build verification sensor 153 or a transfer verification sensor 154. For example, in one embodiment, the cleaning roller 173 that is not contacting the layer 38 (i.e., the left hand roller 173 in FIG. 71B) is positioned and configured to contact the roller 42 and to roll freely along with the roller 42, and function as a transfer verification sensor. Any portions of the layer 38 that are not separated from the roller 42 and transferred to the object 11 will cause the cleaning roller 173 to be pushed slightly away from the roller 42, and the cleaning roller 173 is equipped with a positional sensor to sense this movement, permitting functioning as a transfer verification sensor. It is understood that when the deposition mechanism 30 moves in the opposite direction, the other cleaning roller 173 can function as the transfer verification sensor. In another embodiment, the cleaning roller 173 in contact with the layer 38 can use a positional sensor to function as a build verification sensor in a similar manner. The cleaning roller(s) 173 in FIGS. 71B-D can be used in connection with other embodiments shown and described herein, including the embodiments of FIGS. 72-75, and the positions of the cleaning roller(s) 173 in such embodiments may be altered as necessary and practical.

FIG. 75 illustrates another embodiment of an apparatus 12 and deposition mechanism 30 which is configured to build an object 11 on a build platform 22 located below the applicator 40. The embodiment of FIG. 75 includes many of the same components as the embodiments of FIGS. 71-74, including the secondary roller 151, the optional additional secondary roller(s) 152, the verification sensors 153, 154, and the removal device 155. These components share the same functions as in FIGS. 71-74, although some components are relocated in FIG. 75, and these components may not be described in detail with respect to FIG. 75. It is noted that the embodiment of FIG. 75 depicts the use of two exposure devices 50 each having an outlet 54 or array 55 of outlets 54, and that any configuration of an exposure assembly 60 described herein may be used in connection with the embodiment of FIG. 75, including any of the configurations in FIGS. 72-74. In the embodiment of FIG. 75, the supply 34 of the flowable material 36 holds the flowable material 36 above the application site 41 and in communication with only one side of the roller 42. The secondary roller 151 is positioned alongside of the roller 42 and immersed in the flowable material 36 to create an initial exposure site 150 between the roller 42 and the secondary roller 151. As described above, the spacing between the rollers 42, 151 determines the thickness of the layer 38. The layer 38 is then carried by the roller 42 over the top of the roller and down toward the application site 41 and the secondary exposure site 51 for bonding to the object 11 and/or the build platform 22. The deposition mechanism in FIG. 75 further includes a containment seal 163, such as a flexible lip or gasket, which resists leakage of the flowable material 36 downward out of the supply vat 34 at the junction between the supply vat 34 and the roller 42. In case some leakage may occur, a drip pan 164 is provided below the containment seal 163 to collect any flowable material 36 that passes through the seal 163. The drip pan 164 may be configured for returning the flowable material 36 to the supply vat 34, such as by using a pump mechanism or by being removable for dumping the flowable material 36 back into the supply vat 34. It is noted that the removal mechanism 155 in FIG. 75 is an air wiper configured to blow the excess material 36 back toward the supply 34.

The embodiments of FIGS. 71-75 using the additional solidification stage present advantages over existing additive manufacturing methods. For example, building the layer 38 before bonding to the object 11 permits improved shrink control during solidification. As another example, the additional solidification step avoids buildup of heat that may be involved in a curing process using fewer steps and produces a more fully cured/solidified layer 38. As a further example, at least the embodiments in FIG. 75 permits the production of an article 11 from the bottom upward, with the article 11 resting above the build platform 22, which can present advantages for production of many articles 11. The embodiments of FIGS. 71-75 are also capable of constructing an object 11 with only the minimum desired amount of flowable material 36 being incorporated into the object 11, because excess flowable material 36 can be removed from the layer 38 before bonding to the object 11. This minimizes the use of flowable material and increases cost-efficiency of the process. In one embodiment, up to 98% of excess resin is removed, allowing the part to be cleaned with detergent, rather than harsh chemicals. This also permits creation of an object with internal cavities, without unsolidified flowable material 36 being trapped in the internal interstices. The ability to produce such porous objects permits construction of objects with decreased weight and decreased material usage, increasing the versatility of the process and decreasing the cost of production. Such porous objects may also provide increased buoyancy, thermal insulation, and sound insulation properties, among other improved properties. FIGS. 82-93 illustrate different production techniques that are enabled by the embodiments of FIGS. 71-75, including techniques to produce objects 11 with internal porosity. The embodiments of FIGS. 71-75 may also be used to build a part with an internal honeycomb configuration, i.e., hexagonal cells (not shown). It is understood that objects 11 with internal porosity may include an external "shell" layer of solid (non-porous) material to form a smoother and more rigid exterior surface and resist ingress of moisture and other contaminants.

Figure 82:
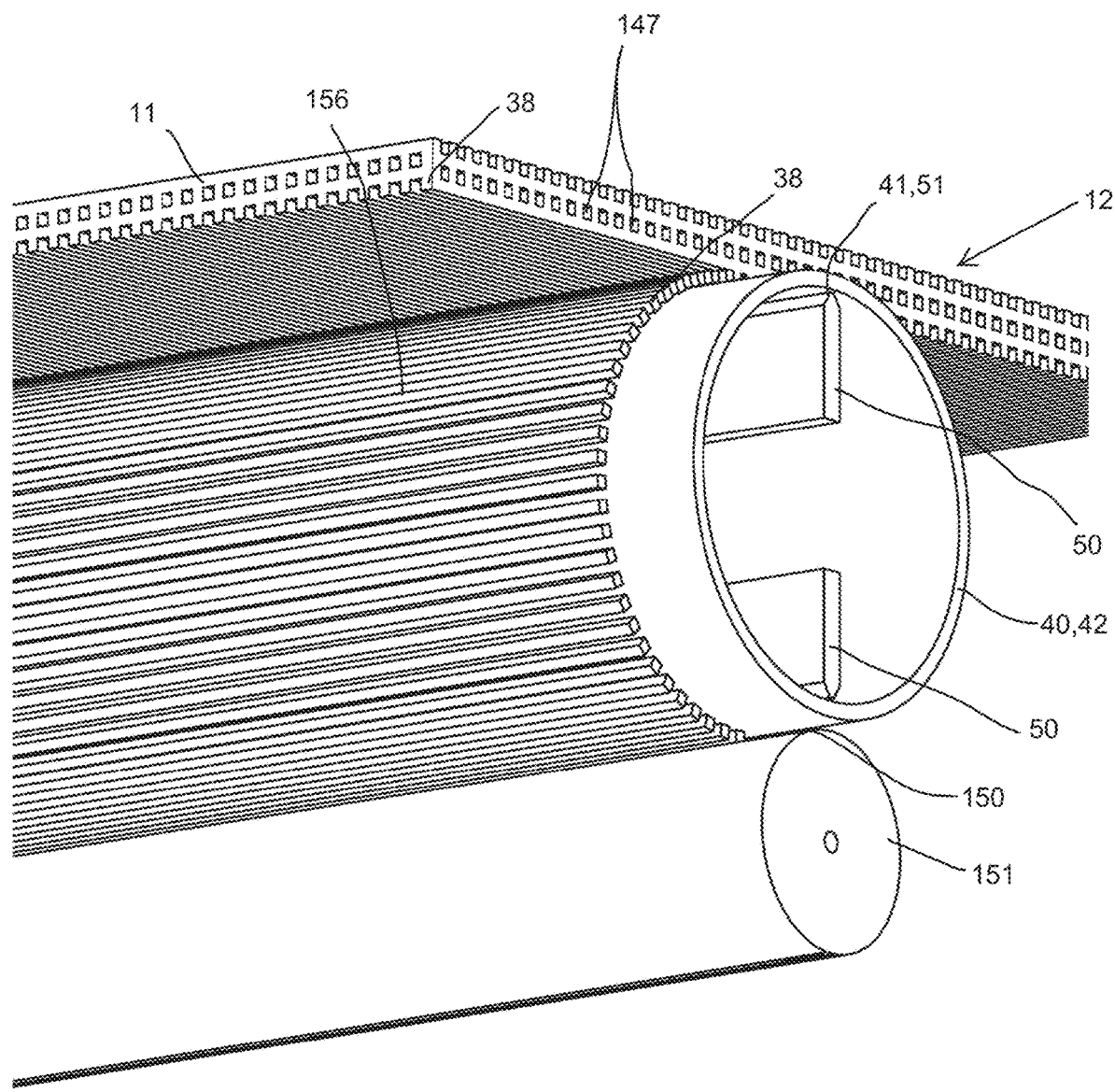
FIG. 82 is a bottom perspective view of a portion of a deposition mechanism producing a layer of another embodiment of a three-dimensional object according to aspects of the disclosure.
Figure 83:
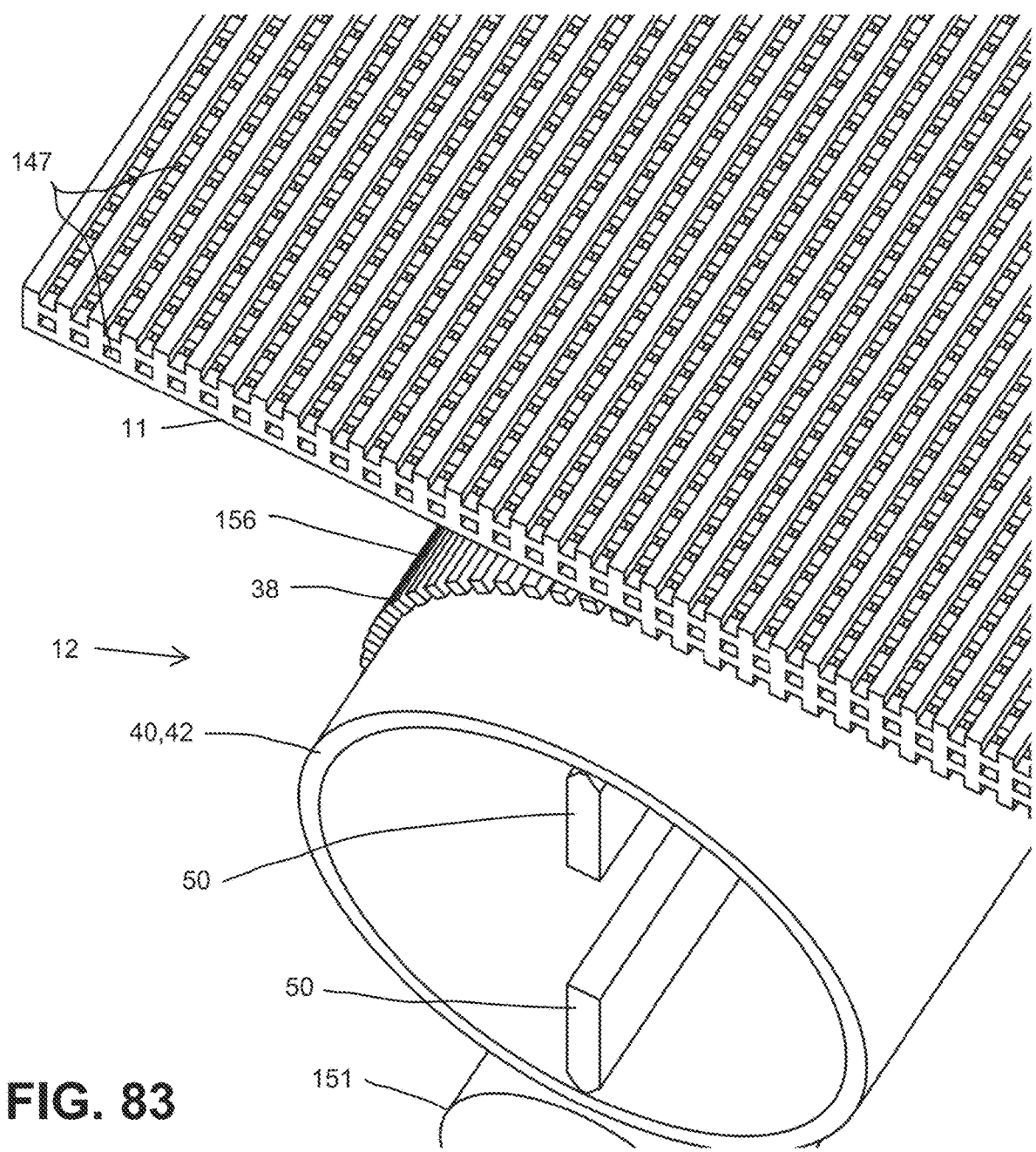
FIG. 83 is a top perspective view of the portion of the deposition mechanism producing the layer of three-dimensional object as shown in FIG. 82.
Figure 84:
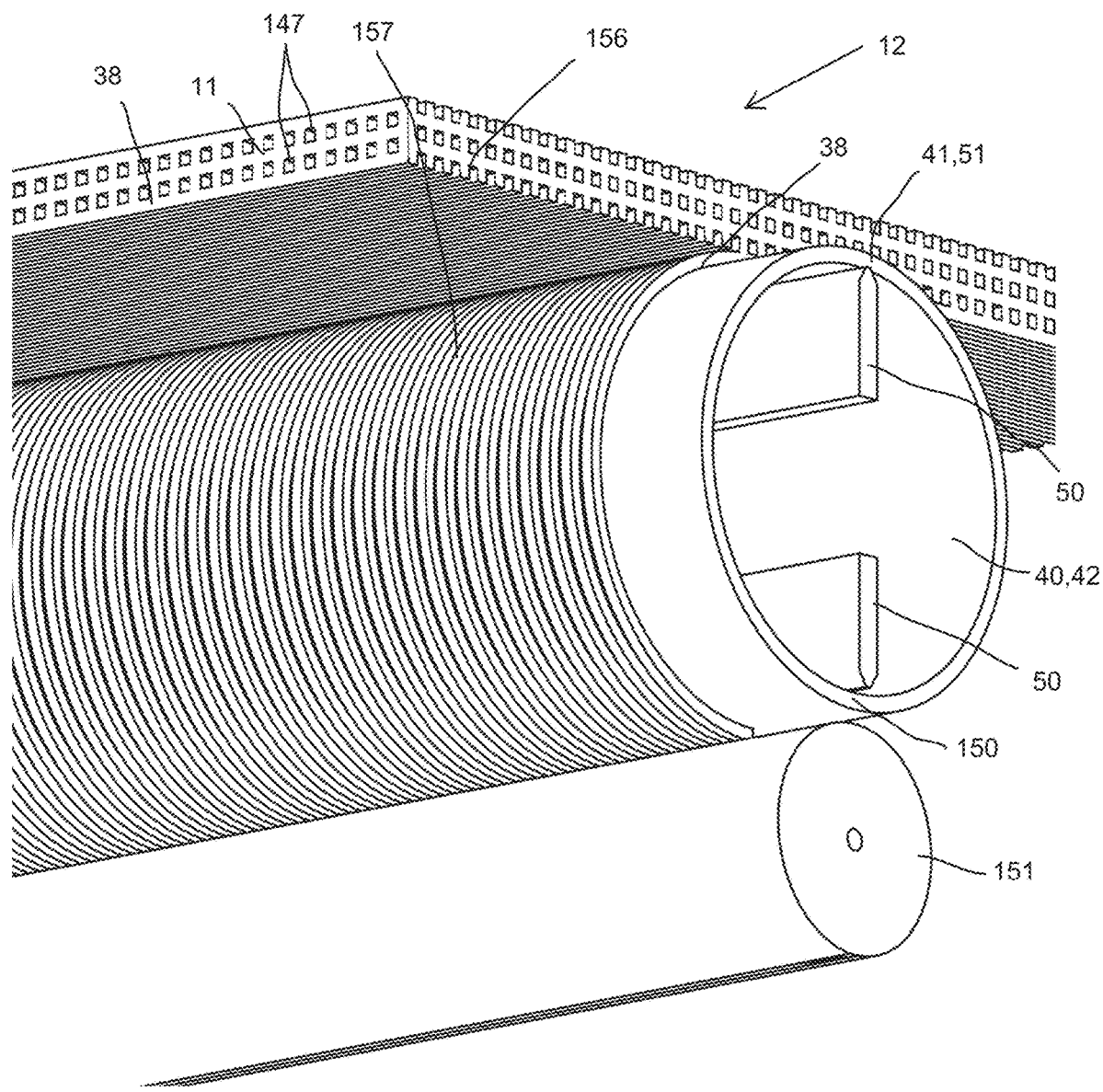
FIG. 84 is a bottom perspective view of the portion of a deposition mechanism producing a second layer of the three-dimensional object as shown in FIG. 82.
Figure 85:
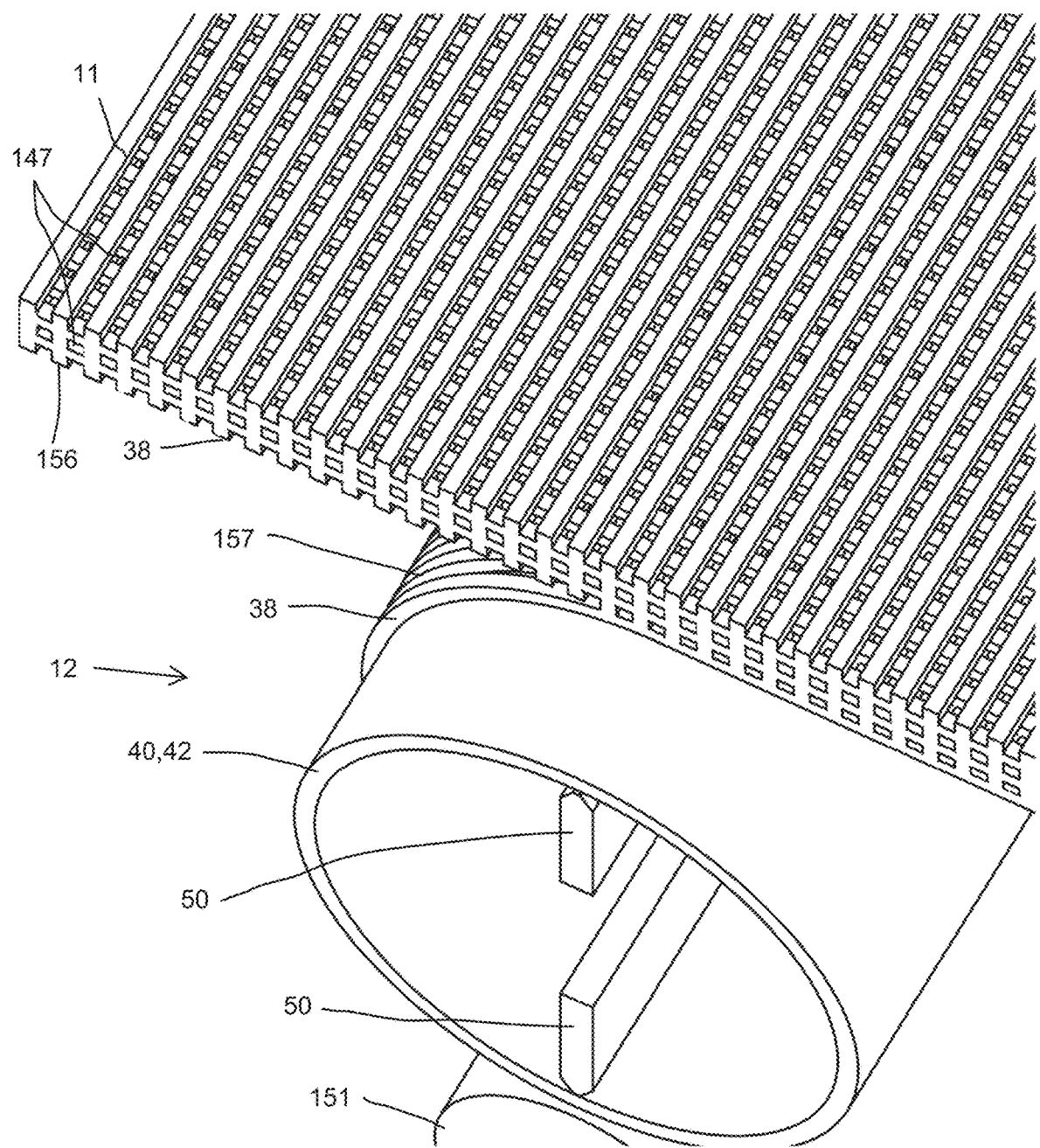
FIG. 85 is a top perspective view of the portion of the deposition mechanism producing the second layer of the three-dimensional object as shown in FIG. 84.

FIGS. 82-85 illustrate a first production technique, where an object 11 is produced using layers 38 of obliquely oriented strips 156, 157. FIGS. 82-83 illustrate production of a first layer 38 including strips 156 of solidified material that extend axially on the roller 42, i.e., in the y-direction. FIGS. 84-85 illustrate production of a second layer 38 that is adhered to the first layer 38 including strips 157 of solidified material that extend circumferentially on the roller 42, i.e., in the x-direction. Each successive layer is produced in alternating fashion. The resultant object 11 has internal porosity as shown in FIGS. 82-85, with internal air pockets or voids 147 partially or completely surrounded by solidified material of the article 11.

Figure 86:
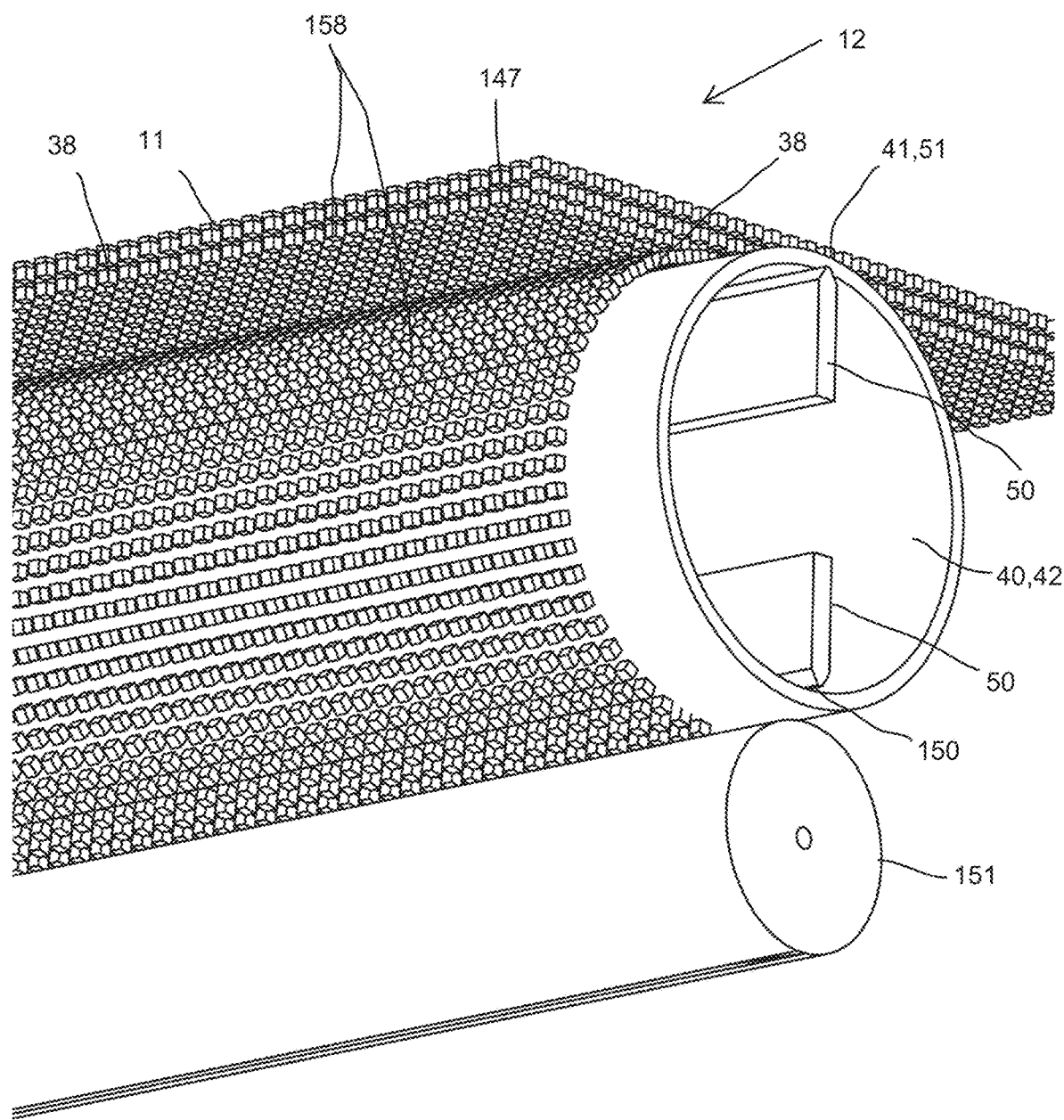
FIG. 86 is a bottom perspective view of a portion of a deposition mechanism producing a layer of another embodiment of a three-dimensional object according to aspects of the disclosure.
Figure 87:
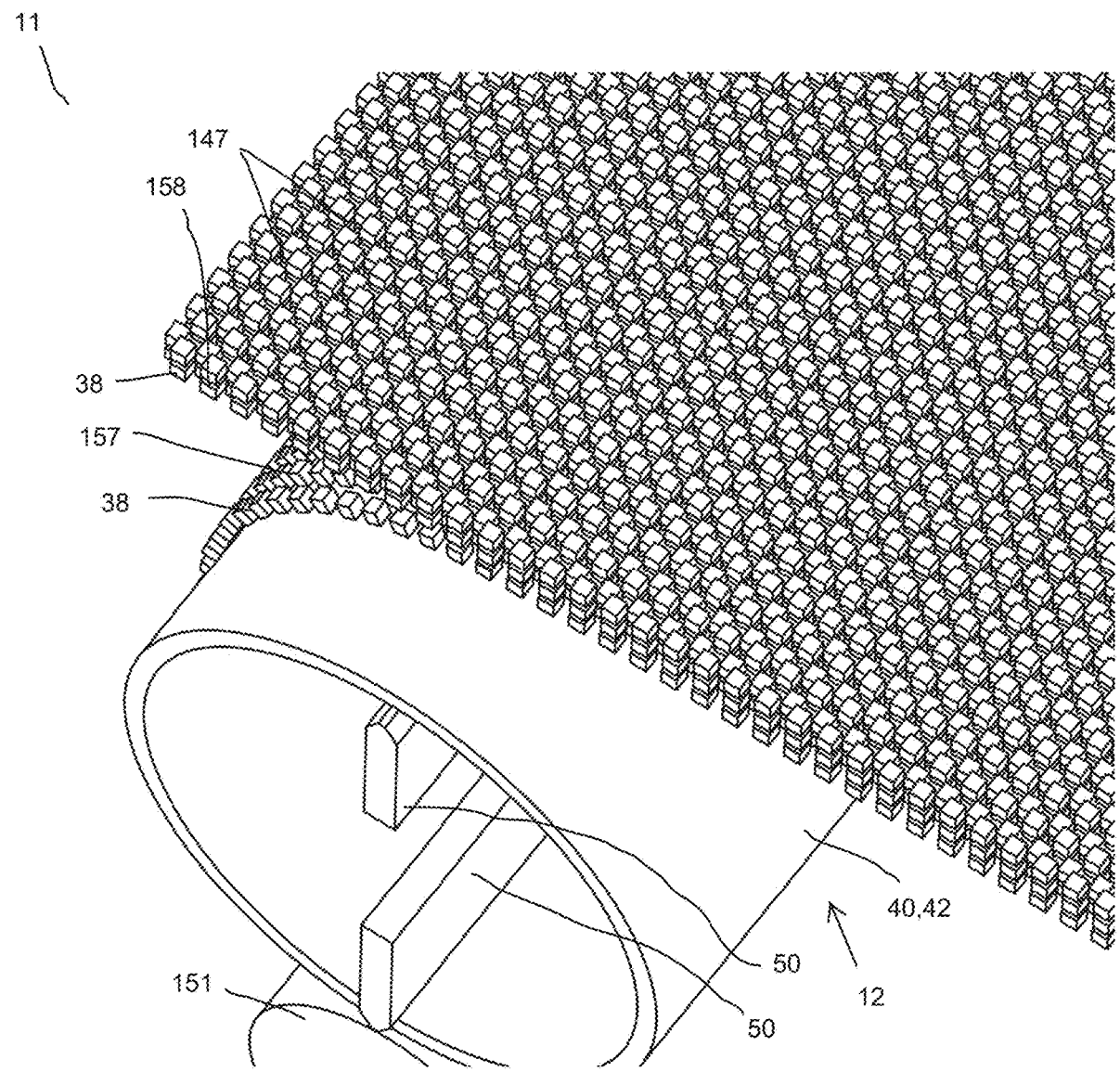
FIG. 87 is a top perspective view of the portion of the deposition mechanism producing the layer of three-dimensional object as shown in FIG. 86.
Figure 88:
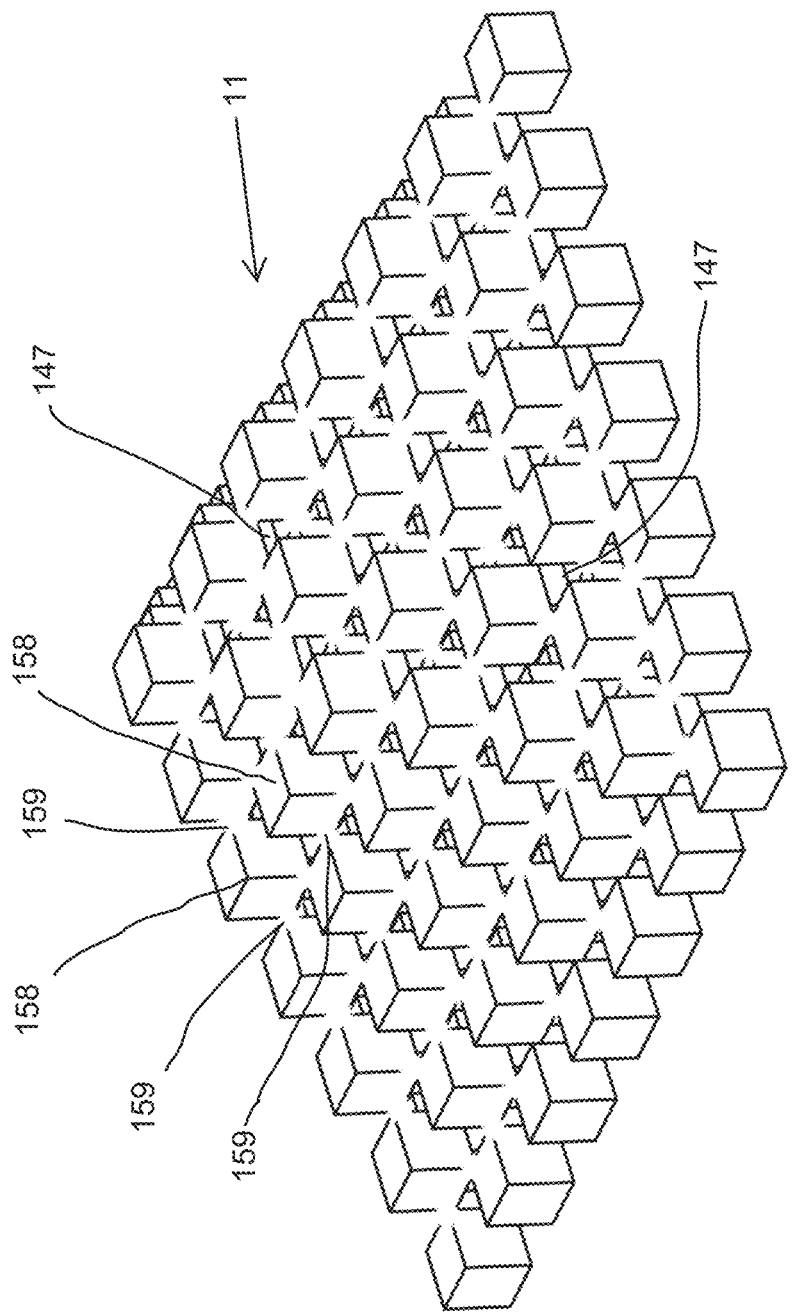
FIG. 88 is a magnified perspective view of one example of a three-dimensional object produced using the technique of FIGS. 86 and 87.
Figure 89:
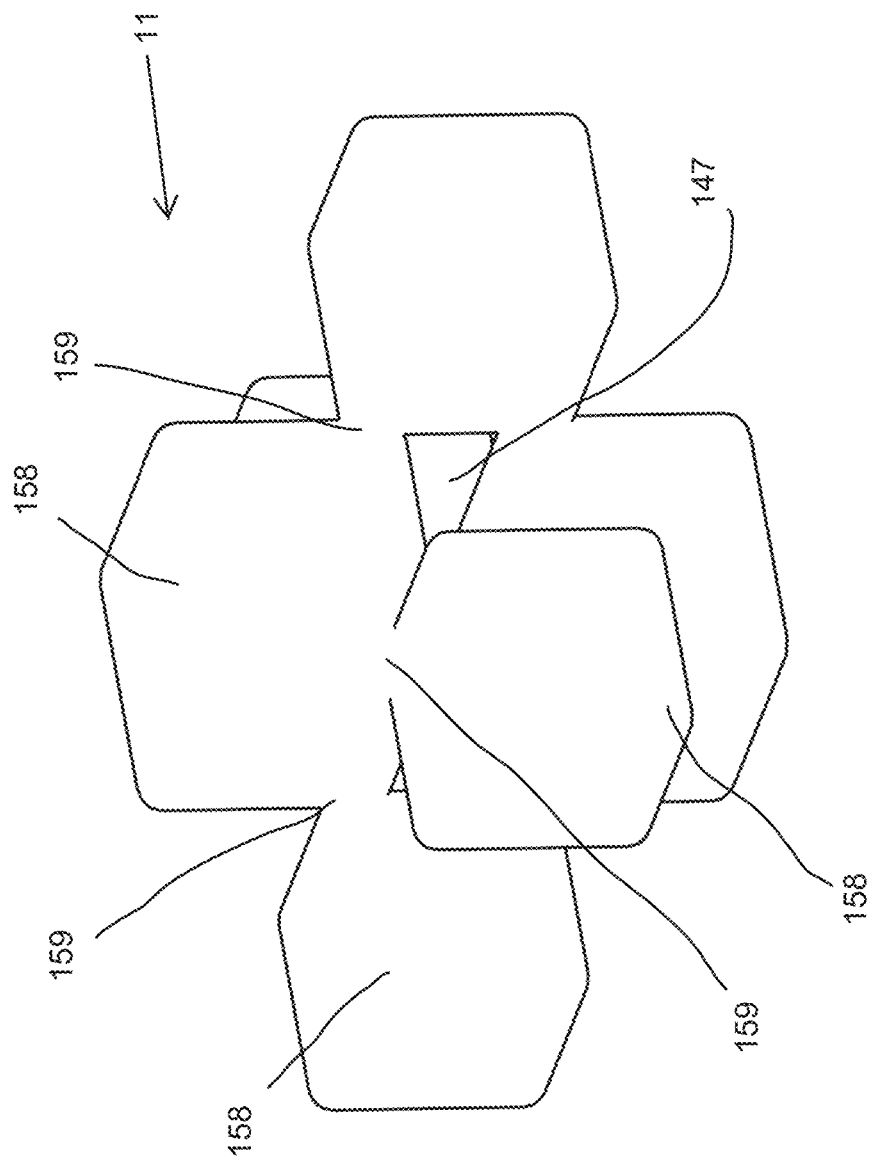
FIG. 89 is a further magnified perspective view of a portion of the three-dimensional object of FIG. 88.

FIGS. 86-89 illustrate a second production technique, where an object 11 is produced using layers 38 of offset or staggered cubes 158 of solidified material. FIGS. 86-87 illustrate production of a layer 38 of such cubes 158 that are offset in the x-direction, the y-direction, and the z-direction relative to the previously deposited layer forming the surface of the object 11 to which the currently produced layer 38 is being bonded. Each successive layer 38 is produced to be offset in this same manner, creating a repeating and internally porous structure of the object 11, with internal air pockets or voids 147 partially or completely surrounded by solidified material of the article 11. The cubes 158 are dimensioned so as to be bonded to each other at their corners 159, as shown in FIGS. 88-89, which show the structure of the object 11 greatly magnified. It is understood that the height (z-direction) position of the roller 42 must be controlled in order to achieve this bonding.

Figure 90:
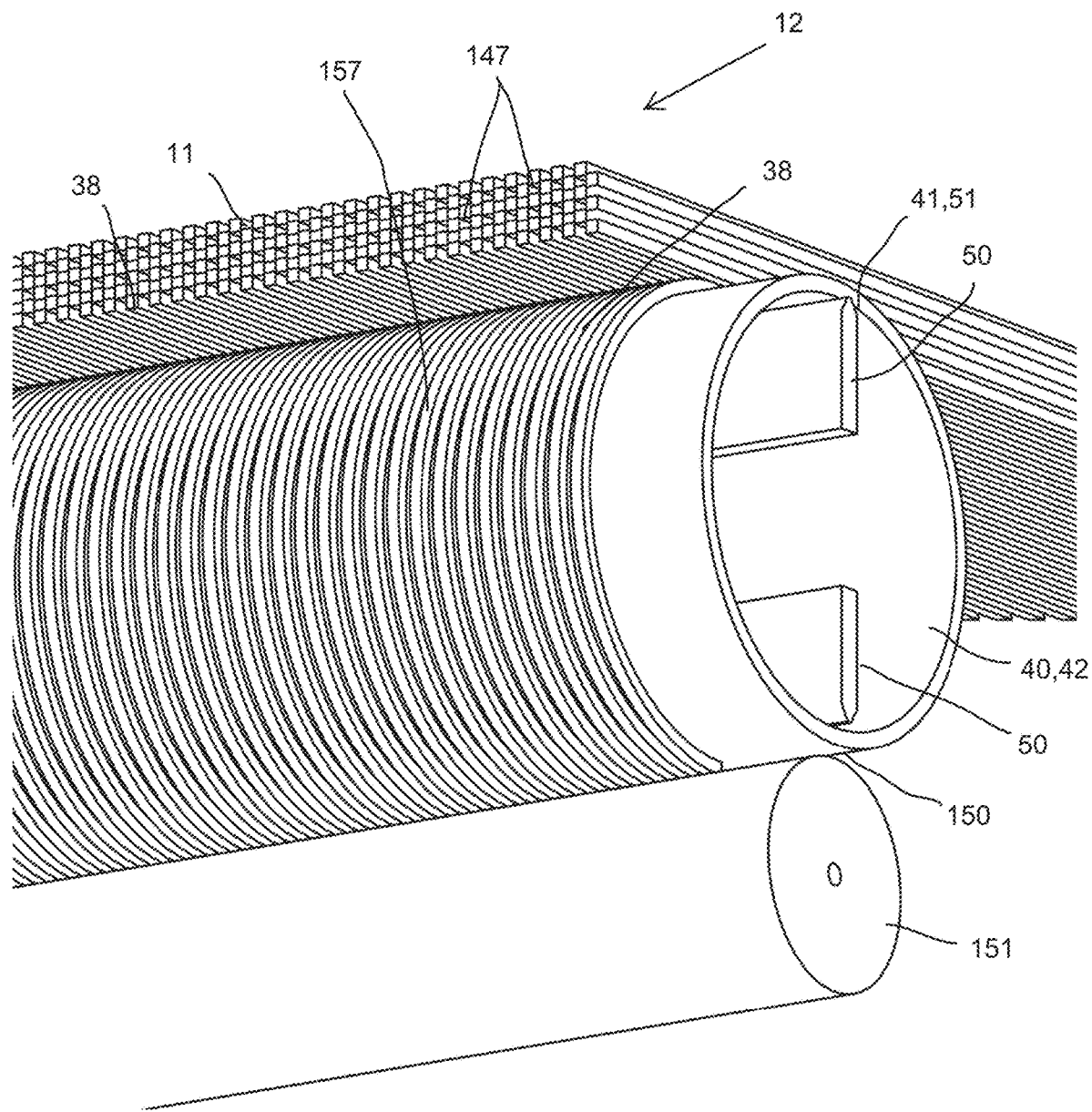
FIG. 90 is a bottom perspective view of a portion of a deposition mechanism producing a layer of another embodiment of a three-dimensional object according to aspects of the disclosure.
Figure 91:
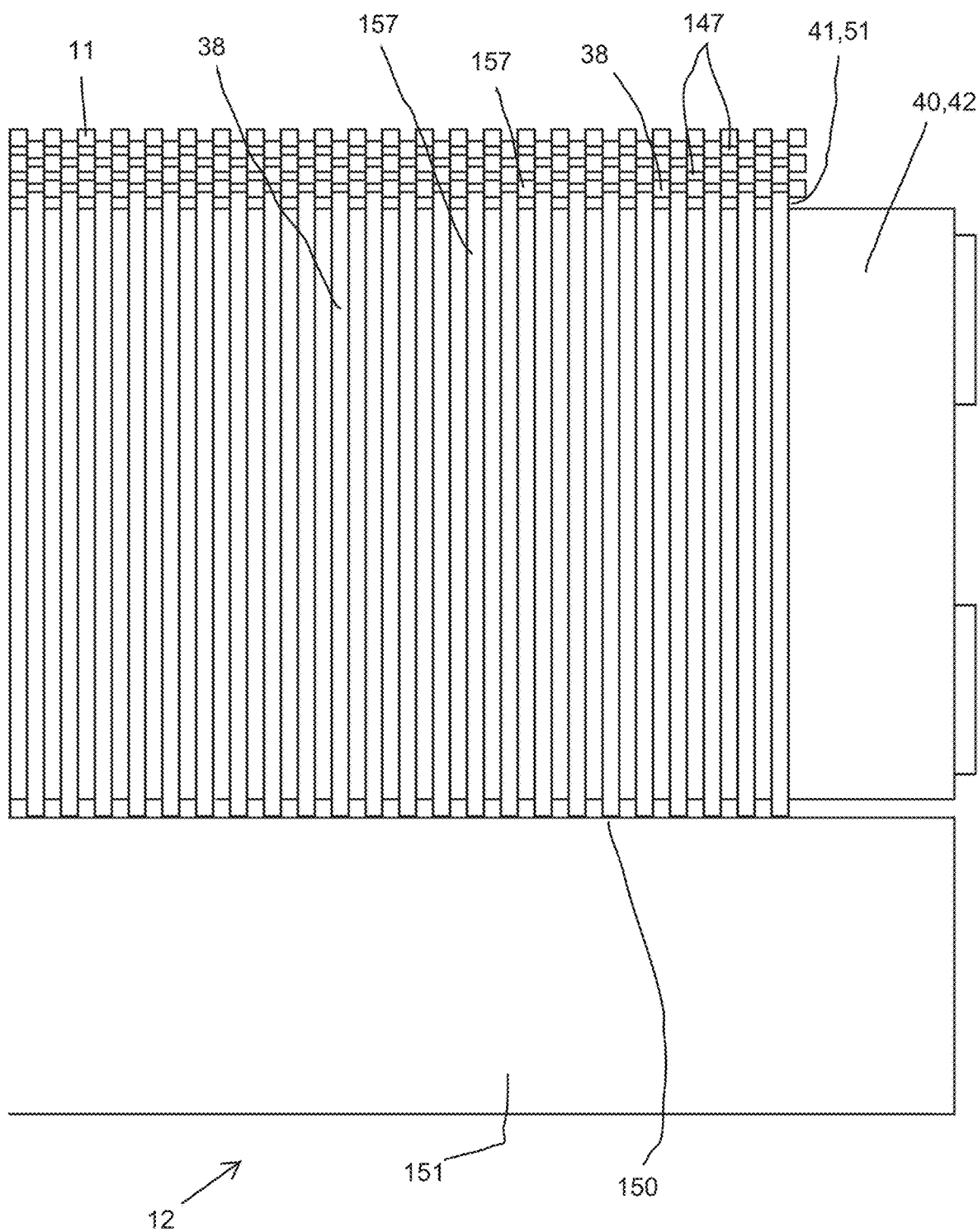
FIG. 91 is a top perspective view of the portion of the deposition mechanism producing the layer of three-dimensional object as shown in FIG. 90.

FIGS. 90-91 illustrate a third production technique, where an object 11 is produced using layers 38 of offset or staggered strips 157 of solidified material. The strips 157 in FIGS. 90-91 extend in circumferentially on the roller 42, i.e., in the x-direction, but the process may be modified to instead use strips that extend axially on the roller 42, i.e., in the y-direction. The strips 157 of the layer 38 currently being applied in FIGS. 90-91 are parallel to and offset in the y-direction and the z-direction from the strips 157 forming the surface of the object 11 to which the currently produced layer 38 is being bonded. Each successive layer 38 is produced to be offset in this same manner, creating a repeating and internally porous structure of the object 11, with internal air pockets or voids 147 partially or completely surrounded by solidified material of the article 11. The strips 157 are bonded at the corners 159 to the adjacent strips in order to produce this structure. It is understood that the height (z-direction) position of the roller 42 must be controlled in order to achieve this bonding. It is also understood that if the process uses strips that extend in the y-direction rather than the x-direction, the strips would be offset in the x-direction in adjacent layers 38.

Figure 92:
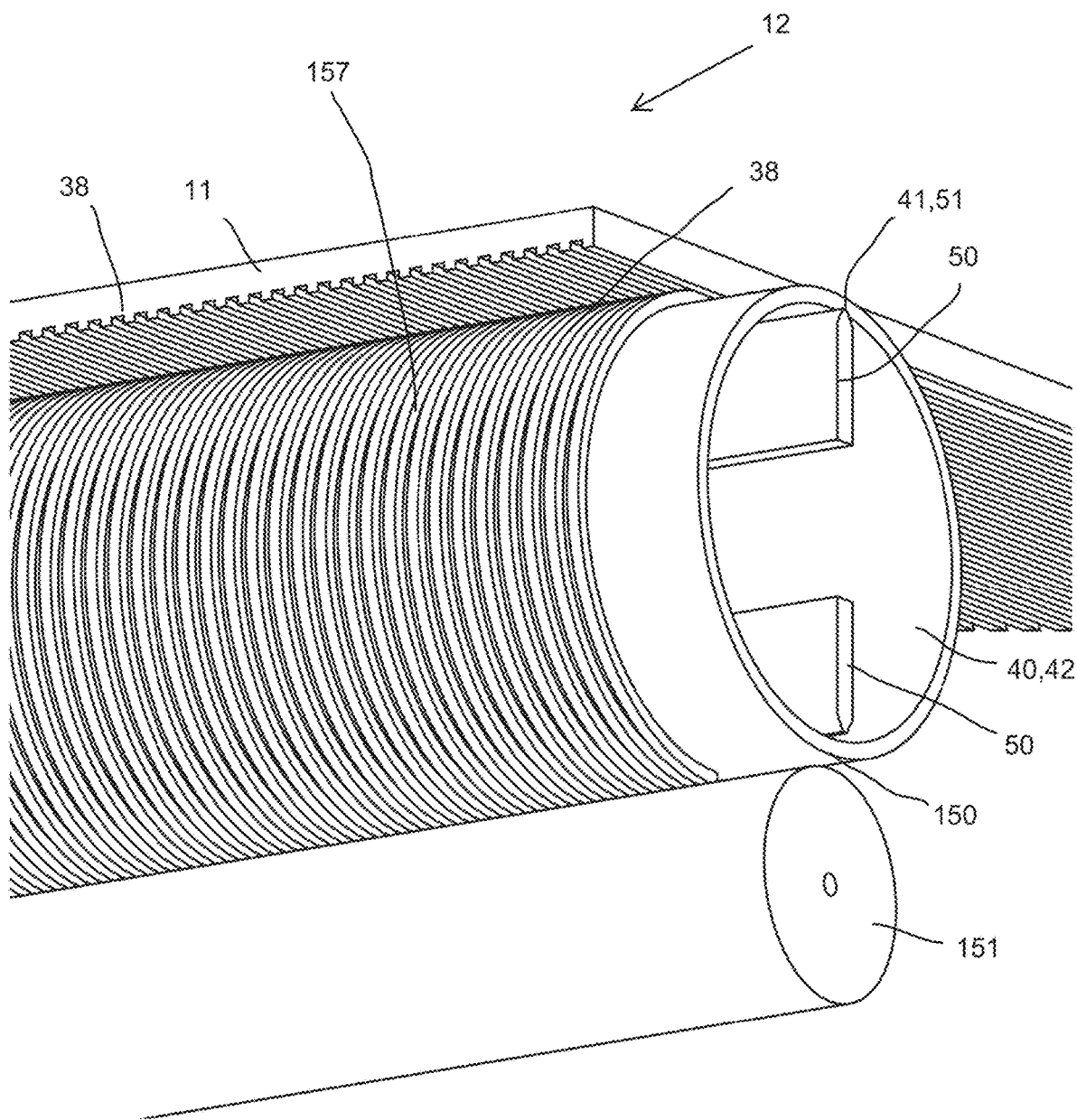
FIG. 92 is a bottom perspective view of a portion of a deposition mechanism producing a layer of another embodiment of a three-dimensional object according to aspects of the disclosure.
Figure 93:
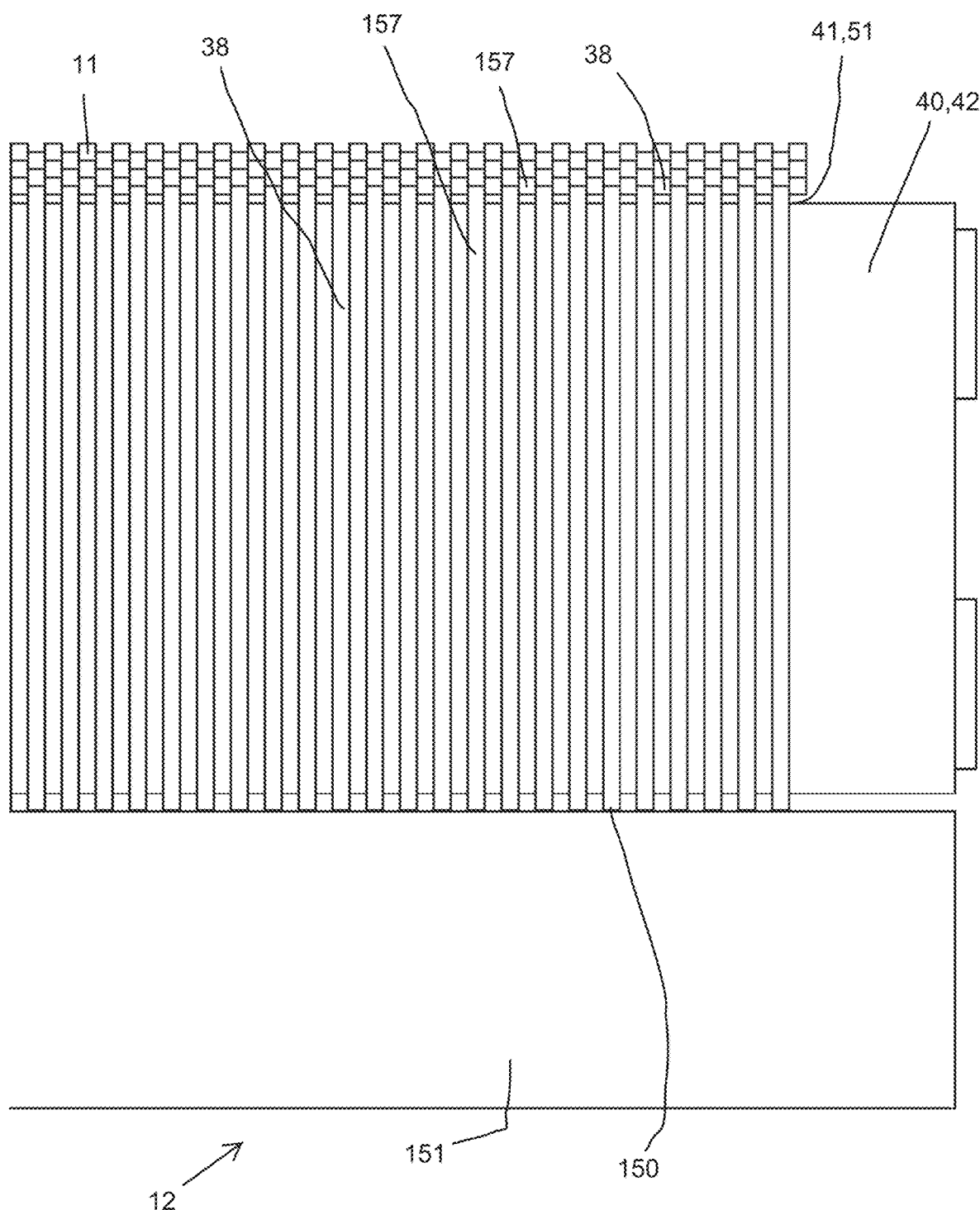
FIG. 93 is a top perspective view of the portion of the deposition mechanism producing the layer of three-dimensional object as shown in FIG. 92.

FIGS. 92-93 illustrate a fourth production technique, where an object 11 is produced using layers 38 of offset or staggered strips 157 of solidified material. The strips 157 in FIGS. 92-93 extend in circumferentially on the roller 42, i.e., in the x-direction, but the process may be modified to instead use strips that extend axially on the roller 42, i.e., in the y-direction. The strips 157 of the layer 38 currently being applied in FIGS. 92-93 are parallel to and offset in the y-direction from the strips 157 forming the surface of the object 11 to which the currently produced layer 38 is being bonded. The layers 38 are applied in pairs, with a first layer 38 being applied to the object 11 and then a second layer 38 being subsequently applied with the strips 157 at a z-position that is offset approximately half the thickness of the first layer 38 relative to the first layer 38 but offset in the y-direction to fill the gaps between the strips 157 and create a solid object. FIGS. 92-93 illustrate production of the second such layer 38, and it is understood that the first layer 38 would be applied to a flat surface of the object 11. It is understood that the height (z-direction) position of the roller 42 must be controlled in order to achieve this bonding. It is also understood that if the process uses strips that extend in the y-direction rather than the x-direction, the strips would be offset in the x-direction in adjacent layers 38. This production technique may provide advantages for production of large parts with little internal porosity, due to issues that arise with application of large, continuous sheets of material. Such issues include potential speed improvement, buildup of uncured material at the application site 41 (e.g., "plowing"), and deformation of the layer 38 due to stresses. The build configuration in FIGS. 92-93 may also potentially create an object with greater strength and/or toughness due to offsetting of the bonding locations.

Figure 78:
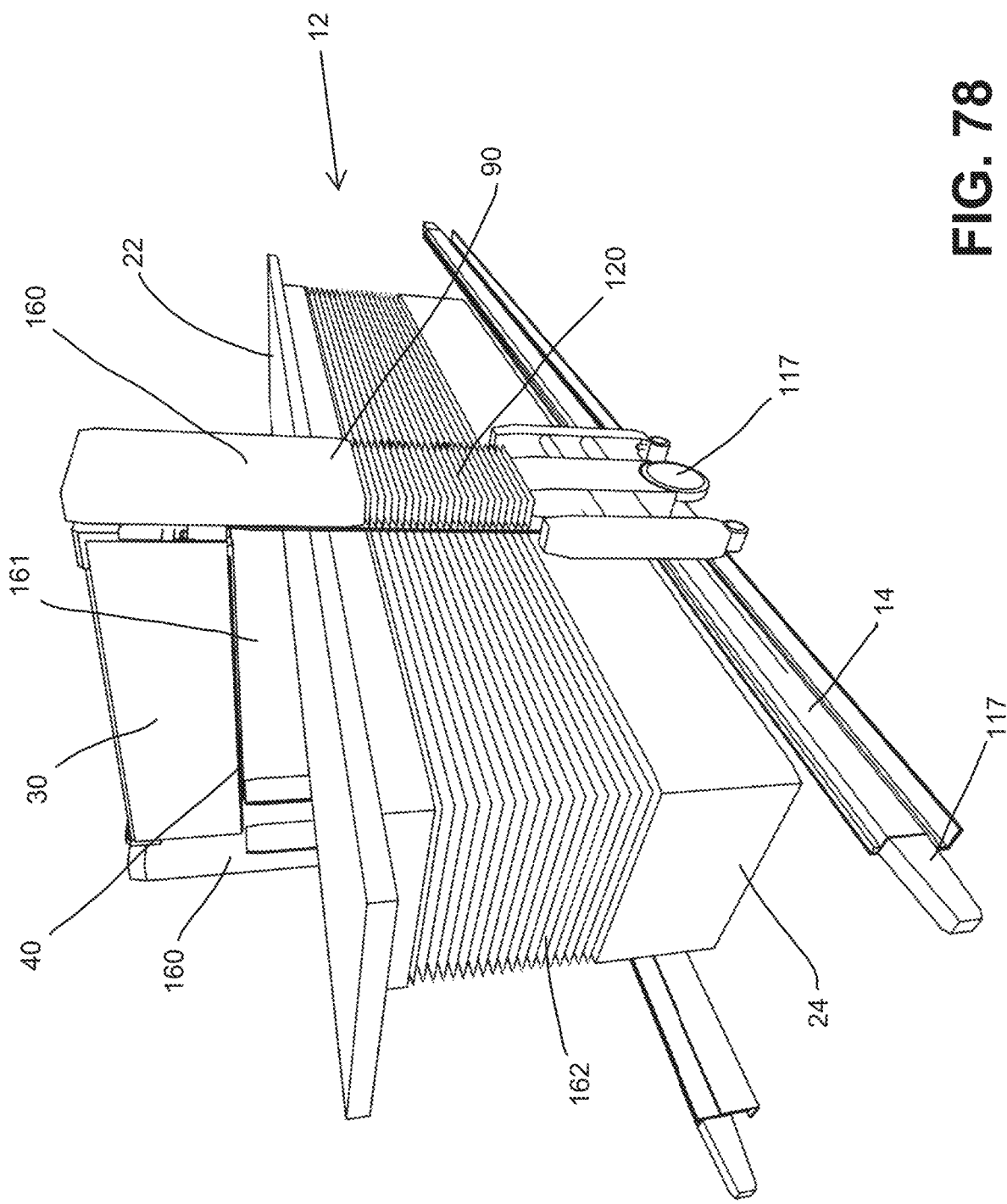
FIG. 78 is a perspective view of the apparatus of FIG. 76, showing vertical adjustment of the support assembly of the apparatus to a new vertical application location and operation of the deposition mechanism to produce the three-dimensional object.
Figure 79:
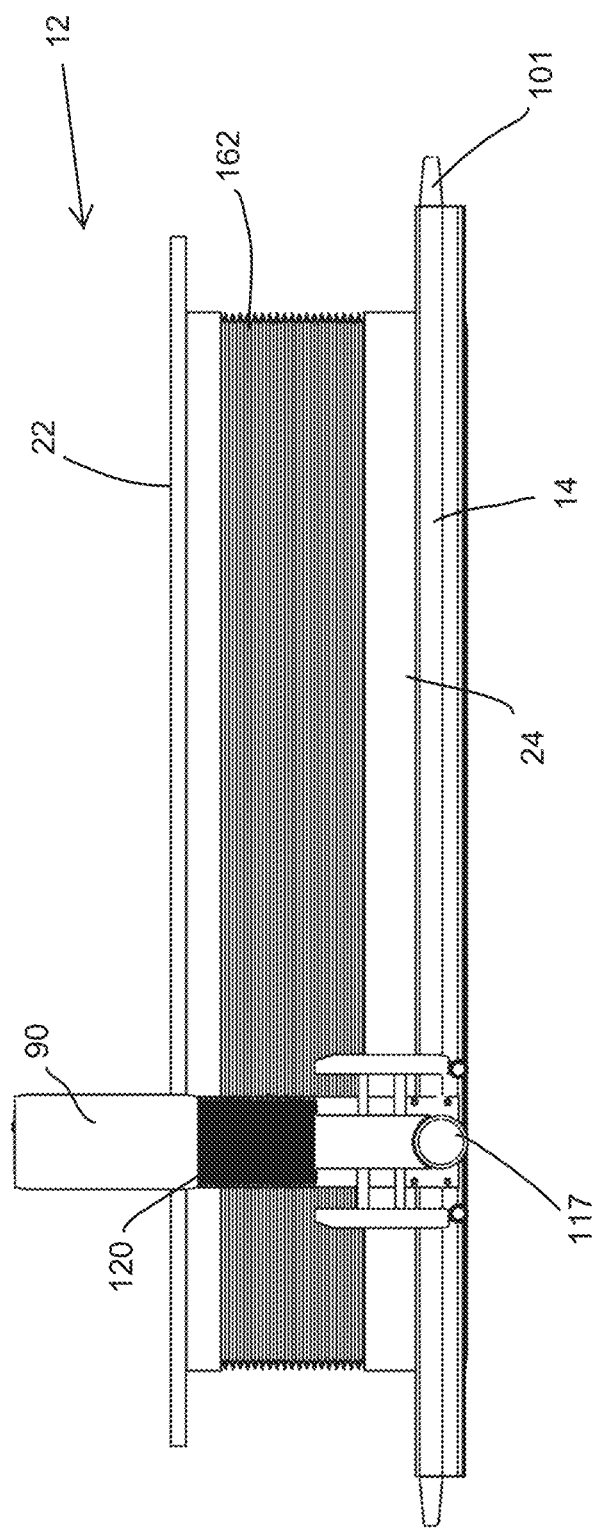
FIG. 79 is a side view of the apparatus of FIG. 78.
Figure 80:
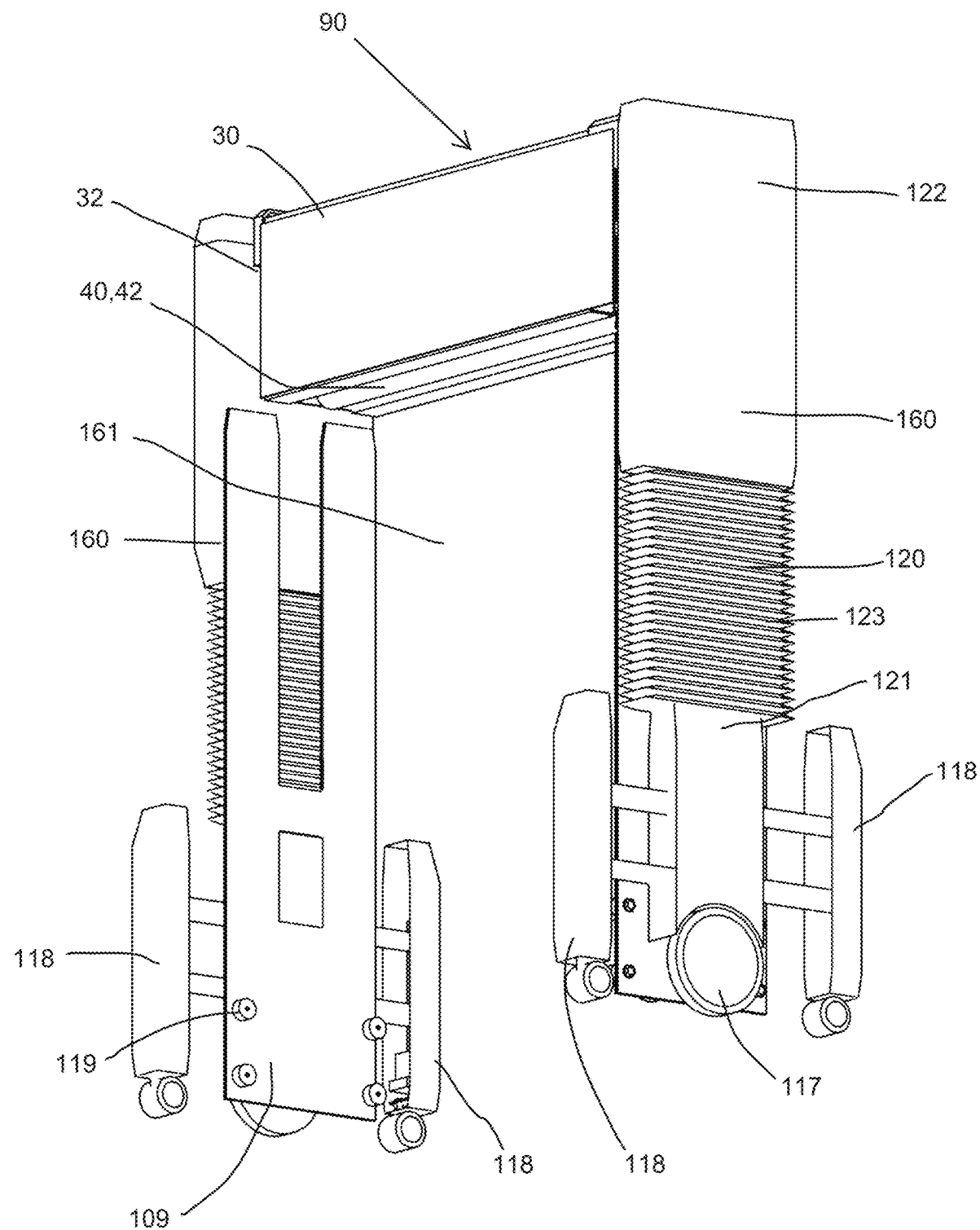
FIG. 80 is a bottom perspective view of the deposition mechanism of the apparatus of FIG. 76.
Figure 81:
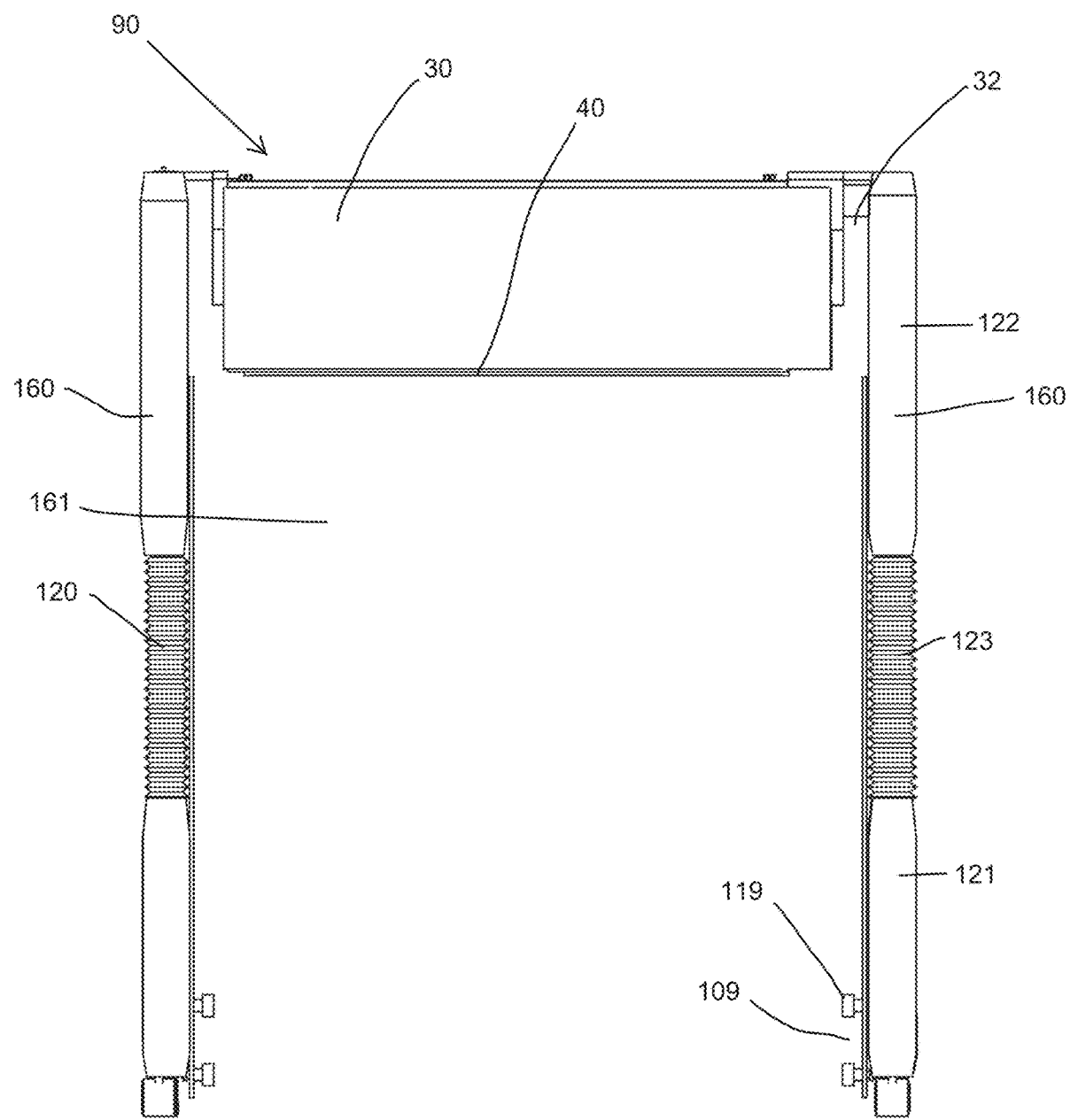
FIG. 81 is a front view of the deposition mechanism of FIG. 80.

FIGS. 76-81 illustrate an autonomous unit 90 and a build platform 22 configured to use a deposition mechanism 30 as shown in FIG. 75. The components of the autonomous unit 90 are the same as the unit 90 described herein and shown in FIGS. 31-47, and similar or identical components are not re-described with respect to this embodiment for the sake of brevity. As seen in FIGS. 80-81, the autonomous unit 90 is configured to hold a deposition mechanism 30 in which the application site 41 is at the bottom of the deposition mechanism 30. The unit 90 therefore has two legs 160 forming a space 161 between the legs 160, and the applicator 40 is configured to apply the layer 38 to build the object 11 in the space 161 between the legs 160 and below the applicator 40. FIGS. 76-79 illustrate use of the autonomous unit 90 to build an object 11 on the build platform 22, and the build platform 22 passes through the gap 161 during manufacturing as shown in FIGS. 78-79. The height (z-position) of the deposition mechanism 30 is adjustable using the vertical adjustment mechanism 120 of the unit 90, and the height of the build platform 22 is also adjustable using a vertical adjustment mechanism 162 on the build platform 22. The combination of these adjustment mechanisms 120, 162 permit a great deal of relative movement between the deposition mechanism 30 and the build platform 22 for production of objects 11 having large heights.

The system 10 also includes a controller 100 that is configured to control and/or monitor the operation of one or more mechanisms of the apparatus 12, including numerous examples described herein. In one embodiment of the invention, controller 100 may be implemented with a computer system, such as computer 2602. Computer 2602 includes a central processor 2604 that controls the overall operation of the computer and a system bus 2606 that connects central processor 210 to the components described below. System bus 2606 may be implemented with any one of a variety of conventional bus architectures.

Computer 2602 may include a variety of interface units and drives for reading and writing data or files. For example, computer 2602 may include a memory interface 2608 coupling a memory drive 2610 to system bus 2606. Memory drive 2610 may be implemented with physical memory device, magnetic memory device, optical memory device or other type of memory device. Memory drive 2610 may store data, CAD files, and other electronic files that are used to produce three-dimensional objects as described herein. A system memory 2612 may be included and implemented with a conventional computer readable medium memory having a read only memory section that stores a basic input/output system (BIOS) and a random access memory (RAM) that stores other data and files. Memory drive 2610 and system memory 2612 may both contain computer-executable instructions designed to be executed by processor 2604. In some embodiments, one or more control programs for operating one or more apparatuses 12 and/or multiple components (e.g., multiple deposition mechanisms 30) within each apparatus 12 may be stored in memory drive 2610 and/or system memory 2612.

Figure 26:
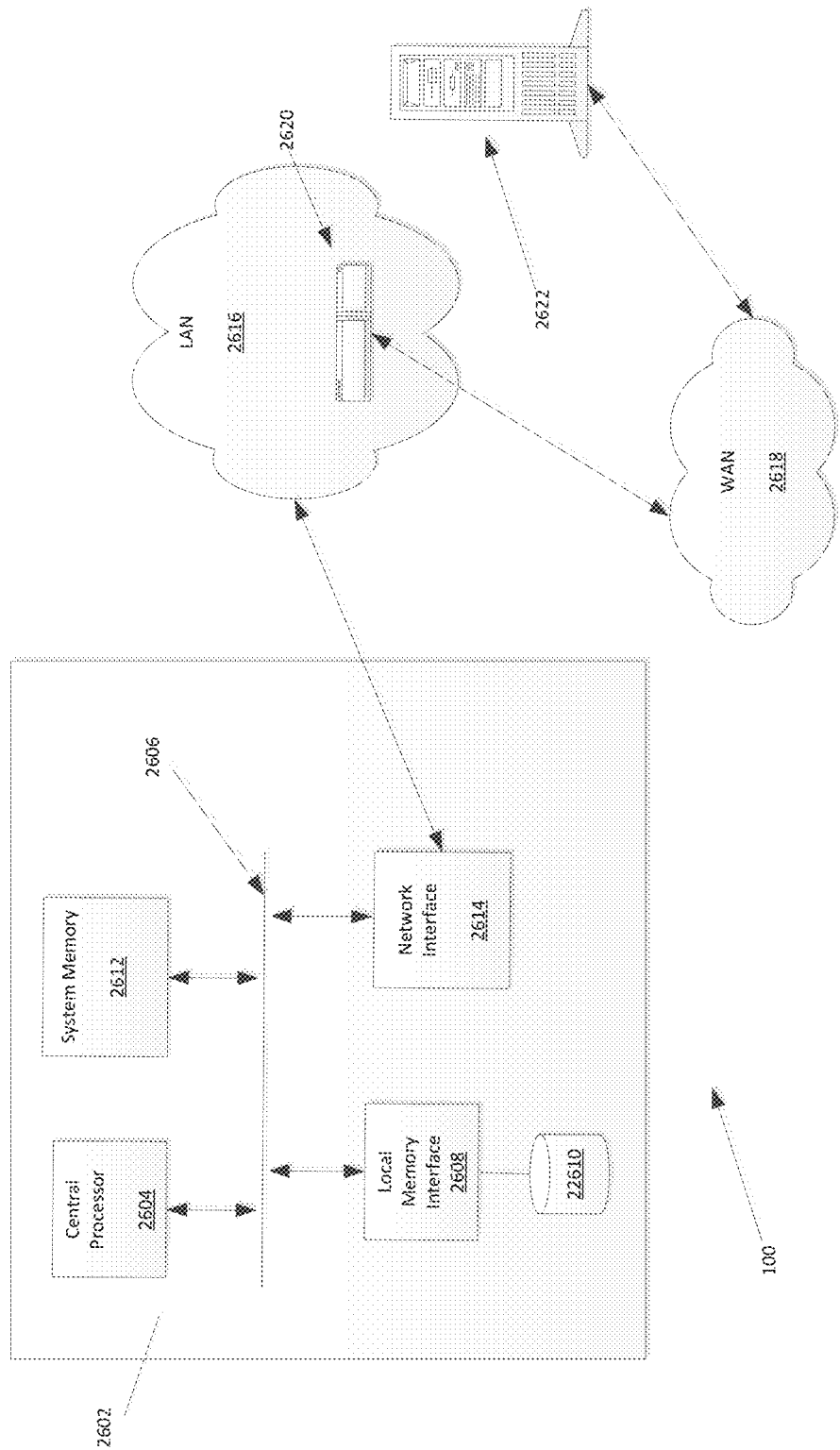
FIG. 26 is a schematic view of a controller according to aspects of the disclosure.

Computer 2602 may include additional interfaces for connecting peripheral devices to system bus 2606. For example, computer 2602 may also include a network interface 2614 that couples system bus 2602 to local area network (LAN) 2616. LAN 2616 may have one or more of the well-known LAN topologies and may use a variety of different protocols, such as Ethernet. A wide area network (WAN) 2618, such as the Internet, may also be accessed by computer 2602. FIG. 26 shows a router 2620 that may connect LAN 2616 to WAN 2618 in a conventional manner. A server 2622 is shown connected to WAN 204. Of course, numerous additional servers, computers, handheld devices, personal digital assistants, telephones and other devices may also be connected to WAN 2618. In some embodiments, server 2622 stores data, CAD files, control programs and/or other electronic files that may be accessed by computer 2602 and used to produce three-dimensional objects as described herein.

Various embodiments are described herein with various combinations of features and components. It is understood that the features and components of each of the various embodiments described herein may be incorporated into other embodiments described herein.

The use of the system and apparatus described herein provides benefits and advantages over existing technology. For example, consumable cost is greatly decreased, as the apparatus generates little waste and does not require maintaining a large vat of material to be solidified for manufacturing, as do many current technologies. Additionally, the structure of the apparatus does not dictate any specific size limits, and the apparatus may be configured to create an object that is significantly larger than existing technologies. The length of the track and the width of the applicator can be increased as desired without negatively affecting performance, and the size of the room in which the apparatus sits becomes the limit of the size of the apparatus. Further, the apparatus may be configured for manufacturing an object or multiple objects many times faster than any existing technology. The apparatus also provides the ability to manufacture objects from multiple materials, including objects that have removable support structure that is made from a material different from that of the main object. Production of objects from multiple materials that require different exposure sources is enabled as well. The apparatus further provides the ability to manufacture functional objects, such as a window or other transparent object, or a conductive object. Still further, objects manufactured using the apparatus described herein may not require draining liquid material from any internal cavities of the finished object, which may require drilling a hole for drainage. The apparatus is also capable of producing clean, dry, and fully-cured objects, which increases production efficiency. The modular configuration of the apparatus also great versatility, customizability, and other benefits.

Additional advantages are provided by the configuration of the deposition mechanism 30 as an autonomous unit 90 with a vertical adjustment mechanism 120, in combination with an open-ended track 14 that can be engaged and disengaged by the unit 90 and a build platform 22 associated with the track 14 and configured for manufacturing of an object 11 in a downward layer-by-layer technique. This configuration permits multiple deposition mechanisms 30 to operate on the same track 14 to apply multiple layers to one or more objects 11 simultaneously. Multiple deposition mechanisms 30 operating on the same track 14 may combine to build one or more objects 11 or may build multiple objects 11 separately and simultaneously on the same build platform 22. This configuration also enables building multiple objects of the same or different materials in separate locations on the same build platform 22 in a rapid manner. This configuration also facilitates maintenance of the deposition mechanism 30, as an autonomous unit 90 can be removed from the production process for maintenance quickly and easily, and may also be quickly and easily replaced with another unit 90 to achieve substantially uninterrupted production. A system including multiple such units 90 can operate with a number of different build platforms 22, such as in a large production facility, where the units 90 can be assigned and re-assigned to specific build areas 13 as needed for optimized production. Still other benefits and advantages over existing technology are provided by the systems, apparatuses, and methods described herein, and those skilled in the art will recognize such benefits and advantages.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. In particular, these terms do not imply any order or position of the components modified by such terms. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. A deposition mechanism configured for producing a three-dimensional object on a build platform using a resin in a layer-by-layer technique, with a build area defined adjacent to the build platform, the deposition mechanism comprising:
   a carriage configured for movement through the build area;
   a supply of the resin in flowable form mounted on the carriage;
   a roller in communication with the supply of the resin and rotatably mounted on the carriage; and
   an exposure device mounted on the carriage and configured for emitting electromagnetic waves,
   wherein the exposure device is configured for emitting the electromagnetic waves to a first exposure site located adjacent to the roller within the supply of the resin, to at least partially solidify a layer of the resin,
   wherein the roller is configured for rotating to carry the layer of the resin to an application site within the build area for application to produce the three-dimensional object as the carriage passes through the build area, and
   wherein the exposure device is further configured for emitting the electromagnetic waves to a second exposure site within the build area to apply the layer to produce the three-dimensional object.

2. The deposition mechanism of claim 1, further comprising a controller configured for controlling movement of the carriage and the roller and for controlling activation of the exposure device to produce the three-dimensional object.

3. The deposition mechanism of claim 1, wherein the deposition mechanism further comprises a resin removal mechanism positioned between the first exposure site and the second exposure site and configured for removing excess unsolidified resin from the layer between the first and second exposure sites.

4. The deposition mechanism of claim 1, wherein the deposition mechanism further comprises a first lens array positioned between the exposure device and the first exposure site and a second lens array positioned between the exposure device and the second exposure site, wherein the first and second lens arrays are configured to focus the electromagnetic waves directed toward the first exposure site and the second exposure site.

5. The deposition mechanism of claim 1, wherein the first exposure site and the second exposure site are located at approximately 180° from each other relative to the roller.

6. An apparatus comprising the deposition mechanism according to claim 1 and a support assembly having the build platform with the build area defined adjacent to the build platform.

7. The deposition mechanism of claim 1, further comprising a first plurality of optical fibers having first exit ends arranged in a first array and first entrance ends configured for receiving the electromagnetic waves from the exposure device, and a second plurality of optical fibers having second exit ends arranged in a second array and second entrance ends configured for receiving the electromagnetic waves from the exposure device, wherein the first plurality of optical fibers are configured such that the electromagnetic waves emitted by the exposure device travel through the first plurality of optical fibers and exit the exit ends of the first array directed toward the first exposure site, and the second plurality of optical fibers are configured such that the electromagnetic waves emitted by the exposure device travel through the second plurality of optical fibers and exit the exit ends of the second array directed toward the second exposure site.

8. The deposition mechanism of claim 7, wherein the exposure device comprises a plurality of LEDs, wherein each of the first plurality of optical fibers and each of the second plurality of optical fibers is associated with one of the plurality of LEDs.

9. The deposition mechanism of claim 7, wherein the exposure device comprises a DLP projector, wherein each of the first plurality of optical fibers and each of the second plurality of optical fibers are configured for receiving the electromagnetic waves from the DLP projector.

10. The deposition mechanism of claim 1, wherein the deposition mechanism further comprises a thickness limiter positioned at the first exposure site, such that the first exposure site is located between the roller and the thickness limiter, and wherein a space between the roller and the thickness limiter defines a thickness of the layer.

11. The deposition mechanism of claim 10, wherein the thickness limiter comprises a secondary roller rotatably mounted at least partially within the supply of the resin.

12. The deposition mechanism of claim 1, wherein the carriage is configured to be mounted on a track for movement through the build area.

13. The deposition mechanism of claim 12, wherein the carriage is further configured for autonomous movement separate from the track.

14. A deposition mechanism configured for producing a three-dimensional object on a build platform using a resin in a layer-by-layer technique, with a build area defined adjacent to the build platform, the deposition mechanism comprising:
   a carriage configured for movement through the build area;

a supply of the resin in flowable form mounted on the carriage;

a primary roller in communication with the supply of the resin and rotatably mounted on the carriage;

a secondary roller rotatably mounted at least partially within the supply of the resin, such that a space is defined between the primary roller and the secondary roller; and an exposure device mounted on the carriage and configured for emitting electromagnetic waves, wherein the exposure device is configured for emitting the electromagnetic waves to a first exposure site located within the supply of the resin and within the space between the primary and secondary rollers, to at least partially solidify a layer of the resin, such that the space between the primary and secondary rollers defines a thickness of the layer, wherein the primary roller is configured for rotating to carry the layer of the resin to an application site within the build area for application to produce the three-dimensional object as the carriage passes through the build area, and wherein the exposure device is further configured for emitting the electromagnetic waves to a second exposure site within the build area to apply the layer to produce the three-dimensional object.

15. The deposition mechanism of claim 14, further comprising a controller configured for controlling movement of the carriage and the primary and secondary rollers and for controlling activation of the exposure device to produce the three-dimensional object.

16. The deposition mechanism of claim 14, wherein the deposition mechanism further comprises a first lens array positioned between the exposure device and the first exposure site and a second lens array positioned between the exposure device and the second exposure site, wherein the first and second lens arrays are configured to focus the electromagnetic waves directed toward the first exposure site and the second exposure site.

17. An apparatus comprising the deposition mechanism according to claim 14 and a support assembly having the build platform with the build area defined adjacent to the build platform.

18. The deposition mechanism of claim 14, further comprising a first plurality of optical fibers having first exit ends arranged in a first array and first entrance ends configured for receiving the electromagnetic waves from the exposure device, and a second plurality of optical fibers having second exit ends arranged in a second array and second entrance ends configured for receiving the electromagnetic waves from the exposure device, wherein the first plurality of optical fibers are configured such that the electromagnetic waves emitted by the exposure device travel through the first plurality of optical fibers and exit the exit ends of the first array directed toward the first exposure site, and the second plurality of optical fibers are configured such that the electromagnetic waves emitted by the exposure device travel through the second plurality of optical fibers and exit the exit ends of the second array directed toward the second exposure site.

19. The deposition mechanism of claim 18, wherein the exposure device comprises a plurality of LEDs, wherein each of the first plurality of optical fibers and each of the second plurality of optical fibers is associated with one of the plurality of LEDs.

20. The deposition mechanism of claim 18, wherein the exposure device comprises a DLP projector, wherein each of the first plurality of optical fibers and each of the second plurality of optical fibers are configured for receiving the electromagnetic waves from the DLP projector.

21. The deposition mechanism of claim 18, wherein the exit ends of the first array and the exit ends of the second array are positioned within the primary roller.

22. The deposition mechanism of claim 14, wherein the deposition mechanism further comprises a resin removal mechanism positioned between the first exposure site and the second exposure site and configured for removing excess unsolidified resin from the layer between the first and second exposure sites.

23. The deposition mechanism of claim 22, wherein the resin removal mechanism comprises a cleaning roller positioned between the first exposure site and the second exposure site and configured for rotating in contact with a surface of the layer to remove the excess unsolidified resin from the layer between the first and second exposure sites.

24. The deposition mechanism of claim 22, wherein the resin removal mechanism comprises first and second cleaning rollers positioned between the first exposure site and the second exposure site on opposite sides of the second exposure site, wherein the first and second cleaning rollers are configured such that the first cleaning roller is configured for rotating in contact with a surface of the layer to remove the excess unsolidified resin from the layer between the first and second exposure sites when the deposition mechanism is moving in a first direction and the second cleaning roller is configured for rotating in contact with the surface of the layer to remove the excess unsolidified resin from the layer between the first and second exposure sites when the deposition mechanism is moving in a second direction opposite the first direction.

25. The deposition mechanism of claim 24, wherein the first and second cleaning rollers are configured such that the first cleaning roller is configured for contacting the primary roller to function as a first transfer verification sensor when the deposition mechanism is moving in the second direction and the second cleaning roller is configured for contacting the primary roller to function as a second transfer verification sensor when the deposition mechanism is moving in the first direction.

26. The deposition mechanism of claim 14, wherein the carriage is configured to be mounted on a track for movement through the build area.

27. The deposition mechanism of claim 26, wherein the carriage is further configured for autonomous movement separate from the track.

* * * * *